(12) United States Patent
Yoshida et al.

(10) Patent No.: US 6,642,984 B1
(45) Date of Patent: Nov. 4, 2003

(54) LIQUID CRYSTAL DISPLAY APPARATUS HAVING WIDE TRANSPARENT ELECTRODE AND STRIPE ELECTRODES

(75) Inventors: Hidefumi Yoshida, Kawasaki (JP);
Yasutoshi Tasaka, Kawasaki (JP);
Takashi Sasabayashi, Kawasaki (JP);
Yohei Nakanishi, Kawasaki (JP);
Takatoshi Mayama, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/454,578

(22) Filed: Dec. 7, 1999

(30) Foreign Application Priority Data

| Dec. 8, 1998 | (JP) | 10-348915 |
| Feb. 15, 1999 | (JP) | 11-036281 |
| Mar. 19, 1999 | (JP) | 11-075866 |
| Mar. 19, 1999 | (JP) | 11-075867 |
| Nov. 1, 1999 | (JP) | 11-311174 |
| Dec. 2, 1999 | (JP) | 11-343457 |

(51) Int. Cl.$^7$ ............................................. G02F 1/1343
(52) U.S. Cl. ........................ 349/139; 349/141; 349/143; 349/144
(58) Field of Search ................................ 349/139, 141, 349/143, 144, 146

(56) References Cited

U.S. PATENT DOCUMENTS

| 4,902,103 A | 2/1990 | Miyake et al. ............... 350/336 |
| 5,454,690 A | 10/1995 | Hisatake et al. ............... 359/87 |
| 5,745,207 A | * 4/1998 | Asada et al. .................. 349/141 |
| 5,870,160 A | * 2/1999 | Yanagawa et al. ............. 349/141 |
| 5,926,244 A | * 7/1999 | Takeda et al. ................ 349/139 |
| 6,028,653 A | * 2/2000 | Nishida ........................ 349/141 |
| 6,064,451 A | * 5/2000 | Oh et al. ........................ 349/40 |
| 6,111,627 A | * 8/2000 | Kim et al. ..................... 349/141 |
| 6,128,061 A | * 10/2000 | Lee et al. ..................... 349/141 |
| 6,154,266 A | * 11/2000 | Okamoto et al. ............ 349/129 |
| 6,181,402 B1 | * 1/2001 | Shim et al. ................... 349/130 |
| 6,191,837 B1 | * 2/2001 | Fujimaki et al. ............. 349/141 |
| 6,222,602 B1 | * 4/2001 | Aratani et al. ............... 349/141 |
| 6,281,958 B1 | * 8/2001 | Nakajima .................... 349/141 |
| 6,297,866 B1 | * 10/2001 | Seo et al. ..................... 349/141 |

FOREIGN PATENT DOCUMENTS

| JP | 7120792 | 5/1995 |
| JP | 7333617 | 12/1995 |
| JP | 9160042 | 6/1997 |
| JP | 9258201 | 10/1997 |
| JP | 10153782 | 6/1998 |
| JP | 10186351 | 7/1998 |
| JP | 10186366 | 7/1998 |

* cited by examiner

Primary Examiner—Robert H. Kim
Assistant Examiner—Andrew Schechter
(74) Attorney, Agent, or Firm—Greer, Burns & Crain, Ltd.

(57) ABSTRACT

A liquid crystal is arranged between a pair of substrates. One substrate has a plurality of stripe electrodes extending parallel to each other, and the other substrate has a transparent electrode covering substantially the whole surface of the other substrate. An oblique electric field is formed between the stripe electrodes and the transparent electrode, so that the liquid crystal molecules are aligned along the oblique electric field. In addition, a dielectric layer is arranged between the transparent electrode and the alignment layer.

29 Claims, 106 Drawing Sheets

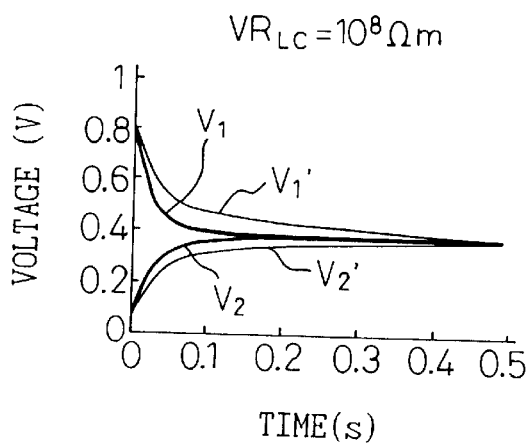
Fig.37A  VR_LC = 10^8 Ωm
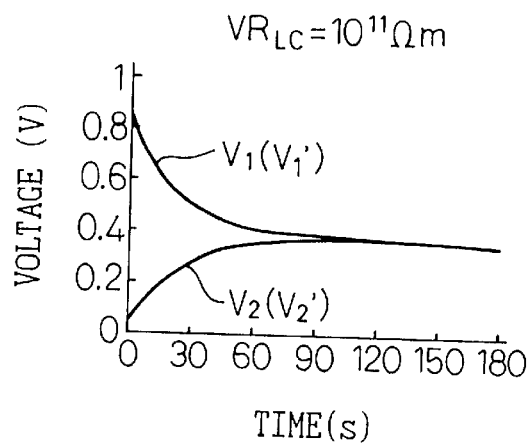
Fig.37D  VR_LC = 10^11 Ωm
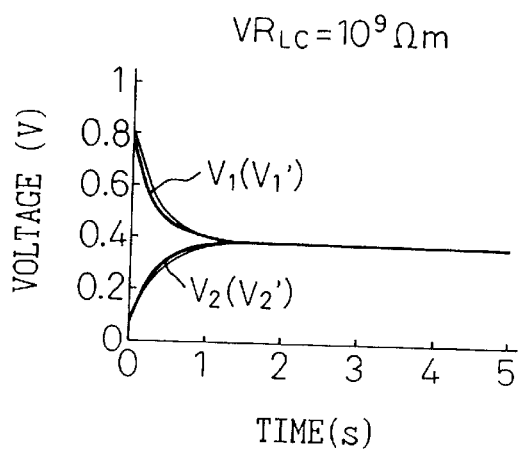
Fig.37B  VR_LC = 10^9 Ωm
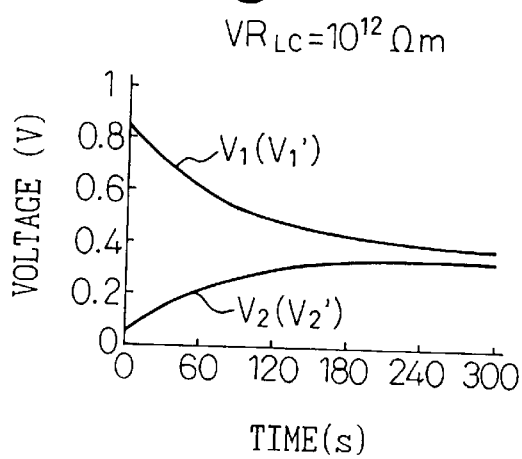
Fig.37E  VR_LC = 10^12 Ωm
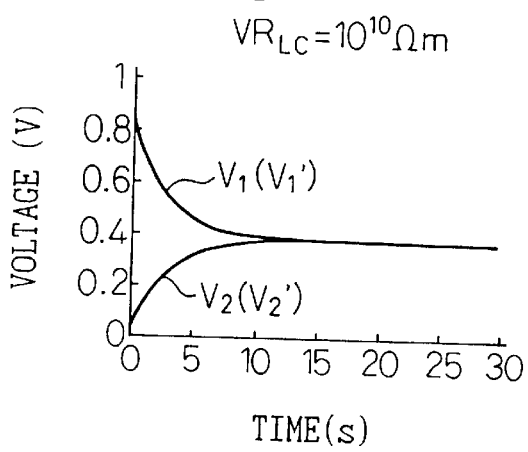
Fig.37C  VR_LC = 10^10 Ωm
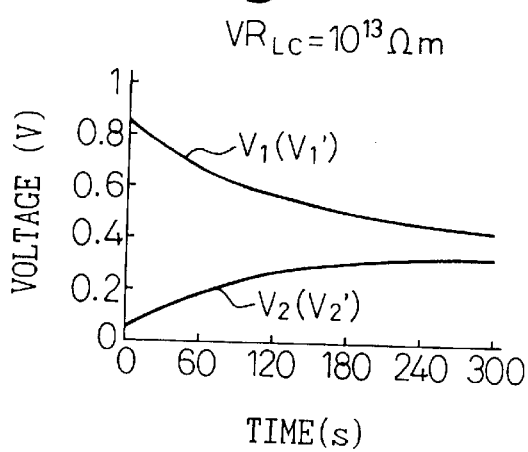
Fig.37F  VR_LC = 10^13 Ωm $VR_{LC} = 10^8 \Omega m$ $VR_{LC} = 10^{11} \Omega m$ $VR_{LC} = 10^9 \Omega m$ $VR_{LC} = 10^{12} \Omega m$ $VR_{LC} = 10^{10} \Omega m$ $VR_{LC} = 10^{13} \Omega m$ $VR_{LC} = 10^8 \Omega m$ $VR_{LC} = 10^{11} \Omega m$ $VR_{LC} = 10^9 \Omega m$ $VR_{LC} = 10^{12} \Omega m$ $VR_{LC} = 10^{10} \Omega m$ $VR_{LC} = 10^{13} \Omega m$ $VR_{IN} = 10^{12} \Omega m$ $VR_{IN} = 10^{14} \Omega m$ $VR_{IN} = 10^{13} \Omega m$ $VR_{IN} = 10^{16} \Omega m$ Fig. 164
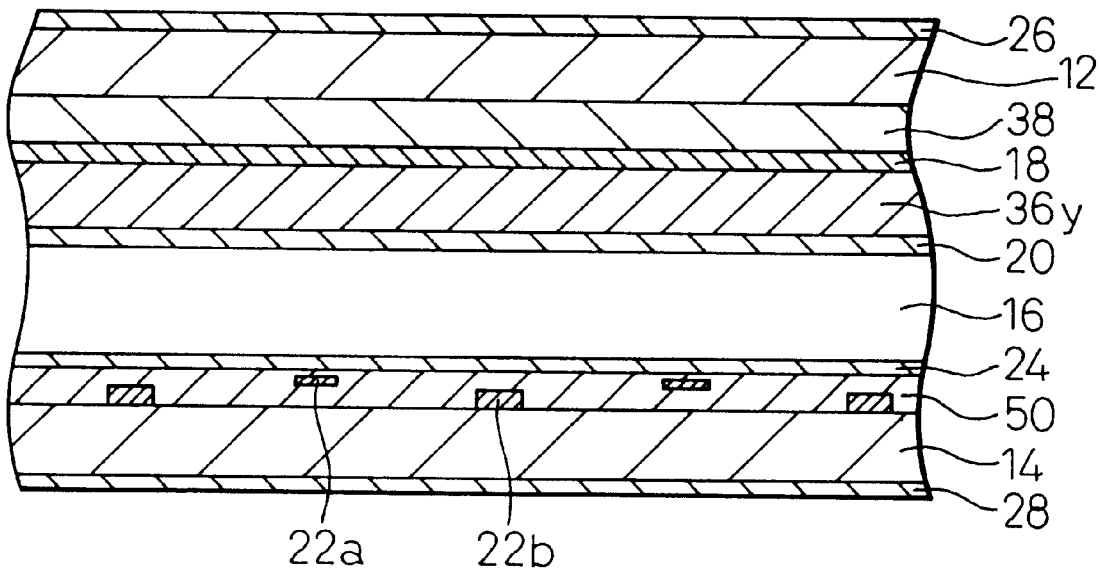
Fig. 165
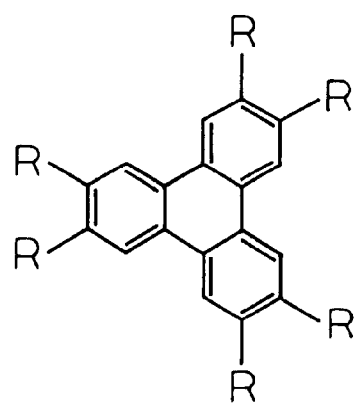
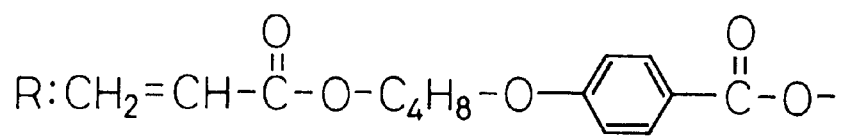

LIQUID CRYSTAL DISPLAY APPARATUS HAVING WIDE TRANSPARENT ELECTRODE AND STRIPE ELECTRODES

BACKGROUND OF THE INVENTION

1. Field of the Invention

The present invention relates to a liquid crystal display apparatus utilizing an oblique electric field.

2. Description of the Related Art

A TN-type liquid crystal display apparatus is widely used, for example, as a display unit of a personal computer. The TN-type liquid crystal display apparatus, however, harbors the problem that the contrast thereof is reduced or the brightness is reversed when the screen thereof is viewed obliquely. Thus, there is a high demand for a liquid crystal display apparatus in which the contrast is not reduced when it is viewed obliquely.

Japanese Unexamined Patent Publications No. 10-153782 and No. 10-186351, for example, disclose a liquid crystal display apparatus of an IPS (in-plane switching) type in which the contrast thereof is not reduced when it is viewed obliquely. In the IPS-type liquid crystal display apparatus, the liquid crystal is arranged between a pair of substrates, and one of the substrates has a first electrode and a second electrode between which a voltage is applied. The other substrate has no electrode. Therefore, a transverse electric field is formed in a direction substantially parallel to the substrate surface between the first electrode and the second electrode. The liquid crystal is driven by this transverse electric field. The liquid crystal display apparatus disclosed in the above publications uses a liquid crystal of a vertical alignment type having a positive dielectric anisotropy. The liquid crystal molecules are aligned in the direction perpendicular to the substrate surface when no voltage is applied thereto and are aligned in the direction parallel to the transverse electric field when a voltage is applied thereto.

In the IPS-type liquid crystal display apparatus described above, the first and second electrodes are formed of metal stripes extending in parallel to each other on one of the substrates. Upon application of a voltage, electric lines of force of the transverse electric field arcuately extend from the first electrode toward the second electrode. Assuming that the first electrode is located on the left side of the second electrode, the liquid crystal molecules located in the vicinity of the first electrode are aligned upward to the right along electric lines of force, while the liquid crystal molecules located in the vicinity of the second electrode are aligned upward to the left along electric lines of force. The liquid crystal molecules located intermediate between the first electrode and the second electrode are aligned in a direction parallel to the substrate surface along electric lines of force.

The liquid crystal molecules located intermediate between the first electrode and the second electrode, however, are affected by the liquid crystal molecules aligned upward to the left and the liquid crystal molecules aligned upward to the right, and cannot be smoothly aligned in the direction parallel to the substrate surface. This unstable alignment causes disclination. As a result, a black line is generated intermediate between the first electrode and the second electrode, thereby reducing the transmittance. The disclination appears or disappears depending on the voltage or on disturbances, and poses the problem of causing an irregular display or an after image.

SUMMARY OF THE INVENTION

The object of the present invention is to provide a liquid crystal display apparatus having a superior viewing angle characteristic free of disclination.

A liquid crystal display apparatus according to the present invention comprises a pair of substrates, a liquid crystal arranged between the pair of substrates, a plurality of stripe electrodes per one pixel formed in one of the substrates, and a transparent electrode formed on the other substrate to cover substantially the whole surface of the other substrate (to cover at least the display area).

In the configuration described above, an electric field is formed between one of the stripe electrodes and the wide transparent electrode. This electric field is an oblique electric field running from each stripe electrode toward the wide transparent electrode in oblique directions. Thus, the liquid crystal molecules are aligned in the direction perpendicular to the substrate surface when no voltage is applied thereto, and are aligned in the direction parallel to the oblique electric field upon application of a voltage thereto. In this way, almost all the liquid crystal molecules are smoothly aligned along the electric field and, therefore, no disclination occurs.

BRIEF DESCRIPTION OF THE DRAWINGS

The present invention will becomes more apparent from the following description of the preferred embodiments, with reference to the accompanying drawings, in which:

FIGS. 37A to 37F are diagrams showing the voltage change in the case where the volume resistivity of the liquid crystal is changed assuming that the volume resistivity of the alignment layer of the liquid crystal display apparatus of FIG. 32 is $10^{10}$ Ω.m;

FIG. 110 is a plan view showing a liquid crystal display apparatus according still another embodiment of the invention;

FIG. 111 is a sectional view taken along line 111—111 in FIG. 110;

FIG. 112 is a diagram for explaining the operation of the liquid crystal display apparatus of FIG. 110;

FIG. 113 is a diagram showing the liquid crystal display apparatus of FIG. 110 with a voltage applied thereto;

FIG. 114 is a diagram showing the result of determining by calculation the relation between the chiral pitch of the liquid crystal and the front brightness;

FIGS. 115A to 115C are diagrams showing the result of studying the voltage transmittance characteristic with d/p changed;

FIGS. 116A to 116C are diagrams showing the result of studying the voltage-transmittance characteristic with d/p changed similarly;

FIGS. 117A to 117C are diagrams showing the result of studying the voltage-transmittance characteristic with d/p changed similarly;

FIG. 118 is a sectional view of a modification of the liquid crystal display apparatus of FIG. 110;

FIG. 119 is a diagram for explaining the operation of the liquid crystal display apparatus of FIG. 118;

FIG. 120 is a diagram showing the liquid crystal display apparatus of FIG. 119 with a voltage applied thereto;

FIG. 121 is a model diagram showing a modification of the liquid crystal display apparatus of FIG. 110;

Figure 6:
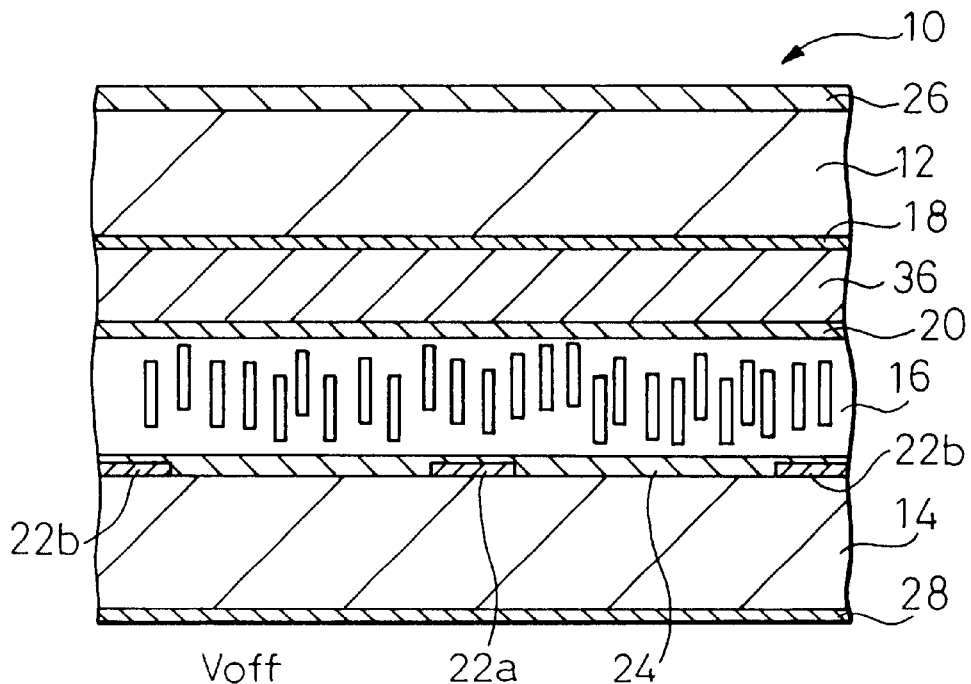
FIG. 6 is a sectional view showing a liquid crystal display apparatus with no voltage applied thereto according to a second embodiment of the present invention.
Figure 7:
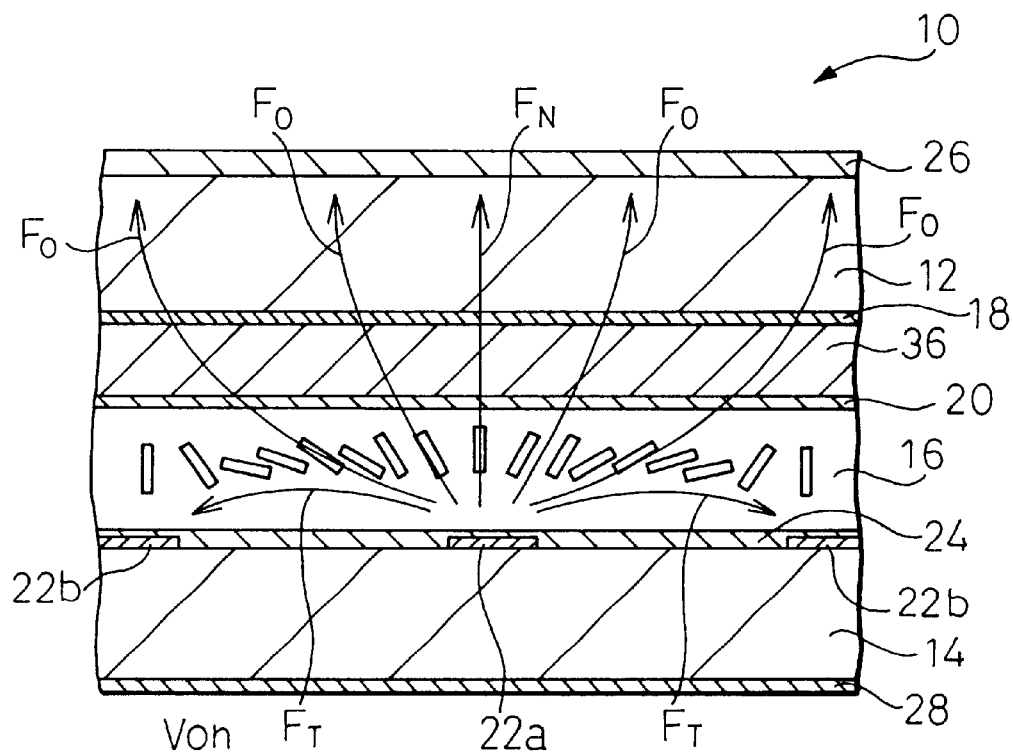
FIG. 7 is a sectional view showing the liquid crystal display apparatus of FIG. 6 with a voltage applied thereto.
Figure 110:
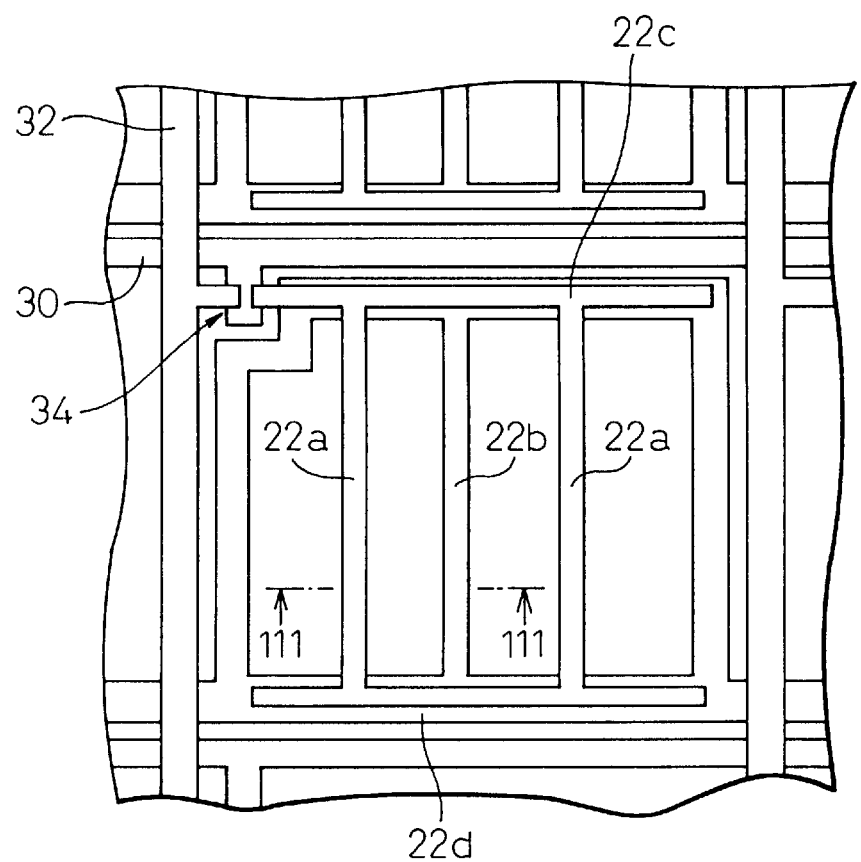
Figure 122:
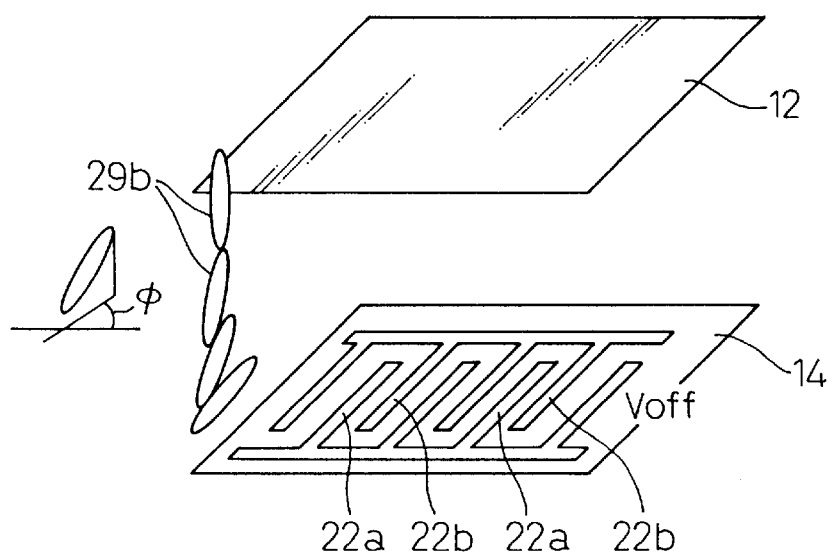
Figure 123:
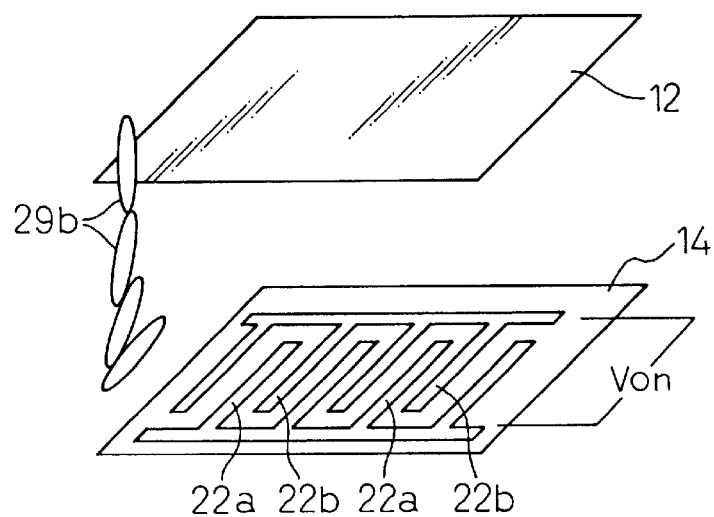
Figure 124:
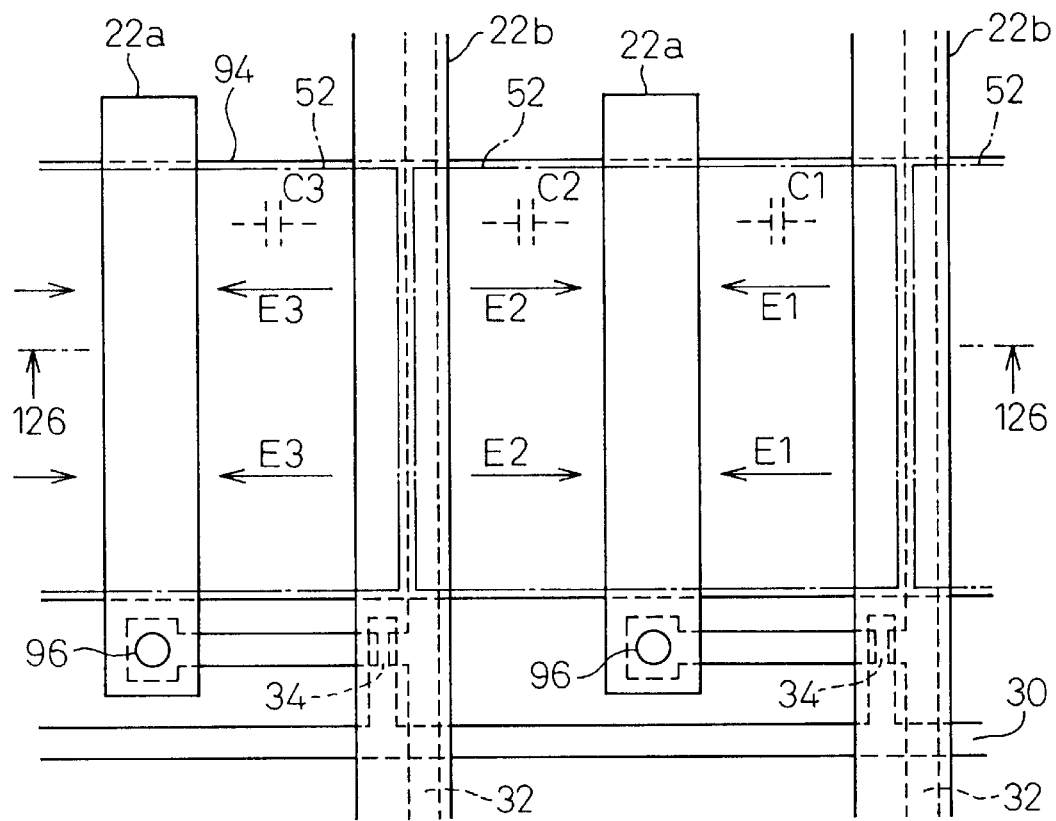
Figure 125:
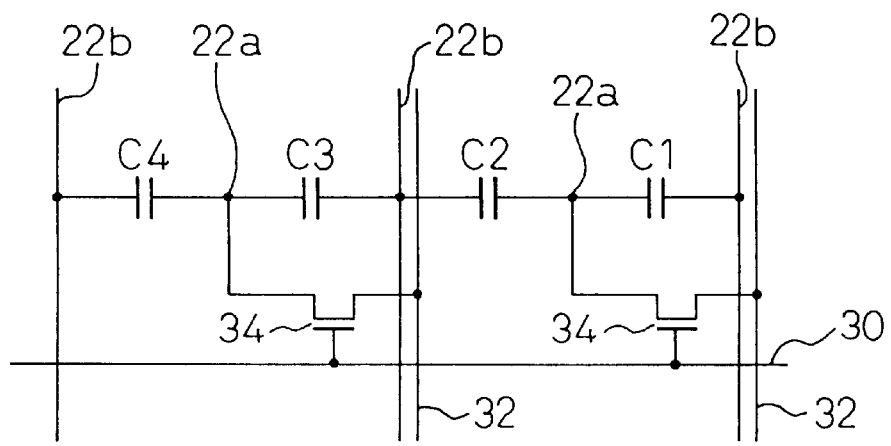
Figure 126:
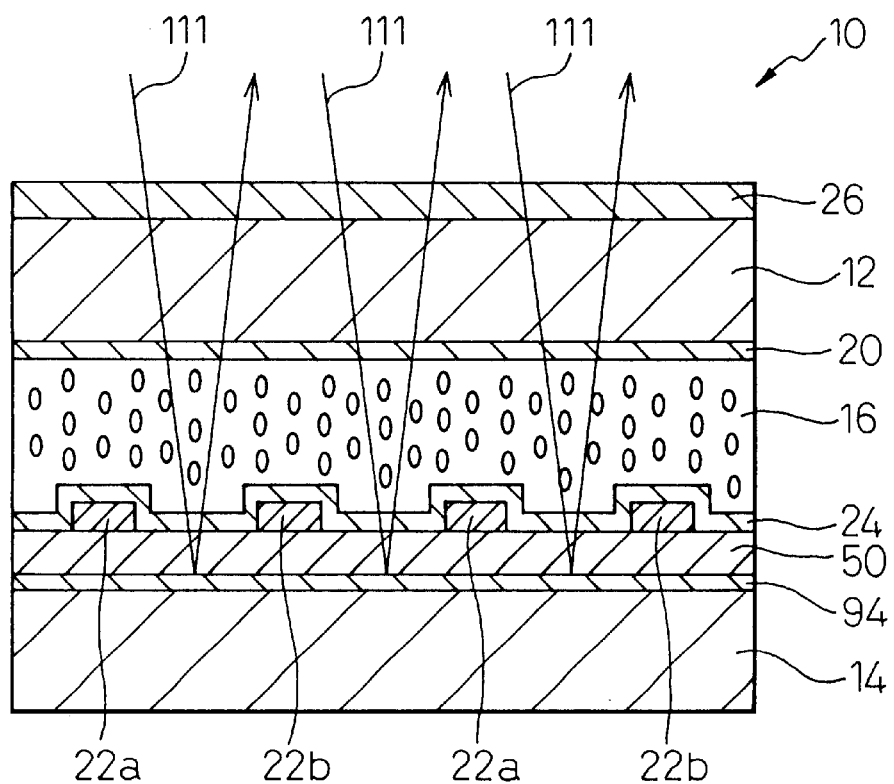
Figure 127:
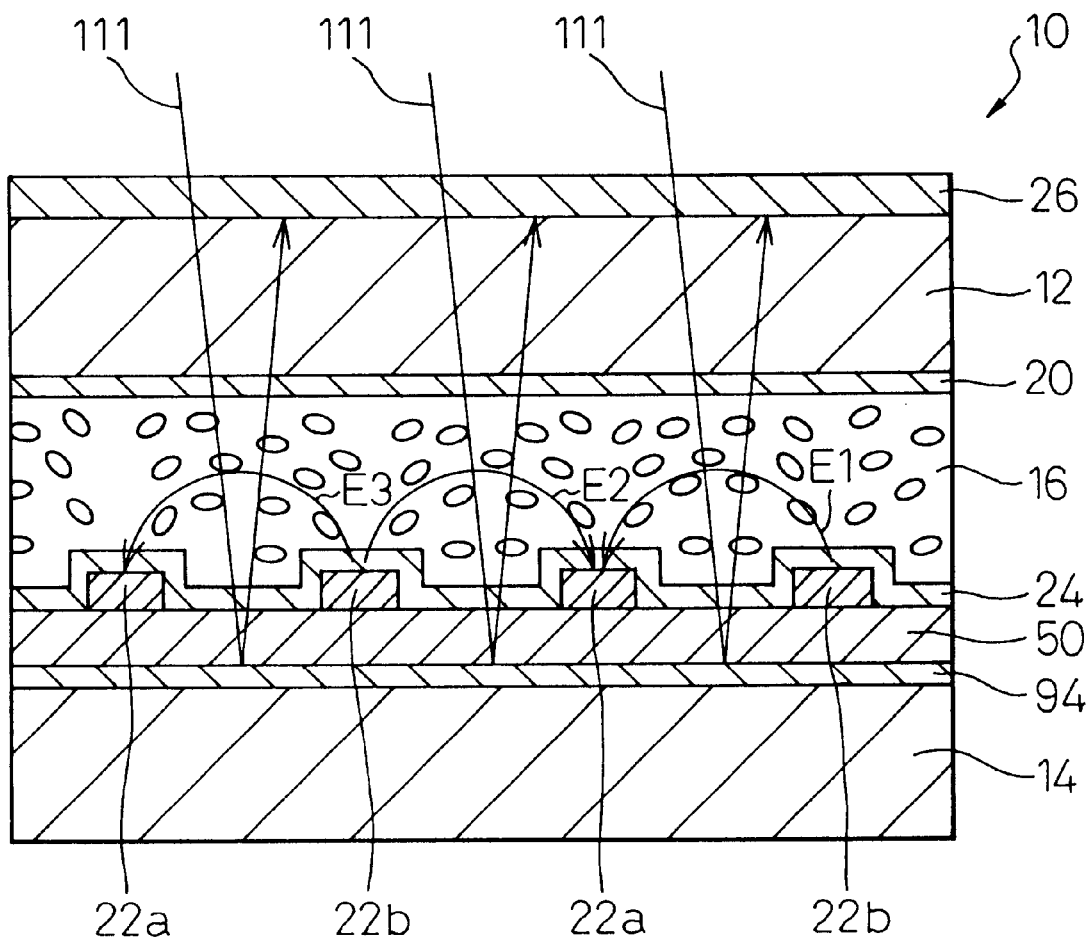
Figure 128:
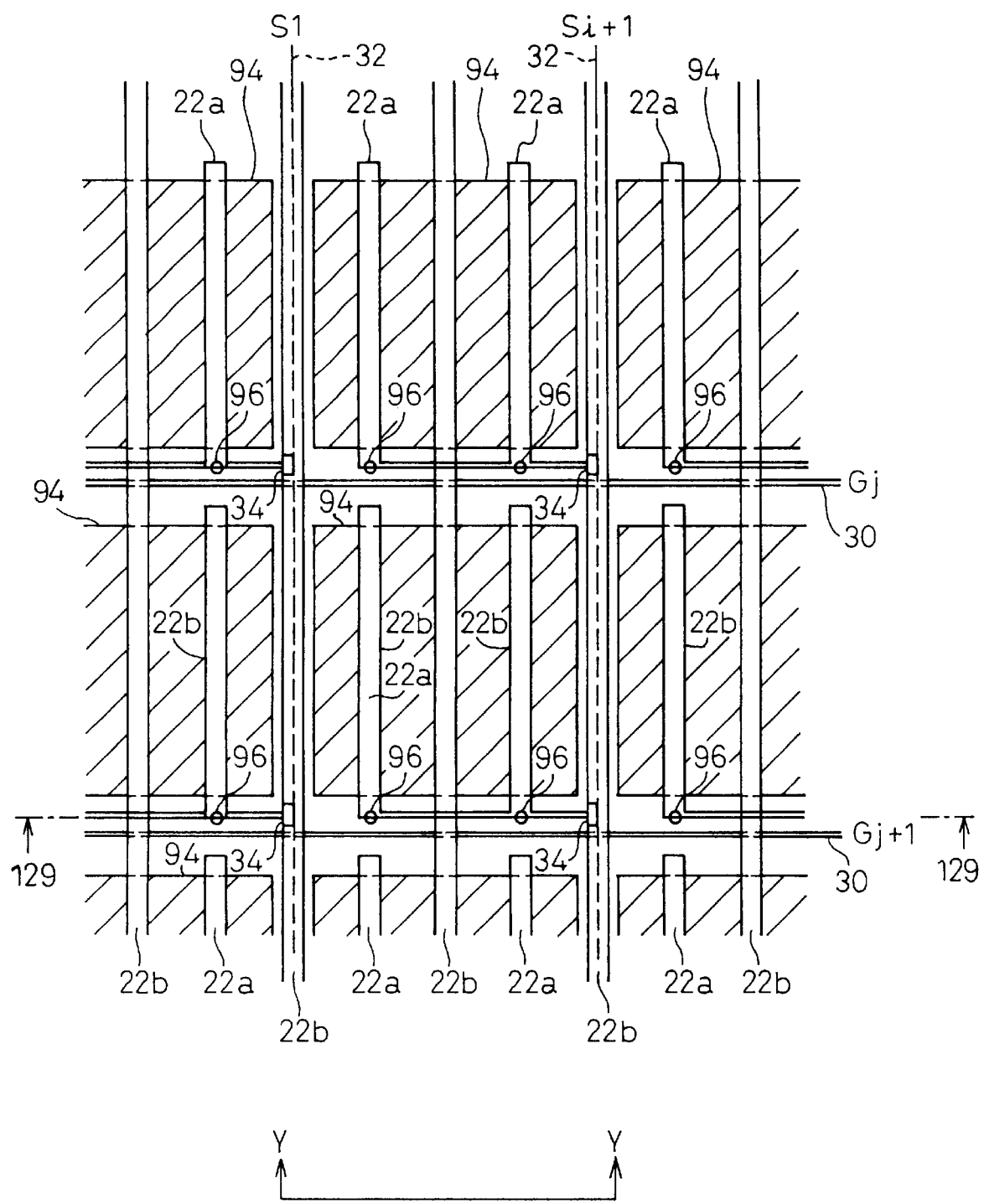
Figure 129:
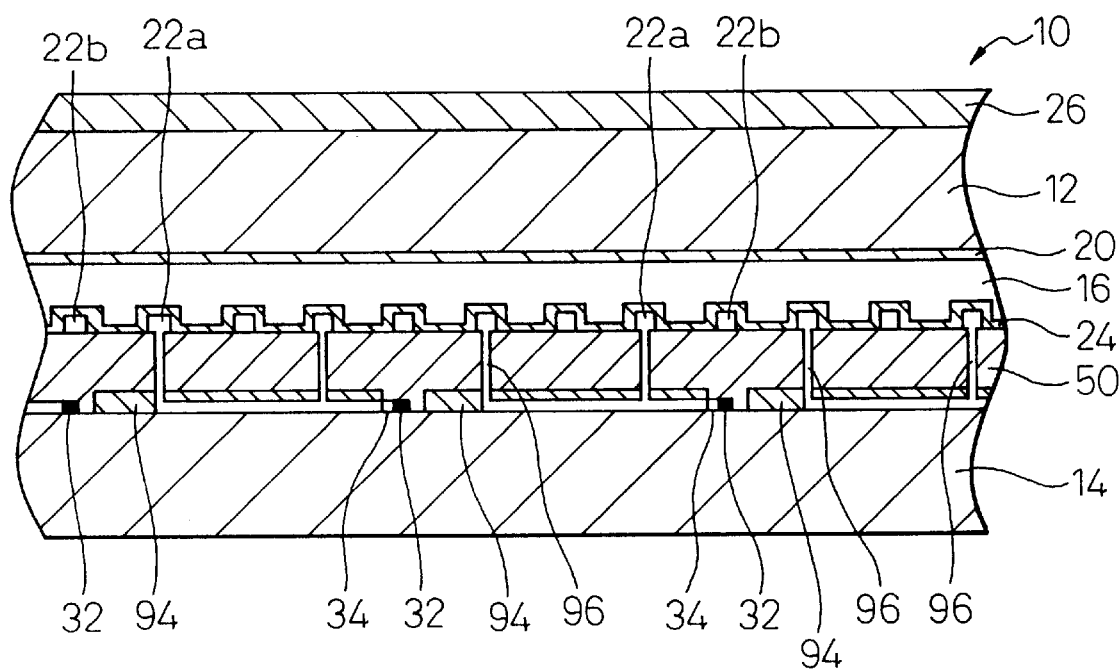
Figure 130:
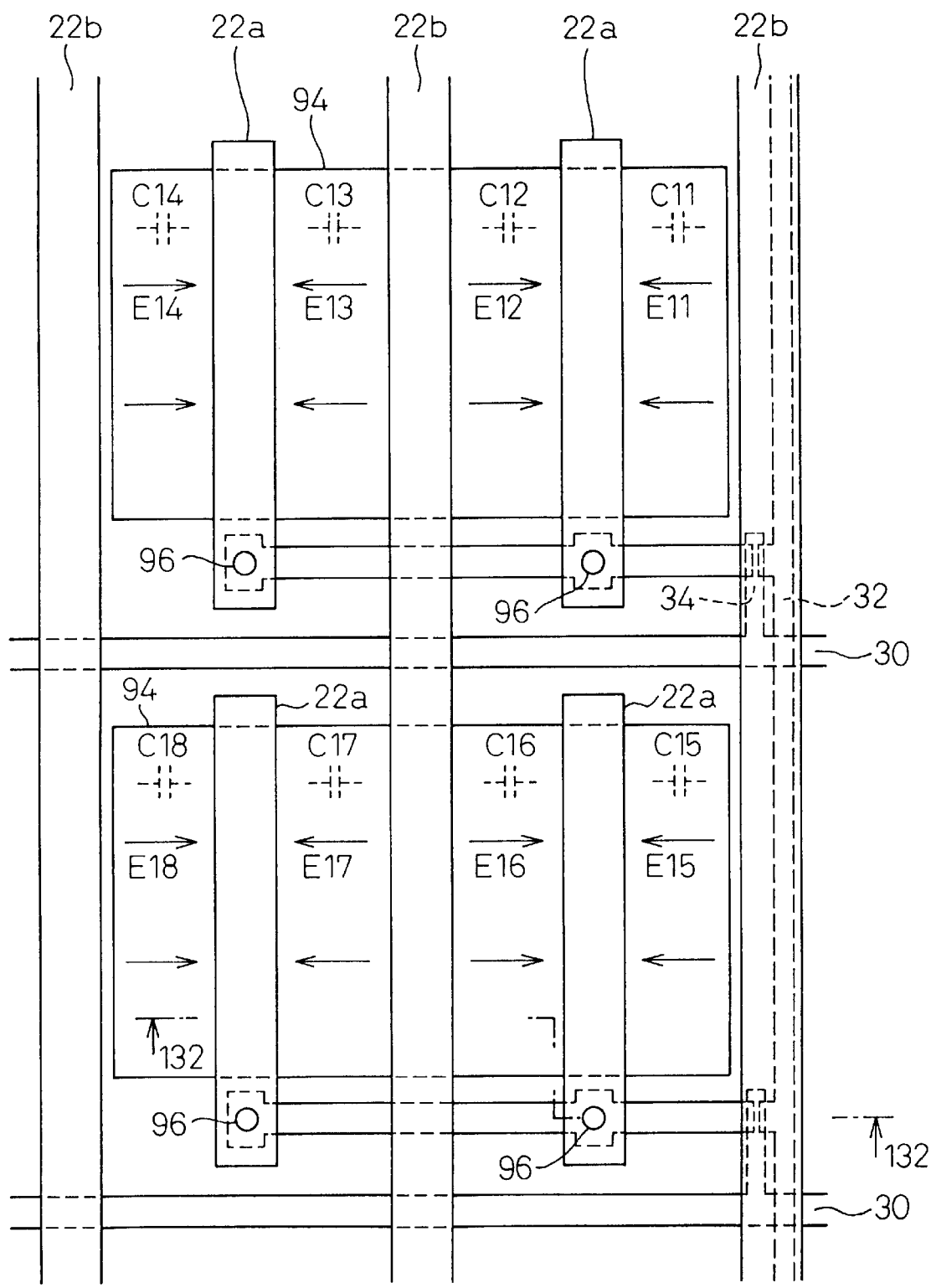
Figure 131:
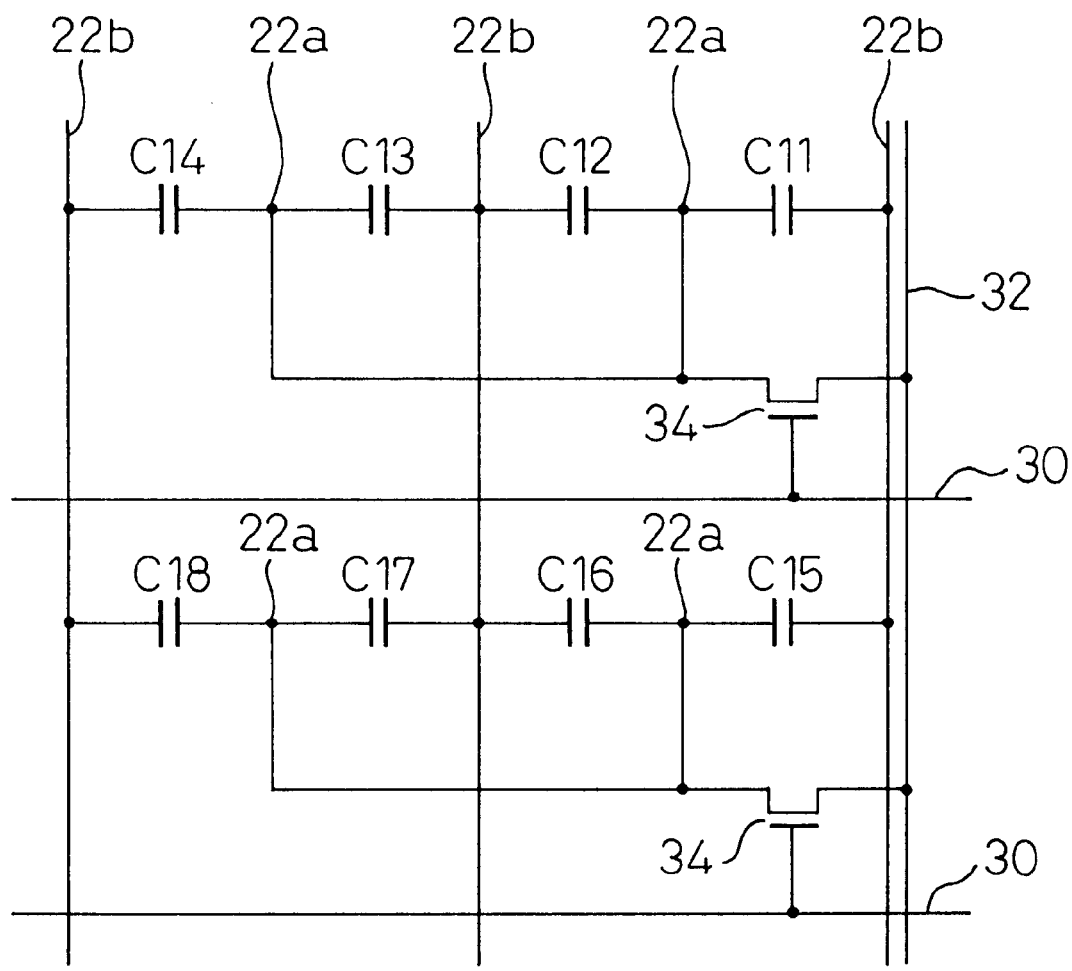
Figure 132A:
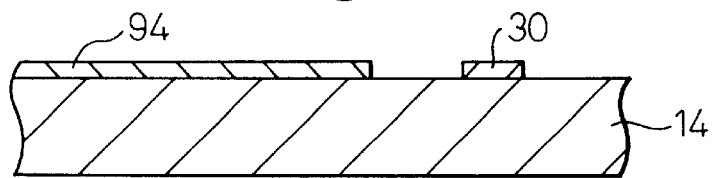
Figure 132B:
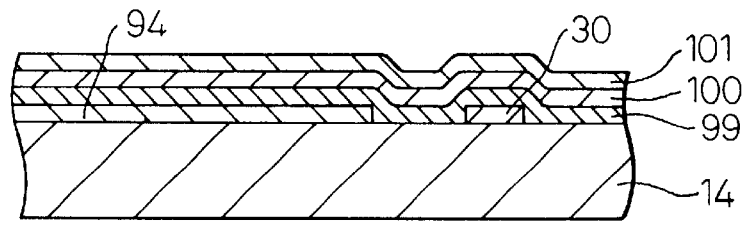
Figure 132C:
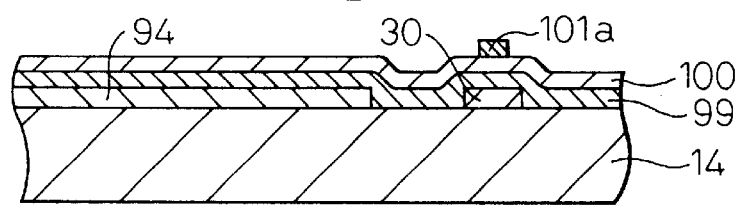
Figure 132D:
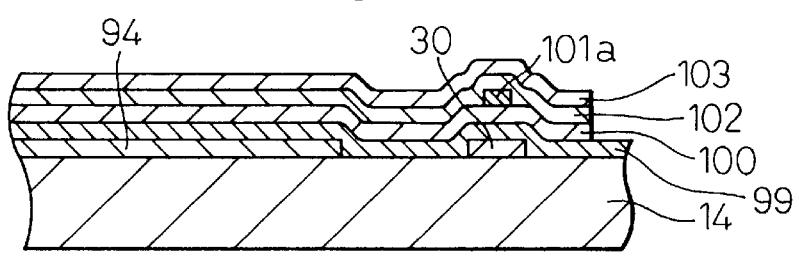
Figure 132E:
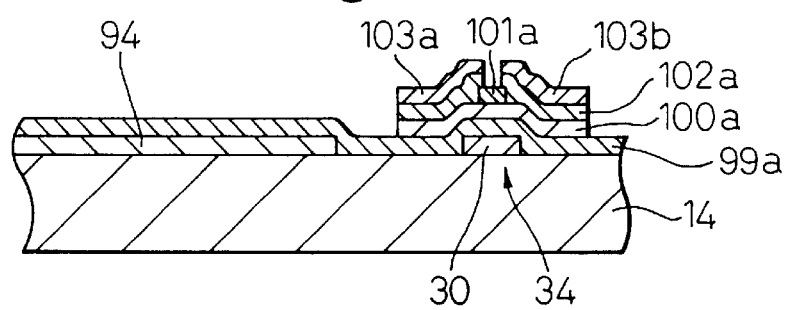
Figure 133A:
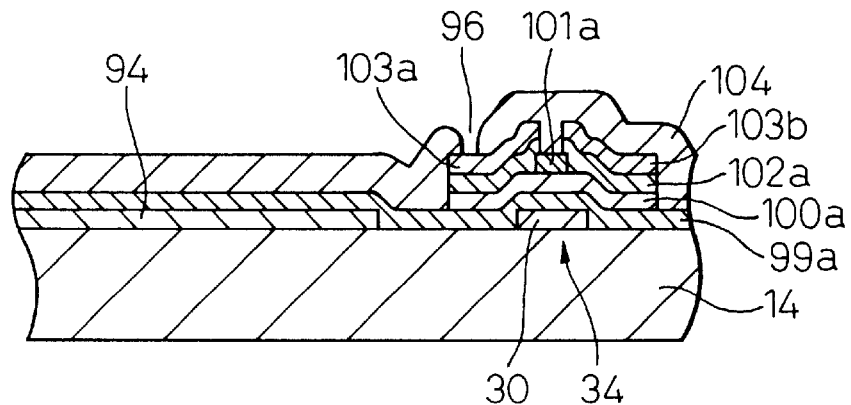
Figure 133B:
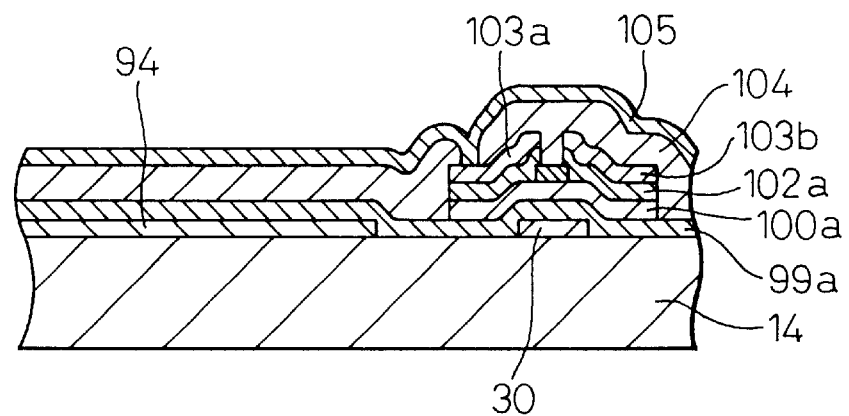
Figure 133C:
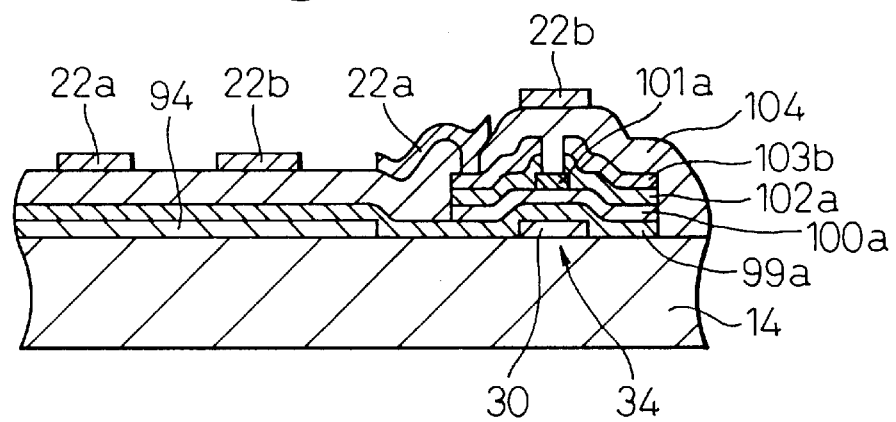
Figure 135:
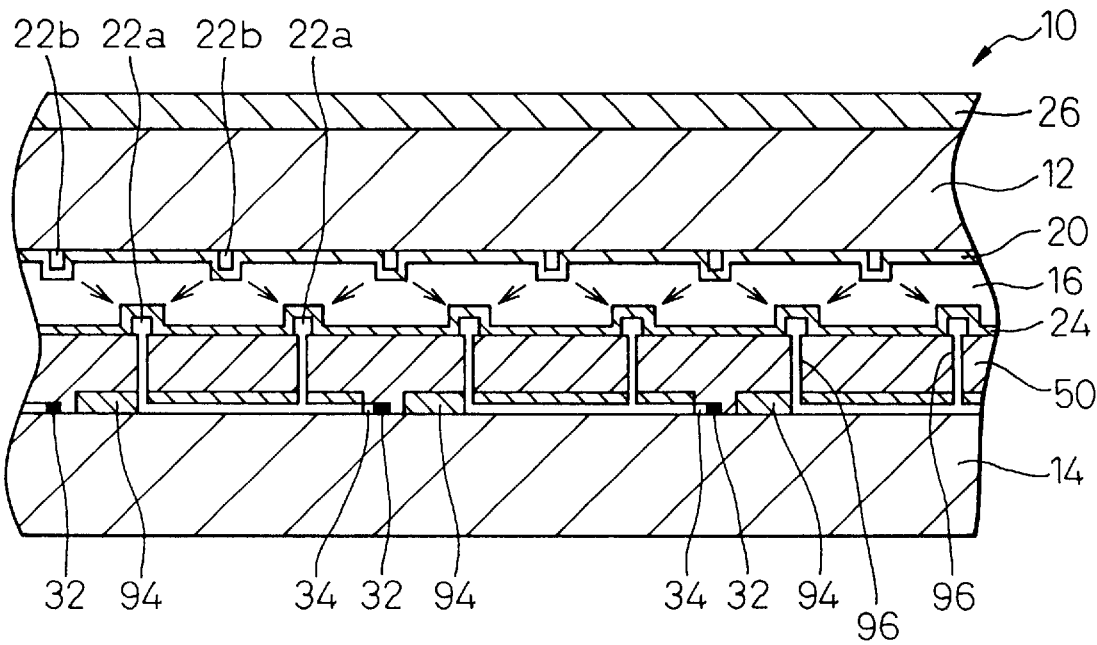
Figure 136:
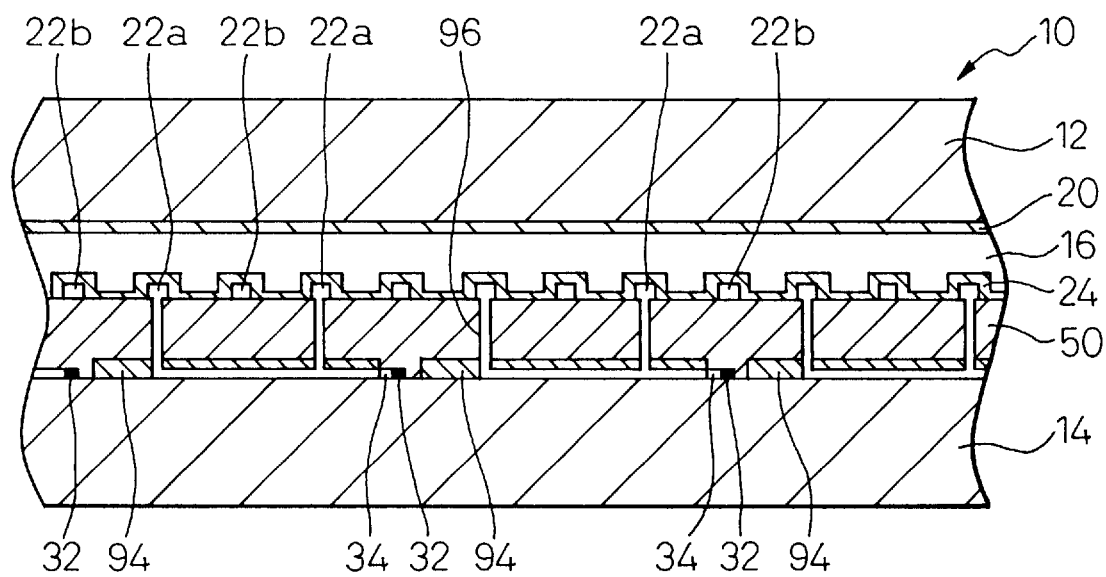
Figure 137:
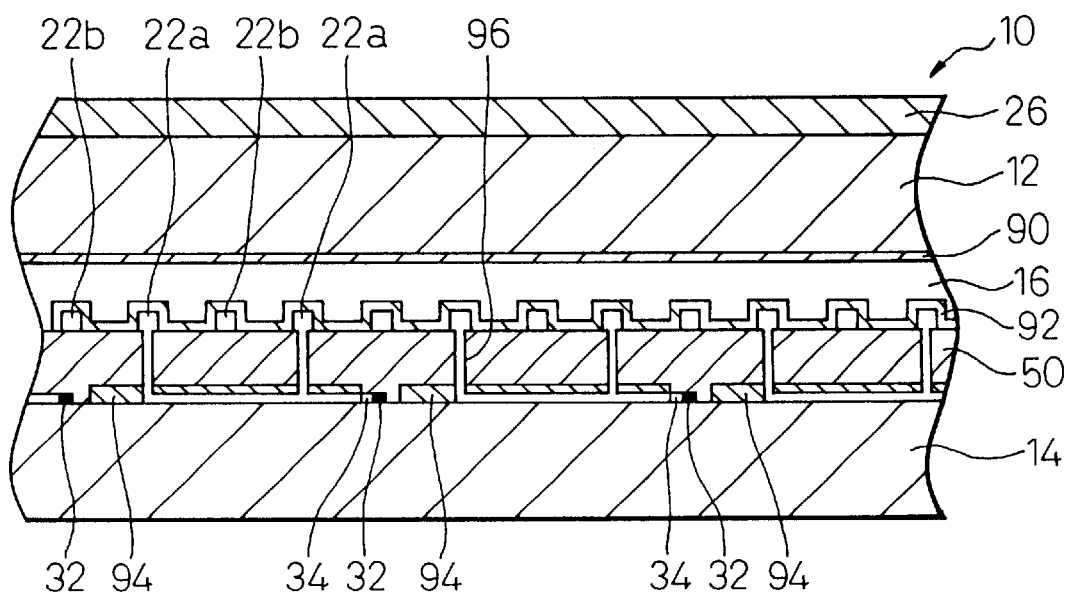
Figure 138:
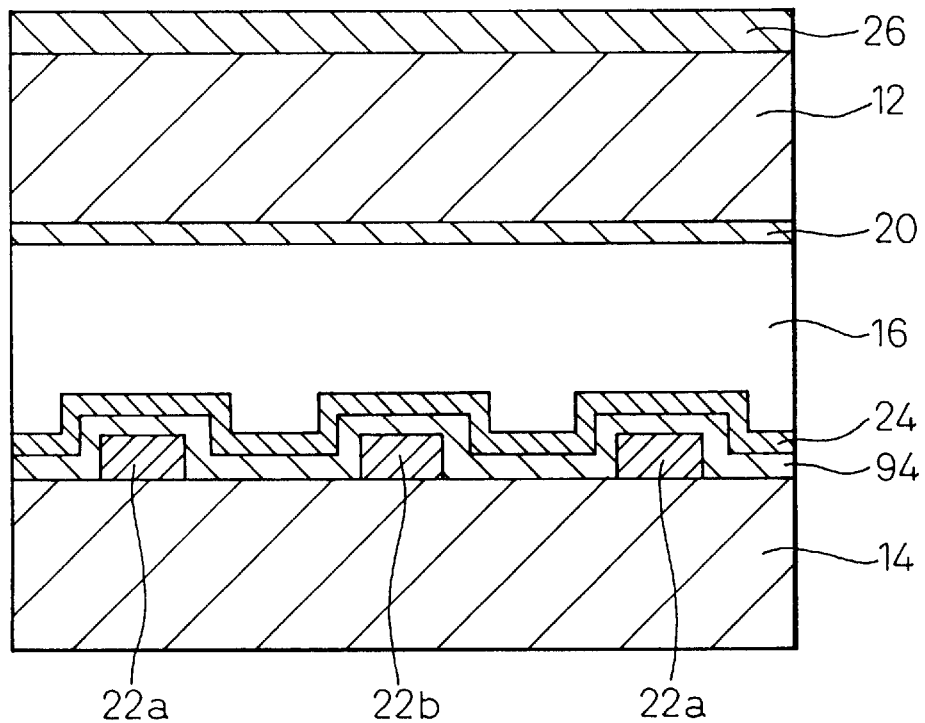
Figure 139:
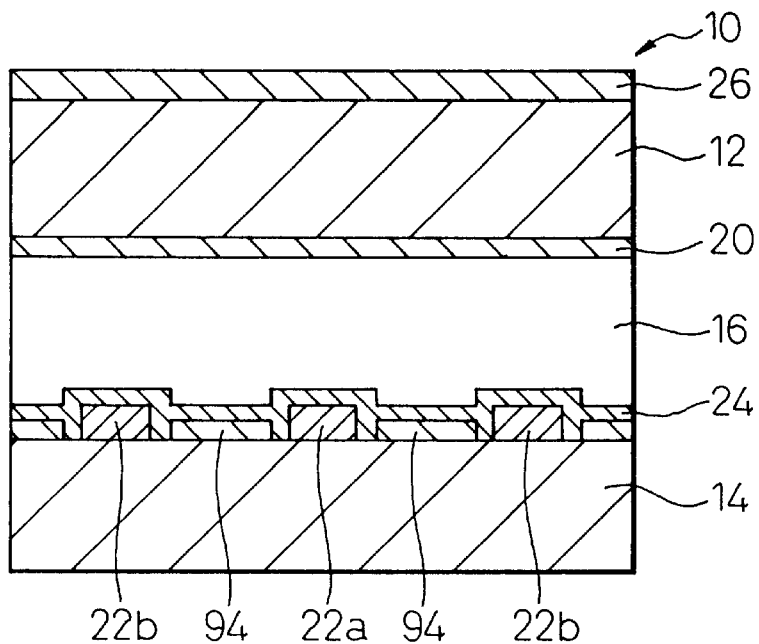
Figure 140:
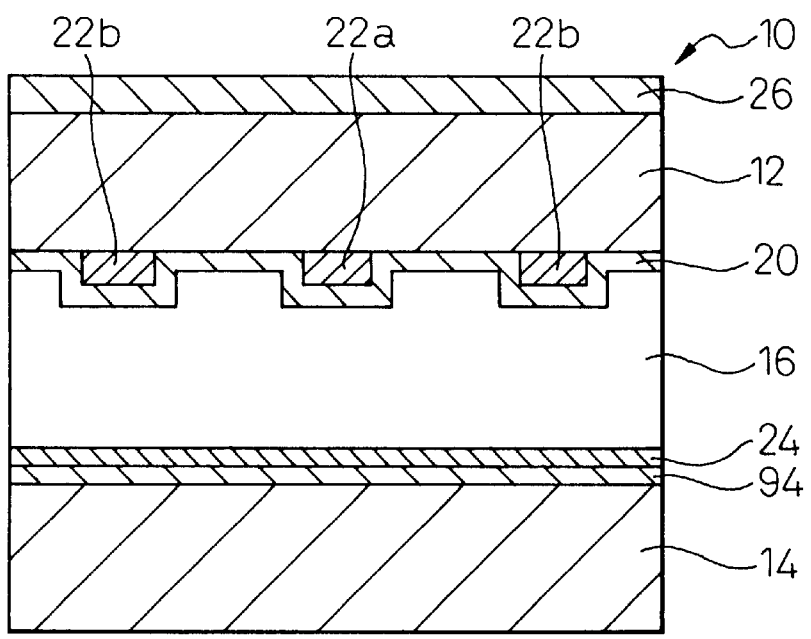
Figure 141:
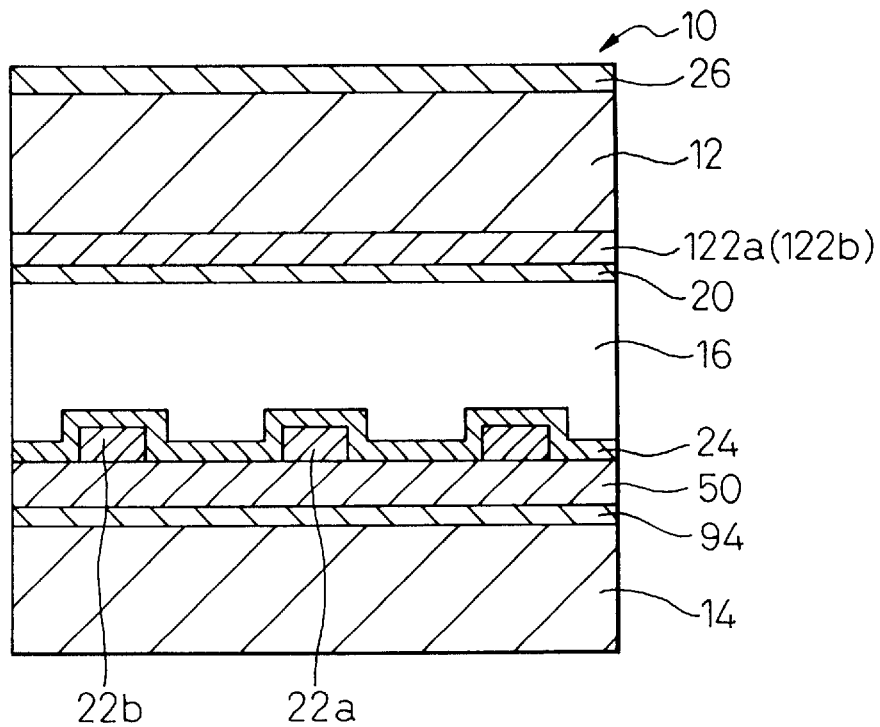
Figure 142:
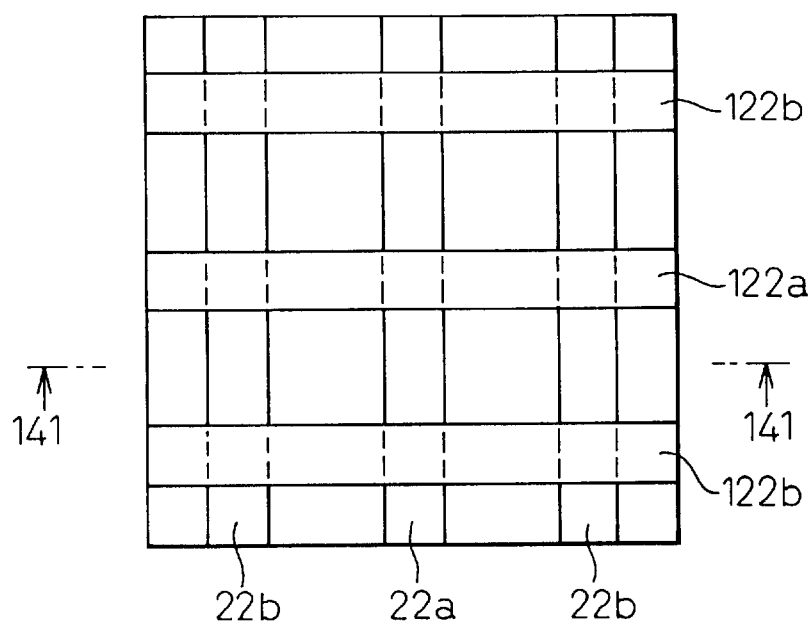
Figure 143:
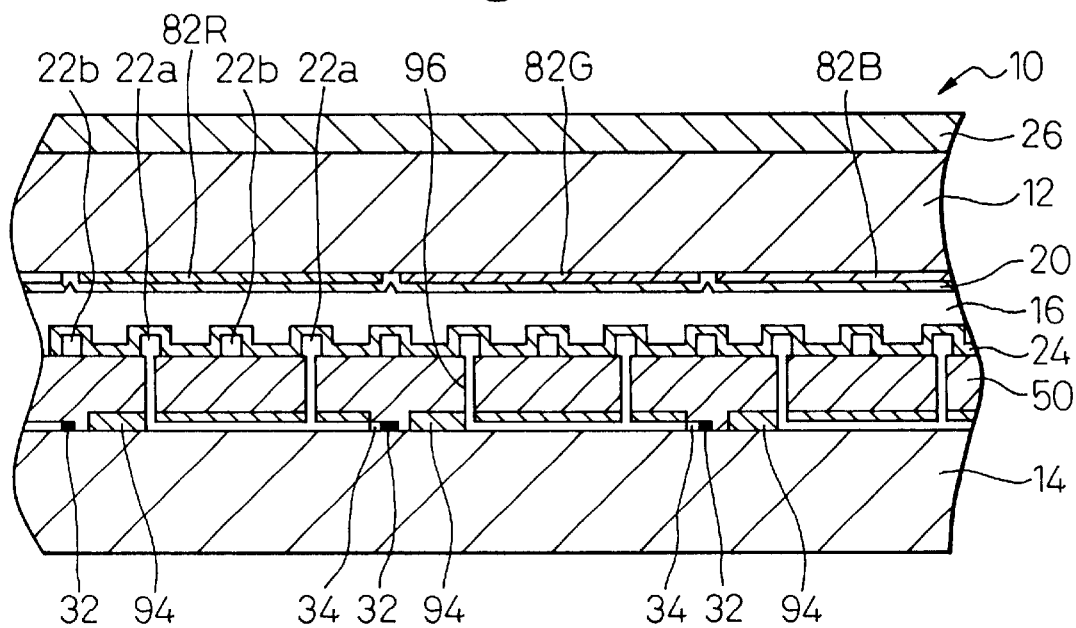
Figure 144:
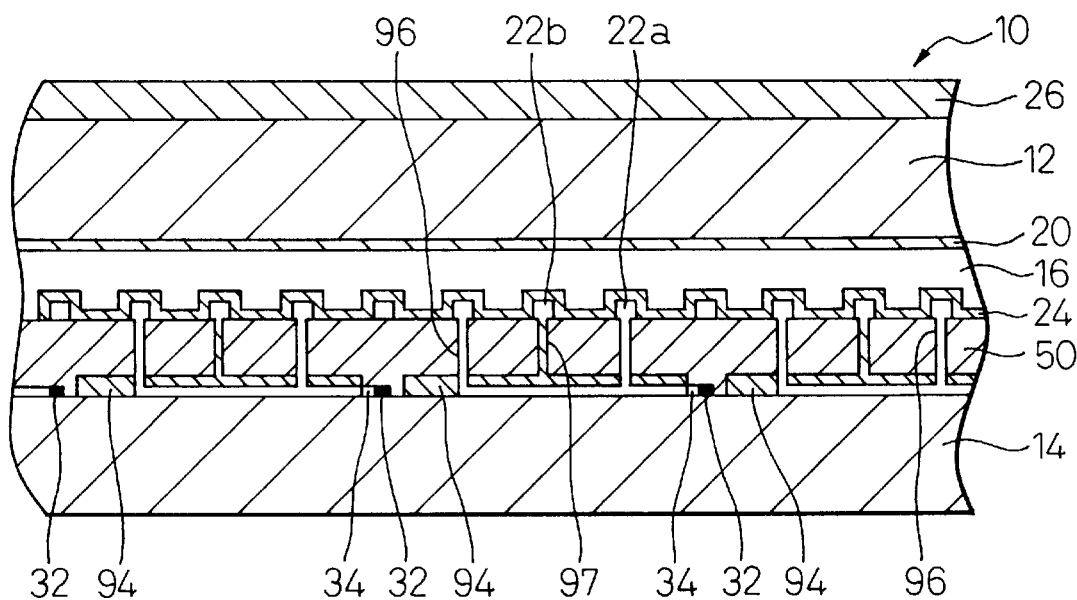
Figure 145:
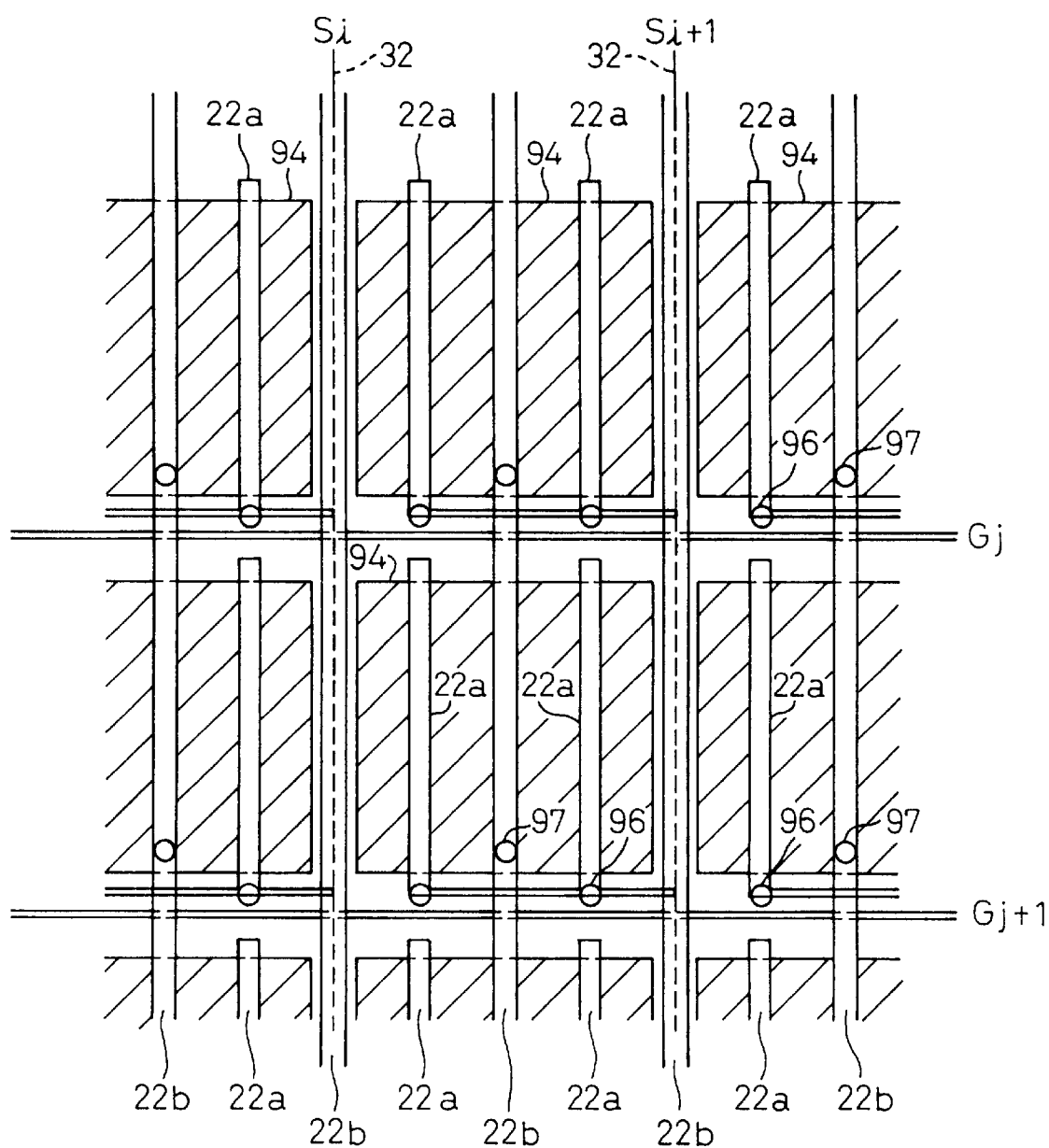
Figure 146:
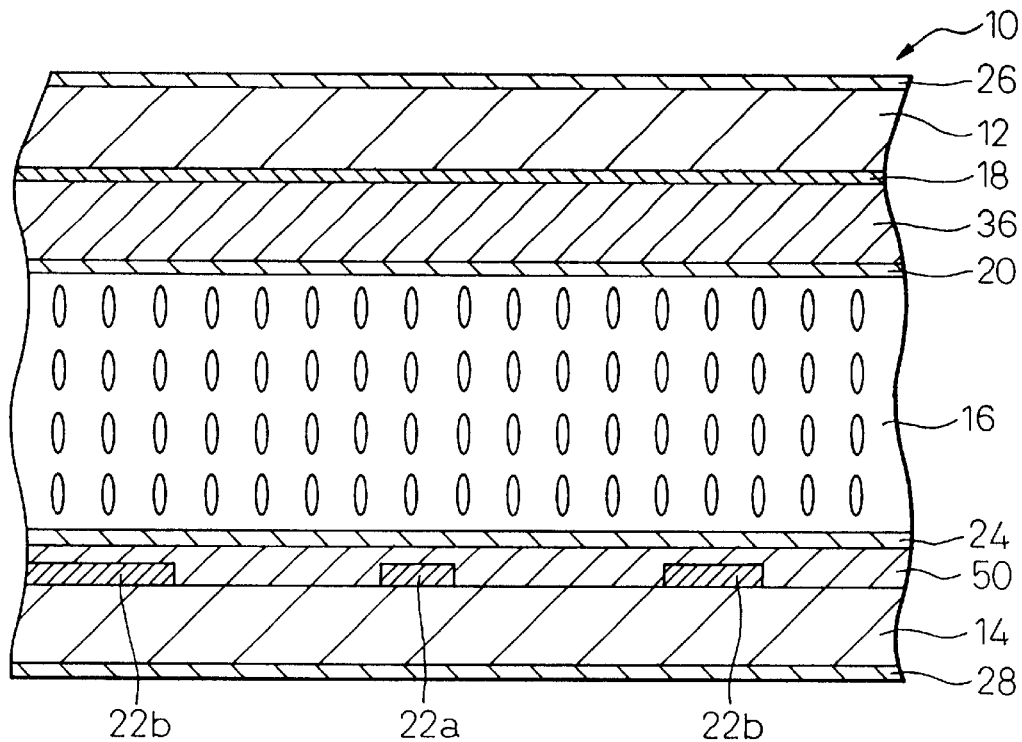
Figure 147:
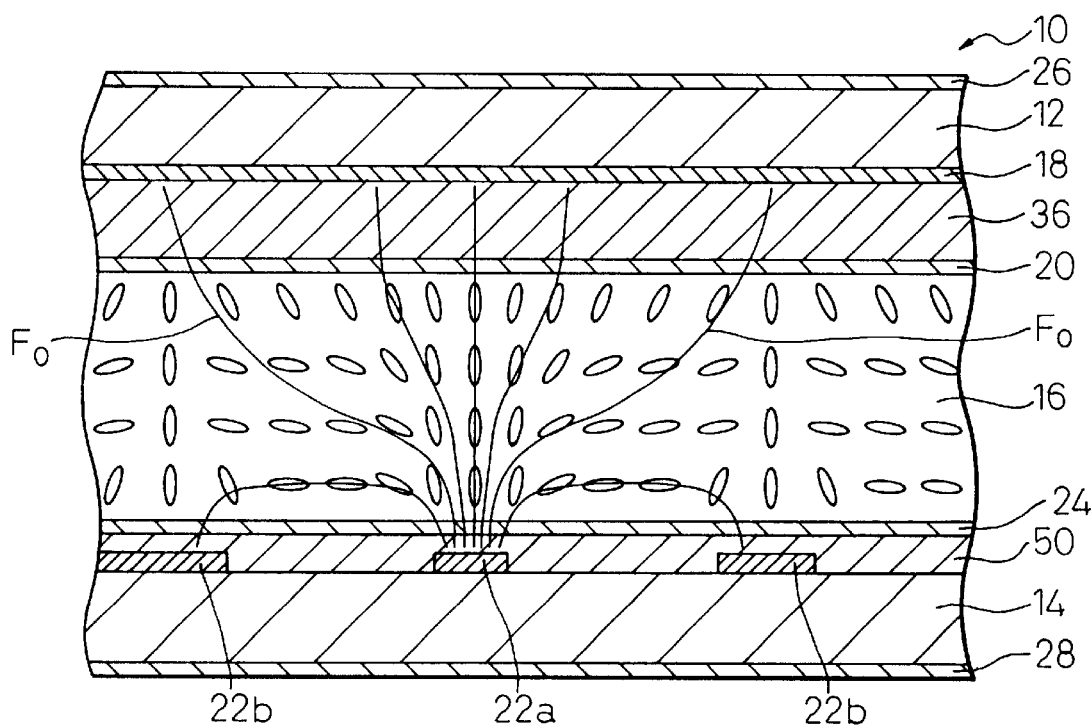
Figure 148A:
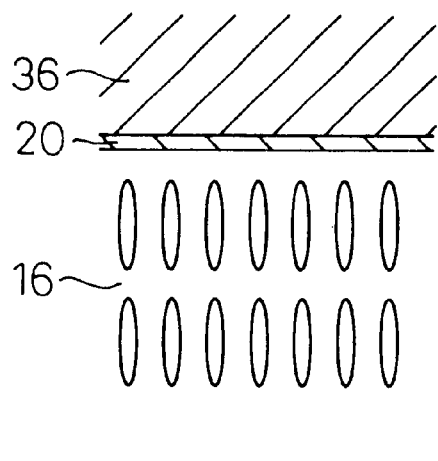
Figure 148B:
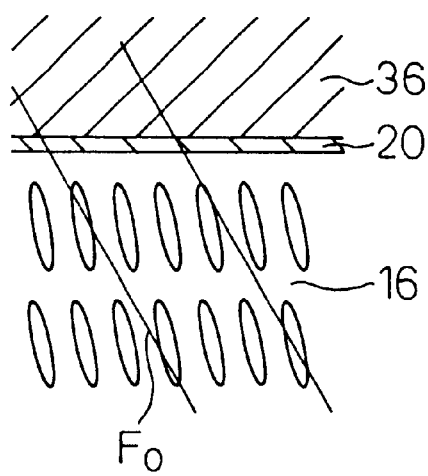
Figure 149A:
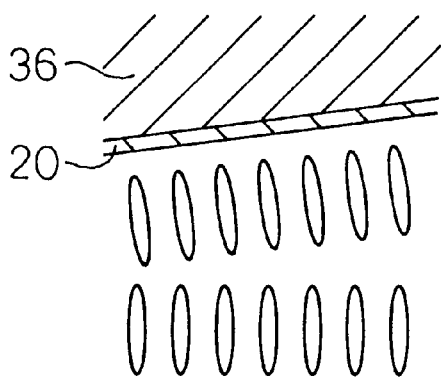
Figure 149B:
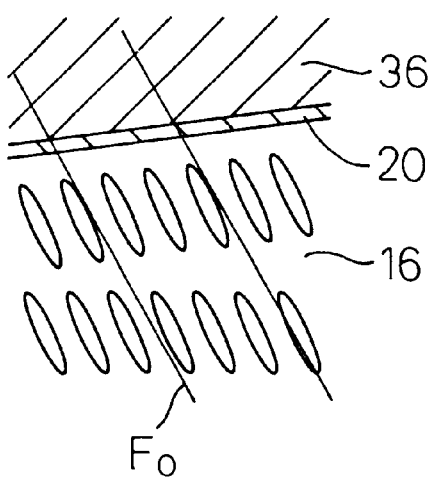
Figure 150:
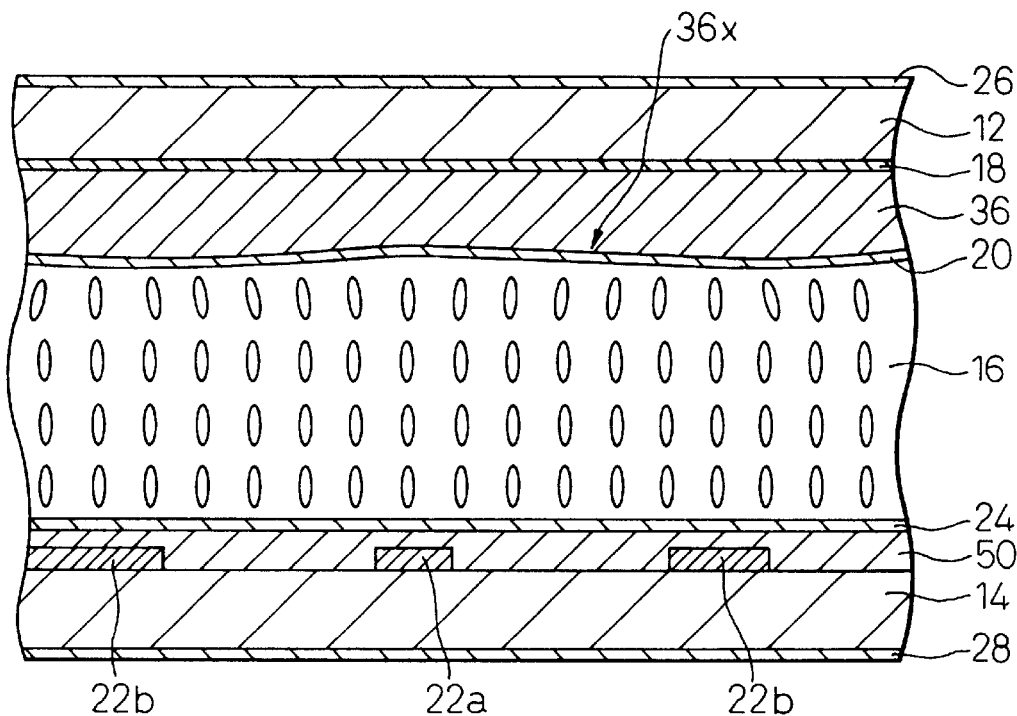
Figure 151:
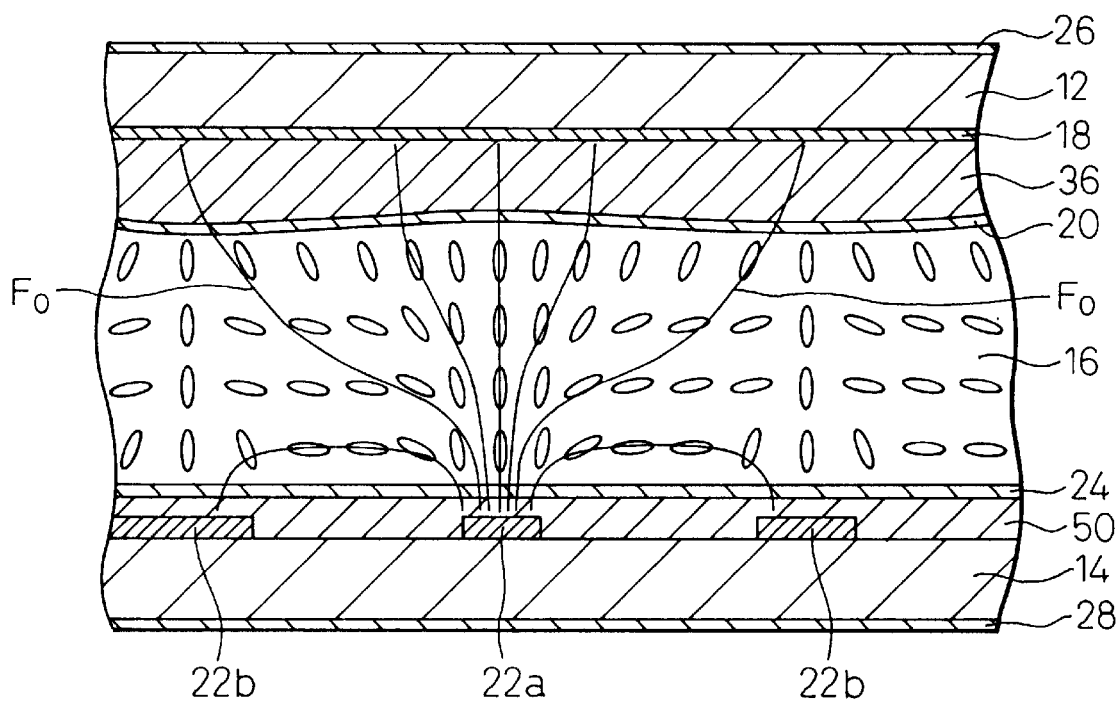
Figure 152:
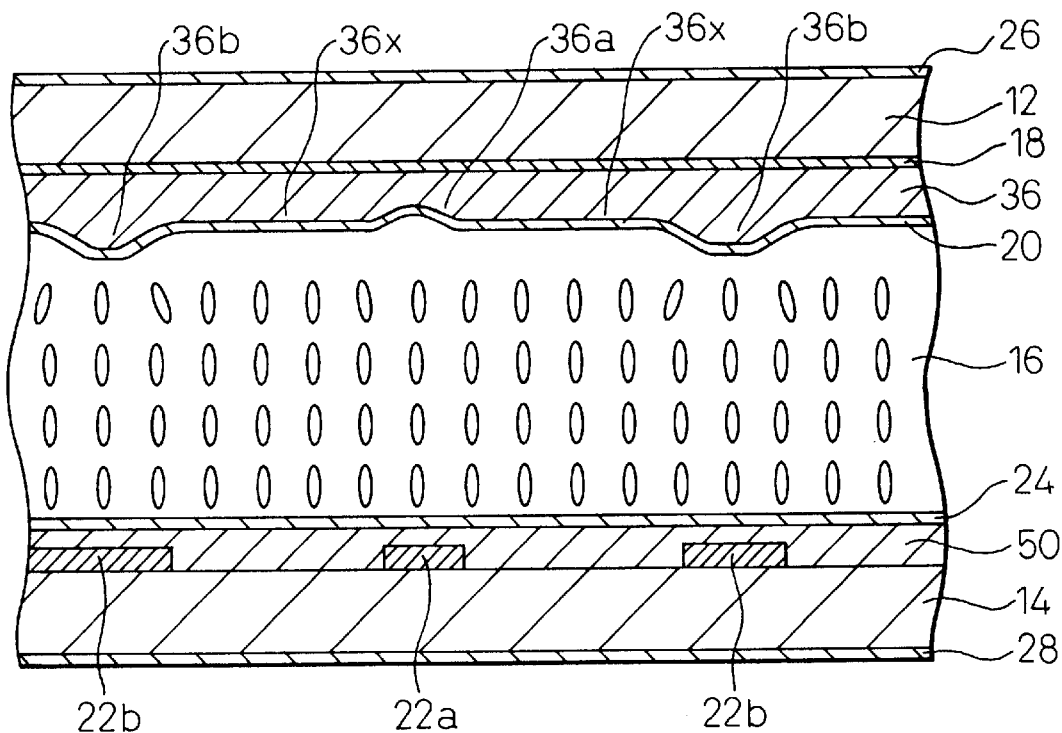
Figure 153:
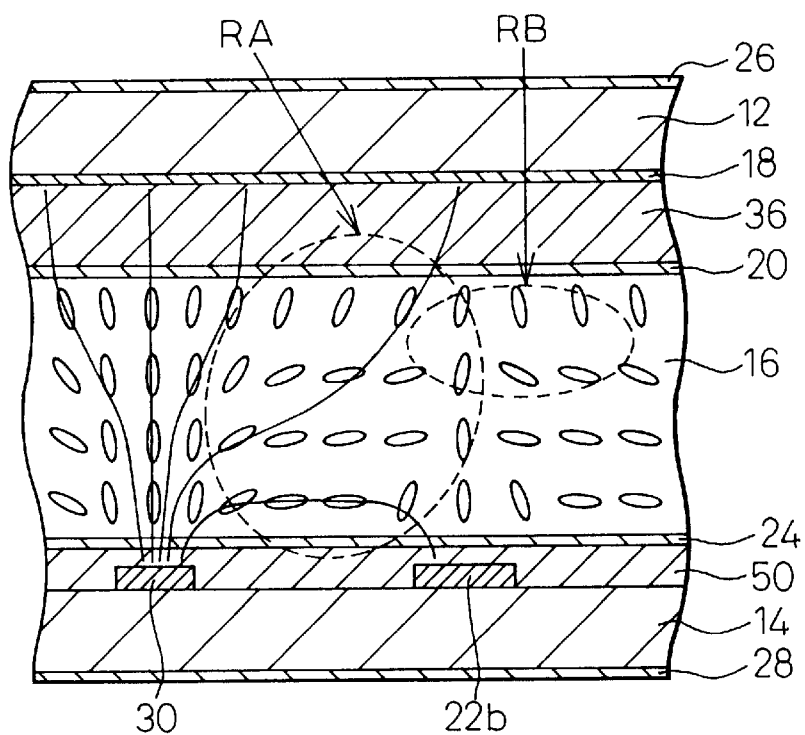
Figure 154:
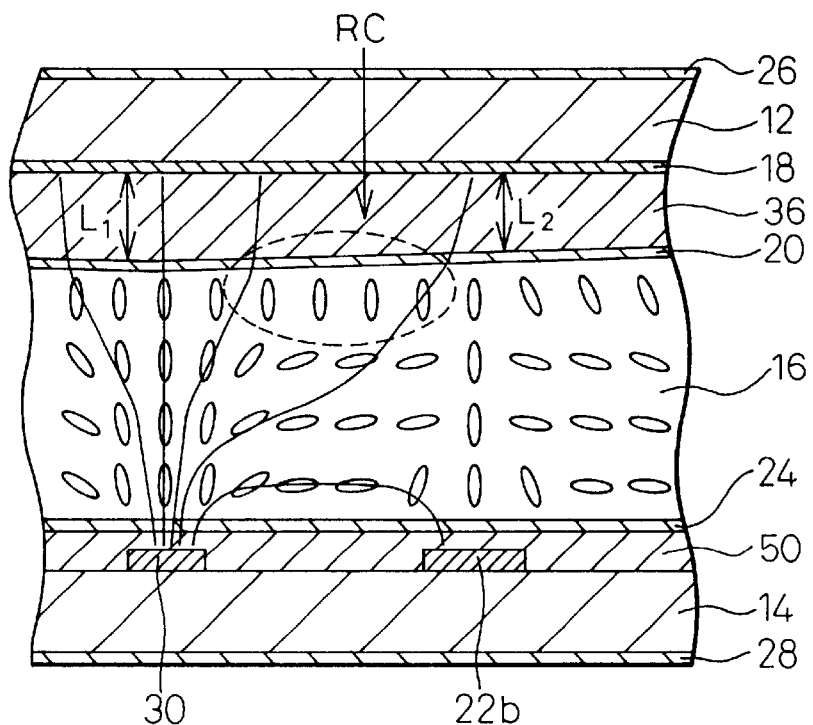
Figure 155:
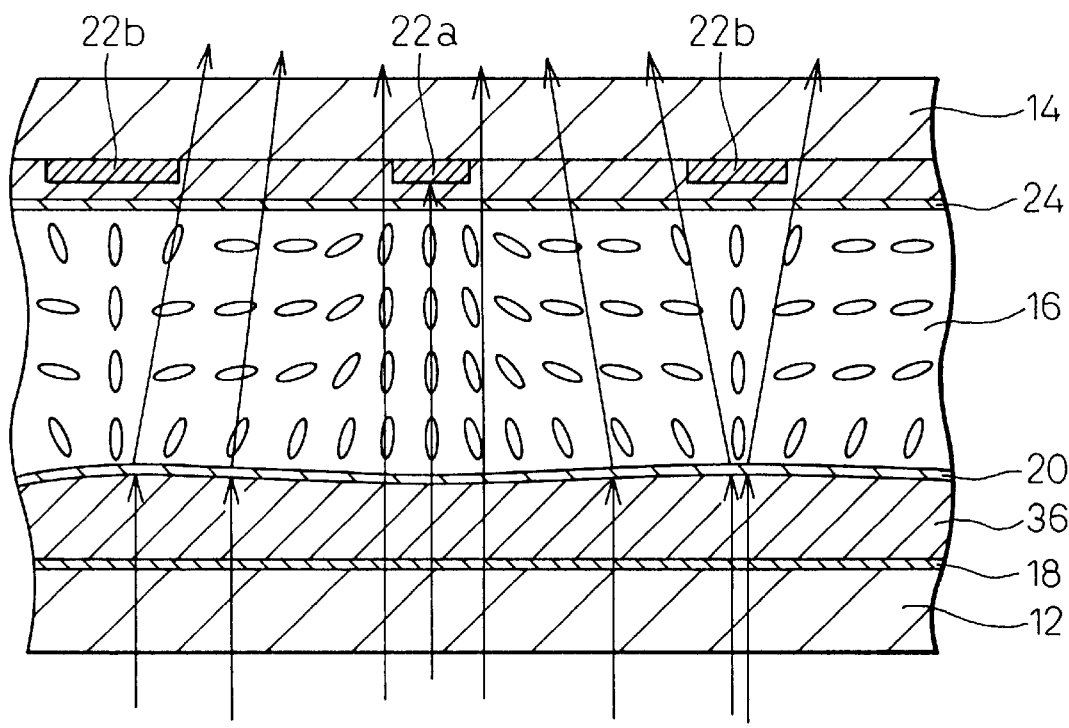
Figure 156:
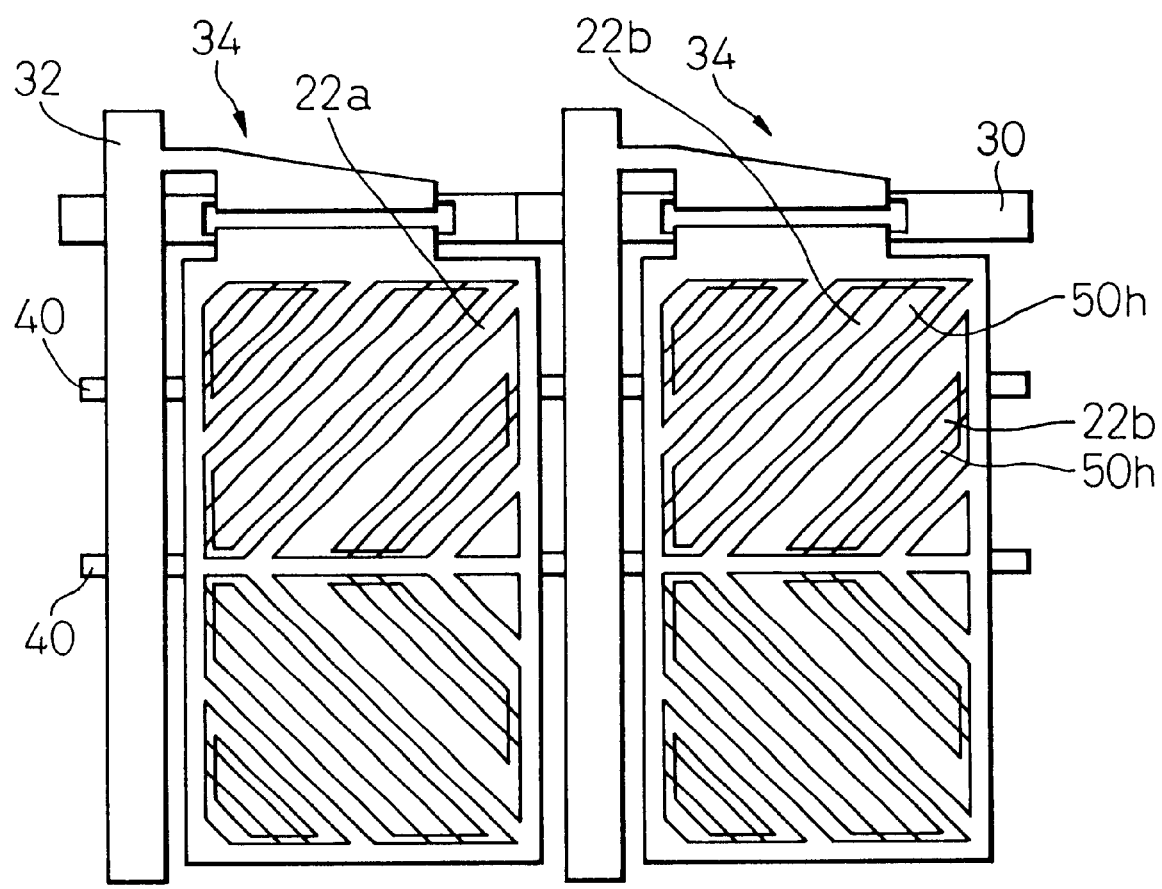
Figure 157:
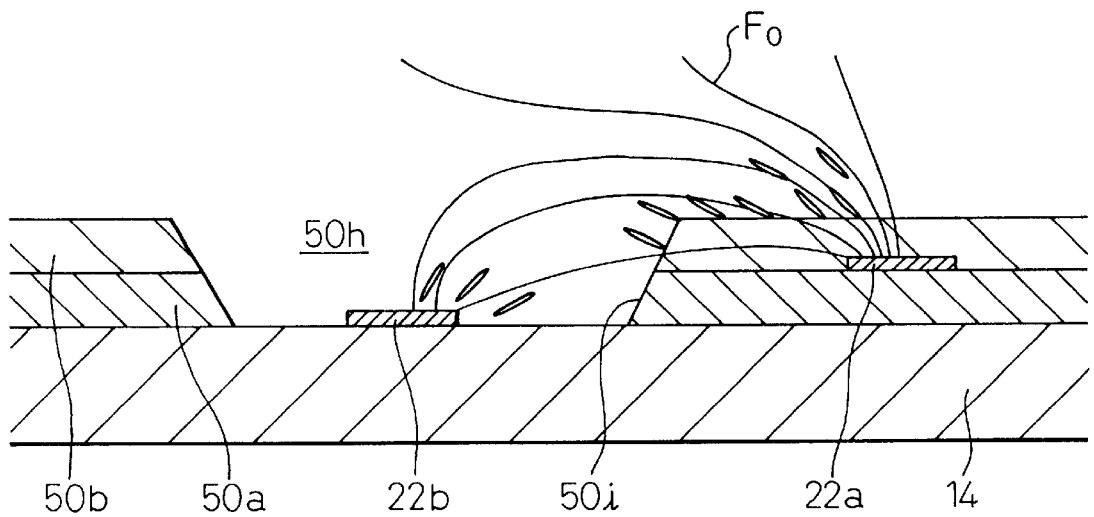
Figure 158:
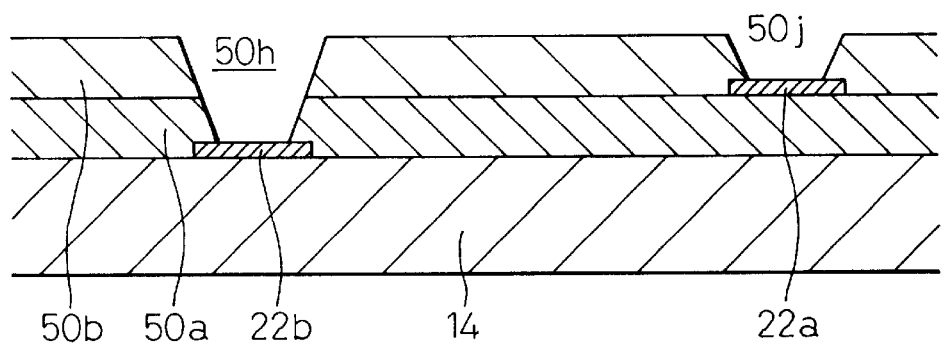
Figure 159:
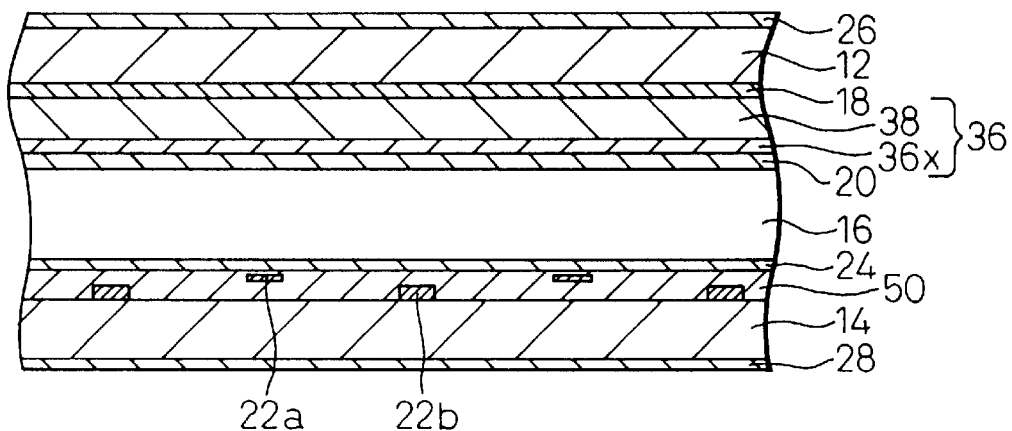
Figure 160:
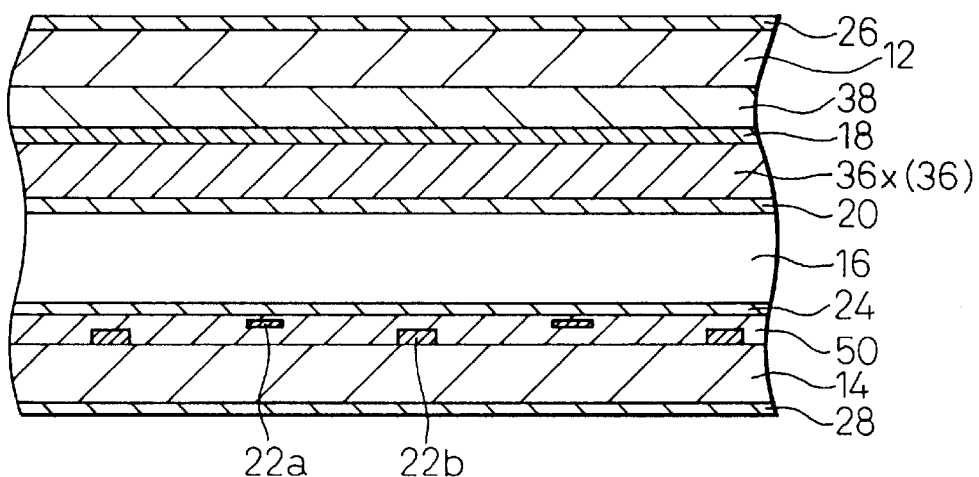
Figure 161:
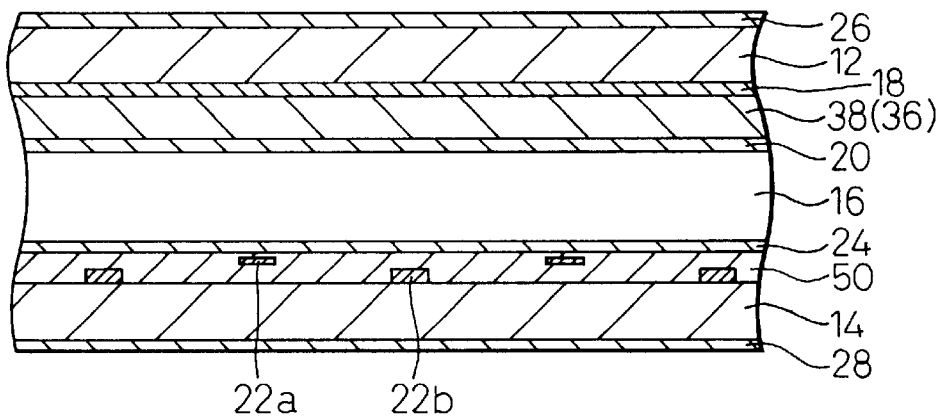
Figure 162:
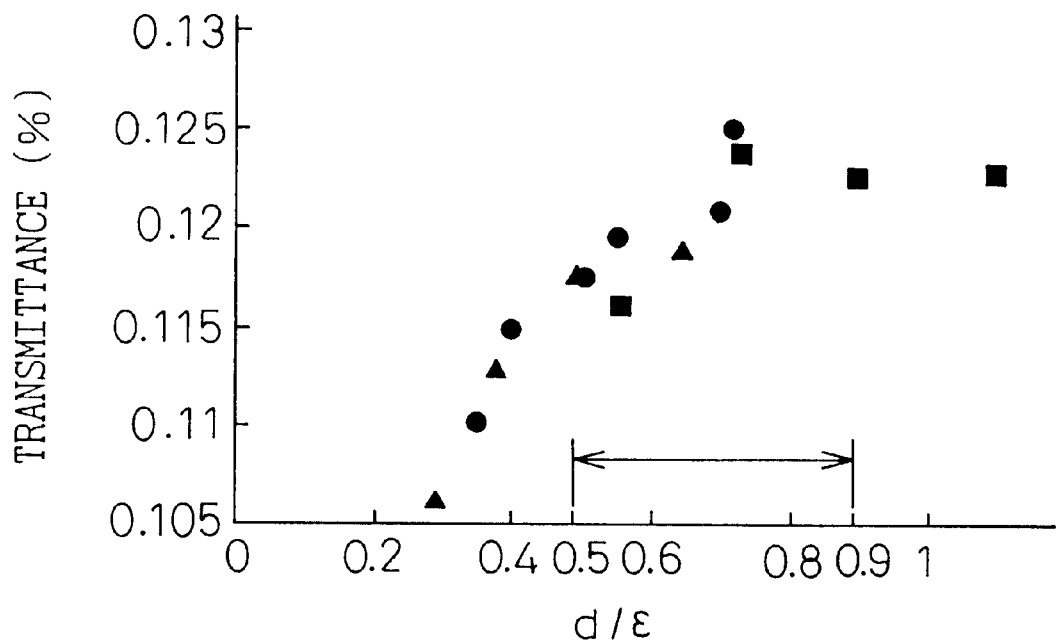
Figure 163:
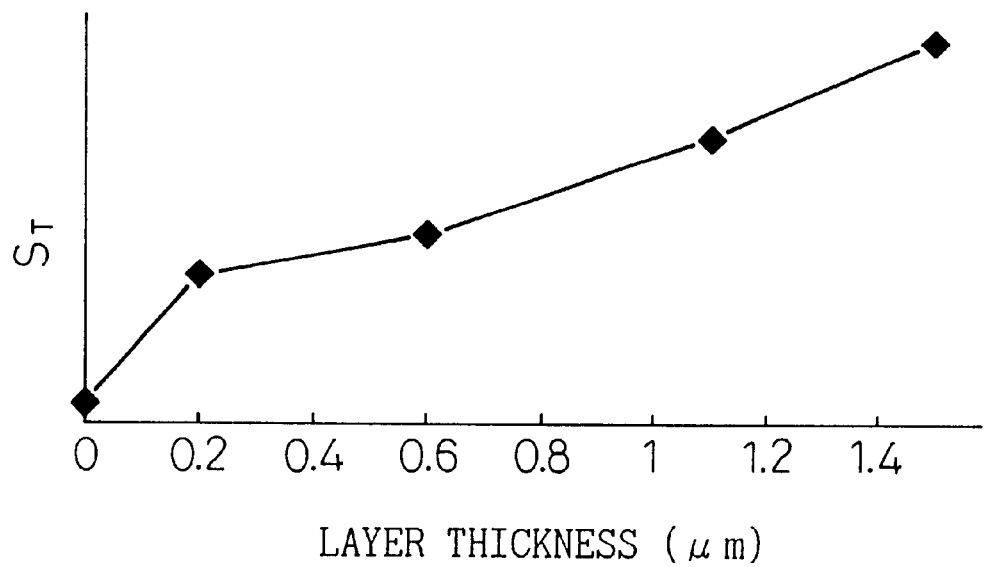

FIG. 122 is a model diagram showing a modification of the liquid crystal display apparatus of FIG. 110;

FIG. 123 is a diagram showing the liquid crystal display apparatus of FIG. 122 with a voltage applied thereto;

FIG. 124 is a plan view schematically showing the liquid crystal display apparatus according to still another embodiment of the invention;

FIG. 125 is a diagram showing an equivalent circuit of the liquid crystal display apparatus of FIG. 124;

FIG. 126 is a sectional view taken along line 126—126 in FIG. 124;

FIG. 127 is a diagram for explaining the operation of the liquid crystal display apparatus of FIG. 124;

FIG. 128 is a plan view showing a modification of the liquid crystal display apparatus of FIG. 124;

FIG. 129 is a sectional view taken in line 129—129 in FIG. 128;

FIG. 130 is a detailed plan view showing the liquid crystal display apparatus of FIG. 128;

FIG. 131 is a diagram showing an equivalent circuit of the liquid crystal display apparatus of FIG. 128;

FIGS. 132A to 132E are diagrams showing the manufacturing process of the liquid crystal display apparatus of FIG. 130;

FIGS. 133A to 133C are diagrams showing the manufacturing process of the liquid crystal display apparatus subsequent to the process of FIG. 132E;

FIGS. 134A to 134E are diagrams showing the manufacturing process of the liquid crystal display apparatus of FIG. 128;

FIG. 135 is a sectional view showing a modification of the liquid crystal apparatus of FIG. 124;

FIG. 136 is a sectional view showing a modification of the liquid crystal apparatus of FIG. 124;

FIG. 137 is a sectional view showing a modification of the liquid crystal apparatus of FIG. 124;

FIG. 138 is a sectional view showing a modification of the liquid crystal apparatus of FIG. 124;

FIG. 139 is a sectional view showing a modification of the liquid crystal apparatus of FIG. 124;

FIG. 140 is a sectional view showing a modification of the liquid crystal apparatus of FIG. 124;

FIG. 141 is a sectional view showing a modification of the liquid crystal apparatus of FIG. 124;

FIG. 142 is a plan view showing the liquid crystal apparatus of FIG. 141;

FIG. 143 is a sectional view showing a modification of the liquid crystal apparatus of FIG. 124;

FIG. 144 is a sectional view showing a modification of the liquid crystal apparatus of FIG. 124;

FIG. 145 is a plan view showing the liquid crystal apparatus of FIG. 144;

FIG. 146 is a sectional view of a liquid crystal display apparatus similar to that of FIG. 6;

FIG. 147 is a sectional view of a liquid crystal display apparatus similar to that of FIG. 7;

FIG. 148A is a view showing a part of the liquid crystal display apparatus of FIG. 146 near the surface of the dielectric layer;

FIG. 148B is a view showing the liquid crystal display apparatus of FIG. 148A when a voltage is applied;

FIG. 149A is a view showing a part of the liquid crystal display apparatus of FIG. 150 near the surface of the dielectric layer;

FIG. 149B is a view showing the liquid crystal display apparatus of FIG. 149A with a voltage applied;

FIG. 150 is a sectional view of a liquid crystal display apparatus according to a further embodiment of the present invention;

FIG. 151 is a view showing the liquid crystal display apparatus of FIG. 150 when a voltage is applied;

FIG. 152 is a view showing a modification of a liquid crystal display apparatus of FIG. 150;

FIG. 153 is a view showing a liquid crystal display apparatus to illustrate that the alignment of the liquid crystal is disturbed by an electric field occurring between the gate bus line and the first stripe electrode;

FIG. 154 is a view showing a modification of a liquid crystal display apparatus of FIG. 150;

FIG. 155 is a view showing a modification of a liquid crystal display apparatus of FIG. 150;

FIG. 156 is a plan view showing a part of the active matrix formed in one of the substrates according to a further embodiment of the present invention;

FIG. 157 is a sectional view showing the substrate having the stripe electrodes of FIG. 156;

FIG. 158 is a sectional view showing a modification of a liquid crystal display apparatus of FIG. 157;

FIG. 159 is a sectional view showing a liquid crystal display apparatus according to a further embodiment of the present invention;

FIG. 160 is a sectional view showing a modification of a liquid crystal display apparatus of FIG. 158;

FIG. 161 is a sectional view showing a modification of a liquid crystal display apparatus of FIG. 158;

FIG. 162 is a diagram showing a relation between d/∈ and the transmittance;

FIG. 163 is a diagram showing a relation between the thickness of the transparent resin layer of the dielectric layer and image sticking of the screen when the thickness of the color filter is 2 μm;

FIG. 164 is a sectional view showing a liquid crystal display apparatus according to a further embodiment of the present invention; and FIG. 165 is a diagram showing an example of a discotic liquid crystal display apparatus which can be used as a dielectric layer of FIG. 164.

DESCRIPTION OF THE PREFERRED EMBODIMENTS

Figure 1:
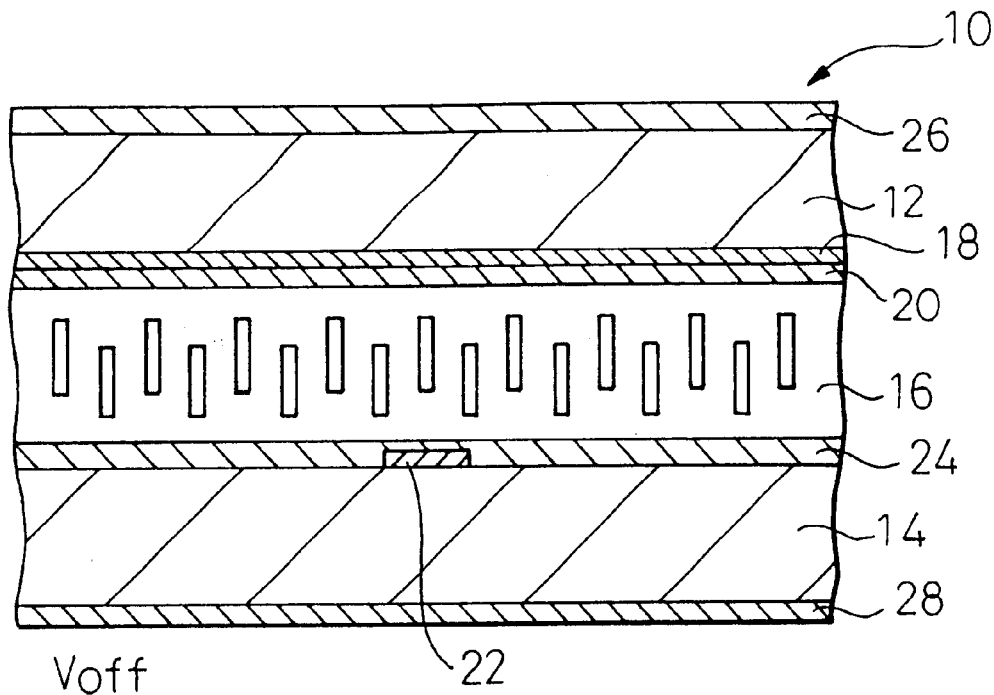
FIG. 1 is a sectional view showing a liquid crystal display apparatus with no voltage applied thereto according to a first embodiment of the present invention.
Figure 2:
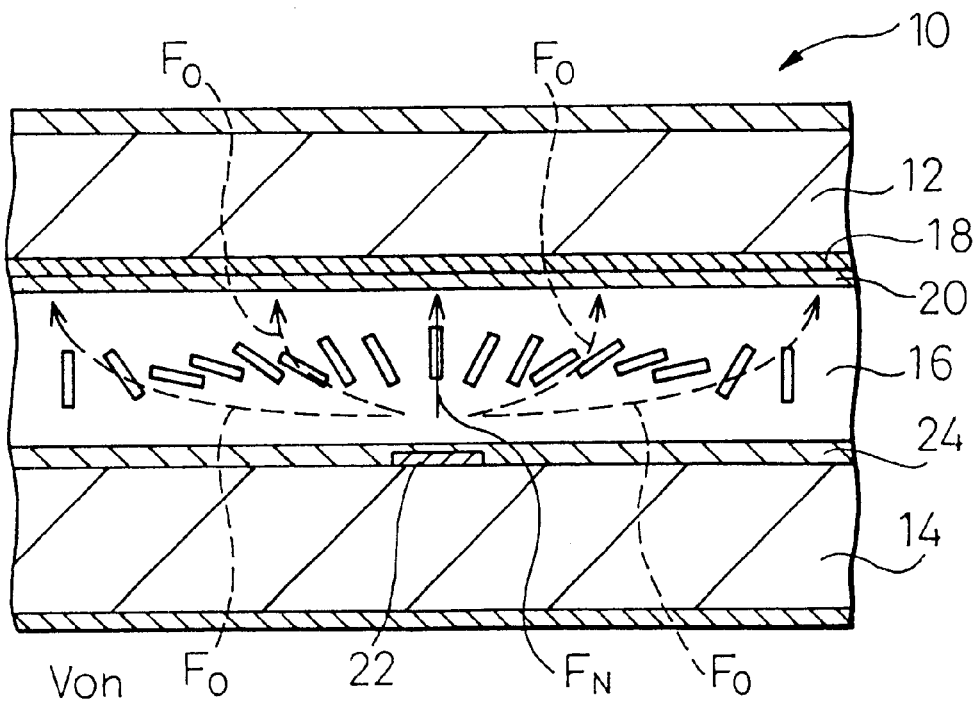
FIG. 2 is a sectional view showing the liquid crystal display apparatus of FIG. 1 with a voltage applied thereto.

FIG. 1 is a sectional view showing a liquid crystal display apparatus 10 according to a first embodiment of the invention when no voltage is supplied, and FIG. 2 is a sectional view of the liquid crystal display apparatus of FIG. 1 when a voltage is supplied.

In FIGS. 1 and 2, the liquid crystal display apparatus 10 according to this invention comprises first and second opposed transparent glass substrates 12, 14, and a liquid crystal layer 16 arranged between the first and second substrates 12, 14. The first substrate 12 is a color filter substrate including a color filter (not shown), and the second substrate 14 is a TFT substrate including TFTs. The liquid crystal panel is formed of a pair of the substrates 12, 14 and the liquid crystal layer 16.

The first substrate 12 includes a wide or solid transparent electrode 18 formed to cover substantially the whole surface of the first substrate 12 and a vertical alignment layer 20.

The second substrate 14 includes a plurality of stripe electrodes (only one is shown in FIG. 1) extending in parallel to each other and a vertical alignment layer 24. The liquid crystal of the liquid crystal layer 16 is vertically aligned, and has a positive dielectric anisotropy. A pair of polarizers 26, 28 are arranged on the two sides of the liquid crystal panel.

Figure 3:
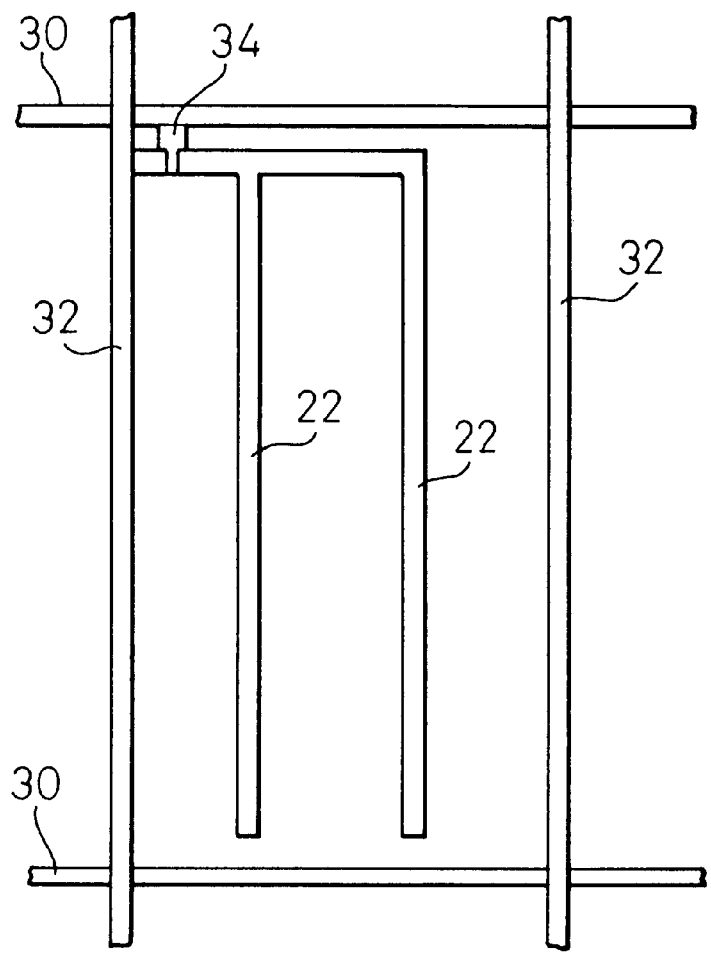
FIG. 3 is a diagram showing a part of the active matrix formed in one substrate.

FIG. 3 shows a part of the active matrix formed in the substrate 14. The active matrix includes gate bus lines 30, data bus lines 32 and TFTs 34. The region defined by the gate bus lines 30 and the data bus lines 32 corresponds to one pixel. The two stripe electrodes 22 are connected to the TFT 34, and supplied with an AC data voltage of the data bus line 321. In FIG. 3, the two stripe electrodes 22 are arranged in one pixel. The wide transparent electrode 18 is formed of a substantially transparent material such as ITO or NESA. The stripe electrodes. 22, however, are formed of the same metal as the gate bus lines 30 or the data bus lines 32.

Figure 4:
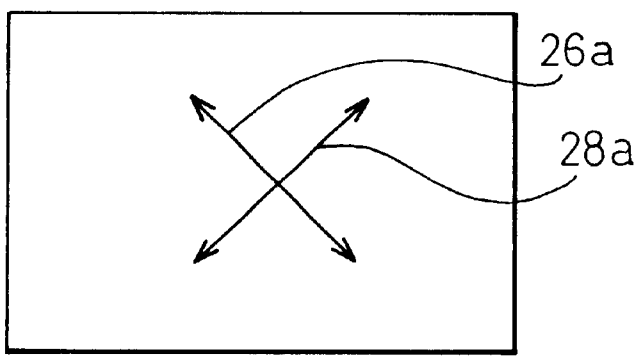
FIG. 4 is a diagram showing the relation of the absorption axes of the polarizers shown in FIG. 1.

FIG. 4 shows the relation between the absorption axes 26a, 28a of the polarizers 26, 28. The absorption axes 26a, 28a are arranged at right angles to each other in a crossed Nicol arrangement. The absorption axes 26a, 28a are arranged at an angle of 45 degrees to the gate bus lines 30, the data bus lines 32 and the stripe electrodes 22 shown in FIG. 3.

In this configuration, as shown in FIG. 1, when no voltage is applied, the liquid crystal molecules are aligned in the direction substantially perpendicular to the substrate surface As shown in FIG. 2, however, upon application of a voltage (when the wide transparent electrode 18 is connected to the ground and the stripe electrodes 22 are supplied with an AC voltage, for example), an electric field (electric lines of force) from each stripe electrode 22 toward the transparent electrode is formed. Many electric fields (electric lines of force), as shown also by arrows $F_O$, run obliquely from each stripe electrode 22 toward the solid transparent electrode 18. Thus, the liquid crystal molecules having a positive dielectric anisotropy are aligned in parallel to the oblique electric field $F_O$ upon application of a voltage thereto.

As a result, the liquid crystal molecules are tilted in an oblique direction to the substrate surface and birefringence thereby changes the polarization of the incident light. Thus, most of the liquid crystal molecules are smoothly aligned along the oblique electric field and no disclination is caused. The polarizers 26, 28 are arranged as a crossed Nicol and, therefore, upon the application of a voltage thereto, a white display is realized. In the immediate vicinity of the stripe electrodes 2, the electric field (electric lines of force) is perpendicular to the substrate surface as shown by arrows $F_N$. The stripe electrodes 22, which are made of a metal, have a shielding ability. Therefore, the behavior of the liquid crystal of this portion poses no problem. The viewing angle characteristic of the liquid crystal display apparatus of this type is superior to that of the TN-type liquid crystal display apparatus.

Figure 5A:
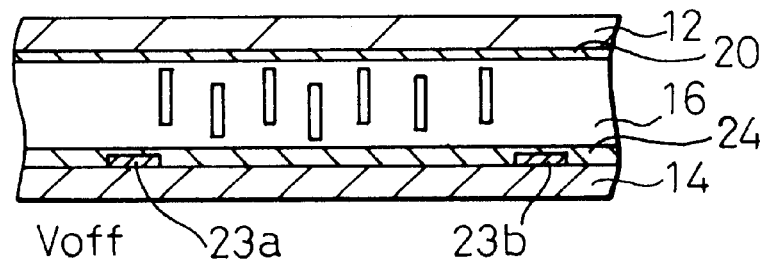
FIG. 5A is a sectional view showing a liquid crystal display apparatus according to a comparative example.
Figure 5B:
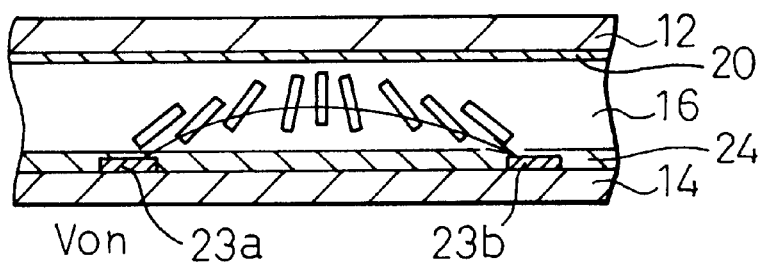
FIG. 5B is a diagram showing the liquid crystal display apparatus of FIG. 5A with a voltage applied thereto.
Figure 5C:
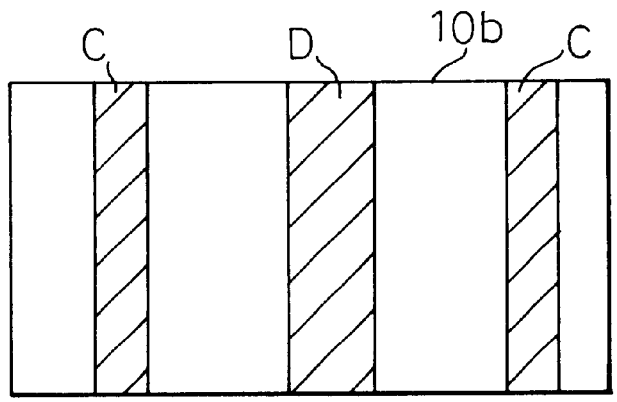
FIG. 5C is a diagram showing an image of a white display of the liquid crystal display apparatus shown in FIG. 5B.

FIGS. 5A to 5C are diagrams showing a comparative example of the liquid crystal display apparatus. In FIG. 5, the first substrate 12 has no electrode, and first electrodes 23a and second electrodes 23b are arranged only on the second substrate 14. The liquid crystal layer 16 includes a liquid crystal of vertical alignment type having a positive anisotropy of dielectric constant. Thus, when no voltage is applied thereto, the liquid crystal molecules are aligned in the direction substantially perpendicular to the substrate surface. Upon application of a voltage thereto, on the other hand, as shown in FIG. 5B, a horizontal electric field running from the first electrode 23a toward the second electrode 23b is formed. The liquid crystal molecules are aligned parallel to the horizontal electric field. However, it is not certain that the liquid crystal molecules located at a position intermediate between the two electrodes 23a, 23b, will follow the direction of alignment of the liquid crystal molecules at the right end or the direction of alignment of the liquid crystal molecules at the left end, thereby leading to an unpredictable alignment of the liquid crystal. As a result, as shown in FIG. 5C, a disclination D occurs at the central portion of the one-pixel region 10b of the liquid crystal display apparatus. The C regions are those shielded by the first electrode 23a and the second electrode 23b made of a metal. According to this invention, such a disclination D is reduced.

FIG. 6 is a sectional view showing the liquid crystal display apparatus according to a second embodiment when no voltage is applied. FIG. 7 is a sectional view showing the liquid crystal display apparatus 10 of FIG. 6 when a voltage is applied. The liquid crystal display apparatus 10, like the embodiment of FIGS. 1 and 2, comprises first and second transparent glass substrates 12, 14 in opposed relation to each other, a liquid crystal layer 16 arranged between the first and second substrates 12, 14 and polarizers 26, 28.

The first substrate 12 includes a wide or solid transparent electrode 18 to cover substantially the whole surface of the first substrate 12 and a vertical alignment layer 20. The second substrate 14 includes a plurality of alternately extending parallel first and second groups of stripe electrodes 22a, 22b and a vertical alignment layer 24. The first and second groups of the stripe electrodes 22a, 22b are supplied with different voltages. In this embodiment, the first group of the stripe electrodes 22 a are supplied with an AC data voltage (say, ±5 V), and the second group of the stripe electrodes 22b are supplied with the same voltage as the solid transparent electrode 18. In this case, the solid transparent electrode 18 is supplied with a voltage (ground) substantially intermediate of the AC data voltage.

Further, the dielectric layer (insulating layer) 36 is arranged between the solid transparent electrode 18 and the vertical alignment layer 20. The solid transparent electrode 18 is arranged on the inner surface of the first substrate 12, and the dielectric layer 36 is arranged on the solid transparent electrode 18. Basically, the dielectric layer 36 is interposed between the solid transparent electrode 18 and the liquid crystal layer 16. Preferably, the dielectric layer 36 is formed of an optically curable resin, a thermosetting resin, a positive or negative resist, a polyamic acid or other organic resin (such as epoxy resin, acrylic resin or fluorine resin) or an SiO, $SiO_2$ or SiN group.

In this configuration, as shown in FIG. 6. when no voltage is applied, the liquid crystal molecules are aligned in the direction substantially perpendicular to the substrate surface. As shown in FIG. 7, however, upon application of a voltage, an electric field (electric lines of force) running from each of the first group of the stripe electrodes 22a toward the solid transparent electrode 18 is formed. Many electric fields (electric lines of force), as shown by arrows $F_O$, run obliquely, from each of the first group of the stripe electrodes 22a toward the solid transparent electrode 18. Thus, the liquid crystal molecules having a positive dielectric anisotropy are aligned in the direction parallel to the oblique electric field $F_O$ upon application of a voltage thereto.

Further, a transverse or horizontal electric field $F_T$ is formed from each of the first group of the stripe electrodes 22a toward each of the second group of the stripe electrodes 22b. This transverse electric field $F_T$ functions to aid in the formation of the oblique electric field $F_O$ running from each of the stripe electrodes of the first group toward the solid transparent electrode 18. Specifically, in the configuration of FIG. 2, the oblique electric field $F_O$ sharply weakens with horizontal distance from the stripe electrodes 22. In FIG. 7, however, the intensity of the oblique electric field $F_O$ does not decrease much with distance from the stripe electrodes 22a.

The liquid crystal molecules are aligned in parallel to the oblique electric field $F_O$, and are tilted at an angle to the substrate surface, thereby causing birefringence and changing the polarization of the incident light. Thus, most of the liquid crystal molecules are aligned smoothly along the oblique electric field, thereby considerably preventing the disclination of FIG. 5D.

The interposition of the dielectric layer 36 between the solid transparent electrode 18 and the liquid crystal layer 16 further promotes the formation of the oblique electric field F0 and a superior display can be realized. The effects of the oblique electric field 36 will be explained with reference to FIGS. 8 and 9.

Figure 8:
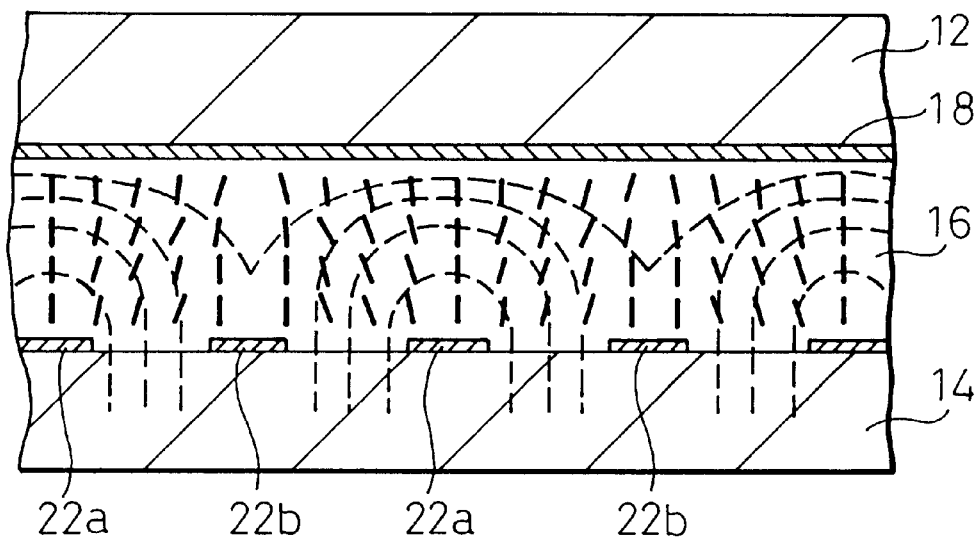
FIG. 8 is a diagram showing the liquid crystal display apparatus in the absence of a dielectric layer in which an electric field is formed.
Figure 9:
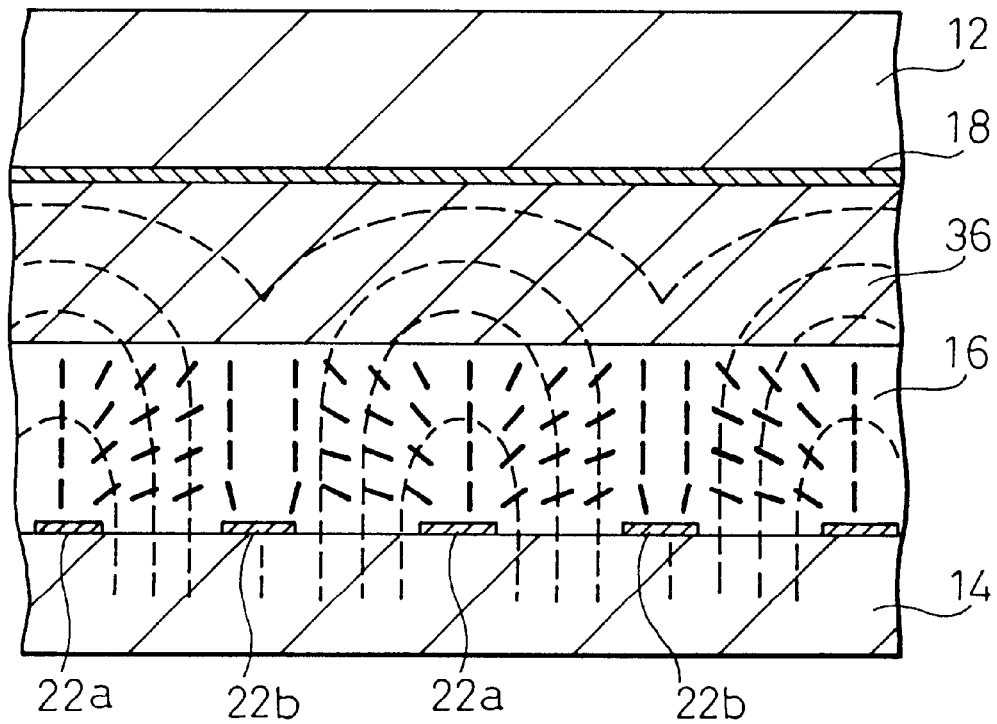
FIG. 9 is a diagram showing the liquid crystal apparatus in the presence of a dielectric layer in which an electric field is formed.

FIGS. 8 and 9 are diagrams for explaining the operation of the dielectric layer 36. FIG. 8 is a diagram showing the manner in which an electric field is formed in the absence of the dielectric layer 36, and FIG. 9 is a diagram showing the manner in which an electric field is formed in the presence of the dielectric layer 36. In FIGS. 8 and 9, equipotential lines are shown to be formed around the stripe electrodes 22a. In FIG. 8, the electric field is excessively concentrated in the vicinity of each stripe electrode 22a of the first group, and the equipotential lines stay within the liquid crystal layer 16. In the liquid crystal layer 16, the electric field tends to run strongly along the normal to the transparent electrode 18, so that the oblique electric field has a strong component along the normal and is not sufficiently oblique. Thus, the liquid crystal fails to exhibit the birefringence characteristic sufficiently.

In FIG. 9, the equipotential line expands from the liquid crystal layer 16 to the dielectric layer 36, so that the concentration of the electric field in the liquid crystal layer 16 is relaxed. Thus, in the liquid crystal layer 16, the intensity of the electric field running along the normal to the transparent electrode weakens. As a result, the component of the oblique electric field along the normal weakens and becomes sufficiently oblique. Thus, the liquid crystal molecules are tilted sufficiently.

Figure 10A:
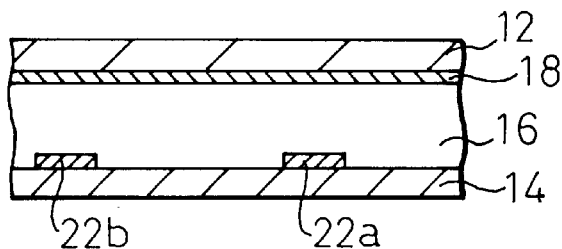
FIG. 10A is a diagram showing an example of a liquid crystal display apparatus similar to the liquid crystal display apparatus of FIG. 6 except that the dielectric member is not included.
Figure 10B:
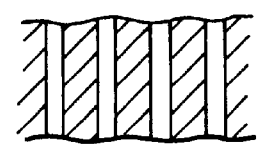
FIG. 10B is a diagram showing an example of the display of the liquid crystal display apparatus of FIG. 10A.

FIG. 10A is a diagram showing a liquid crystal display apparatus similar to the liquid crystal display apparatus of FIG. 6 except that the dielectric layer 36 is not included. FIG. 10B is a diagram showing an example display on the liquid crystal display apparatus of FIG. 10A. In this example, the disclination is eliminated, but the whole display is comparatively dark.

Figure 11A:
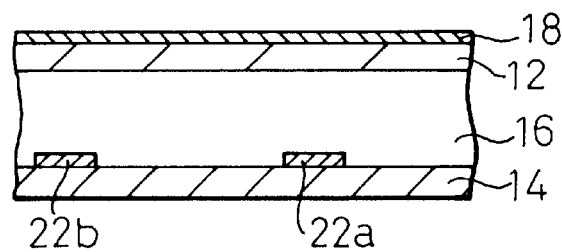
FIG. 11A is a diagram showing an example of the liquid crystal display apparatus having a reverse arrangement of the substrate having the transparent electrode without a dielectric member.
Figure 11B:
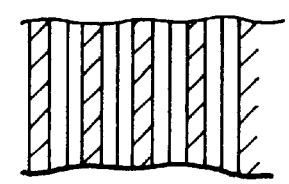
FIG. 11B is a diagram showing an example of the display of the liquid crystal display apparatus of FIG. 11A.

FIG. 11A is a diagram showing a liquid crystal display apparatus having mounted thereon the substrate 12, upside down with the transparent electrode 18. FIG. 11B is a diagram showing an example display on the liquid crystal display apparatus of FIG. 11A. The hatched regions represent the dark portions, and the other regions represent the bright portions. In this example, the bright portions without hatchings include a linear disclination.

Figure 12A:
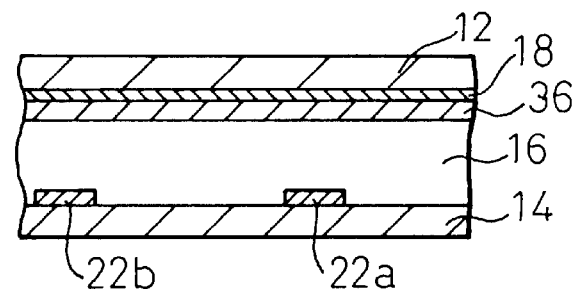
FIG. 12A is a diagram showing an example of a liquid crystal display apparatus similar to the liquid crystal display apparatus of FIG. 6.
Figure 12B:
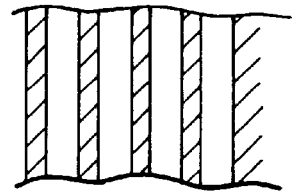
FIG. 12B is a diagram showing an example of the display on the liquid crystal display apparatus of FIG. 12A.

FIG. 12A is a diagram showing a liquid crystal display apparatus similar to the liquid crystal display apparatus of FIG. 6 having the dielectric layer 36. FIG. 12B is a diagram showing an example display on the liquid crystal display apparatus of FIG. 12A. In this example, the disclination is not developed and the display is bright as a whole. Thus, with the configuration of FIG. 12, a bright display free of disclination can realized with a small drive voltage.

Figure 13:
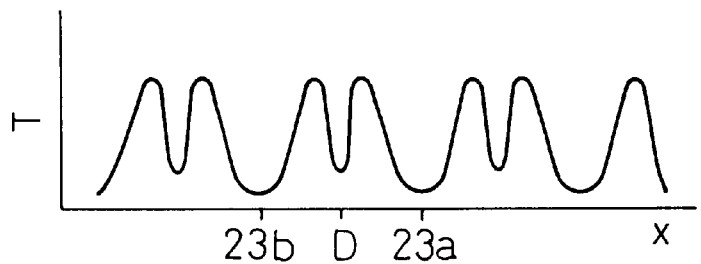
FIG. 13 is a diagram showing the transmittance in the case where a voltage of 6 V is applied to the liquid crystal display apparatus in the absence of a dielectric layer and the transparent electrode;.

FIG. 13 is a diagram showing a transmittance (T) in the case where a voltage of 6 V is applied to the liquid crystal display apparatus in the absence of the dielectric layer 36 and the transparent electrode 18. In FIGS. 13 to 16, the abscissa x represents the position, and each valley of the curve corresponds to the position of the stripe electrodes 22a, 22b, 23a, or 23b, or the disclination D.

Figure 14:
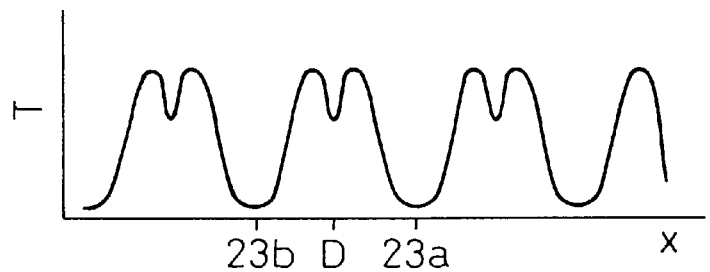
FIG. 14 is a diagram showing the transmittance in the case where a voltage of 10 V is applied to the liquid crystal display apparatus in the absence of a dielectric layer and the transparent electrode.

FIG. 14 is a diagram showing the transmittance (T) in the case where a voltage of 10 V is applied to the liquid crystal display apparatus in the absence of the dielectric layer 36 and the transparent electrode 18. In FIGS. 13 and 14, the disclination occurs in a region of high transmittance.

Figure 15:
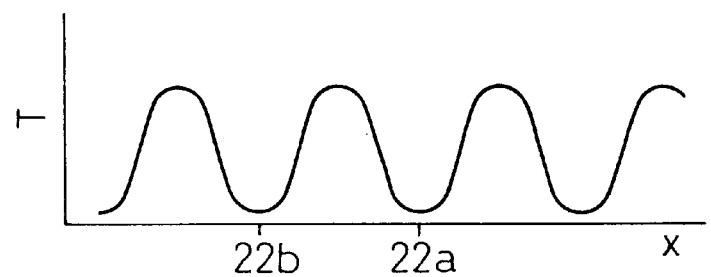
FIG. 15 is a diagram showing the transmittance in the case where a voltage of 6 V is applied to the liquid crystal display apparatus in the presence of a dielectric layer and the transparent electrode.

FIG. 15 is a diagram showing the transmittance (T) in the case where a voltage of 6 V is applied to the liquid crystal display apparatus in the presence of the dielectric layer 36 and the transparent electrode 18.

Figure 16:
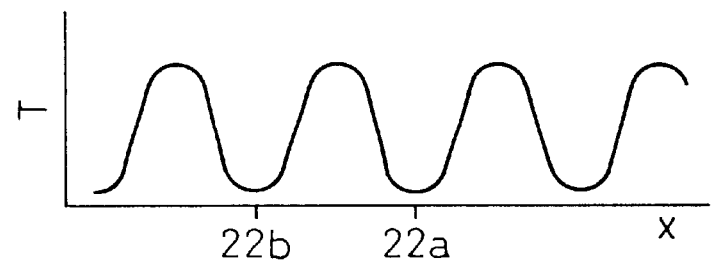
FIG. 16 is a diagram showing the transmittance in the case where a voltage of 10 V is applied to the liquid crystal display apparatus in the presence of a dielectric layer and the transparent electrode.

FIG. 16 is a diagram showing the transmittance (T) in the case where a voltage of 10 V is applied to the liquid crystal display apparatus in the presence of the dielectric layer 36 and the transparent electrode 18. In FIGS. 15 and 16, no disclination occurs.

Figure 17:
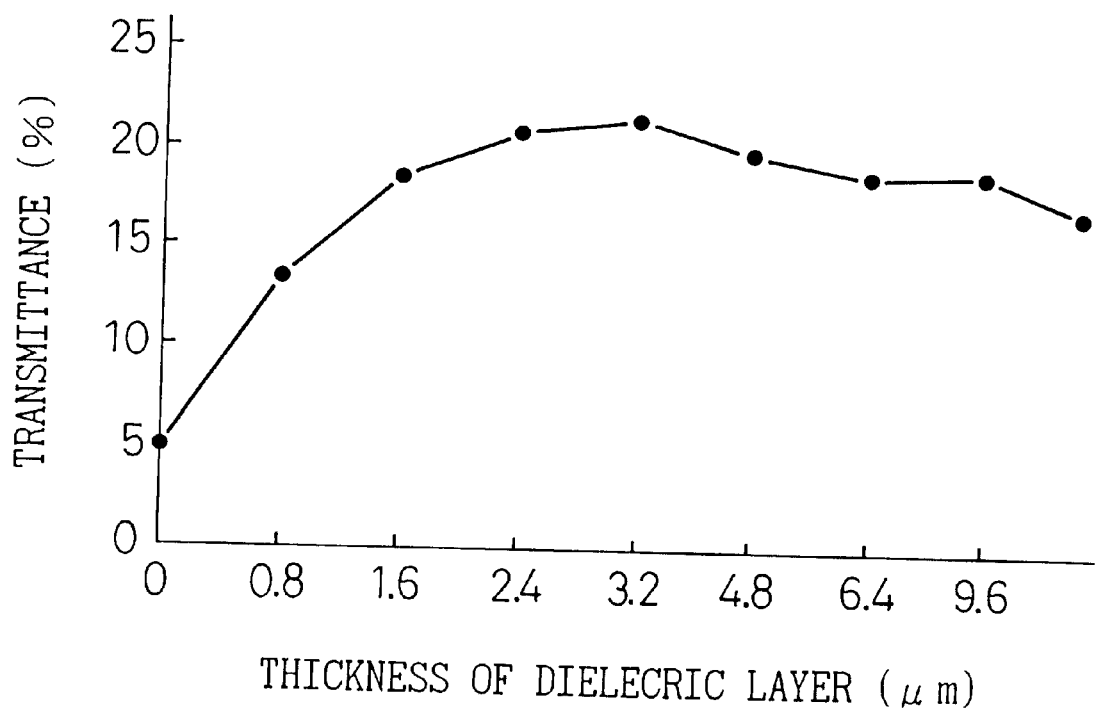
FIG. 17 is a diagram showing the relation between the thickness of the dielectric layer and the transmittance.

FIG. 17 is a diagram showing the relation between the thickness of the dielectric layer 36 and the transmittance (brightness). In the case where the thickness of the dielectric layer 36, is zero, the transmittance is low with the increase in the thickness of the dielectric layer 36, however, the transmittance increases. When the thickness of the dielectric layer 36 is about 3 to 4 μm, the transmittance is highest, and when the thickness of the dielectric layer 36 exceeds 4 μm, the transmittance gradually decreases. When the thickness of the dielectric layer 36 exceeds 4 μm, however, the effect of the solid transparent layer 18 decreases. In principle, the thickness of the dielectric layer 36 is preferably in the range of 3 μm±3 μm.

The thickness of the dielectric layer 36 depends on the dielectric constant of the dielectric layer 36. In the case where the dielectric constant of the dielectric layer 36 is in the range of 3±1, the thickness of the dielectric layer 36 should be not less than 0.1 μm but not more than 5 μm. In the case where the dielectric constant of the dielectric layer 36 is in the range of 5±1, on the other hand, the thickness of the dielectric layer 36 should be not less than 0.5 μm but not more than 10 μm. Specifically, in the case where the dielectric constant of the dielectric layer 36 is about 3, the thickness of the dielectric layer 36 should be 1 μm to 4 μm. In the case where the dielectric constant of the dielectric layer 36 is about 7, on the other hand, the proper thickness of the dielectric layer 36 is 3 μm to 6 μm. This depends on the manner in which the equipotential line of FIG. 9 is formed.

Figure 18:
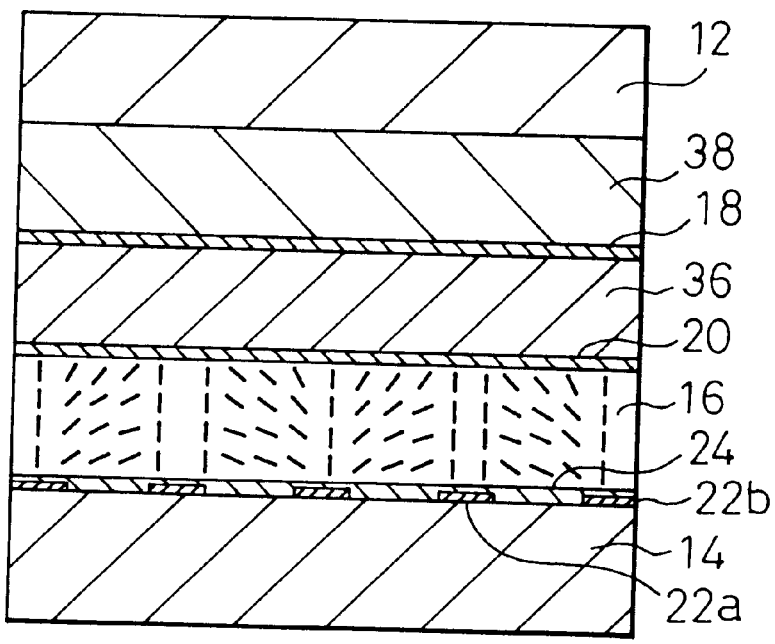
FIG. 18 is a sectional view of a liquid crystal display apparatus, showing an example of the dielectric layer.

FIGS. 18 to 21 show various examples of the dielectric layer 36. In FIG. 18, a color filter 38 is arranged on the inner surface of the first substrate 12. A solid transparent electrode 18 is arranged on the color filter 38, a dielectric layer 36 is formed on the solid transparent electrode 18, and a vertical alignment layer 20 is formed on the dielectric layer 36.

Figure 19:
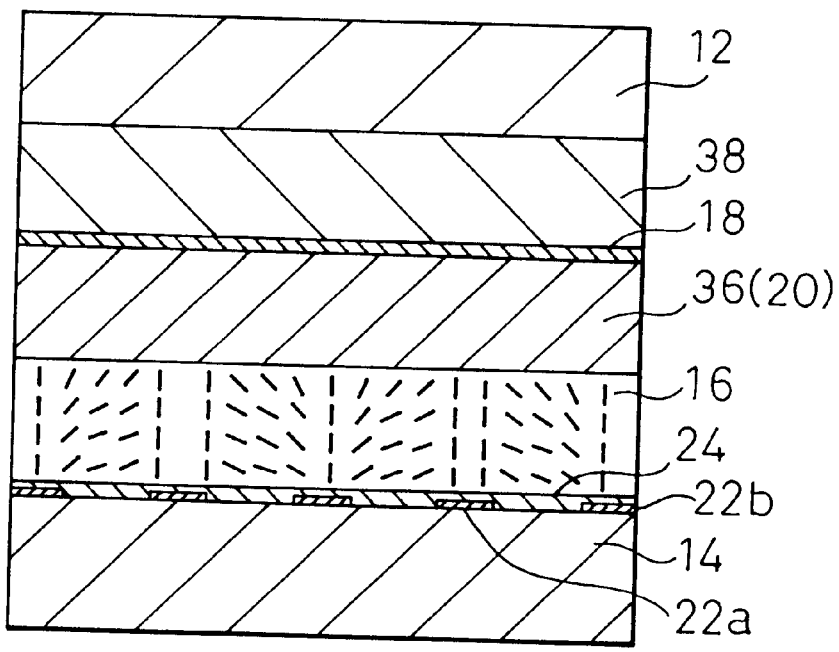
FIG. 19 is a sectional view of a liquid crystal display apparatus, showing another example of the dielectric layer.

In FIG. 19, the color filter 38 is arranged on the inner surface of the first substrate 12, the solid transparent electrode 18 is formed on the color filter 38, and the dielectric layer 36 doubling as the vertical alignment layer 20 is formed on the solid transparent electrode 18. In this case, the normal vertical alignment layer 20 is formed thick to meet the thickness requirement of the dielectric layer 3, 6.

Figure 20:
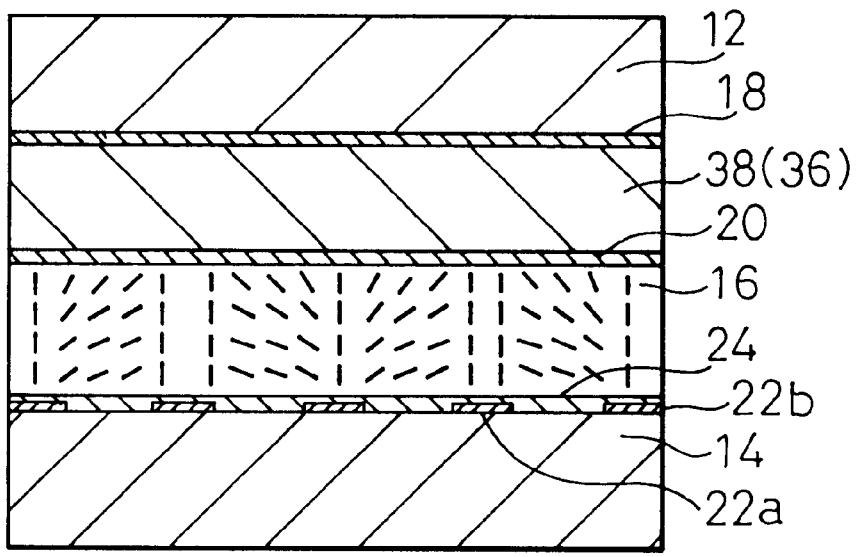
FIG. 20 is a sectional view of a liquid crystal display apparatus, showing another example of the dielectric layer.

In FIG. 20, the solid transparent electrode 18 is formed on the inner surface of the first substrate 12, the dielectric layer 36 doubling as the color filter 38 is formed on the solid transparent electrode 18, and the vertical alignment layer 20 is formed on the color filter 38.

Figure 21:
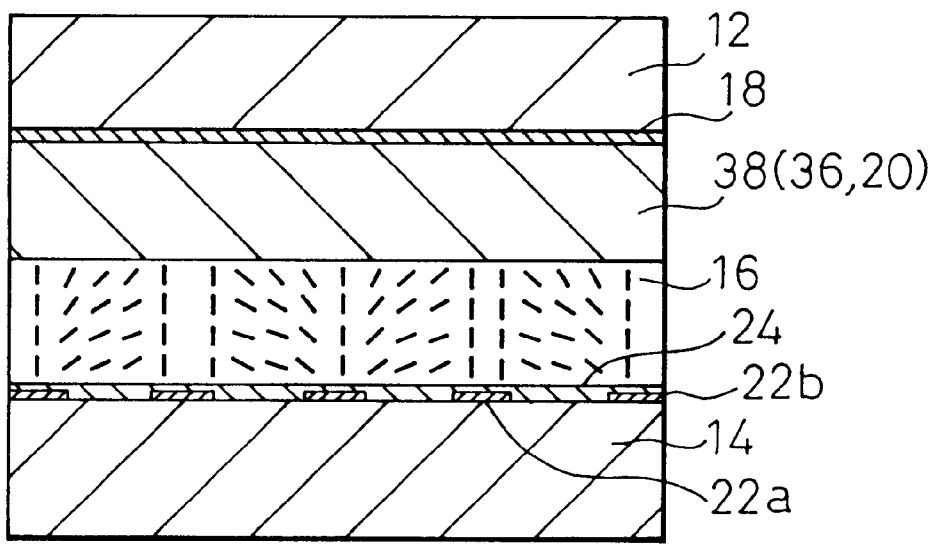
FIG. 21 is a sectional view of a liquid crystal display apparatus, showing another example of the dielectric layer.

In FIG. 21, the solid transparent electrode 18 is formed on the inner surface of the first substrate 12, and the dielectric layer 36 doubling as the color filter 38 doubling as the vertical alignment film 20 is formed on the solid transparent electrode 18. In this case, polyimide exhibiting the vertical alignment characteristic is used as a base material of the color filter 38 thereby to complete the configuration described above. In the configuration of FIG. 18, the dielectric layer 36 is required, but in the configuration of FIGS. 19 to 21, the dielectric layer 36 is not required. In the case where the dielectric layer 36 is added, the step is added for patterning the dielectric layer 36 in order to form a transfer electrode for connecting the solid transparent electrode 18 to the lead electrode of the second substrate 14. Further, the dielectric layer 36 conveniently has the property of the phase film described later.

Figure 22:
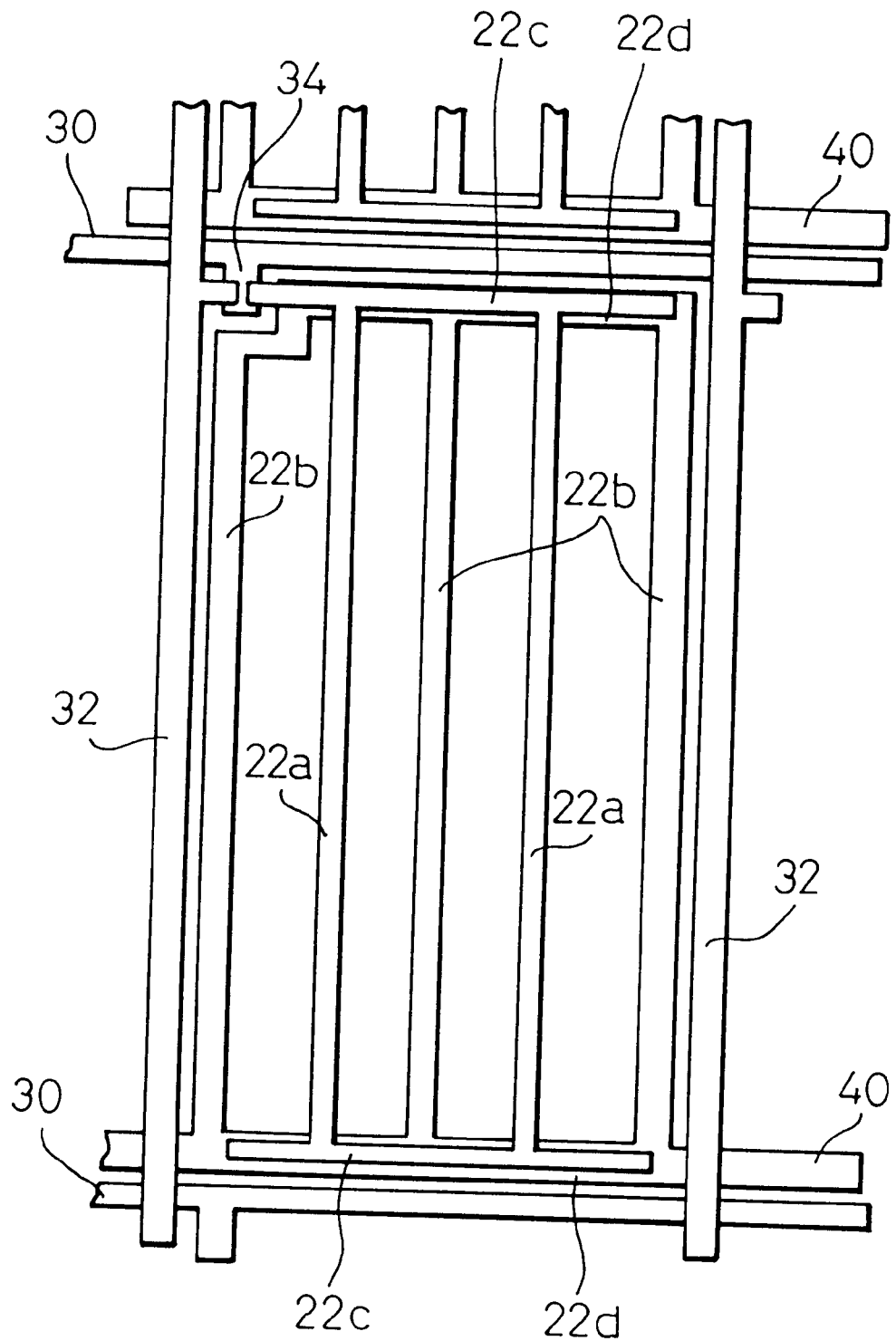
FIG. 22 is a diagram showing an example of the first and second groups of stripe electrodes and an active matrix formed in one substrate.

FIG. 22 is a diagram showing an example of the first and second stripe electrodes 22a, 22b and the active matrix formed in the second substrate 14. The active matrix includes gate bus lines 30, data bus lines 32 and TFTs 34. The region defined by the gate bus lines 30 and the data bus lines 32 corresponds to one pixel. The two stripe electrodes 22a of the first group are connected to the TFT 34 and to each other by a connection electrode 22c and supplied with the AC data voltage of the data bus lines 32. Further, a common bus line 40 is arranged in parallel to the gate bus lines 30. Three stripe electrodes of the second group are connected to the common bus line 40 and to each other by a connection electrode 22d. The two first stripe electrodes 22a and the three second stripe electrodes 22b are alternately arranged to form a transverse or horizontal electric field. As explained with reference to FIGS. 6 and 7, this horizontal electric field promotes the formation of the oblique electric field between the first group of the stripe electrodes 22a and the wide or solid transparent electrode 18 of the first substrate 12.

Figure 23:
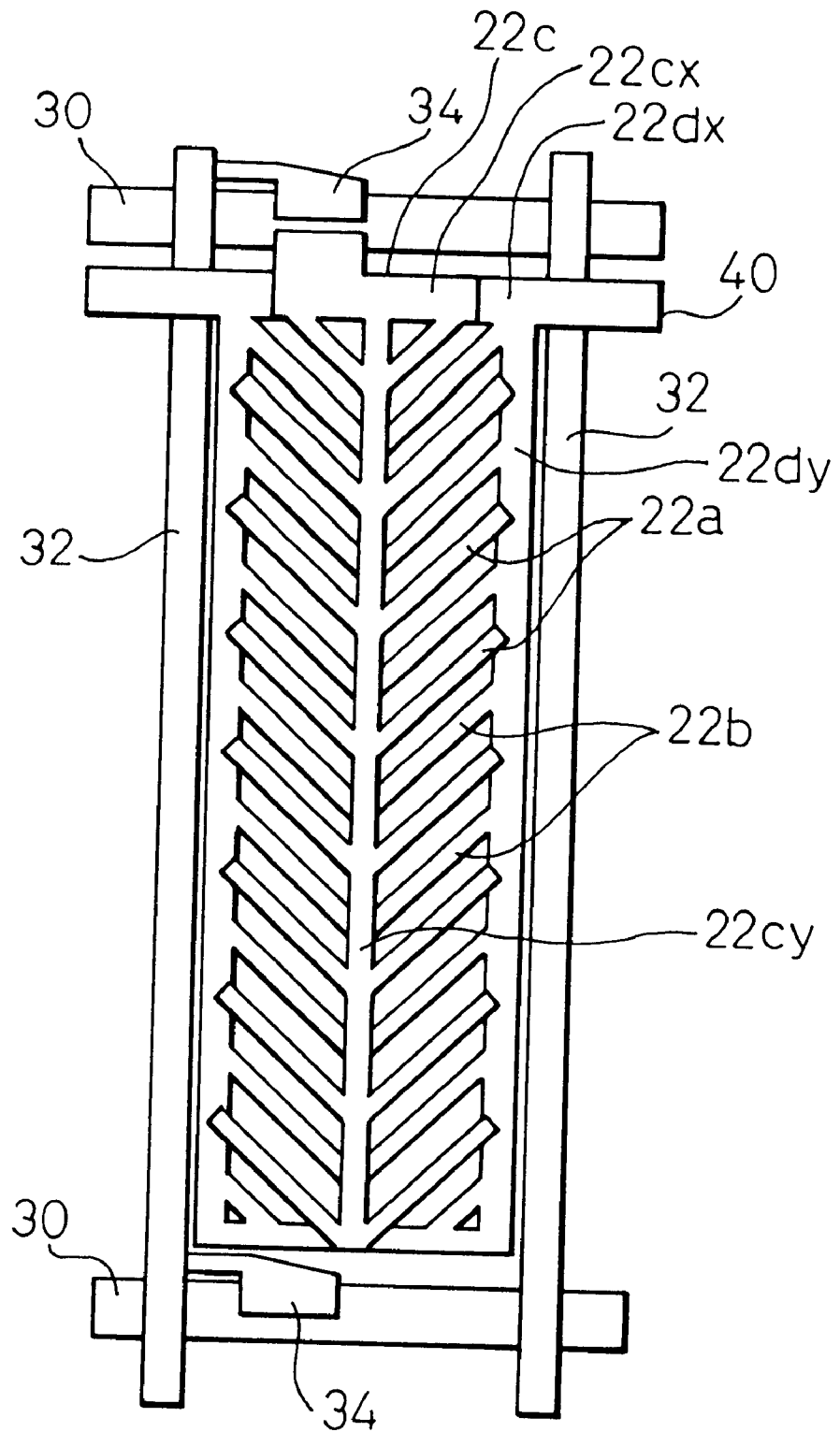
FIG. 23 is a diagram showing another example of the first and second groups of stripe electrodes and an active matrix formed in one substrate.

FIG. 23 is a diagram showing another example of the first and second groups of the stripe electrodes 22a, 22b and the active matrix formed in the second substrate 14. Also, in this example, the first group of the stripe electrodes 22a are connected to the TFT 34 through the connection electrode 22c, and the second group of the stripe electrodes 22b are connected to the common bus line 40 by the connection electrode 22d. The first group of the stripe electrodes 22a and the second group of the stripe electrodes 22b are alternately arranged to form a horizontal electric field. The stripe electrodes 22a, 22b are formed at an angle of 45 degrees to the gate bus lines 30 and the data bus lines 32. Further, the first and second groups of the stripe electrodes 22a, 22b are divided into two subgroups of linear portions extending in the directions at 90 degrees between respective portions. Specifically, the connection electrode 22c includes a connection electrode portion 22cx extending in parallel to the gate bus line 30 and a connection electrode portion 22cy extending in parallel to the data bus line 32 along the center line of the pixel. The connection electrode 22d similarly has connection electrode portions. 22dx, 22dy. The first and second groups of the stripe electrodes 22a, 22b are divided into two subgroups on the two sides of the connection electrode portion 22cy, 22dy. Within each subgroup, the liquid crystal molecules located on the two sides of each stripe electrode 22a of the first group are tilted in opposite directions (FIG. 7) and thus the liquid crystal is aligned in different directions. As a result, the pixel is divided into four regions of 2×2. With this configuration, the liquid crystal molecules are tilted in four directions, and therefore the viewing angle characteristic is further improved.

The second substrate shown in FIGS. 22 and 23 can be also combined with the first substrate 12. shown in FIGS. 18 to 21.

Figure 24:
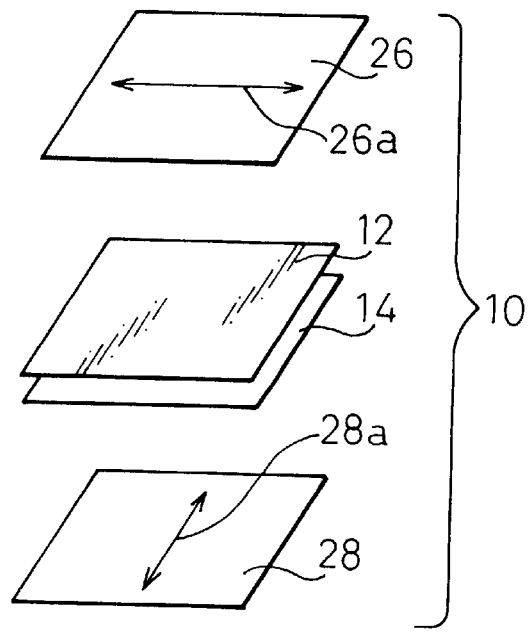
FIG. 24 is a diagram showing the liquid crystal display apparatus of FIGS. 6 and 7 in simplified fashion.

FIG. 24 is a diagram showing the liquid crystal display apparatus 10 of FIGS. 6 and 7 (FIGS. 18 to 23) in a simplified fashion. The liquid crystal display apparatus 10 includes a liquid crystal panel having a pair of glass substrates 12, 14 holding a liquid crystal layer 16 therebetween, and a pair of polarizers 26, 28 located on the two sides of the liquid crystal panel. The absorption axes 26a, 28a of the polarizers 26, 28 are arranged at right angles to each other. The absorption axes 26a, 28a can be arranged at an angle of 45 degrees to the gate bus lines 30, the data bus lines 32 and the stripe electrodes 22.

Figure 25:
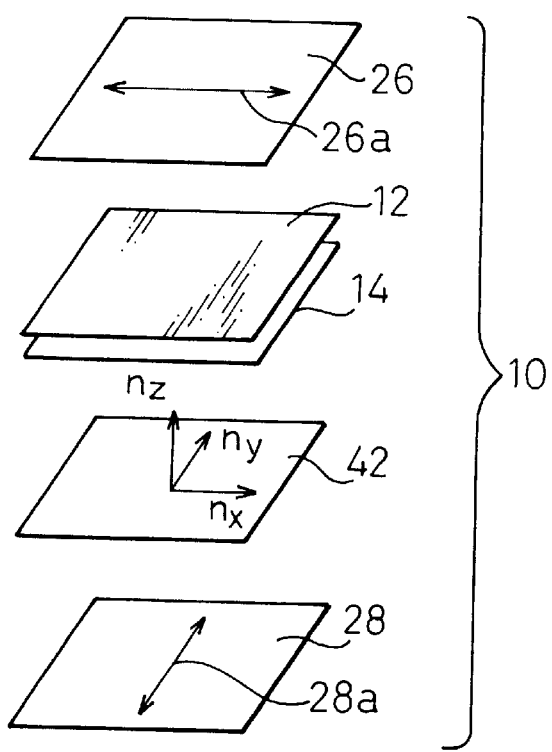
FIG. 25 is a diagram showing a liquid crystal display apparatus with a phase plate added to the configuration of FIG. 24.

FIG. 25 is a diagram showing the liquid crystal display apparatus 10 further comprising at least one phase plate or film 42. The at least one phase film 42 can be arranged at any position between the pair of the polarizers 26, 28.

The phase film 42 according to this embodiment is assumed to have a property expressed by the relation $$n_x \geq n_z, \; n_y \geq n_z \; (\text{not } n_x = n_y = n_z) \tag{1}$$

where the main refractive indexes of the phase film 42 are $n_x$, $n_y$, $n_z$, of which the refractive indexes in the film surface are $n_x$, $n_y$ (the refractive index in the direction perpendicular to the absorption axis of the adjacent polarizer is $n_x$, and the refractive index in the direction parallel thereto is $n_y$), and the refractive index normal to the film is $n_z$.

In the case where the relation $n_x > n_y$ holds between the refractive indexes $n_x$, $n_y$, for example, the x direction is called a slow axis. Assuming that the thickness of the phase film 42 is d, $R_{xz}$ is defined to be equal to $(n_x - n_z)d$ and $R_{yz}$ equal to $(n_y - n_z)d$.

Figure 26:
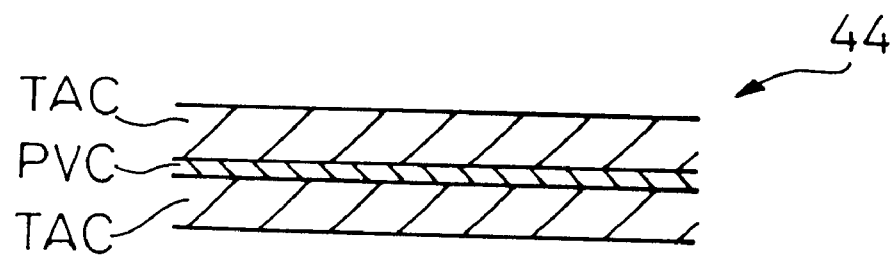
FIG. 26 is a sectional view showing an example of a typical polarization film.
Figure 27:
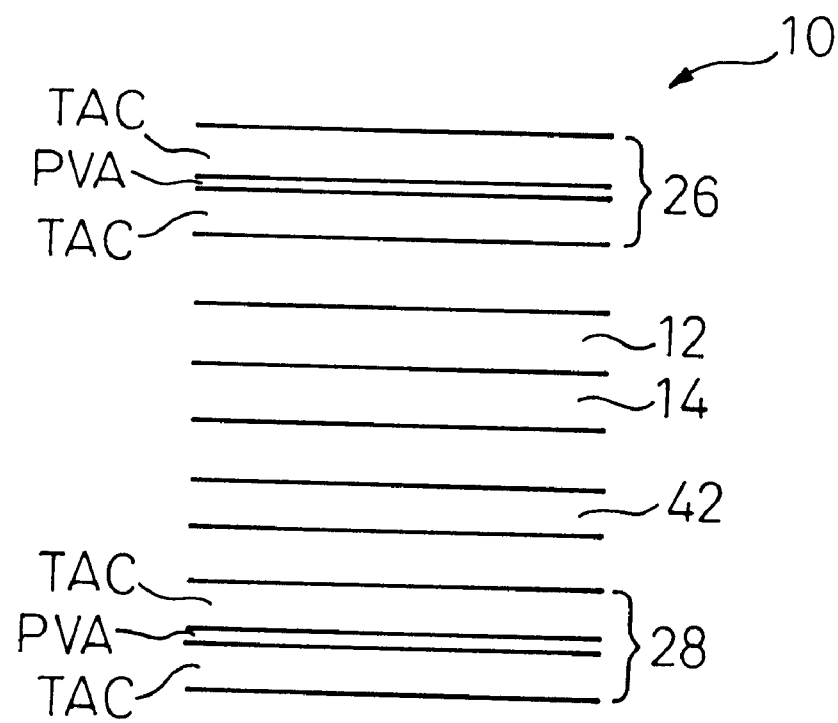
FIG. 27 is a diagram showing a configuration of the liquid crystal display apparatus using the polarization film of FIG. 26.

FIG. 26 is a diagram showing a configuration of a typical polarizer 44. The polarizer 44 is configured as a polarizing film holding a PVA (polyvinyl alcohol) film having a polarizing function with TAC (triacetylcellulose) films or the like supporting films. As shown in FIG. 27, in the case where this polarizer 44 is used as the polarizers 26, 28 of the liquid crystal display apparatus 10, only the PVA film is regarded as the actual polarizers 26, 28. Thus, when the TAC film located inside of the PVA film satisfies the relations $n_x \geq n_z$, $n_y \geq n_z$, the particular TAC film is regarded as a phase film inserted between the pair of the polarizers 26, 28. Also, according to this invention, any layer formed with a phase can be used in place of the phase film. The layer having a phase is preferably formed as a film-like material possibly including a color filter layer, a resin layer or an alignment layer.

Figure 28:
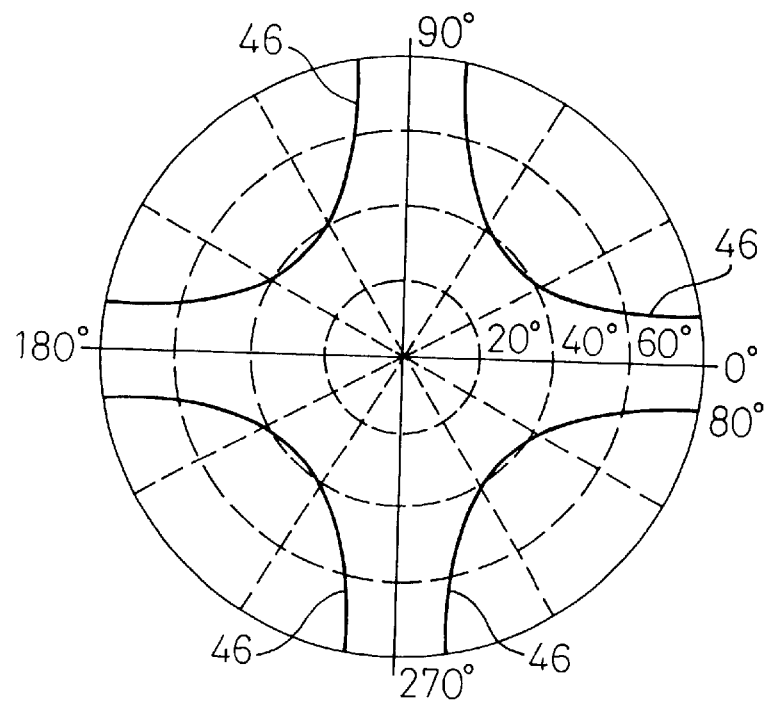
FIG. 28 is a diagram showing the viewing angle characteristic of the liquid crystal display apparatus of FIG. 24.

FIG. 28 is a diagram showing the viewing angle characteristic of the liquid crystal display apparatus shown in FIG. 24. A curve 46 represents a constant contrast curve indicating the contrast of 10 when the liquid crystal panel is viewed from all the directions. It is seen from this constant contrast curve 46 that a superior contrast can be obtained at a viewing angle wider than the viewing angle characteristic of the TN-type liquid crystal display apparatus. In this constant contrast curve 46, the viewing angle associated with the contrast of 10 in the directions of 45 degrees, 135 degrees, 225 degrees and 315 degrees is 38 degrees.

Figure 29:
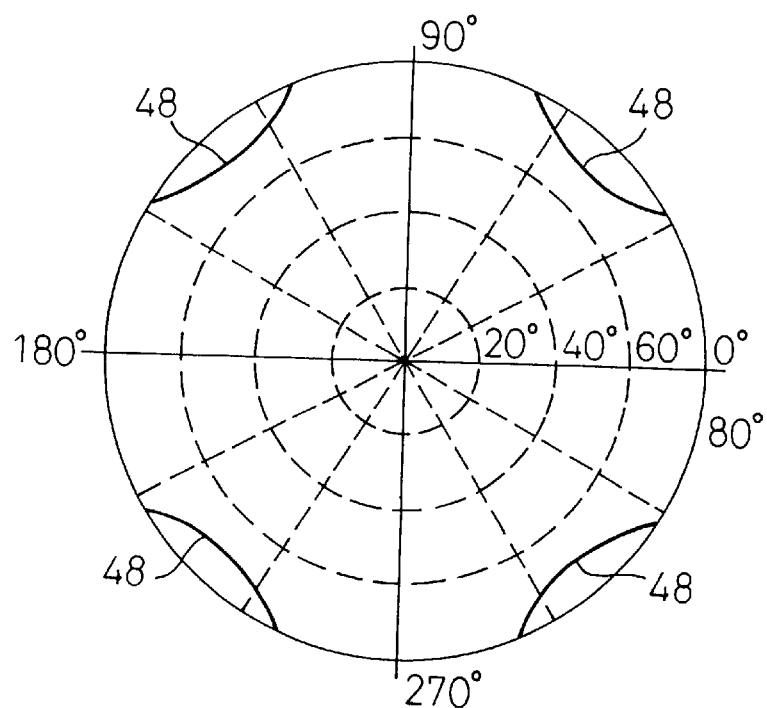
FIG. 29 is a diagram showing the viewing angle characteristic of the liquid crystal display apparatus of FIG. 25.

FIG. 29 is a diagram showing the viewing angle characteristic of the liquid crystal display apparatus of FIG. 25. A curve 48 is a constant contrast curve associated with the contrast of 10 when the liquid crystal display panel is viewed from all directions. In this constant contrast curve 48, the viewing angle associated with the contrast of 10 in the directions of 45 degrees, 135 degrees, 225 degrees and 315 degrees is about 70 degrees. Thus the insertion of the phase film 42 can produce a superior viewing angle characteristic.

First, in the configuration of FIG. 25, a sheet of phase film 42 was inserted and the viewing angle characteristic was studied by changing $R_{xz}$, $R_{yz}$ variously. By changing $R_{xz}$, $R_{yz}$, the viewing angle was determined at which the contrast is 10 in the direction of 45 degrees.

Figure 30:
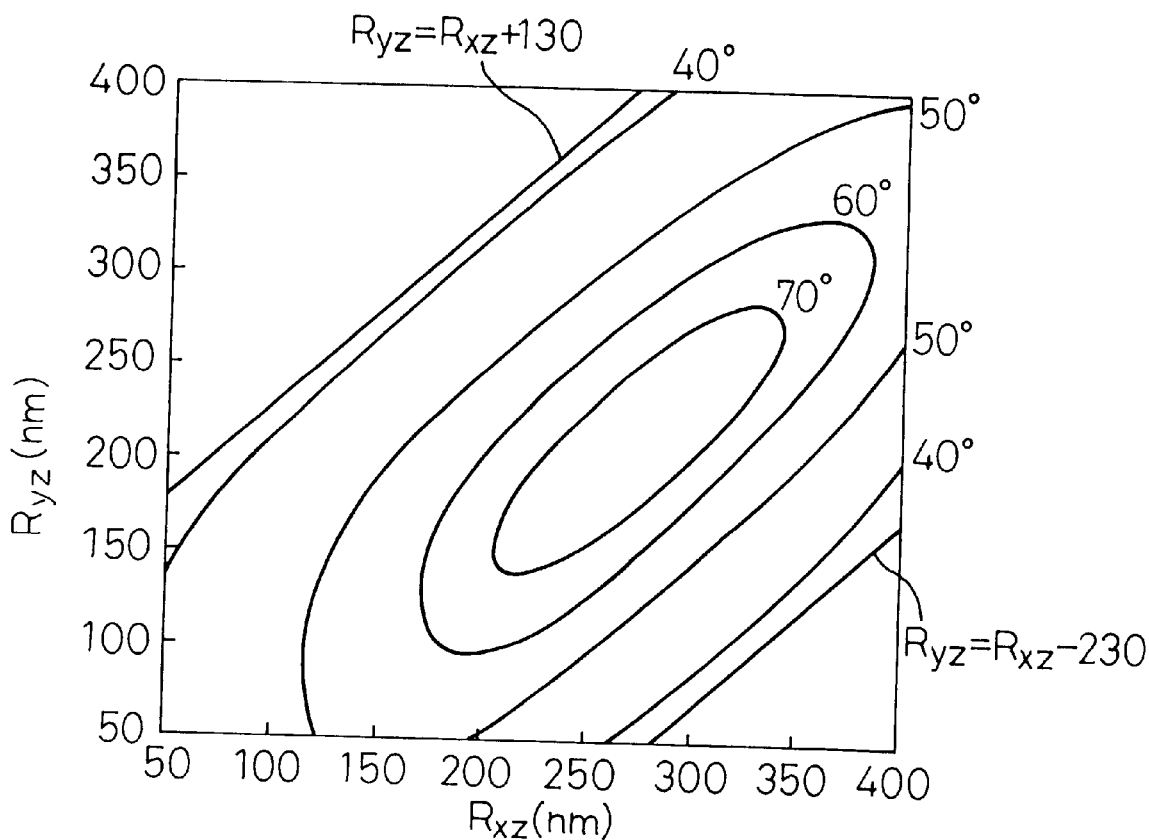
FIG. 30 is a diagram showing constant viewing angle curves associated with a contrast of 10 on the $R_{xz}$–$R_{yz}$ coordinate.

FIG. 30 is a diagram showing a constant viewing angle curve associated with the contrast of 10. A curve having the viewing angles of 70 degrees, 60 degrees, 50 degrees and 40 degrees is plotted in the $R_{xz}$, $-R_{yz}$ coordinate. In the liquid crystal display apparatus having the stripe electrodes 22a, 22b of FIG. 23, the viewing angle characteristic is the same in the four directions, and therefore a similar result is obtained in the directions of 135 degrees, 225 degrees and 315 degrees.

As described above, in FIG. 28, the viewing angle associated with the contrast of 10 in the direction of 45 degrees is 38 degrees. It follows therefore that as far as the viewing angle is 38 degrees or more with the contrast of 10 in FIG. 30, the addition of the phase film 42 is effective.

In FIG. 30, the viewing angle associated with the contrast of 10 is 38 degrees or more when the following conditions of $R_{xz}$, $R_{yz}$ are satisfied.

$$R_{yz} \geq R_{xz} - 230 \text{ nm}$$

$$R_{yz} \leq R_{xz} + 130 \text{ nm}$$

$$R_{yz} \leq -R_{xz} + 1060 \text{ nm}$$

Rewriting these conditions, $$-130 \text{ nm} \leq (n_x - n_y)d \leq 230 \text{ nm}$$

$$((n_x + n_y)/2 - n_z)d \leq 530 \text{ nm}$$

where assuming that $R = (n_x - n_y)d$, $R_t = ((n_x + n_y)/2 - n_z)d$, the conditions to be met by the phase film 42 are given as $$-130 \text{ nm} \leq R \leq 230 \text{ nm} \tag{2}$$

$$R_t \leq 530 \text{ nm}$$

In a similar fashion, the optimum conditions for R and $R_t$ were determined by changing $\Delta nd_{LC}$ of the liquid crystal panel ($d_{LC}$ is the thickness of the liquid crystal layer). It was found that the optimum conditions for R are always given by the following equation regardless of $\Delta nd_{LC}$ of the liquid crystal panel.

$$-130 \text{ nm} \leq R \leq 230 \text{ nm} \tag{2}$$

Figure 31:
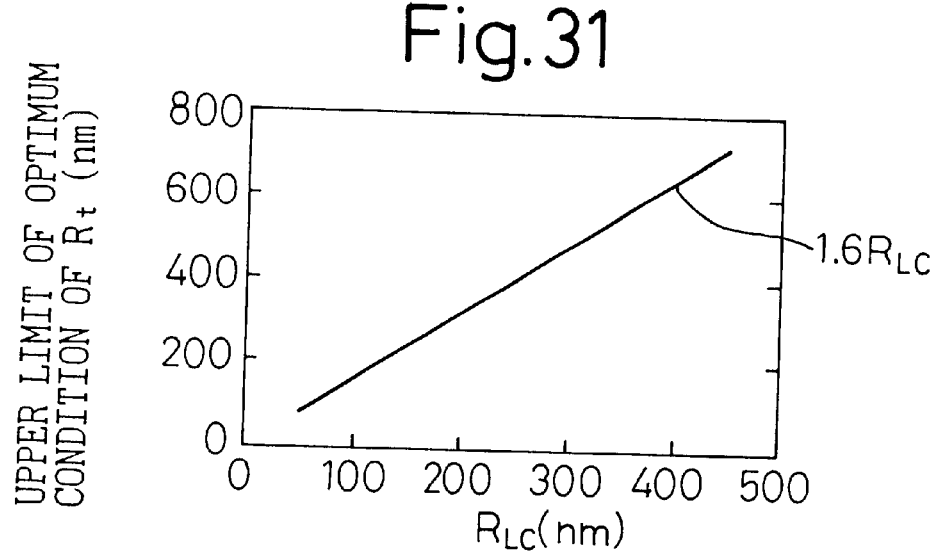
FIG. 31 is a diagram showing the relation between $R_{LC}$ and $R_i$.

On the other hand, the optimum conditions for $R_t$ depends on $\Delta nd_{LC}$ of the liquid crystal panel. The relation between $\Delta nd_{LC}$ and the upper limit of the optimum conditions for $R_t$ was studied and determined as shown in FIG. 31. Assuming that $\Delta nd_{LC} = R_{LC}$ for a liquid crystal panel, the upper limit of the optimum conditions for $R_t$ is given by the relation $1.6 \times R_{LC}$. Thus, $R_t$ should be in the range lower than this upper limit. In other words, the relation holds that $$R_t \leq 1.6 \times R_{LC}$$

The foregoing is a study of the case in which a sheet of phase film 42 is inserted between a pair of the polarizers 26, 28. This study can be applied also in the case where a plurality of phase films are inserted between a pair of the polarizers 26, 28. As explained with reference to FIGS. 26 and 27, for example, in the case where the polarizers 26, 28 are of such a structure that a PVA film and TAC films are laid one on the other, for example, the inner TAC film functions as a phase film defined in equation (1). In the case of the configuration shown in FIG. 27, therefore, three phase films are inserted between a pair of the polarizers 26, 28.

A similar study was made regarding the case in which N phase films are inserted between a pair of the polarizers 26, 28. Assuming that R for N phase films is $R_1, R_2, \ldots R_N$ and $R_t$ is $R_{t1}, R_{t2}, \ldots R_{tN}$, the optimum conditions have been found to satisfy the following relations at the same time.

$$-130 \text{ nm} \leq R_1 \leq 230 \text{ nm} \tag{2}$$

$$-130 \text{ nm} \leq R_N \leq 230 \text{ nm}$$

$$R_{t1}+R_{t2}+ \ldots R_{tN} \leq 1.6 \times R_{LC} \tag{3}$$

The foregoing is a description of the conditions under which the viewing angle associated with the contrast of 10 is not less than 38 degrees. Expanding this further, the conditions under which the viewing angle associated with the contrast of 10 is 50 degrees or more was studied. It has been found that the conditions are met when the following relations hold at the same time.

$$n_x \geq n_z, n_y \geq n_z \text{ (not } n_x=n_y=n_z\text{)} \tag{1}$$

$$-50 \text{ nm} \leq R_1 \leq 150 \text{ nm} \tag{4}$$

$$-50 \text{ nm} \leq R_N \leq 150 \text{ nm}$$

$$R_{t1}+R_{t2}+ \ldots R_{tN} \leq 1.3 \times R_{LC} \tag{5}$$

FIG. 29 shows a constant contrast curve when $\Delta n d_{LC} = R_{LC} = 330$ nm, $R=(n_x-n_y)d=50$ nm, $R_t=200$ nm in the configuration of FIG. 27. The phase film 42 is the ARTON Film (R=50 nm, $R_t=200$ nm) made by Japan Synthetic Rubber with the slow axis thereof arranged at right angles to the absorption axis of the adjacent polarizer.

Figure 32:
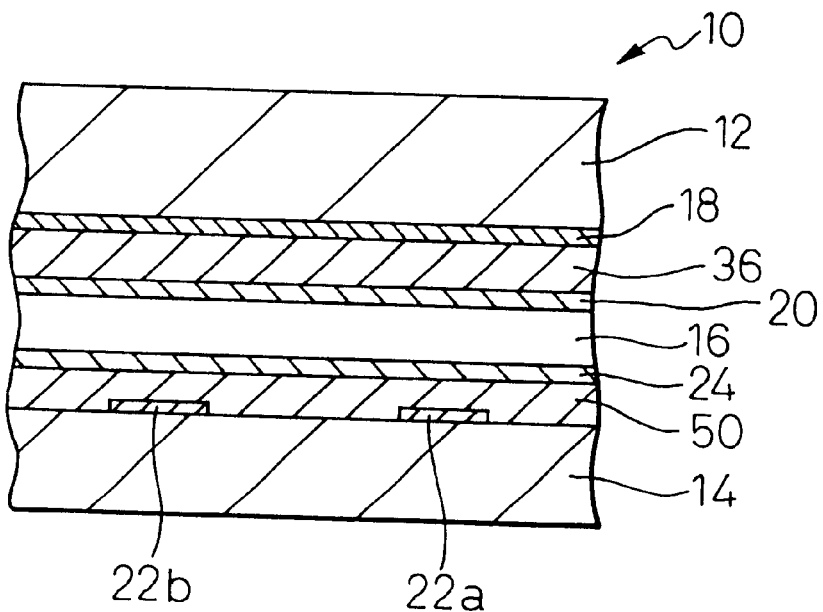
FIG. 32 is a sectional view showing a liquid crystal display apparatus according to a third embodiment of the invention.

FIG. 32 is a sectional view showing a liquid crystal display apparatus according to a third embodiment of the present invention. The liquid crystal display apparatus 10 includes first and second glass substrates 12, 14 in opposed relation to each other, and a liquid crystal layer 16 arranged between the substrates 12, 14. The first glass substrate 12 is a color filter substrate, and the second substrate 14 is a TFT substrate. The first glass substrate 12 includes a transparent electrode 18 having an entirely solid surface, a dielectric layer 36 and a vertical alignment layer 20. The second glass substrate 14 includes first and second groups of stripe electrodes 22a, 22b extending in parallel to each other, an insulating layer 50 and a vertical alignment film 24. Polarizers 26, 28, though not shown, can be arranged, as shown in FIGS. 1 and 6. Incidentally, the embodiments described below are applicable to the liquid crystal display apparatus utilizing only the horizontal electric field shown in FIGS. 5A and 5B as well as the embodiment shown in FIGS. 1 to 4.

The insulating layer 50 covers the first and second groups of stripe electrodes 22a, 22b and are arranged under the alignment layer 24. The insulating layer 50 not always comprises a single insulating layer shown in the drawing, but can comprise a combination of a plurality of insulating layers. For example, the insulating layer 50 can be a combination of the first and second insulating layers described below. In this case, the second group of the stripe electrodes 22b supplied with a common voltage are formed on the glass substrate 14, the first insulating layer is formed to cover the second group of the stripe electrodes 22b as the same layer as the gate insulating layer of the TFTs, the first group of the stripe electrodes 22a supplied with the data voltage is formed on the first insulating layer, and the second insulating layer is formed to cover the first group of the stripe electrodes 22a as the same layer as the protective layer of the TFTs. The insulating layer 50 (or the first and second insulating layers) is made of SiNx, SiO$_2$, resist, resin, acrylic resin or a similar insulating material.

Figure 33:
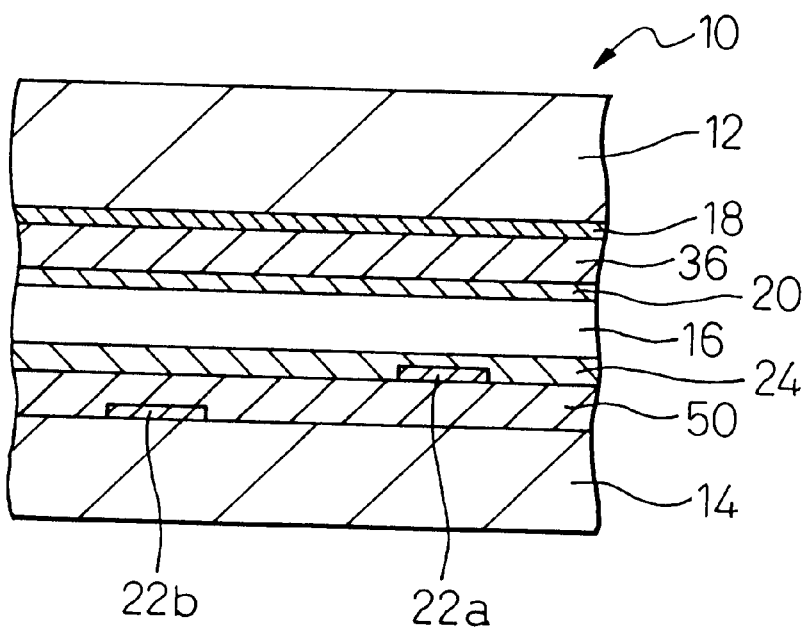
FIG. 33 is a sectional view showing a modification of the liquid crystal display apparatus of FIG. 32.

FIG. 33 is a diagram showing a modification of the liquid crystal display apparatus shown in FIG. 32. In this example, the insulating layer 50 covers the second group of the stripe electrodes 22b and is arranged under the alignment layer 24. The first group of the stripe electrodes 22a is arranged above the insulating layer 50 and under the alignment layer 24. The insulating layer 50 of FIGS. 32 and 33 can be interposed between the steps of forming the TFT by use of SiN, for example.

Figure 34:
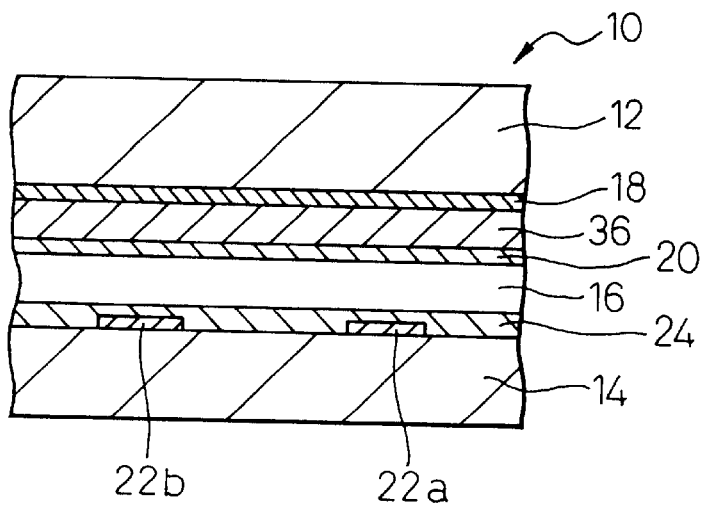
FIG. 34 is a sectional view showing a comparative example of the liquid crystal display apparatus of FIG. 32.

FIG. 34 is a diagram showing a reference of the liquid crystal display apparatus of FIG. 32. In FIG. 34, the insulating layer 50 of FIGS. 32 and 33 is not included.

In the liquid crystal display apparatus having the first and second groups of the stripe electrodes 22a, 22b as shown in FIGS. 32 to 34, the first stripe electrodes 22a are connected to the TFT and supplied with a data voltage, and the second stripe electrodes 22b are supplied with a common voltage.

In the liquid crystal display apparatus of FIG. 34, an image sticking of the screen may occur after a protracted application of a DC voltage component between the first group of the stripe electrodes 22a and the second group of the stripe electrodes, 22b. In the liquid crystal display apparatus of FIGS. 32 and 33, however, provision of the insulating layer 50 can prevent the image sticking of the screen which otherwise might be caused by the DC voltage component.

Figure 44:
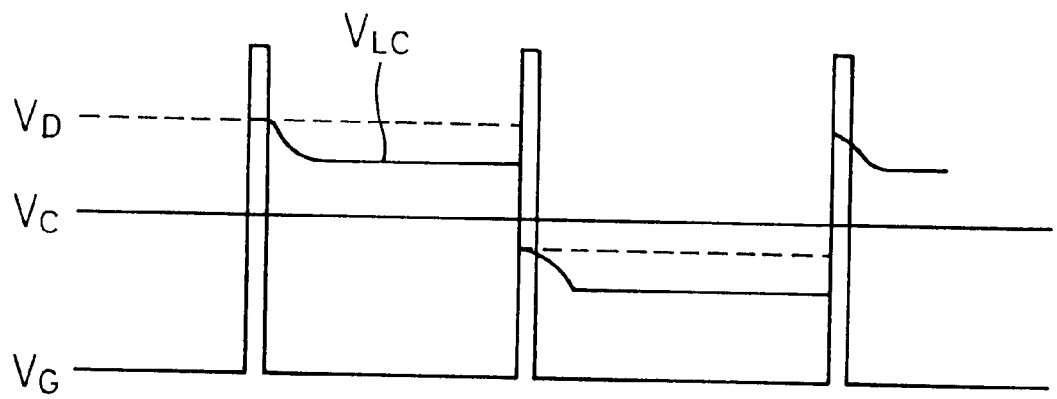
FIG. 44 is a diagram showing an example voltage applied to the liquid crystal display apparatus.

FIG. 44 shows an example of the Voltage applied to the liquid crystal display apparatus, in which character $V_G$ designates a gate voltage, $V_D$ a data voltage, and $V_C$ a common voltage. The voltage $V_{LC}$ applied to the liquid crystal is equal to the data voltage $V_D$. In view of the fact that the voltage drop occurs, due to the capacitance coupling, immediately after turning on of the gate, however, the voltage $V_{LC}$ is slightly lower than the data voltage $V_D$. The common voltage $V_C$ is determined in such a manner as to assume the average value of the voltage $V_{LC}$ applied to the liquid crystal taking the voltage drop into account. Since the liquid crystal is driven by AC voltage, the DC voltage component is not normally applied for a long time between the first stripe electrodes 22a and the second stripe electrodes 22b. In the case where the common voltage $V_C$ deviates from thee average value of the voltage $V_{LC}$ applied to the liquid crystal, however, a DC voltage is supplied between the first stripe electrodes 22a and the second stripe electrodes 22b. As a result, in the liquid crystal display apparatus of FIG. 34, an image sticking of the screen may occur due to the DC voltage component.

Figure 35:
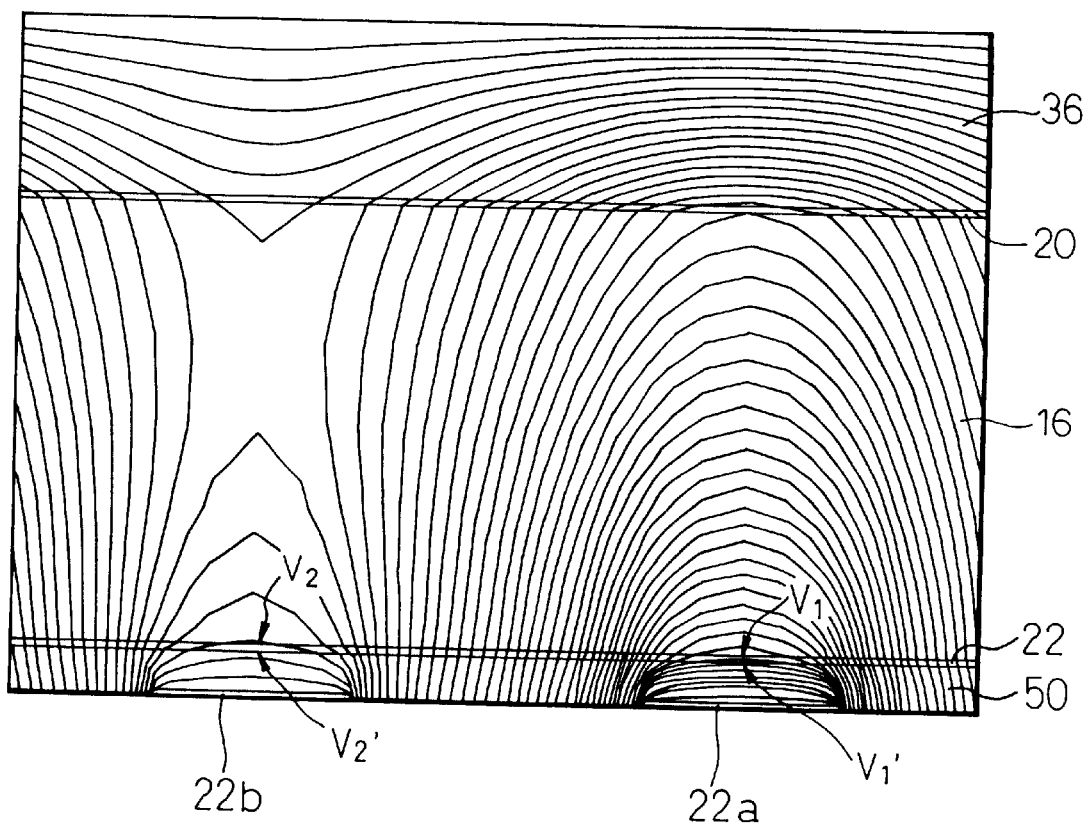
FIG. 35 is a sectional view showing the liquid crystal display apparatus of FIG. 32 with a voltage applied thereto.

FIG. 35 is a diagram showing a liquid crystal display apparatus of FIG. 32 with a voltage applied thereto. FIG. 35 shows a potential distribution immediately after applying one volt to the first group of the stripe electrodes 22a and 0 volt to the second group of the stripe electrodes 22b. The curve in FIG. 35 is an equipotential curve. $V_1$ designates a voltage in the boundary between the liquid crystal layer 16 and the alignment layer 22 above the first group of the stripe electrodes 22a, and $V_1$40 the voltage in the boundary between the alignment layer 22 and the insulating layer 50 above the first group of stripe electrodes 22*a*. In similar fashion $V_2$ designates the voltage in the boundary between the liquid crystal inlayer 16 and the alignment layer 22 above the second stripe electrodes 22*b*, and $V_2'$ the voltage in the boundary between the alignment layer 22 and the insulating layer 50 above the second group of stripe electrodes 22*b*.

Figure 36A:
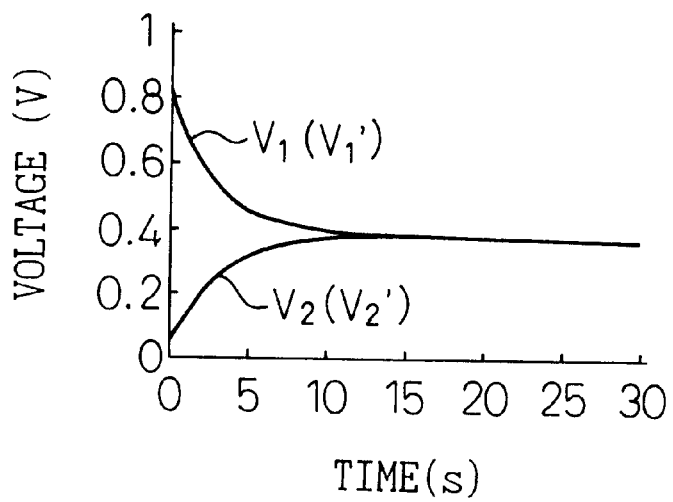
FIGS. 36A to 36C are diagrams showing the voltage change in the case where a DC voltage of one volt is applied to the first and second groups of stripe electrodes of the liquid crystal display apparatus shown in FIGS. 32 to 34.
Figure 36B:
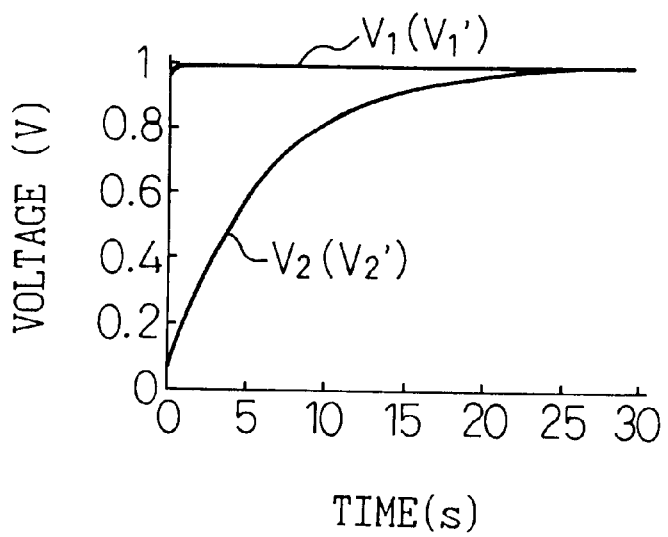
Figure 36C:
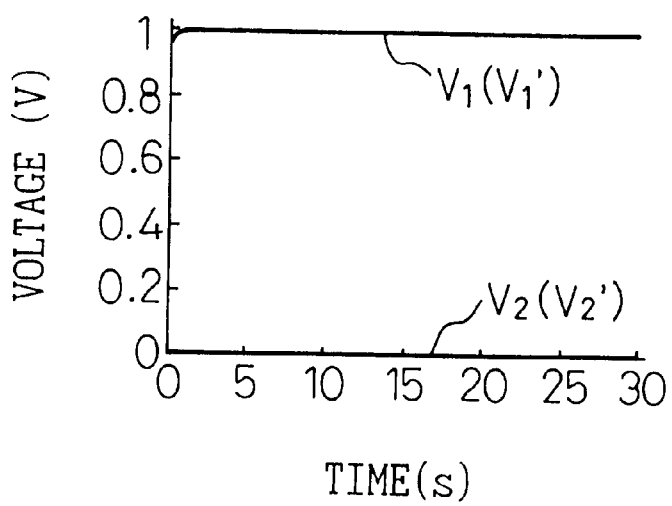

FIGS. 36A, 36B, and 36C are diagrams showing the voltage change when a DC voltage of one volt is applied between the first and second groups of the stripe electrodes of the liquid crystal display apparatus shown in FIGS. 32 to 34. FIG. 36A shows such a change for the liquid crystal display apparatus of FIG. 32, FIG. 36B shows such a change for the liquid crystal display apparatus of FIG. 33, and FIG. 36C shows such a change for the liquid crystal display apparatus of FIG. 34.

In FIGS. 36A and 36B, the voltage difference between $V_1$ and $V_2$, i.e. the DC voltage component applied to the liquid crystal layer 16 decreases with time and converges to zero after the lapse of 10 to 20 seconds. In the case where the insulating layer 50 is included, therefore, the possibility of the image sticking of the screen is reduced even in the presence of the DC voltage component. In FIG. 36C, the voltage difference between $V_1$ and $V_2$ is not decreased with time and therefore the image sticking of the screen may occur.

In order to prevent the image sticking, the provision of the insulating layer 50 and the following facts are taken into account. (a) That time necessary to absorb the voltage difference between $V_1$ and $V_2$, i.e. the time in which the DC voltage component applied to the liquid crystal layer 16 converges to zero, is several seconds to several hundred seconds. The shorter the time before the voltage difference between $V_1$ and $V_2$ converges to zero, the shorter the time the DC voltage component is applied to the liquid crystal layer 16. This is very advantageous for preventing the image sticking of the screen. An excessively short time of convergence, however, reduces the voltage holding rate of the liquid crystal. The appropriate convergence time, therefore, is several seconds to several hundred seconds. (b) The voltage difference between $V_1$ and $V_2'$, i.e. the intensity of the electric field in the vicinity of the alignment layer 22 is as near to zero as possible. As a result, the residual DC voltage due to ion absorption can be reduced in the boundary between the liquid crystal layer 16 and the alignment layer 22. These two conditions can be met by appropriately selecting the volume resistivity of the component materials of the liquid cell.

FIGS. 37A to 37F show the voltage change in the case where the voltage resistivity of the liquid crystal layer 16 is changed assuming that the volume resistivity of the alignment layer 22 of the liquid crystal display apparatus 10 shown in FIG. 32 is $10^{10}$ Ωm. FIG. 37A shows the case where the voltage resistivity $VR_{LC}$ of the liquid crystal layer 16 is $10^8$ Ωm, FIG. 37B shows the case where the voltage resistivity $VR_{LC}$ of the liquid crystal layer 16 is $10^9$ Ωm, FIG. 37C shows the case where the voltage resistivity $VR_{LC}$ of the liquid crystal layer 16 is $10^{10}$ Ωm, FIG. 37D shows the case where the voltage resistivity $VR^{LC}$ of the liquid crystal layer 16 is $10^{11}$ Ωm, FIG. 37E shows the case where the voltage resistivity $VR_{LC}$ of the liquid crystal layer 16 is $10^{12}$ Ωm and FIG. 37F shows the case where the voltage resistivity $VR_{LC}$ of the liquid crystal layer 16 is $10^{13}$ Ωm.

Figure 38A:
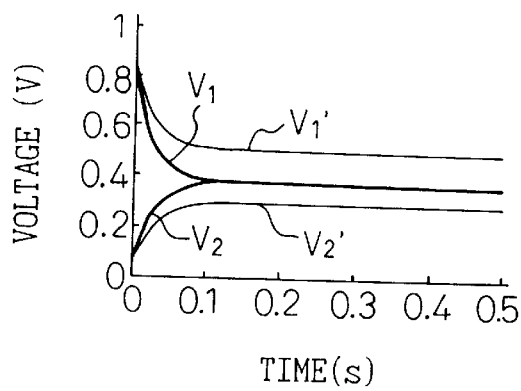
FIGS. 38A to 38F are diagrams showing the voltage change in the case where the volume resistivity of the liquid crystal is changed assuming that the volume resistivity of the alignment layer of the liquid crystal display apparatus of FIG. 32 is $10^{12}$ Ω.m.
Figure 38D:
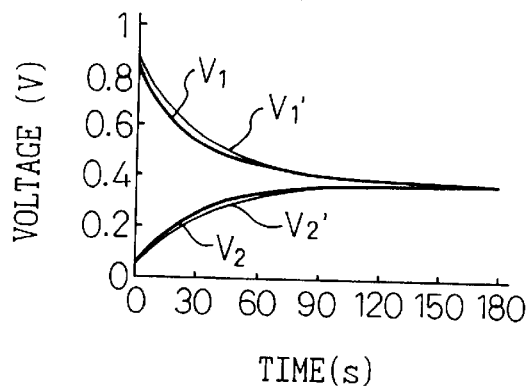
Figure 38B:
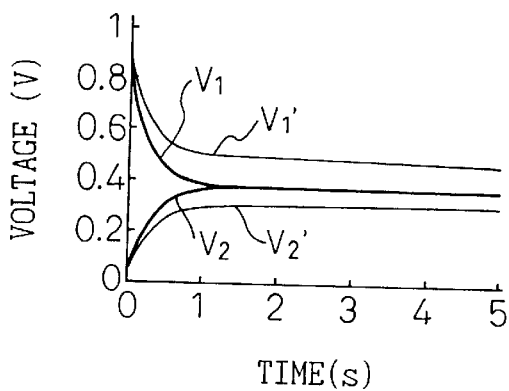
Figure 38E:
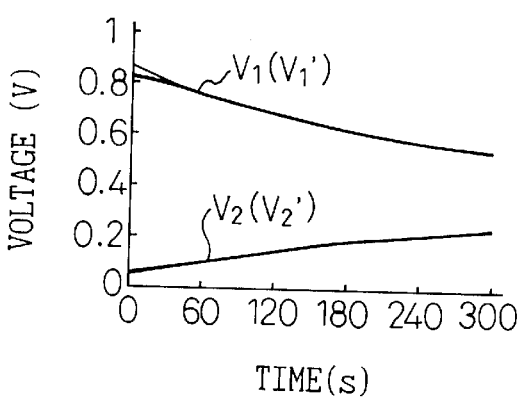
Figure 38C:
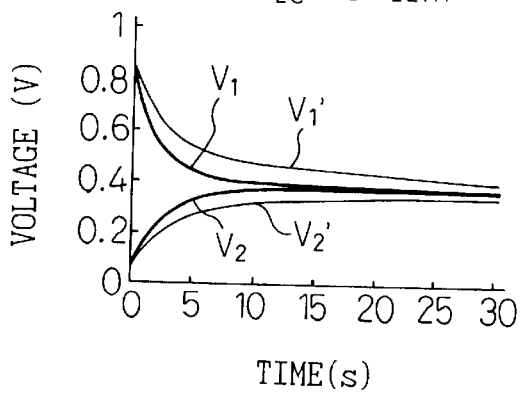
Figure 38F:
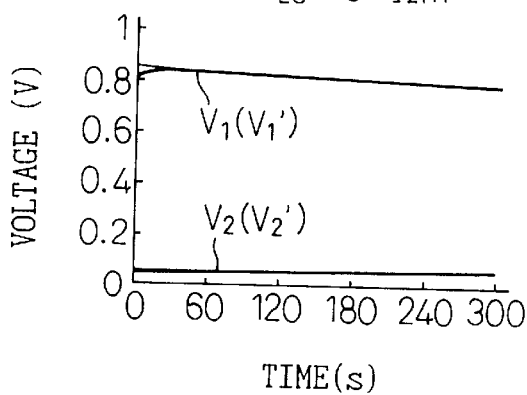

FIGS. 38A to 38F show a similar diagram showing the voltage change in the case where the volume resistivity of the liquid crystal layer 16 is changed assuming that the volume resistivity of the alignment layer 22 is $10^{12}$ Ωm. FIG. 38A shows the case in which $VR_{LC}$ is $10^6$ Ωm, FIG. 38B shows the case in which $VR_{LC}$ is $10^9$ Ωm, FIG. 38C shows the case in which $VR_{LC}$ is $10^{10}$ Ωm, FIG. 38D shows the case in which $VR_{LC}$ is $10^{11}$ Ωm, FIG. 38E shows the case in which $VR_{LC}$ is $10^{12}$ Ωm and FIG. 38F shows the case in which $VR_{LC}$ is $10^{13}$ Ωm.

Figure 39A:
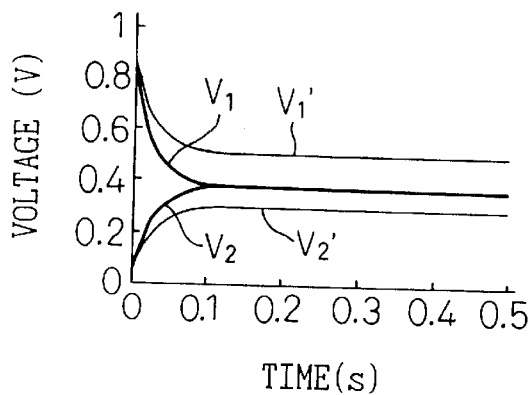
FIGS. 39A to 39F are diagrams showing the voltage change in the case where the volume resistivity of the liquid crystal is changed assuming that the volume resistivity of the alignment layer of the liquid crystal display apparatus of FIG. 32 is $10^{14}$ Ω.m.
Figure 39D:
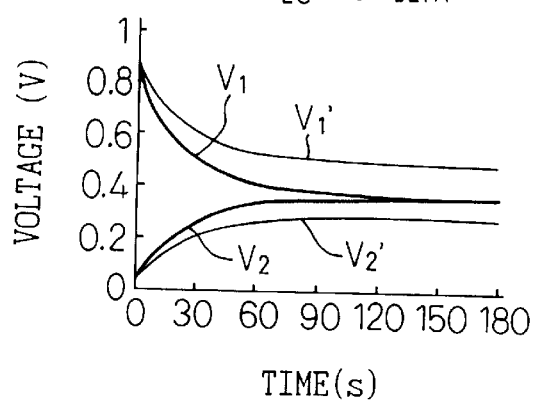
Figure 39B:
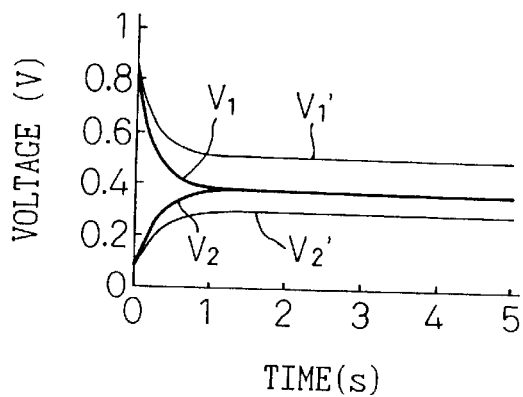
Figure 39E:
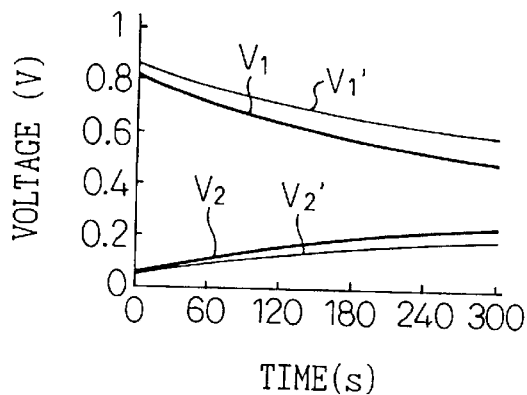
Figure 39C:
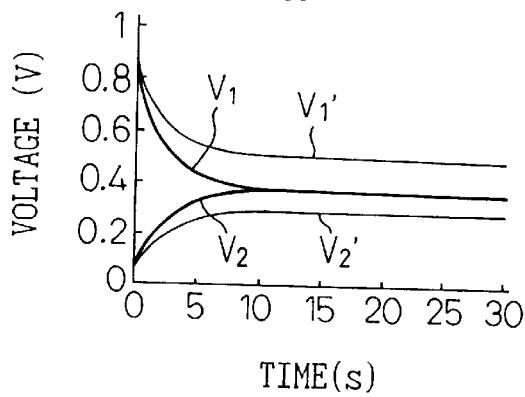
Figure 39F:
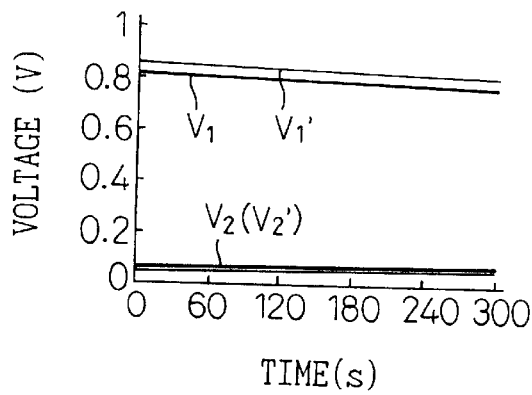

FIGS. 39A to 39F show a similar diagram showing the voltage change in the case where the volume resistivity of the liquid crystal layer 16 is changed assuming that the volume resistivity of the alignment layer 22 is $10^{14}$ Ωm. FIG. 39A shows the case in which $VR_{LC}$ is $10^6$ Ωm, FIG. 39B shows the case in which $VR_{LC}$ is $10^9$ Ωm, FIG. 39C shows the case in which $VR_{LC}$ is $10^{10}$ Ωm, FIG. 39D shows the case in which $VR_{LC}$ is $10^{11}$ Ωm, FIG. 39E shows the case in which $VR_{LC}$ is $10^{12}$ Ωm and FIG. 39F shows the case in which $VR_{LC}$ is $10^{13}$ Ωm.

In FIGS. 37A to 39F, as long as the volume resistivity of the alignment layer 22 remains constant, the smaller the volume resistivity $VR_{LC}$ of the liquid crystal, the shorter the time before the voltage difference between $V_1$ and $V_2$ converges to zero. The volume resistivity $VR_{LC}$ of the liquid crystal is preferably not less than $10^9$ Ωm but not more than $10^{12}$ Ωm, or more preferably not less than $10^9$ Ωm but not more than $10^{10}$ Ωm.

Further, in FIGS. 37A to 39F, the smaller the volume resistivity of the alignment layer 22, the shorter the time before the voltage difference between $V_1$ and $V_2$ converges to zero. Also the voltage difference between $V_1$ and $V_1'$ and the voltage difference between $V_2$ and $V_2'$ is smaller. Thus, the volume resistivity of the alignment layer 22 should be as small as possible, and the volume resistivity of the alignment layer 22 should be lower than the voltage resistivity $VR_{LC}$ of the liquid crystal layer 16. The volume resistivity of the alignment layer 22 should better be not less than $10^{10}$ Ωm but not more than $10^{12}$ Ωm. Especially, the volume resistivity of the alignment layer 22 is preferably not less than $10^{10}$ Ωm but not more than $10^{11}$ Ωm.

The volume resistivity of the insulating layer 50 should be larger than the volume resistivity of the liquid crystal layer 16 and the alignment layer 22.

Figure 40A:
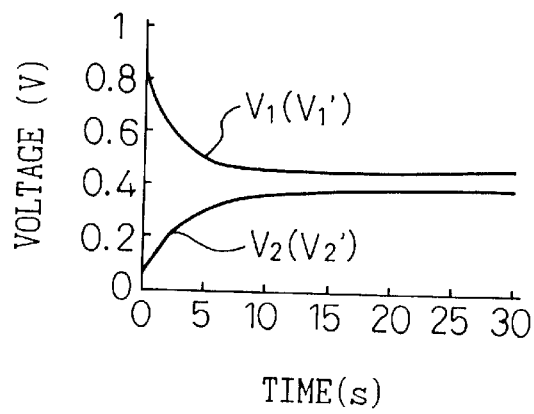
FIGS. 40A to 40D are diagrams showing the voltage change in the case where the volume resistivity of the insulating layer is changed assuming that the volume resistivity of the alignment layer of the liquid crystal display apparatus of FIG. 32 is $10^{10}$ Ω.m.
Figure 40C:
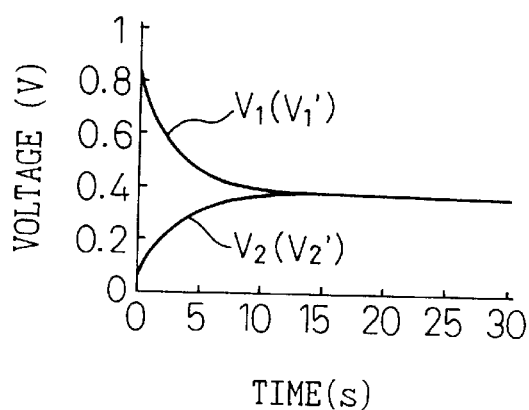
Figure 40B:
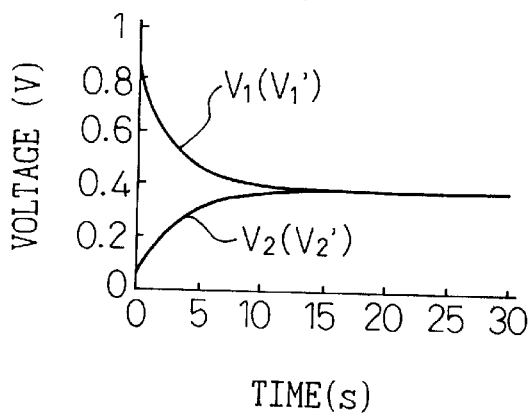
Figure 40D:
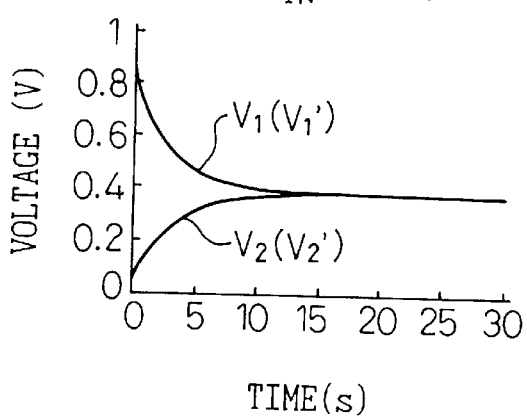

FIGS. 40A to 40D show a diagram showing the voltage change in the case where the volume resistivity of the insulating layer 50 is changed assuming that the volume resistivity of the liquid crystal layer 16 and the alignment layer 22 of the liquid crystal display apparatus 10 are $10^{10}$ Ωm. FIG. 40A shows the case in which the volume resistivity of the insulating layer 50 is $10^{12}$ Ωm, FIG. 40B shows the case in which the volume resistivity of the insulating layer 50 is $10^{13}$ Ωm, FIG. 40C shows the case in which the volume resistivity of the insulating layer 50 is $10^{14}$ Ωm, and FIG. 40D shows the case in which the volume resistivity of the insulating layer 50 is $10^{16}$ Ωm.

Figure 41A:
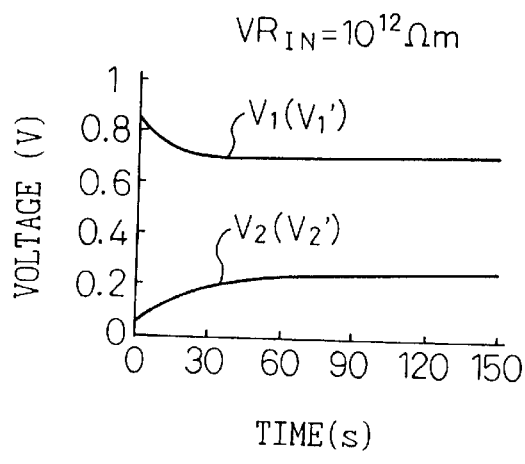
FIGS. 41A to 41D are diagrams showing the voltage change in the case where the volume resistivity of the insulating layer is changed assuming that the volume resistivity of the liquid crystal and the alignment layer of the liquid crystal display apparatus of FIG. 32 is $10^{11}$ Ω.m.
Figure 41B:
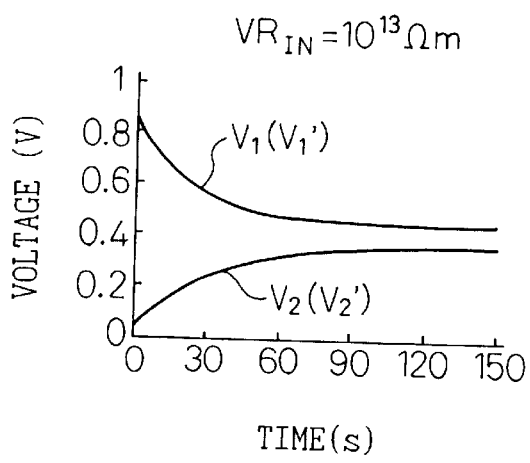
Figure 41C:
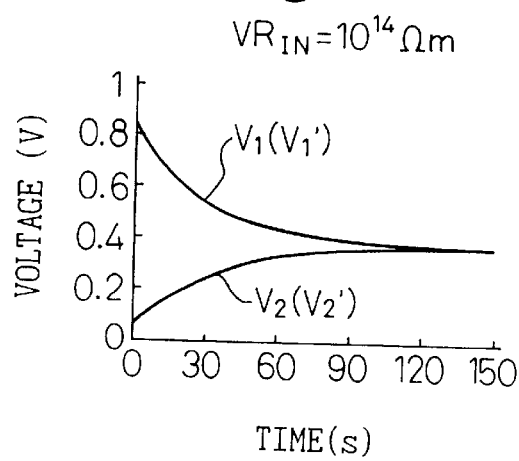
Figure 41D:
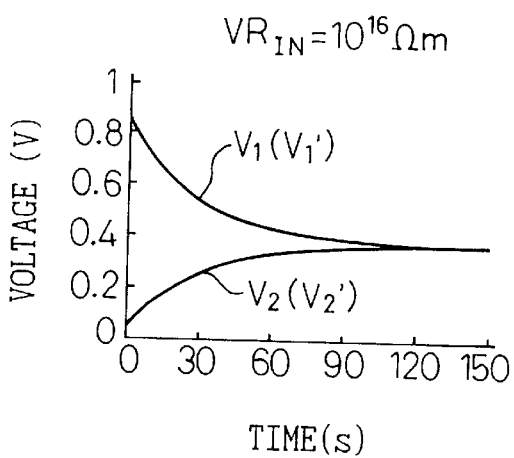

FIGS. 41A to 41D show a diagram showing the voltage change in the case where the volume resistivity of the insulating layer 50 is changed assuming that the volume resistivity of the liquid crystal layer 16 and the alignment layer 22 of the liquid crystal display apparatus 10 are $10^{11}$ Ωm. FIG. 41A shows the case in which the volume resistivity of the insulating layer 50 is $10^{12}$ Ωm, FIG. 41B shows the case in which the volume resistivity of the insulating layer 50 is $10^{13}$ Ωm, FIG. 41C shows the case in which the volume resistivity of the insulating layer 50 is $10^{14}$ Ωm, and FIG. 41D shows the case in which the volume resistivity of the insulating layer 50 is $10^{16}$ Ωm.

In FIGS. 40A to 41D, the larger the volume resistivity of the insulating layer 50, the shorter the time before the voltage difference between $V_1$ and $V_2$ converges to zero. It has been found that the volume resistivity of the insulating layer 50 is preferably not less than $10^{13}$ Ωm.

Figure 42A:
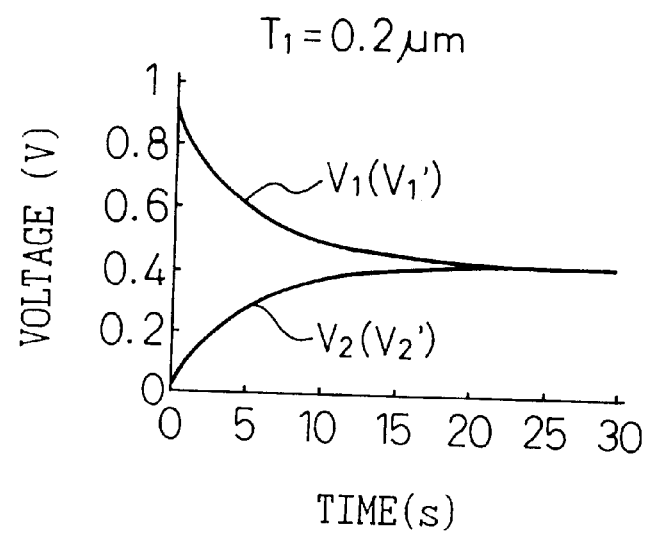
FIGS. 42A to 42C are diagrams showing the voltage change in the case where the thickness of the portion of the insulating layer on the first stripe electrodes is changed assuming that the volume resistivity of the insulating layer of the liquid (crystal display apparatus of FIG. 32 is $10^{14}$ Ω.m.
Figure 42B:
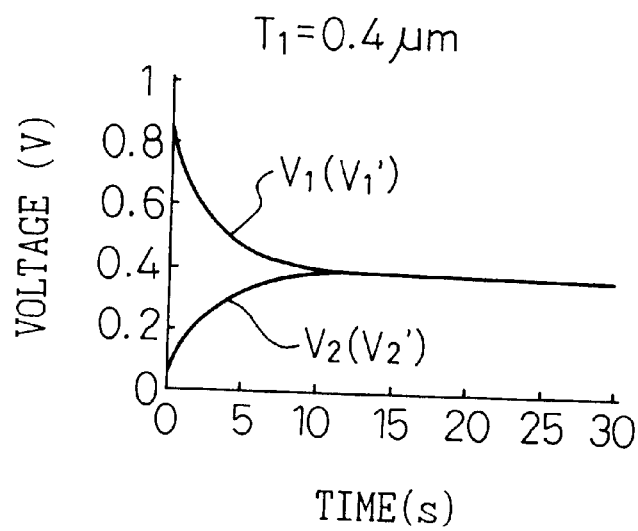
Figure 42C:
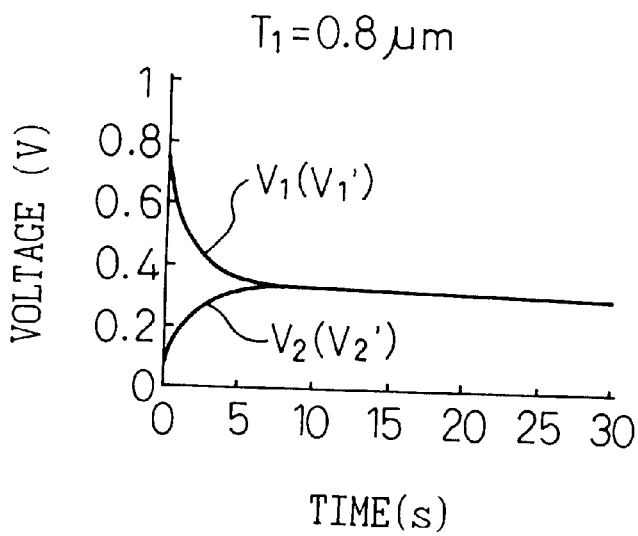

FIGS. 42A to 42C are diagrams showing the voltage change with the thickness $T_1$ of the portion of the insulating layer 50 of the liquid crystal display apparatus 10 of FIG. 32 located on the first stripe electrodes 22a and having the volume resistivity of $10^{14}$ Ωm. In the case where the thickness $T_1$ of the portion of the insulating layer 50 located on the first stripe electrodes 22a is equal to the thickness of the portion of the insulating layer 50 located between the second stripe electrode 22b and the first stripe electrode 22a, the whole thickness of the insulating layer 50 is given as $2T_1$.

FIG. 42A shows the case in which the thickness $T_1$ of the portion of the insulating layer 50 is 0.2 μm, FIG. 42B shows the case in which the thickness $T_1$ of the portion of the insulating layer 50 is 0.4 μm, and FIG. 42C shows the case in which the thickness $T_1$ of the portion of the insulating layer 50 is 0.8 μm. In FIGS. 42A to 42C, the thickness $T_1$ of the portion of the insulating layer 50 is sufficient to reduce the DC voltage component, and the thickness $T_1$ of each portion of the insulating layer 50 can be smaller. The thickness $T_1$ of the portion of the insulating layer 50 has been found to be preferably not less than 50 nm.

Figure 43:
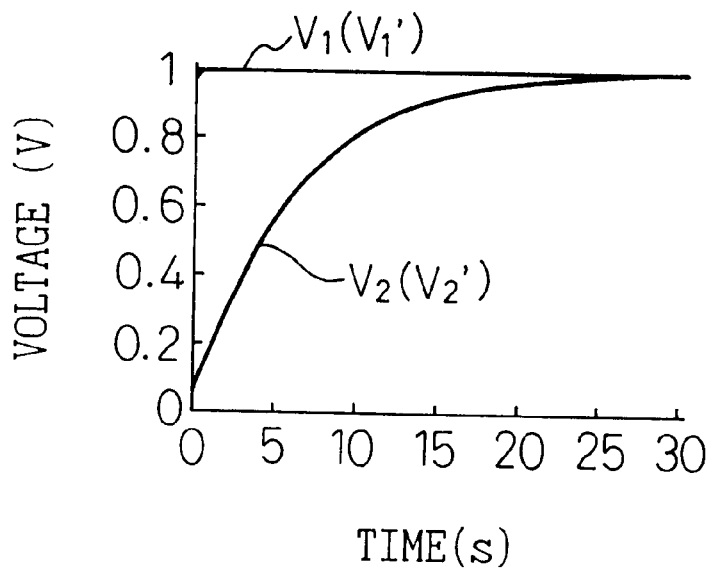
FIG. 43 is a diagram showing the voltage change in the case where the thickness of the portion of the insulating layer on the second stripe electrode is 0.4 μm assuming that the volume resistivity of the insulating layer of the liquid crystal display apparatus of FIG. 33 is $10^{14}$ Ω.m.

FIG. 43 is a diagram showing the voltage change with the change of the thickness $T_2$ of the portion of the insulating layer 50 of the liquid crystal display apparatus 10 of FIG. 33 located on the second stripe electrodes 22b and having the volume resistivity of $10^{14}$ Ωm. In FIG. 33, the insulating layer 50 covers only the second stripe electrodes 22b, but the first stripe electrodes 22a are not covered with the insulating layer 50.

In FIG. 43, the time before the voltage difference between $V_1$ and $V_2$ converges to zero is substantially equal to the time before the voltage difference $V_1$ and $V_2$ converges to zero in FIG. 42A. Thus, from the viewpoint of the effect of preventing the image sticking of the screen, the thickness of the insulating layer 50 in FIG. 43 can be considered equivalent to that of the insulating layer 50 in FIG. 42A. In other words, in FIG. 42A, the average thickness between the thickness $T_1$ of the portion of the insulating layer 50 located on the first stripe electrodes 22a and the thickness $T_1$ of the portion of the insulating layer 50 located on the second stripe electrodes 22b is equal to the average thickness between the thickness (zero in this case) of the portion of the insulating layer 50 located on the first stripe electrodes 22a in FIG. 43 and the thickness $T_2$ of the portion of the insulating layer 50 located on the second stripe electrodes 22b. The thickness $T_2$ of the insulating layer 50 is preferably not less than 50 nm.

Figure 45:
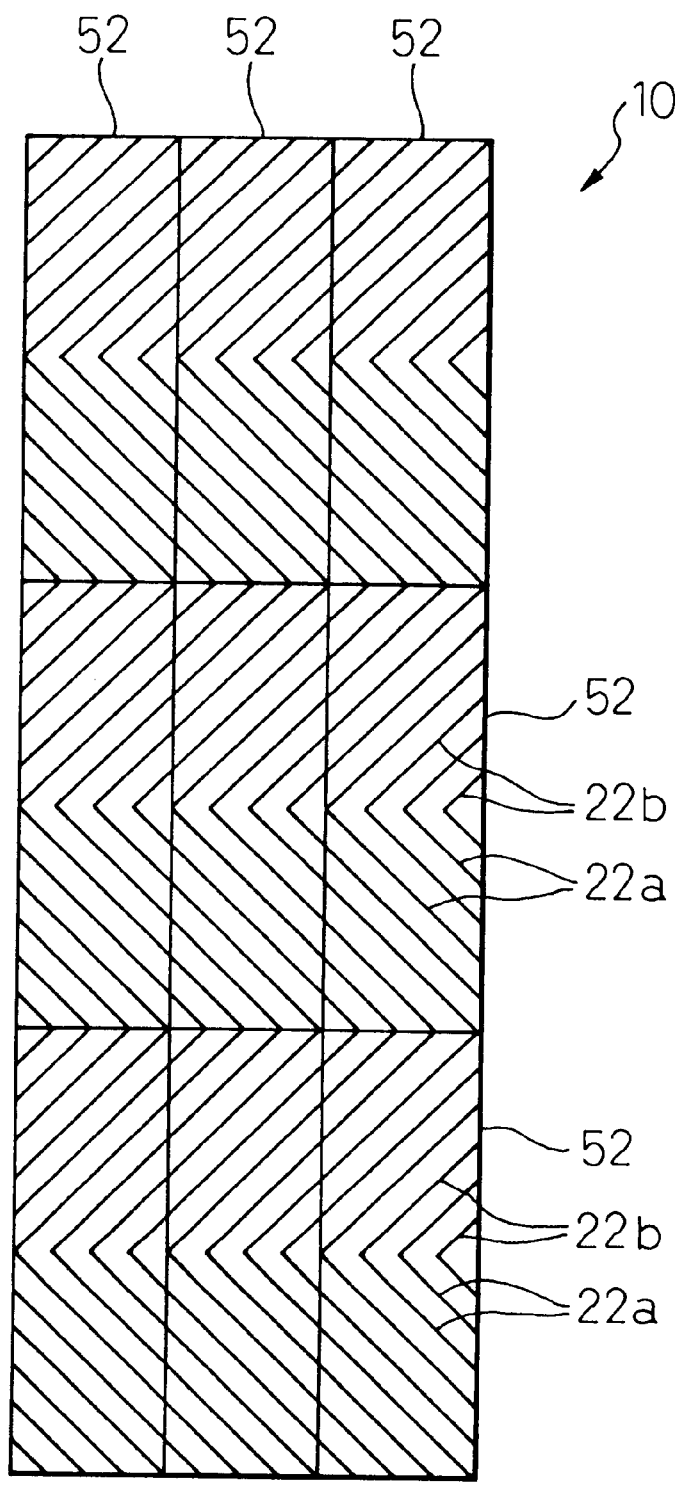
FIG. 45 is a plan view showing an example of the liquid crystal display apparatus having pixels including first and second groups of stripe electrodes arranged in a predetermined pattern.

FIG. 45 is a plan view showing an example of the liquid crystal display apparatus having pixels including the first and second groups of the stripe electrodes arranged in a predetermined pattern. The liquid crystal display apparatus 10 has a matrix of pixels 52, each of which includes the first group of the stripe electrodes 22a and the second group of the stripe electrodes 22b arranged on one of the substrates. The liquid crystal display apparatus having this electrode configuration basically performs a similar function to the embodiments described above.

In each pixel 52, each of the first and second groups of the stripe electrodes 22a, 122b is formed in a shape having a portion bent leftward in FIG. 45. The electrodes of all the first and second groups of the stripe electrodes of all the pixels 52 have a bent portion directed leftward. Thus, in the liquid crystal display apparatus of FIG. 45, the first and second groups of the stripe electrodes 22a, 22b are bent leftward over the entire screen.

Figure 46A:
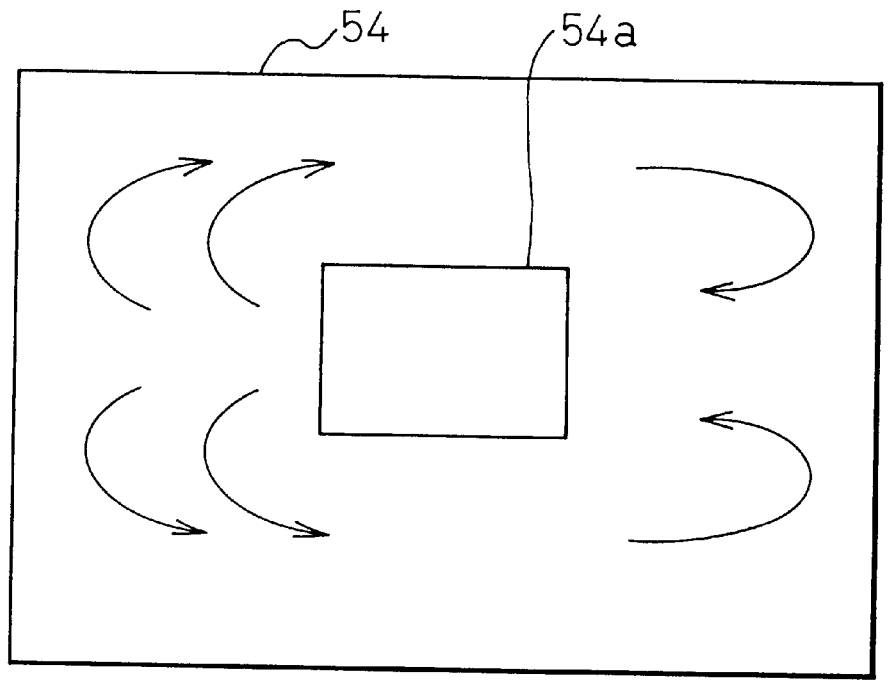
FIG. 46A is a diagram showing the screen of the liquid crystal display apparatus having the first and second stripe electrodes of FIG. 45.
Figure 46B:
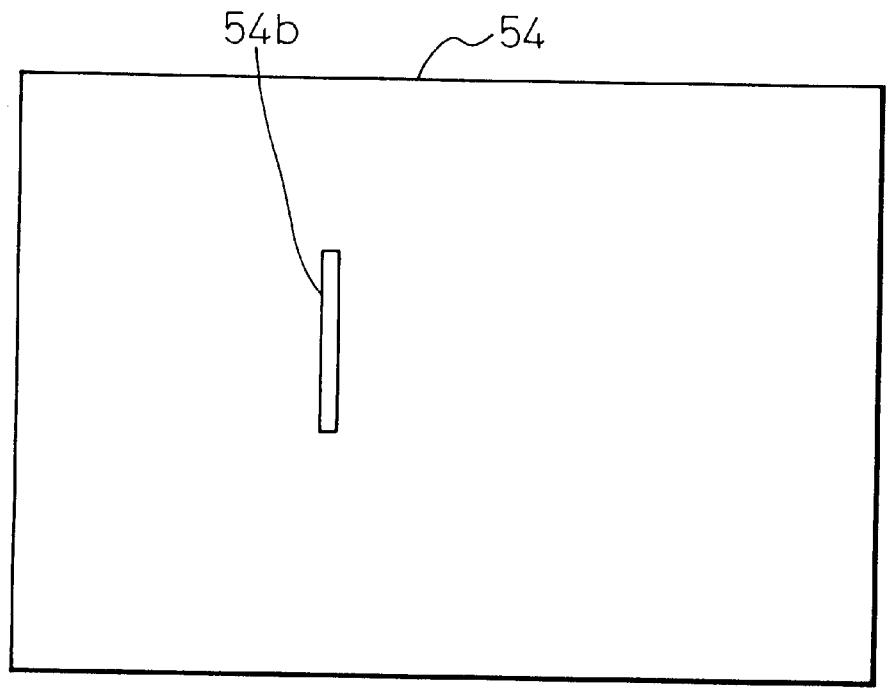
FIG. 46B is a diagram showing an example of image sticking of the screen.

FIG. 46A is a diagram showing an example of the screen 54 of the liquid crystal display apparatus having the first and second groups of the stripe electrodes 22a, 22b of FIG. 45. An image 54a is formed in the screen 54 by applying a voltage thereto. FIG. 46B is a diagram showing an example in which an image sticking 54b occurs when the whole screen 54 of FIG. 46A is displayed in gray. The image sticking 54b of the screen often occurs as a trace of a part of the image 54a after a protracted formation of the same image 54a.

This image sticking of the screen is often attributable to the asymmetry of the pixel configuration. Specifically, the screen 54 in FIG. 46A is formed of the pixels 52 having the first and second stripe electrodes 22a, 22b of FIG. 45, and the first and second stripe electrodes 22a, 22b are bent leftward. With the liquid crystal display apparatus having this asymmetry, the liquid crystal flows asymmetrically as indicated by arrows in FIG. 46A, and since the liquid crystal flows differently along the contour of the image 54a, the impurities contained in the liquid crystal stagnate, with the result that the drive voltage develops a difference and comes to be observed as an image sticking 54b of the screen.

Figure 47:
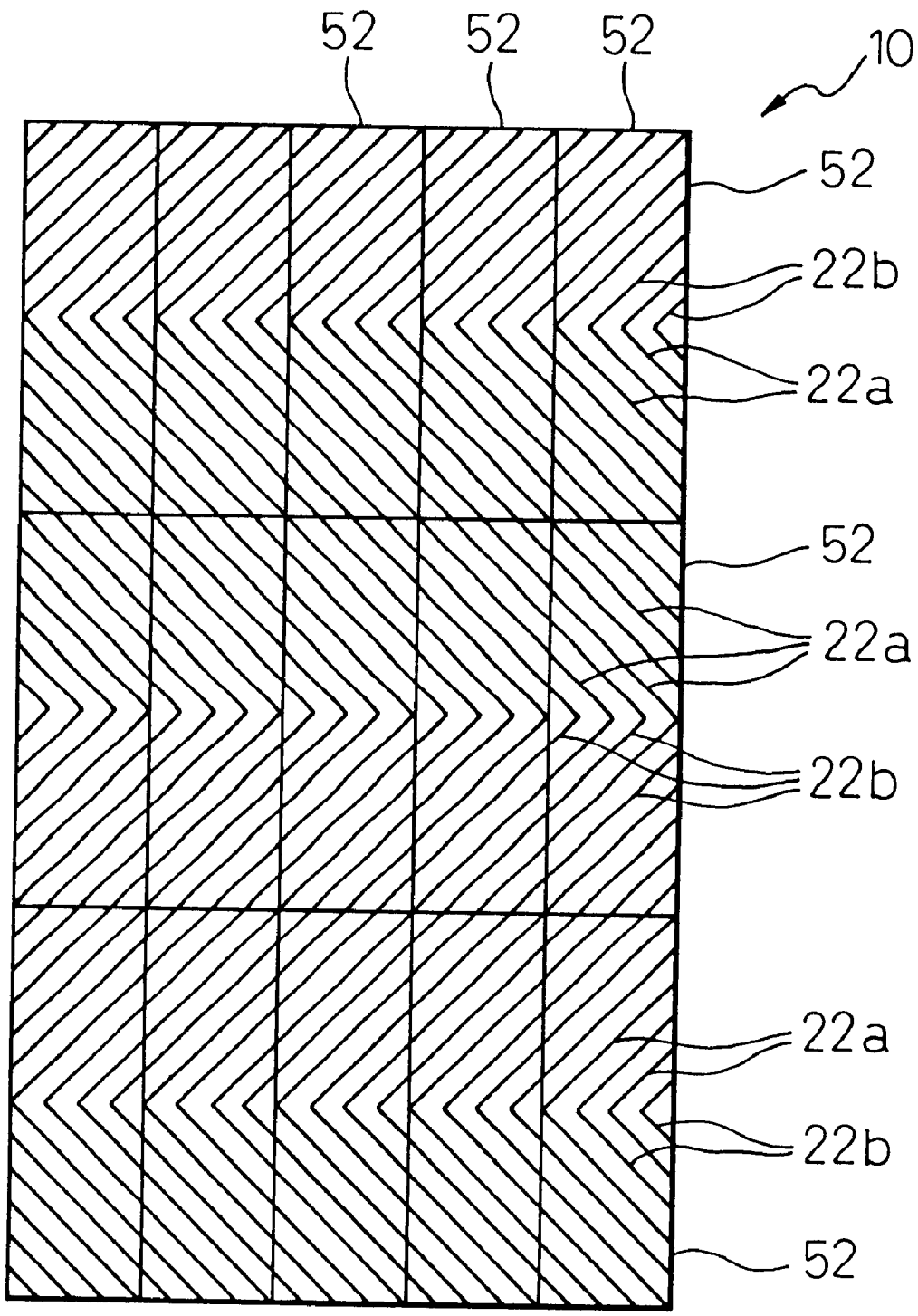
FIG. 47 is a plan view showing a liquid crystal display apparatus having pixels including the first and second stripe electrodes arranged in a pattern according to a fourth embodiment of the invention for solving the problem described with reference to FIGS. 45 and 46.

FIG. 47 is a plan view showing a liquid crystal display apparatus having the pixels of the first and second groups of the stripe electrodes 22a, 22b arranged in a pattern according to a fourth embodiment of the invention for solving the problem points described above with reference to FIGS. 45 and 46. The liquid crystal display apparatus 10 has a basic configuration similar to FIGS. 1, 5 and 6. The liquid crystal display apparatus 10 comprises a matrix of pixels 52, each of which includes the first group of the stripe electrodes 22a and the second group of the stripe electrodes 22b formed on one of the substrates. The first group of the stripe electrodes 22a receives a data voltage, and the second group of the stripe electrodes 22b receives a common voltage. As a result, the liquid crystal display apparatus having this configuration performs a basically similar function to the embodiments described above.

Within each pixel 52, each of the first and second groups of the stripe electrodes 22a, 22b has a unidirectional shape. Specifically, the first and second groups of the stripe electrodes 22a, 22b are each formed in a shape having a portion bent to 90 degrees. In one region, however, e.g. in the pixels 52 located on the first row, the first and second groups of the stripe electrodes 22a, 22b are each bent leftward. In the other regions, e.g. in the pixels 52 located on the second row in FIG. 47, the first and second groups of the stripe electrodes 22a, 22b each are bent rightward. In terms of the whole screen, the region where the electrodes are bent leftward and the region where the electrodes are bent rightward are arranged alternately with each other.

Thus, in FIG. 47, the asymmetry described with reference to FIG. 45 is eliminated, thereby improving the image sticking of the screen caused by the asymmetry of the pixel configuration described with reference to FIG. 46.

Figure 48:
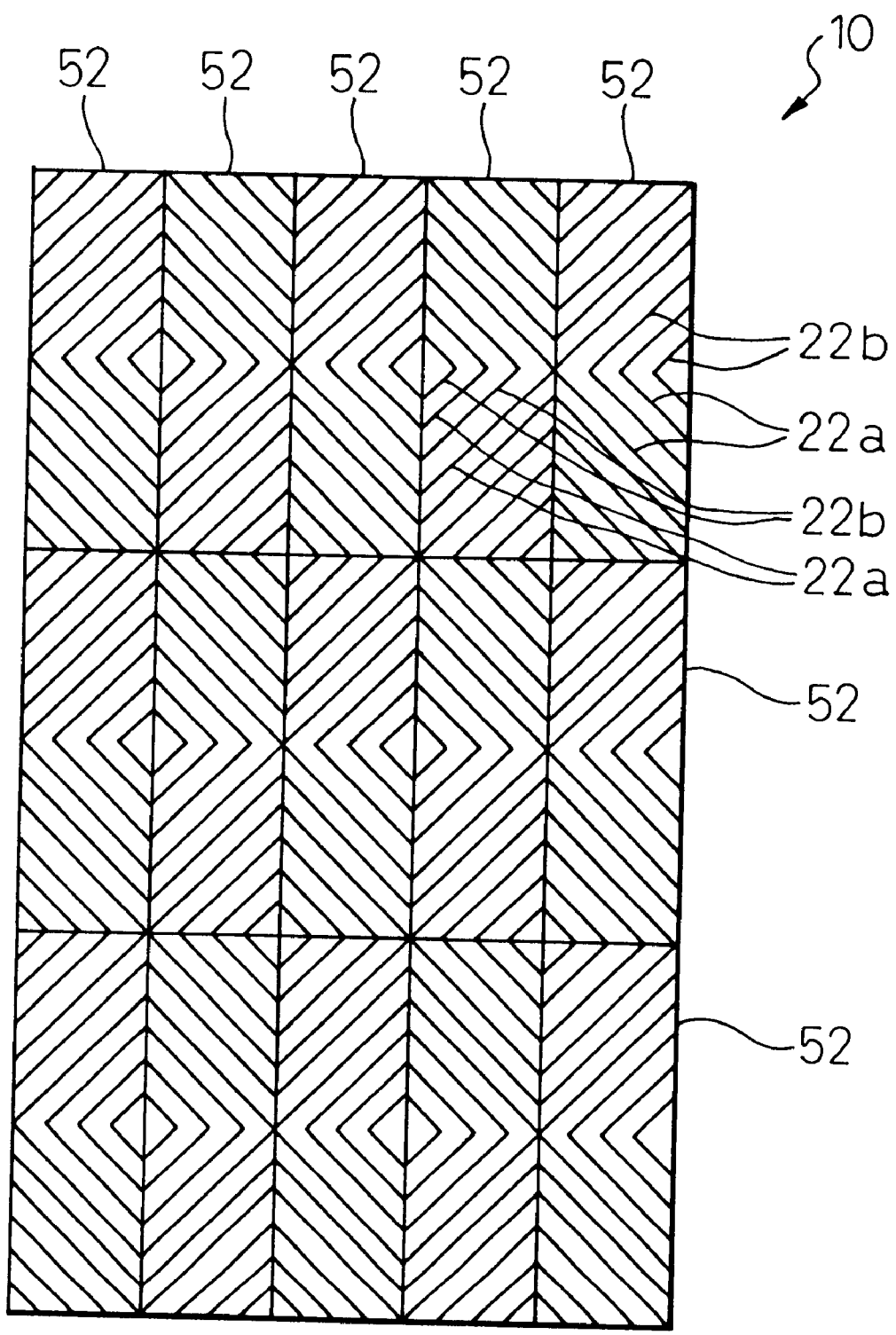
FIG. 48 is a plan view showing a modification of the liquid crystal display apparatus of FIG. 47.
Figure 49:
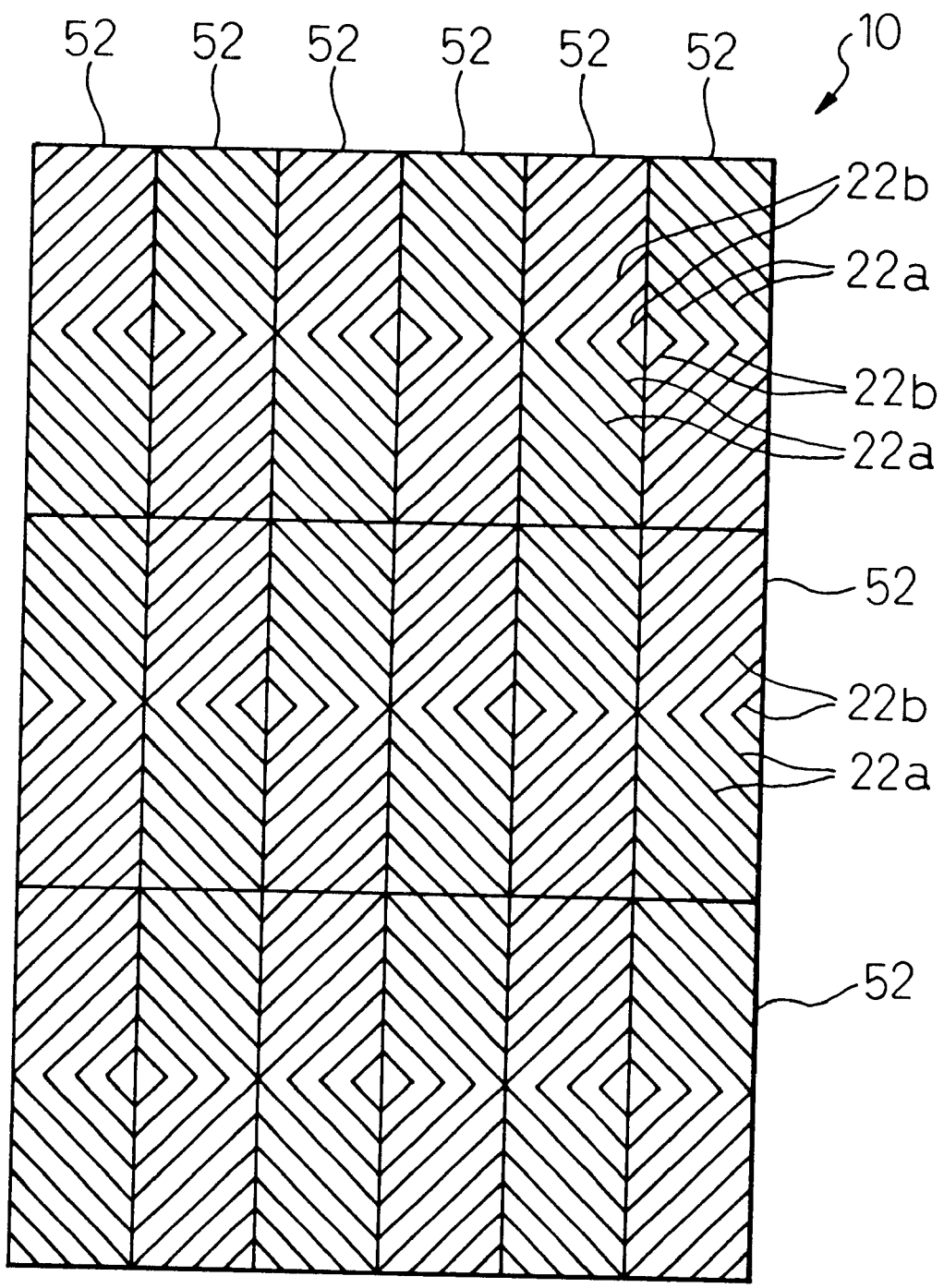
FIG. 49 is a plan view showing a modification of the liquid crystal display apparatus of FIG. 47.

FIGS. 48 and 49 are diagrams showing a modification of the liquid crystal display apparatus of FIG. 47. In these diagrams, too the liquid crystal display apparatus 10 comprises a matrix of pixels 52, each of which includes the first and second groups of the stripe electrodes 22a, 22b formed on one of the substrates. The first and second groups of the stripe electrodes. 22a, 22b each are shaped in a form having a portion bent by 90 degrees.

In FIG. 48, consider the pixels 52 located in one region, e.g. the pixels 52 in the rightmost column, for example. Within each of pixels 52, the first and second groups of the stripe electrodes 22a, 22b are bent leftward. In the pixels in the other regions, e.g. in the pixels 52 located in the second column from the right in FIG. 48, the first and second stripe electrodes 22a, 22b are bent rightward. From the viewpoint of the whole screen, the region where the electrodes are bent leftward and the region where the electrodes are bent rightward are arranged alternately with each other.

In FIG. 49, in each region, e.g. in the upper right pixel 52 in FIG. 47 and the pixel 52 located in the second row of the second column from right, the first and second stripe electrodes 22a, 22b are bent rightward. In the other regions, e.g. in the pixel located in the second column from right on the first row from top in FIG. 48 and the pixel 52 located in the first column from right on the second row from top, the first and second groups of stripe electrodes 22a, 22b are bent leftward. From the viewpoint of the whole screen, the regions where the electrodes are bent leftward and the regions where the electrodes are bent rightward are arranged alternately with each other. In other words, the pixels 52 are arranged in a checker pattern.

As a result, both in FIGS. 48 and 49, the pixel configuration is symmetric, thereby improving the image sticking 54b of the screen caused by, the asymmetry of the pixel configuration described above with reference to FIG. 46.

Figure 50:
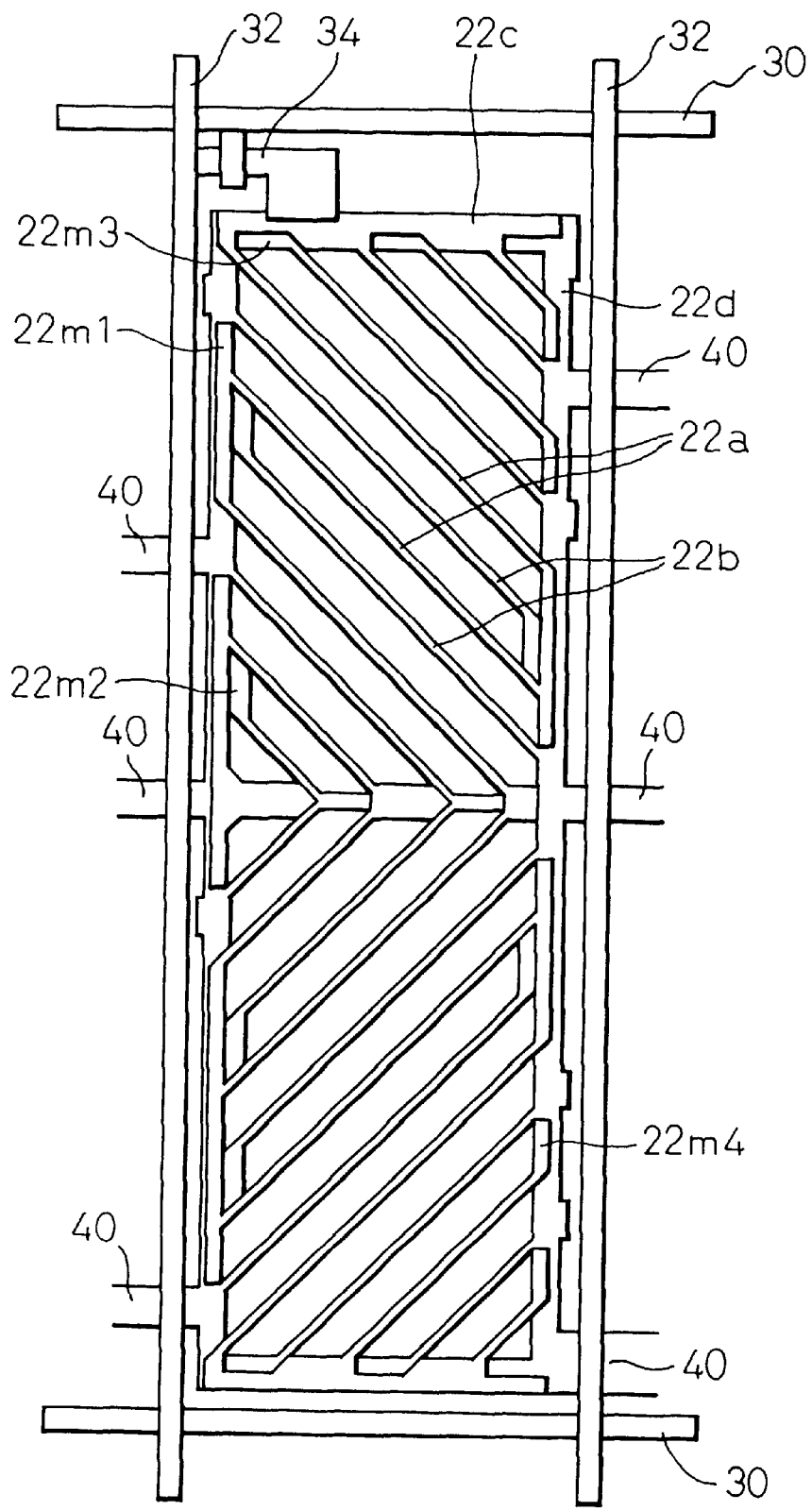
FIG. 50 is a plan view showing an example of one pixel of the liquid crystal display apparatus of FIGS. 47 to 49.
Figure 51:
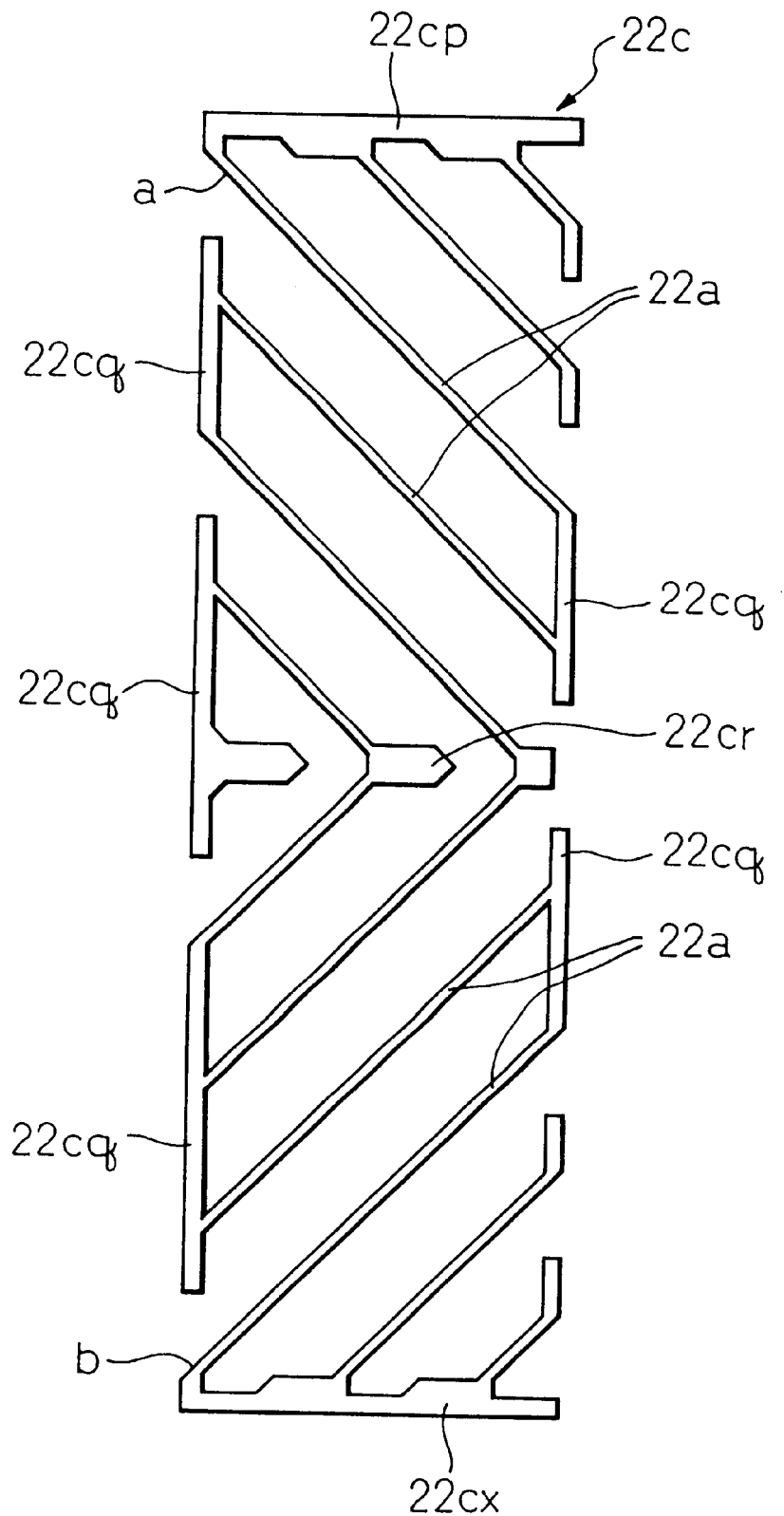
FIG. 51 is a plan view showing the first stripe electrodes of FIG. 50.
Figure 52:
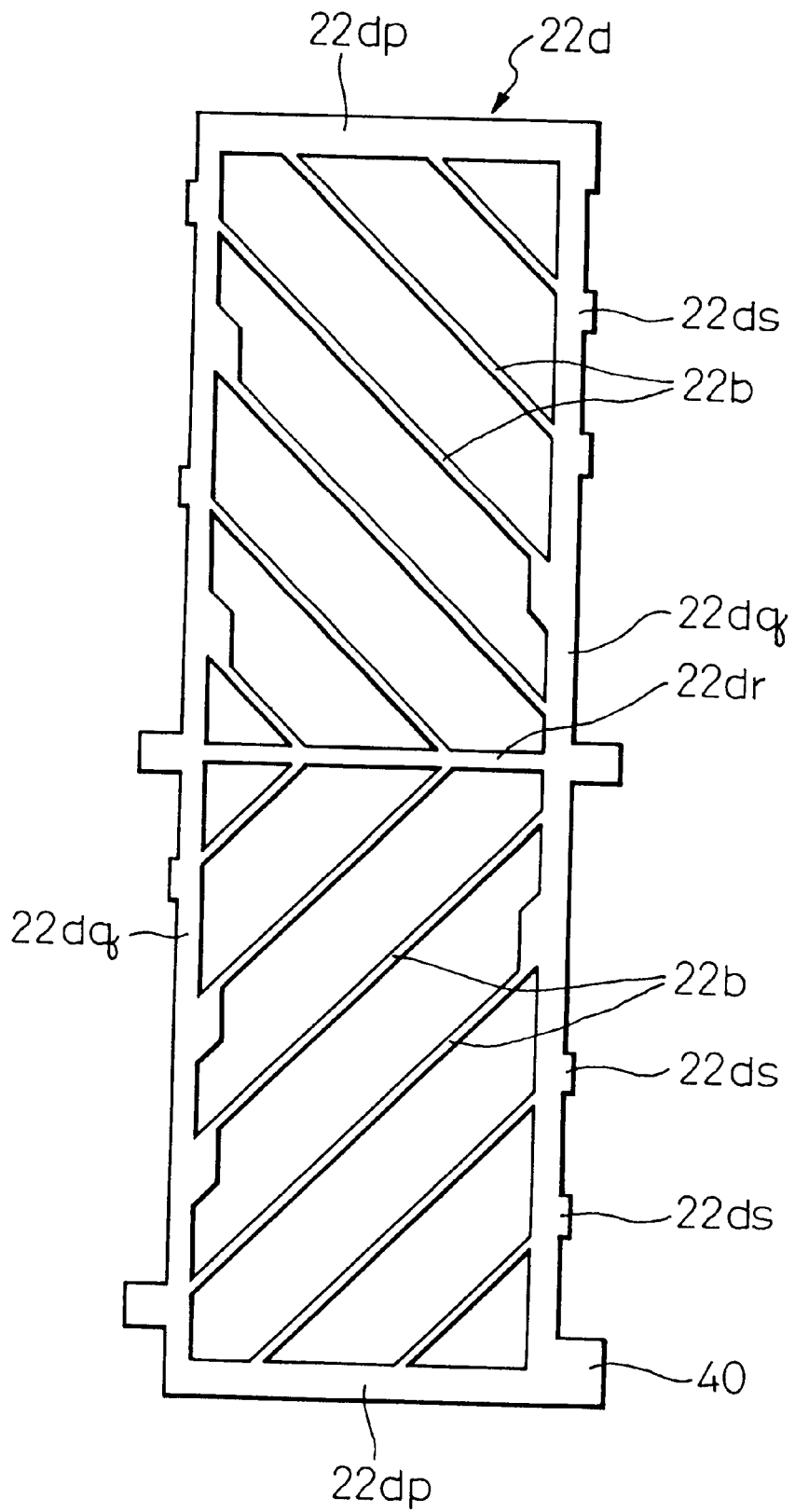
FIG. 52 is a plan view showing the second stripe electrodes of FIG. 50.

FIG. 50 is a plan view showing an example of a pixel of the liquid crystal display apparatus shown in FIGS. 47 to 49. FIG. 51 is a plan view showing the first stripe electrodes 22a. FIG. 52 is a plan view showing the second stripe electrodes 22b. The feature of this pixel is applicable also to the other embodiments.

In the liquid crystal display apparatus 10, as shown in FIG. 50, and also in FIG. 23, one of the substrates 14 includes an active matrix having gate bus lines 30, data bus lines 32 and TFTs 34. Further, common bus lines 40 are provided. The substantially rectangular pixel 52 defined by the gate bus lines 30 and the data bus lines 32 has arranged therein the first and second groups of the stripe electrodes 22a, 22b. The first group of the stripe electrodes 22a is connected to the TFT 34 by the first connection electrode 22c. The second group of the stripe electrodes 22b is connected to the common bus lines 40 by means of the second connection electrode 22d.

In FIGS. 50 and 51, a plurality of stripe electrodes 22a of the first group include parallel linear portions of the first subgroup (the elements above the horizontal center line in FIGS. 50 and 51) and parallel linear portions of the second subgroup (the elements below the horizontal center line in FIGS. 50 and 51) at an angle to the first group of the linear portions. All the linear portions form an angle of 2 to 88 degrees to the data bus lines 32. Preferably, all the linear portions form an angle of 45 degrees to the data bus lines 32.

The first subgroup of the linear portions and the second subgroup of the linear portions are arranged at an angle of 90 degrees to each other. In other words, the first group of the stripe electrodes 22a have a perpendicularly bent portion. The first subgroup of the linear portions are arranged symmetrically with respect to the linear portions of the second subgroup about the horizontal center line in FIGS. 50 and 51. The first subgroup of the linear portions can alternatively be arranged symmetrically with respect to the second group of the linear portions about a point. Several of the first and second subgroups of the linear portions extend straight from one long side to the other long side of the substantially rectangular pixel without being bent midway.

In FIGS. 50 and 52, a plurality of stripe electrodes 22b of the second group includes a third subgroup of parallel linear portions (elements above the horizontal center line in FIGS. 50 and 52), and a fourth subgroup of parallel linear portions at an angle to the third subgroup of the linear portions (elements below the horizontal center line in FIGS. 50 and 52). The third subgroup of the linear portions and the fourth subgroup of the linear portions are arranged at right angles to each other. The linear portions of the third subgroup are arranged symmetrically with respect to the linear portions of the fourth subgroup about, the horizontal center line in FIGS. 50 and 52. Several of the linear portions of the third and fourth subgroups extend straight from one long side to the opposed long side of the substantially rectangular pixel without being bent midway.

In a given pixel, the first connection electrode 22c is arranged at the peripheral portion of the pixel 52 (slightly inward of the gate bus lines 30 and the data bus lines 32 defining the pixel 52), and connects the first group of the stripe electrodes 22a to each other. The second connection electrode 22d, on the other hand, is arranged at the peripheral portion of the pixel 52 and connects the second group of the stripe electrodes 22b to each other. The first connection electrode 22c at least partially overlaps the second connection electrode 22d through an insulating layer 56 (FIGS. 50 and 55). This insulating layer 56 is identical to the insulating layer 50 of FIGS. 32 and 33.

As shown in FIG. 50, the width of the second connection electrode 22d is larger than the width of the first connection electrode 22c, and the first connection electrode 22c is located on the inner edge of the second connection electrode 22d and separated from the gate bus lines 30 and the data bus lines 32 as much as possible, in order to prevent the short circuit.

The first connection electrode 22c will be described in detail. The first connection electrode 22c includes connection electrode portions 22cp, 22cq for connecting the ends of the first and second linear portions of the first group of the stripe electrodes 22a to each other. The connection electrode portions 22cp extend in parallel to the gate bus lines 30 at the peripheral portion of the pixel 52 and connects the ends of the first and second linear portions to each other. The connection electrode portions 22cq, on the other hand, extend discontinuously in parallel to the data bus lines 32 at the peripheral portion of the pixel 52 and each connects the ends of at least two of the first and second linear portions of the first group of the stripe electrodes 22a to each other.

Especially, the configuration in which the connection electrode portion 22cq is arranged in parallel to the data bus lines 32 at the peripheral portion of the pixel 52 can eliminate the connection electrode portion 22cy extending longitudinally in the central portion of the pixel shown in FIG. 23, for example. The connection electrode portions 22cy extending longitudinally in the central portion of the pixel considerably reduces the aperture ratio of the pixel. The provision of the connection electrode portions 22cq at the peripheral portion of the pixel 52, however, can improve the aperture ratio of the pixel.

By arranging the connection electrode portions 22cq discontinuously in parallel to the gate bus lines 30, the amount of the connection electrode portions 22cq in the vicinity of the gate bus lines 30 can be reduced thereby to lessen possibility of a short circuit occurring between the connection electrode portions 22cq and the data bus lines 32. The first connection electrode 22c further includes connection electrode portions 22cr discontinuously arranged along the horizontal center line of the pixel 52. These connection electrode portions 22cr, though not specially required, can prevent the disclination due to the disturbed alignment of the liquid crystal at the bent portion of the first and second groups of the stripe electrodes 22a, 22b.

The end of one linear portion (designated by a in FIG. 51) of the first group of the stripe electrodes 22a is located at the corner of the short side of the pixel, and the end of another linear portion (designated by b in FIG. 51) is located at the corner of the other short side of the pixel. A substantially continuous electrical route is formed extending from the linear portion having the end portion a toward the other linear portion having the end portion b through almost all the other linear portions and the connection electrode portions 22cq of the first connection electrode. Specifically, the connection electrode portions 22cq of the first connection electrode are arranged only in the minimum required portion for achieving the electrical connection of the first group of the stripe electrodes 22a.

The second connection electrode 22d includes connection electrode portions 22dp extending in parallel to the gate bus lines 30 at the peripheral portion of the pixel 52 for connecting the ends of the third and fourth linear portions of the second group of the stripe electrodes 22b to each other, and connection electrode portions 22dq extending in parallel to the data bus lines 32 at the peripheral portion of the pixel 52. The second connection electrode 22d further includes a connection electrode portion 22dr functioning as an auxiliary capacitance electrode arranged along the horizontal center line of the pixel. The connection electrode portion 22dr can also prevent the disclination which otherwise might be caused by the disturbed alignment of the liquid crystal at the bent portion of the first and second stripe electrodes 22a, 22b. The connection electrode portion 22dr may be done without. The second connection electrode 22d further includes external protrusions 22ds for connecting to similar connection electrodes of adjacent pixels at a plurality of points. These external protrusions 22ds are portions of the common bus lines 40 of FIG. 50. That is, the first connection electrode 22d in one pixel is connected to a first connection electrode 22d in the adjacent pixel by a plurality of common bus lines 40.

Figure 53:
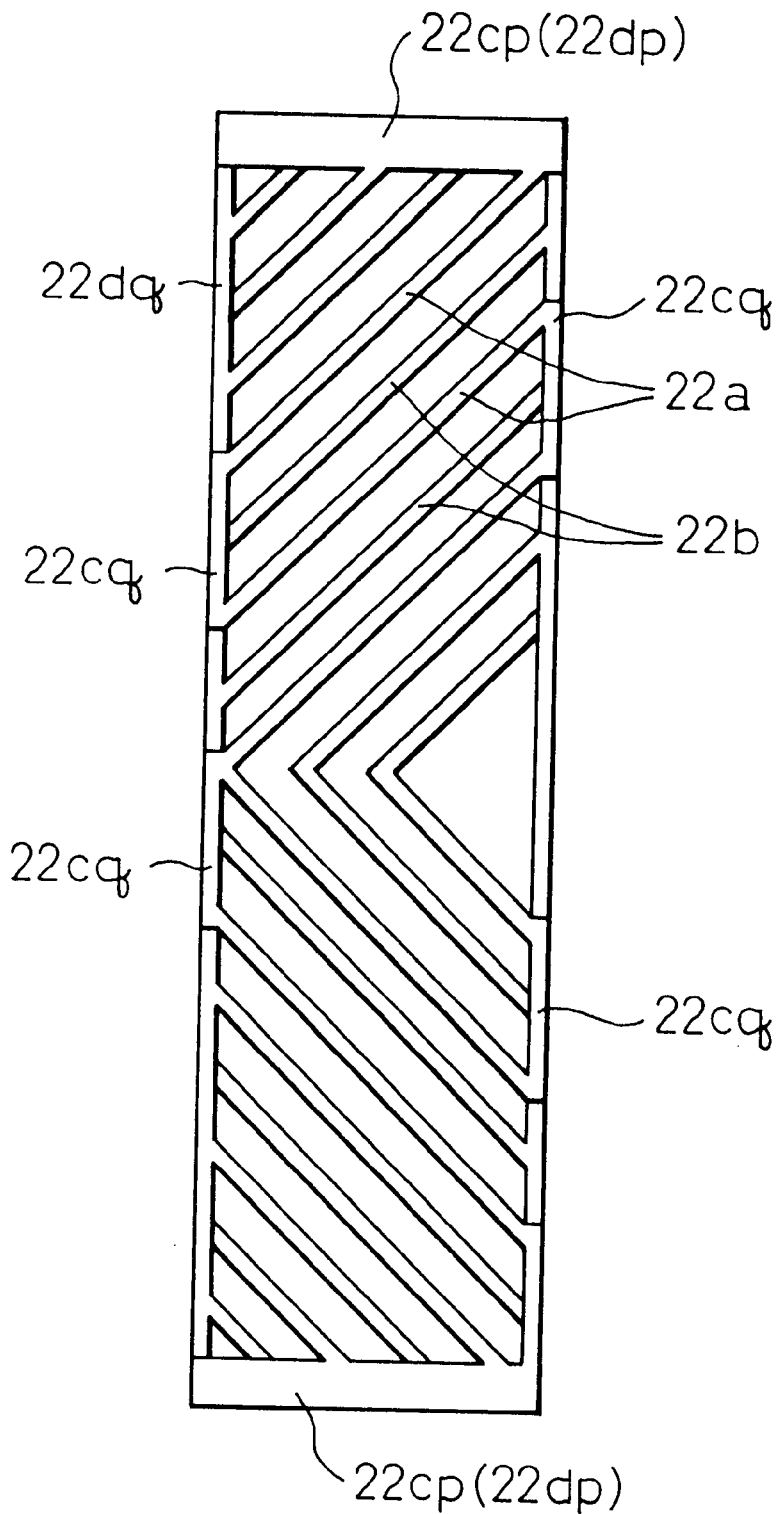
FIG. 53 is a plan view showing an example of the first and second stripe electrodes and the first and second connection electrodes.
Figure 54:
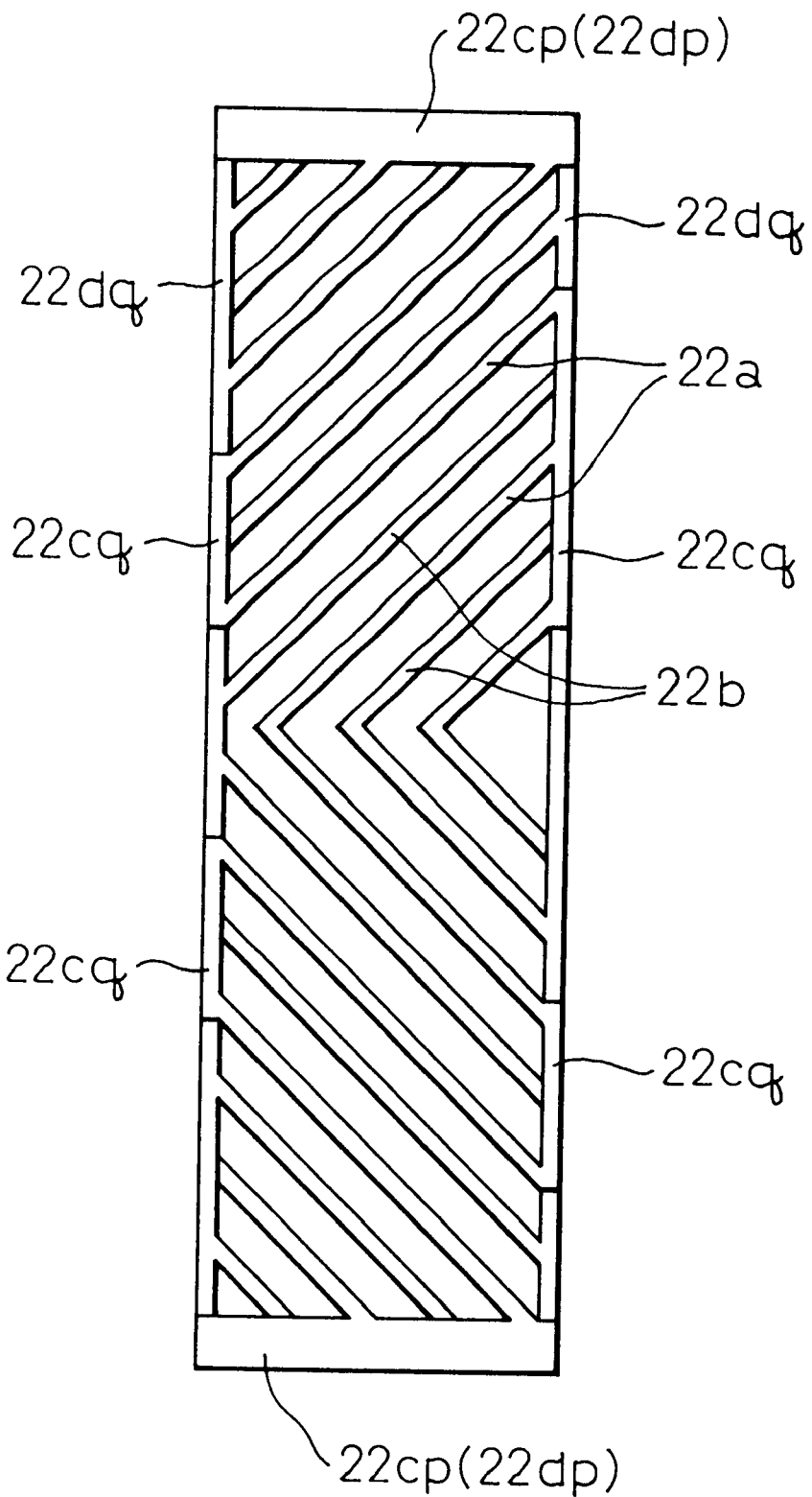
FIG. 54 is a plan view showing a modification of the first and second stripe electrodes and the first and second connection electrodes.

FIG. 53 is a plan view showing a modification of the first and second groups of the stripe electrodes 22a, 22b and the first and second connection electrodes 22c, 22d. FIG. 54 is a plan view showing a modification of the first and second groups of the stripe electrodes 22a, 22b and the first and second connection electrodes 22c, 22d.

In FIGS. 53 and 54, the connection electrode portions 22cq, 22dq of the first and second connection electrodes 22c, 22d are arranged only at the peripheral portion of the pixel, but no connection electrode portion is arranged within the pixel. Thus, a bright liquid crystal display apparatus having a large aperture ratio can be realized.

Of the electrode connection portions 22cq arranged at the peripheral portion of the pixel for connecting the first group of the stripe electrodes 22a, the total length of the electrode connection portions 22cq parallel to one data bus line 32 is preferably substantially the same as the total length of the electrode connection portions 22cq parallel to the other data bus line opposed thereto. By doing so, the likelihood of crosstalk between one data bus line 32 and the electrode connection portions 22cq can be reduced.

Within one pixel, the area of the region having the first linear portions of the first group of the stripe electrodes 22a at an angle of 2 to 88 degrees with respect to the data bus lines 32 is preferably substantially equal to the area of the region having the second linear portion at a supplementary angle thereto.

Figure 55A:
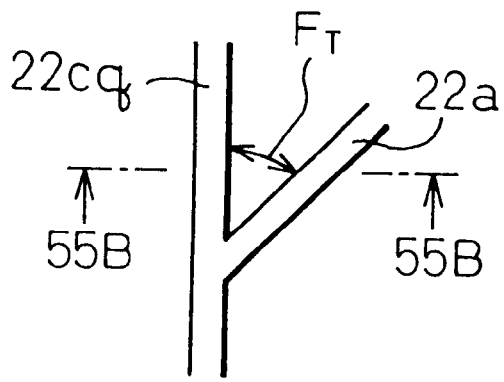
FIG. 55A is a diagram showing a comparative example of the embodiment of FIG. 56.
Figure 55B:
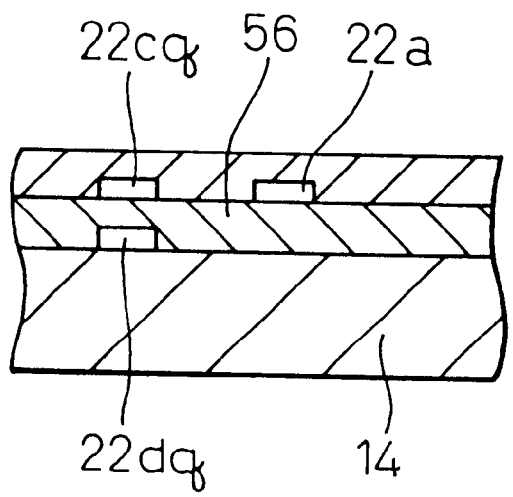
FIG. 55B is a sectional view taken along line 55B—55B in FIG. 55A.
Figure 56A:
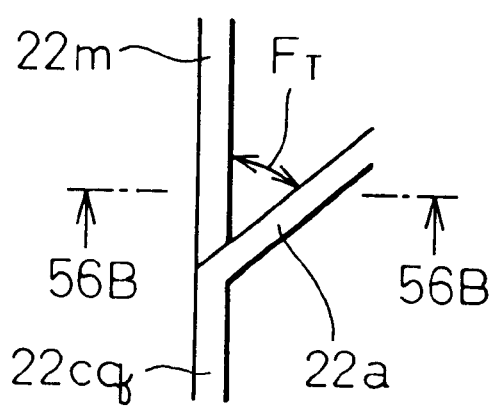
FIG. 56A is a diagram showing a part of the liquid crystal display apparatus according to a fifth embodiment of the invention.

FIG. 55A is a diagram showing a comparative example of the embodiment of FIG. 56A. FIG. 55B is a sectional view taken in line 55B—55B in FIG. 55A. As described previously, in a liquid crystal display apparatus having the first and second groups of stripe electrodes 22a, 22b, a horizontal electric field FT is formed between the first group of the stripe electrodes 22a and the second group of the stripe electrodes 22b. This is also true either in the presence or in the absence of the wholly solid transparent electrode 18 of the opposed substrate 12.

At the position where one of the first group of the stripe electrodes 22a crosses the connection electrode portion 22cq of the first connection electrode 22c at an acute or right angle, the stripe electrode 22a of the first group is at the same potential as the connection electrode portion 22cq of the first connection electrode 22c, thereby leading to the problem that the horizontal electric field FT is not formed between these two members and the liquid crystal cannot be sufficiently driven. In a similar fashion, at the position where one of the second group of the stripe electrodes 22b crosses the connection electrode portion 22dq of the second connection electrode 22d at an acute or right angle, the stripe electrode 22b of the second group is at the same potential as the connection electrode portion 22dq of the first connection electrode 22c, thereby leading to the problem that the horizontal electric field $F_T$ is not formed between these two members and the liquid crystal cannot be sufficiently driven. The fact that the horizontal electric field $F_T$ is not formed and the liquid crystal is not sufficiently driven leads to the fact that the brightness of the liquid crystal display apparatus is reduced and so is the aperture ratio. In the case where the connection electrode portion 22dq of the second connection electrode 22d exists in the overlapped relation with the connection electrode portion 22cq of the first connection electrode 22c, on the other hand, a horizontal electric field is formed between the first group of the stripe electrodes 22a and the second connection electrode portion 22dq of the second connection electrode 22d. It has been found, however, that the connection electrode portion 22cq of the first connection electrode 22c forms a stumbling block to the formation of the horizontal electric field.

Figure 56B:
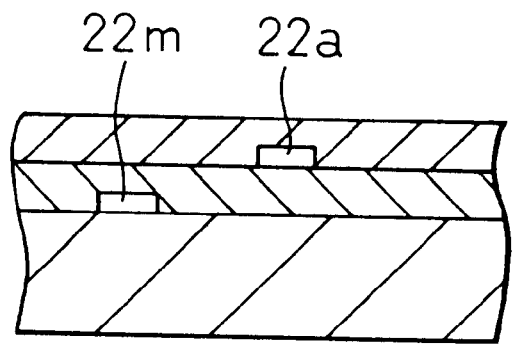
FIG. 56B is a sectional view taken along Line 56B—56B in FIG. 56A.

FIG. 56A is a diagram showing a part of the liquid crystal display apparatus according to a fifth embodiment of the invention. FIG. 56B is a sectional view taken in line 56B—56B in FIG. 56A.

In the case of FIG. 56A, a driving correction electrode portion 22m is provided at a position where the connection electrode portion 22cq is located and where one of the first group of the stripe electrodes 22a crosses the connection electrode portion 22cq of the first connection electrode 2c at an acute or right angle in FIG. 55A. This can be explained generally as follows. The apparatus further comprises a driving correction electrode portion 22m crossing one stripe electrode 22a of one of the first and second groups of the stripe electrodes 22a, 22b at an acute or right angle. This driving correction electrode portion 22m is connected to the stripe electrode 22b of a group different from the group associated with the first one stripe electrode 22a, and is arranged in the same layer as the first or second connection electrode 22d for one stripe electrode 22b of the particular different group.

Specifically, the first stripe electrodes 22a cross, at an acute or right angle, the driving correction electrode portion 22m in the same layer as the second stripe electrode 22b which is located in a layer different from the first stripe electrode 22a, the first group of the stripe electrodes 22a is at a different potential from the driving electrode portion 22m, and a horizontal electric field $F_T$ is formed between these two members. Thus, the liquid crystal can be driven with an improved aperture ratio.

Figure 57:
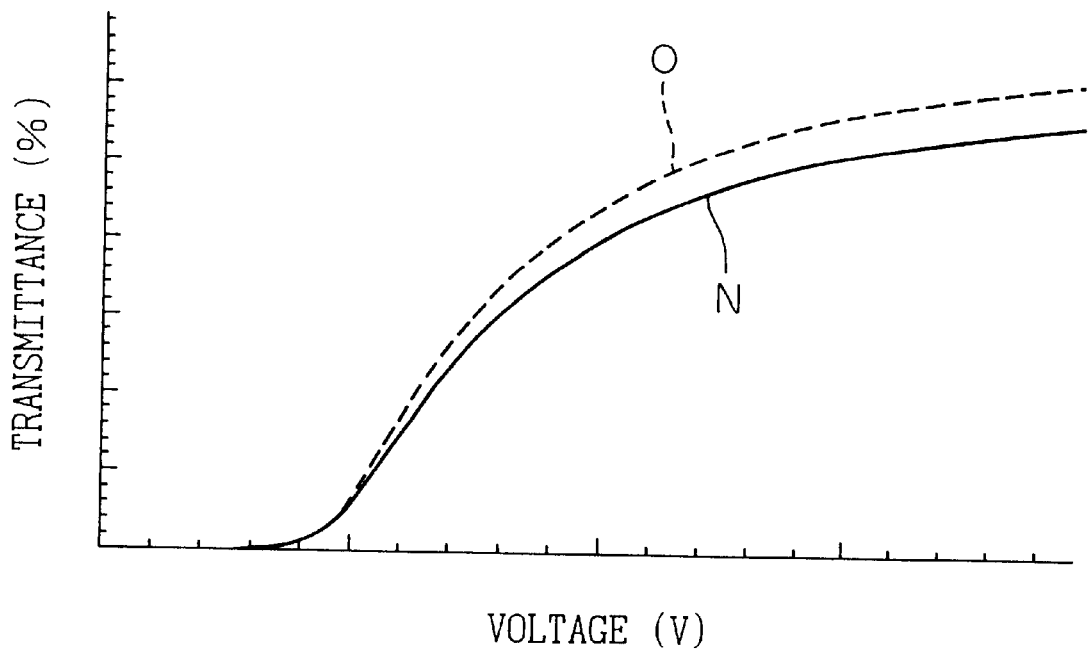
FIG. 57 is a diagram showing the transmittance of the configuration of FIG. 55A and the liquid crystal display apparatus of FIG. 56A.

FIG. 57 is a diagram showing the transmittance of the configuration of FIG. 5—5A and the liquid crystal display apparatus of FIG. 56A. A curve N indicates the transmittance of the liquid crystal display apparatus of FIG. 55A, and a curve O is the transmittance of the liquid crystal display apparatus of FIG. 56A. In the liquid crystal display apparatus of FIG. 56A, the liquid crystal is driven in more portions, and therefore the bright display is made possible.

Figure 58:
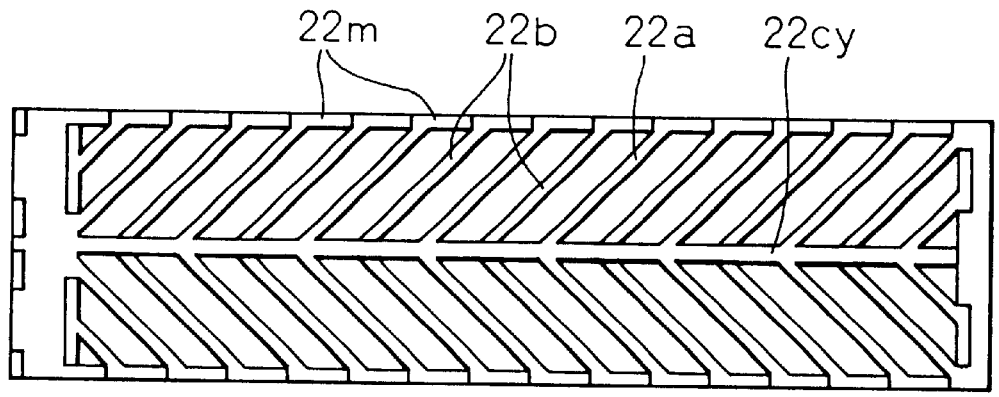
FIG. 58 is a plan view showing a liquid crystal display apparatus having the first and second stripe electrodes and the first and second connection electrodes based on the principle of FIG. 56.

FIG. 58 is a plan view showing the liquid crystal display apparatus having the first and second groups of the stripe electrodes 22a, 22b and the first and second connection electrodes 22c, 22d based on the principle of FIG. 56A. In this example, the connection electrode 22cy is formed at the center of the pixel, and the driving correction electrode portions 22m are arranged on the peripheral portion of the pixel. The driving correction electrode portion 22m may appear to correspond to the connection electrode portion 22dq of the second connection electrode 22d. Nevertheless, the driving correction electrode portion 22m fails to connect the second group of the stripe electrodes 22b.

Figure 59:
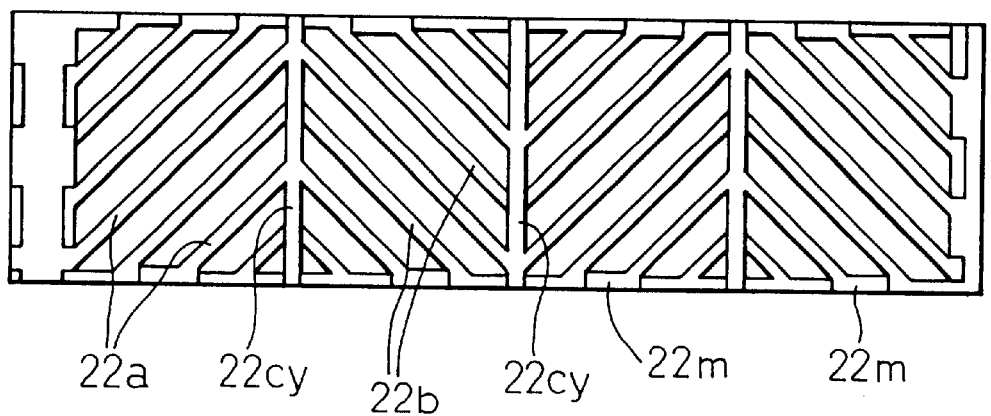
FIG. 59 is a plan view showing a modification of the liquid crystal display apparatus of FIG. 58.

FIG. 59 shows an example in which the pixel is segmented into four parts in the longitudinal direction by the connection electrodes 22cy. In a similar manner to FIG. 58, the driving correction electrode portion 22m is arranged on the peripheral portion of the pixel. In the configuration of FIGS. 58 and 59, the connection electrode cannot be arranged on the peripheral portion of the pixel. In the example described below, however, the connection electrode can be arranged on the peripheral portion of the pixel and the driving correction electrode portion 22m can also be arranged on the peripheral portion of the pixel.

Figure 60:
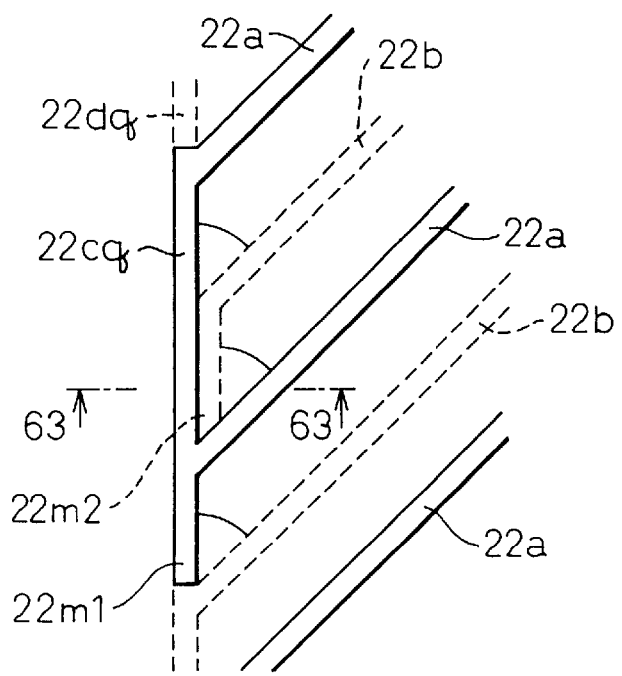
FIG. 60 is a diagram showing an example of the first and second stripe electrodes crossing the first and second connection electrodes at an acute angle and including a driving correction electrode portion.
Figure 70:
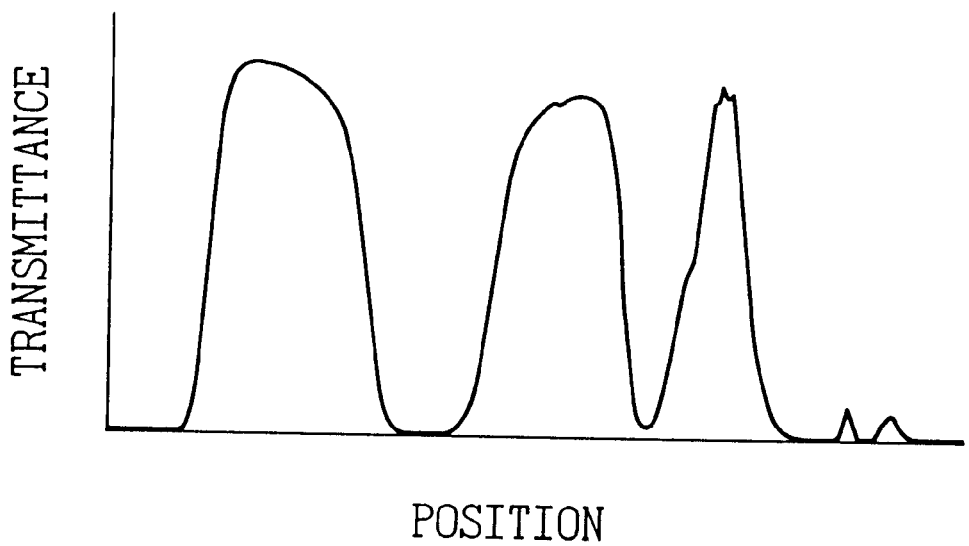
FIG. 70 is a diagram showing the transmittance of the liquid crystal display apparatus in the case where the second group of stripe electrodes cross the first connection electrode at an acute angle and the second group of stripe electrodes are not protruded laterally from the first connection electrode.

FIG. 60 is a diagram showing the case in which the first and second groups of the stripe electrodes 22a, 22b cross the first and second connection electrodes 22c, 22d at an acute angle, and include the driving correction electrode portion 22m. FIG. 70 shows the portion in the vicinity of the connection electrode portions 22cq, 22dq of the first and second connection electrodes 22c, 22d parallel to the data bus lines 32 on the peripheral portion of the pixel.

Figure 66:
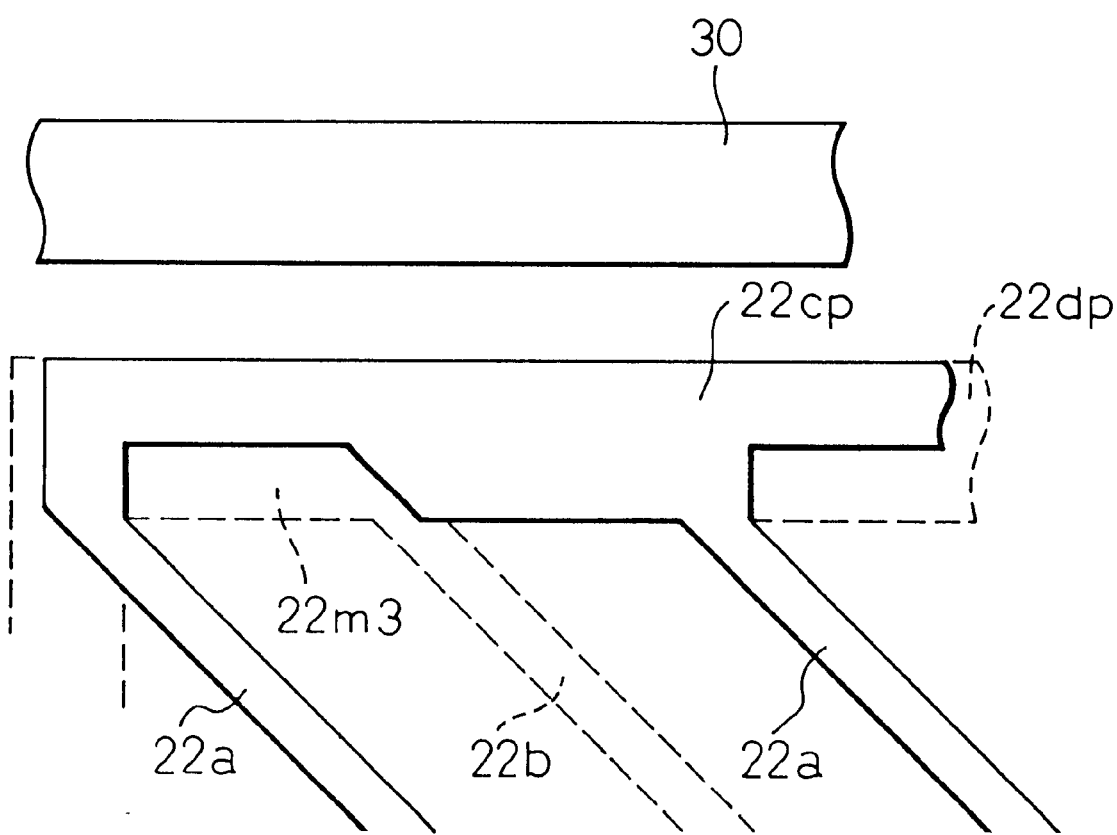
FIG. 66 is a diagram showing a modification of the driving correction electrode portion extending from the second stripe electrode with the first connection electrode depressed.

In the embodiment shown in FIGS. 70 to 66, the first group of the stripe electrodes 22a and the first connection electrodes 22c are located in the layer above the second group of the stripe electrodes 22b and the second connection electrodes 22d. Therefore, the first group of the stripe electrodes 22a and the first connection electrodes 22c are indicated by solid lines, while the second group of the stripe electrodes 22b and the second connection electrodes 22d are indicated by dashed lines.

Figure 61:
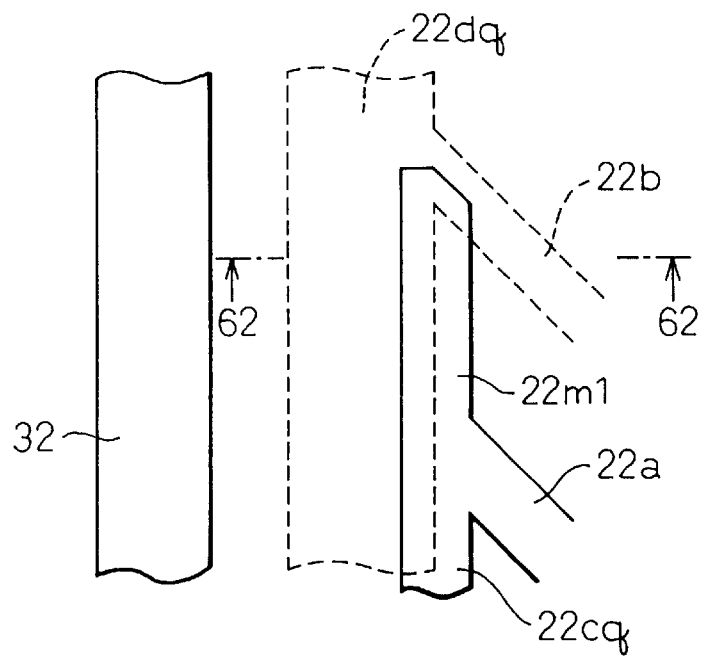
FIG. 61 is a diagram showing an example of the driving correction electrode portion extending from the first stripe electrode.
Figure 62:
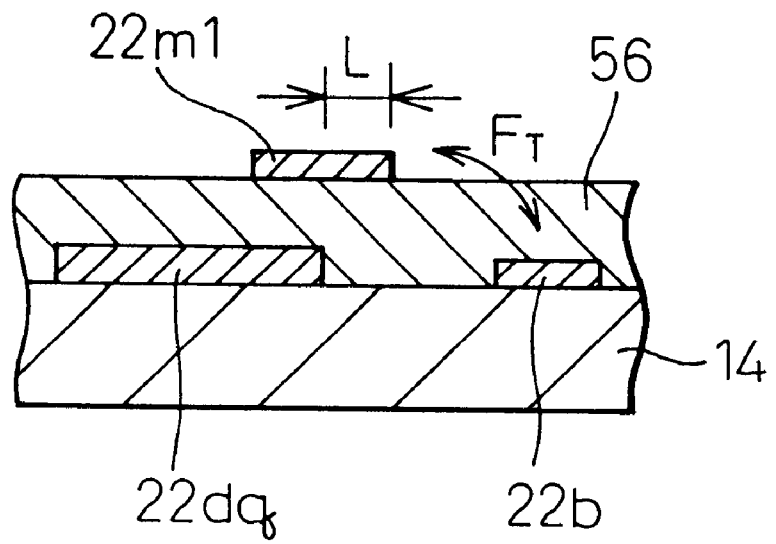
FIG. 62 is a sectional view taken along line 62—62 in FIG. 61.
Figure 63:
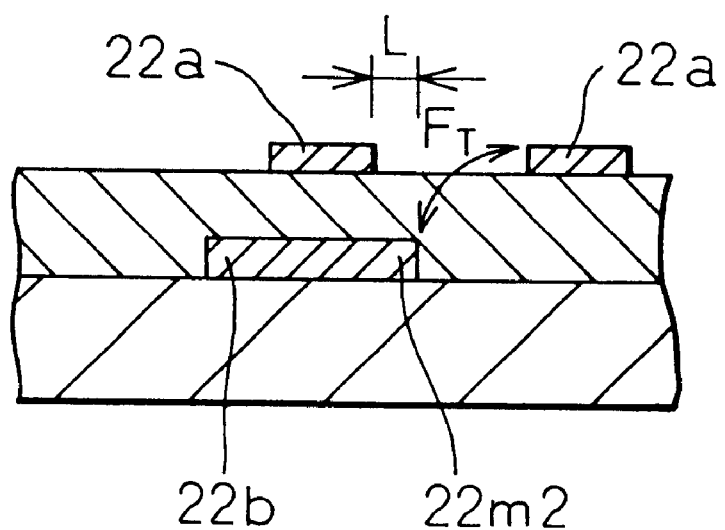
FIG. 63 is a sectional view taken along line 63—63 in FIG. 60.

In FIG. 60, two driving correction electrode portions 22m1, 22m2 are shown. FIG. 61 shows the driving correction electrode portion 22m1 in detail. FIG. 62 is a sectional view taken in line 62—62 in FIG. 61 through the driving correction electrode portion 22m1. FIG. 63 is a sectional view taken in line 63—63 in FIG. 70 through the driving correction electrode portion 22m2.

In FIGS. 60, 61, 62, two of the first and second linear portions of the first group of the stripe electrode 22a are connected by the connection electrode portion 22cq of the first connection electrode 22c parallel to the data bus lines 32. The driving correction electrode portion 2m1 extends along a straight line integrally with the connection electrode portion 22cq.

As viewed from one of the linear portions (called the central linear portion) of the first group of the stripe electrodes 22a located at the center of FIG. 60, the connection electrode portion 22cq connects the central linear portion and the linear portion located above it, but the driving correction electrode portion 22m1 fails to connect the central linear portion with the linear portion located thereunder. The driving correction electrode portion 22m1 forms an acute angle with the linear portion of the second group of the stripe electrode 22b located under the central linear portion. The driving correction electrode portion 22m1 and the linear portion of the second group of the stripe electrode 22b located under the driving correction electrode portion 22m1 are supplied with different voltages.

In other words, one of the first and second linear portions of the first group of the stripe electrodes 22a is connected to the connection electrode portion 22cq of the first connection electrode 22c parallel to the data bus lines 32, the connection electrode portion 22cq of the first connection electrode 22c extends in one direction from the joint between the particular one linear portion and the connection electrode portion, and the driving correction electrode portion 20m1 extends in the direction opposite to the connection electrode portion 22cq in parallel to the data bus lines and ends at a position overlapped with the nearest one of the linear portions of a plurality of the second stripe electrodes 22b. Thus, one linear portion of the second group of the stripe electrodes 22b crosses the driving correction electrode portion 20m1 at an acute angle, but both are supplied with different voltages. The resulting increased portion of the liquid crystal capable of being driven can produce a bright display.

As shown in FIG. 62, the driving correction electrode portion 20m1, as viewed from above, is protruded inward by a protrusion amount L from the connection electrode portion 22dq of the second connection electrode 22d. The protrusion of the driving correction electrode portion 20m1 inward from the connection electrode portion 22dq of the second connection electrode 22d is crucial for validating the horizontal electric field $F_T$ between the driving correction electrode portion 20m1 and the linear portion of the second group of the stripe electrodes 22b that form an acute angle with the driving correction electrode portion 20m1. According to the embodiment, the connection electrode portion 22cq of the first connection electrode 22c and the driving correction electrode portion 20m1 are both protruded inward of the connection electrode electrode portion 22dq of the second connection electrode 22d.

In FIGS. 60 and 63, one linear portion of the second group of the stripe electrodes 22b is connected to the connection electrode portion 22dq of the second connection electrode 22d parallel to the gate bus lines, and the driving correction electrode portion 22m2 is connected to the interior of the connection electrode portion 22dq of the second connection electrode 22d. Thus, one linear portion of the first group of the stripe electrodes 22a crosses the driving correction electrode portion 20m2 at an acute angle but both are supplied with different voltages. Therefore, an increased portion of the liquid crystal can be driven for a brighter display. As shown in FIG. 63, the driving correction electrode portion 20m2 is protruded inward by an amount L from the linear portion of the first group of the stripe electrodes 22a as viewed from above. This protrusion of the driving correction electrode portion 20m2 is important for validating the horizontal electric field $F_T$.

Figure 64:
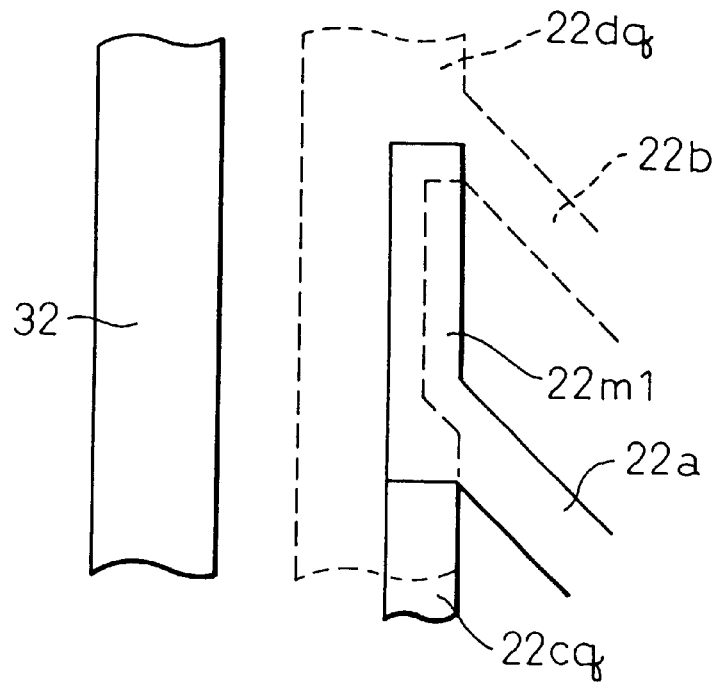
FIG. 64 is a diagram showing an example of the driving correction electrode portion extending from the first stripe electrode with the second connection electrode depressed.

FIG. 64 is a diagram showing that, as in FIG. 61, the driving correction electrode portion 22m1 extends from the first group of the stripe electrodes 22a so that the inner edge of the connection electrode portion 22cq of the first connection electrode 22c is located within the same vertical plane as the inner edge of the connection electrode portion 22dq of the second connection electrode 22d. A depression is formed, however, in the inner edge of the connection electrode portion 22*dq* of the second connection electrode 22*d* where the driving correction electrode portion 22*m*1 is located. Thus, the driving correction electrode portion 22*m*1 is protruded horizontally more than the connection electrode portion 22*dq* of the second connection electrode 22*d*.

Figure 65:
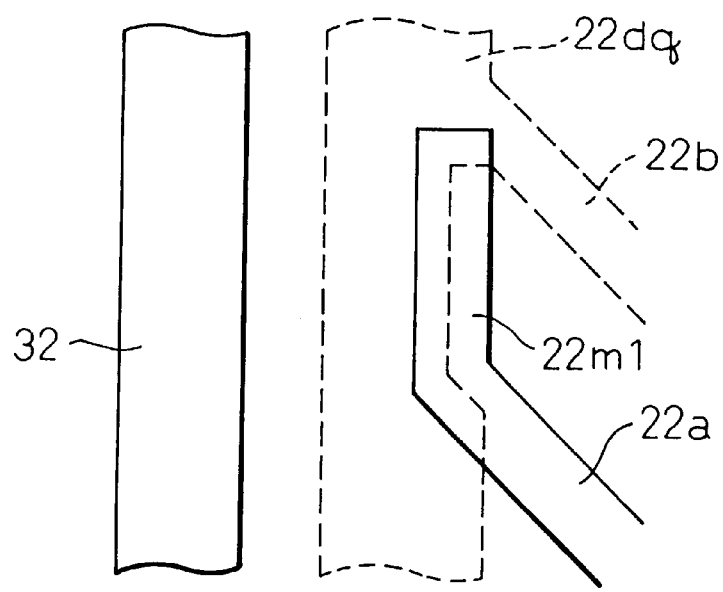
FIG. 65 is a diagram showing a modification of the driving correction electrode portion extending from the first stripe electrode with the second connection electrode depressed.

In FIG. 65, the taper of the linear portion of the first group of the stripe electrodes 22*a* extends to the outer edge of the driving correction electrode portion 22*m*1 nearer to the data bus line 32, thereby minimizing the area of that portion of the driving correction electrode portion 22*m*1 in the same layer as the data bus line 32 which is located in the vicinity of the particular data bus line 32. As a result, the driving correction electrode portion 22*m*1 becomes less liable to short with the data bus line 32.

FIG. 66 is a diagram showing an example in which the connection electrode portion 22*cp* of the first connection electrode 22*d* of the driving correction electrode portion 22*m*3 is depressed, so that the connection electrode portion 22*cp* of the second connection electrode 22*d* is protruded inward from the connection electrode portion 22*cp* of the first connection electrode 22*d*. The linear portion of the first group of the stripe electrodes 22*a* crosses the driving correction electrode portion 22*m*3 at an acute angle.

The driving correction electrode portion 22*m*1, the driving correction electrode portion 22*m*2 and the driving correction electrode portion 22*m*3 are shown also in FIG. 50. FIG. 50 further shows the driving correction electrode portion 22*m*4.

Figure 67:
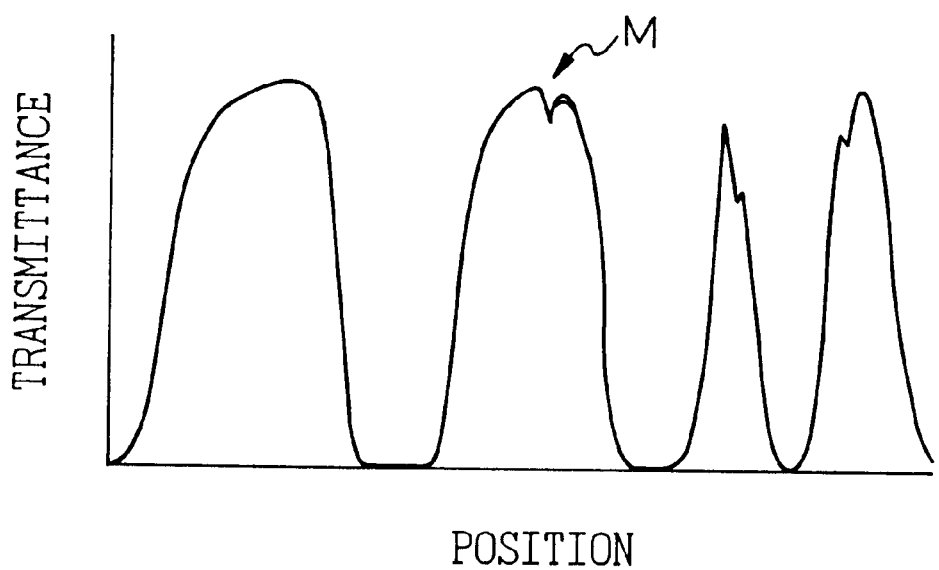
FIG. 67 is a diagram showing the transmittance of the liquid crystal display apparatus in the case where the first stripe electrode crosses the second connection electrode at an acute angle and the first stripe electrode is not protruded laterally from the second connection electrode.

FIG. 67 is a diagram showing the transmittance of the liquid crystal display apparatus in the case where the protrusion amount of the driving correction electrode portion 22*m*1 of FIG. 62 is zero in the configuration of FIG. 61. The drop of the transmittance as indicated by M is observed at a position where the second group of the stripe electrodes 22*b* crosses the driving correction electrode portion 22*m*1 at an acute angle.

Figure 68:
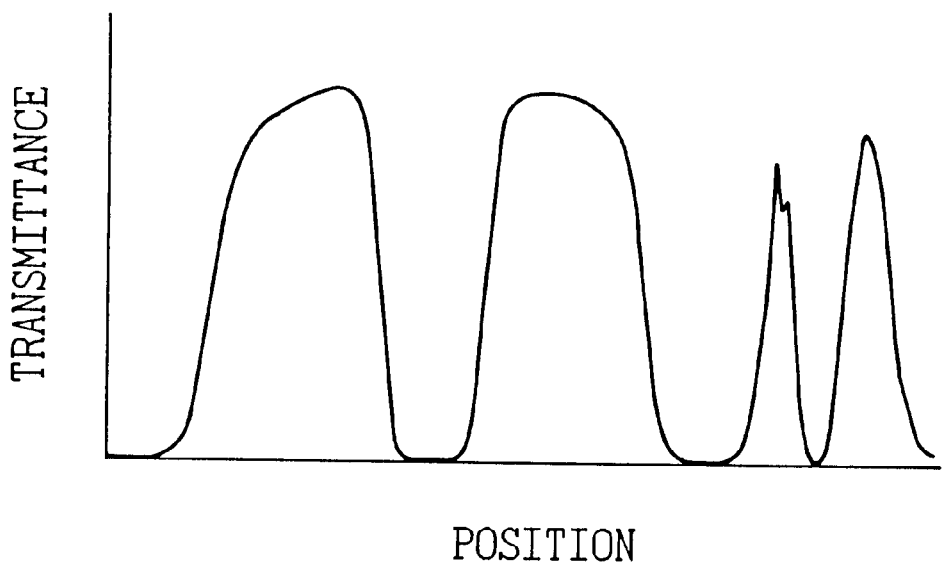
FIG. 68 is a diagram showing the transmittance of the liquid crystal display apparatus in the case where the first stripe electrode crosses the second connection electrode at an acute angle and the first stripe electrode is protruded laterally from the second connection electrode.

FIG. 68 is a diagram showing the transmittance of the liquid crystal display apparatus in the case where the protrusion amount L of FIG. 62 is 2 $\mu$m in the configuration of FIG. 61. The drop of the transmittance at position M in FIG. 67 is canceled.

Figure 69:
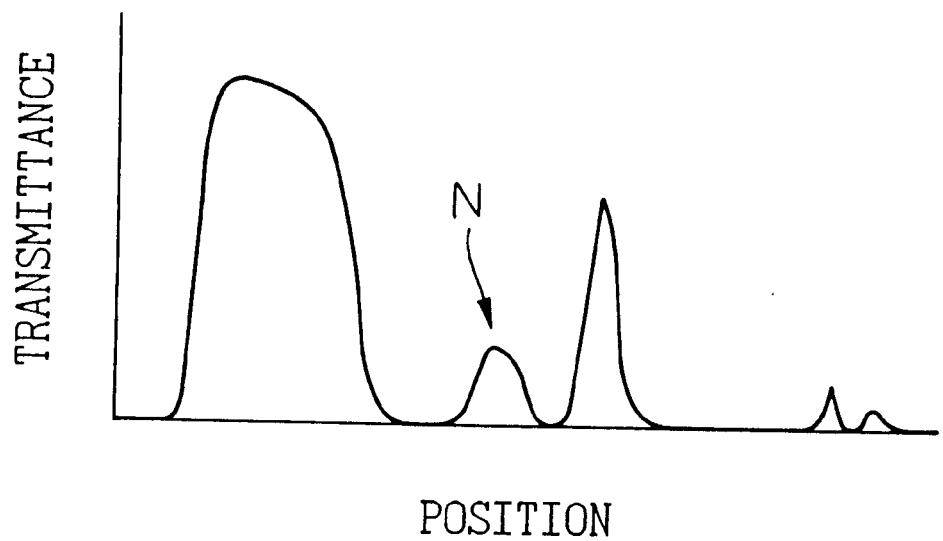
FIG. 69 is a diagram showing the transmittance of the liquid crystal display apparatus in the case where the second stripe electrode crosses the first connection electrode at an acute angle and the second stripe electrode is not protruded laterally from the first connection electrode.

FIG. 69 is a diagram showing the transmittance of the liquid crystal display apparatus in the case where the protrusion amount L of the driving correction electrode portion 22*m*2 of FIG. 63 is zero in the configuration of FIG. 60. The drop of the transmittance as indicated by N is observed at a position where the first group of the stripe electrodes 22*a* crosses the driving correction electrode portion 22*m*2 at an acute angle.

FIG. 70 is a diagram showing the transmittance of the liquid crystal display apparatus in the case where the protrusion amount L of FIG. 63 is 4 $\mu$m in the configuration of FIG. 60. The drop of the transmittance at the position N in FIG. 69 is eliminated.

Figure 71:
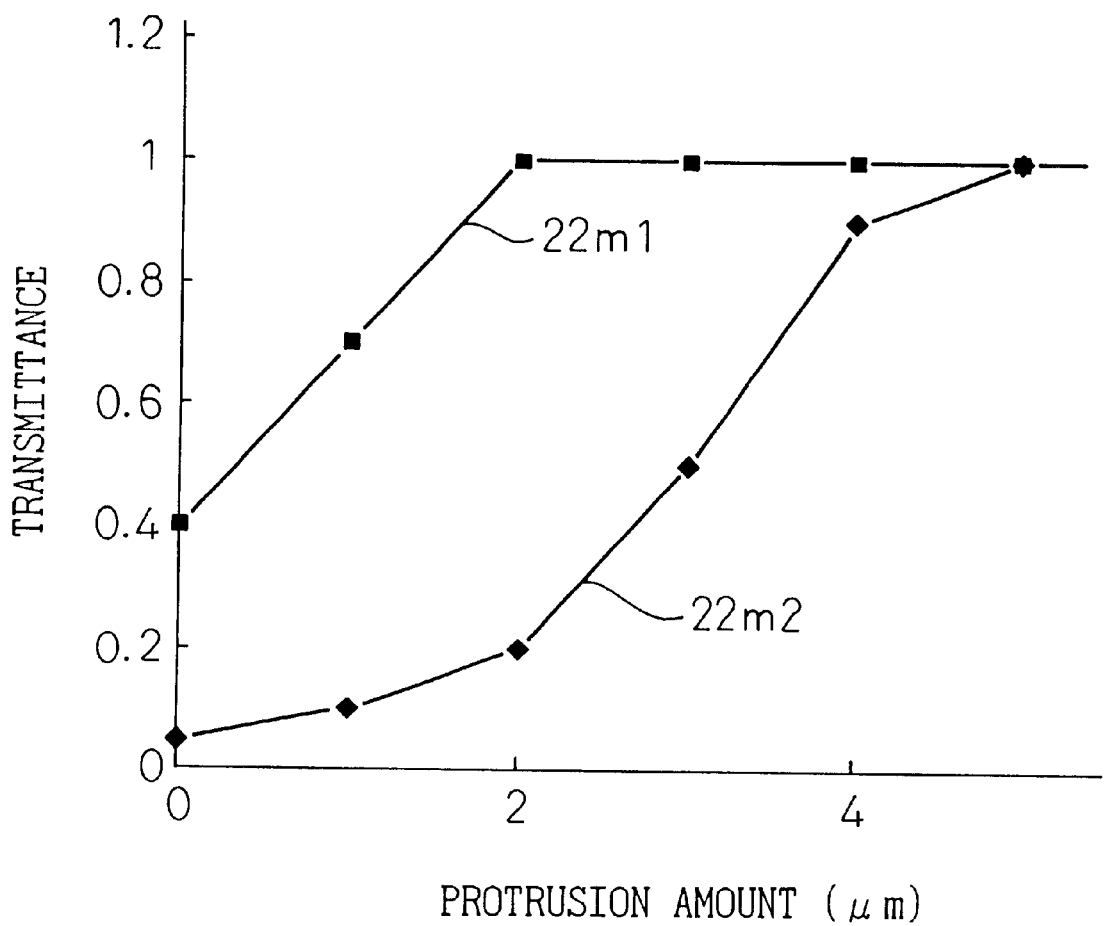
FIG. 71 is a diagram showing the amount of protrusion of the first and second groups of the stripe electrodes from the first and second connection electrodes.

FIG. 71 is a diagram showing the relation between the protrusion amount L of the driving correction electrode portion 22*m*1, the protrusion amount L of the driving correction electrode portion 22*m*2 and the light transmittance of the liquid crystal display apparatus. The protrusion amount L of the driving correction electrode portion 22*m*1 is found to be preferably not less than 0.5 $\mu$m. Also, the protrusion amount L of the driving correction electrode portion 22*m*2 is found to be preferably not less than 3 $\mu$m.

Figure 72:
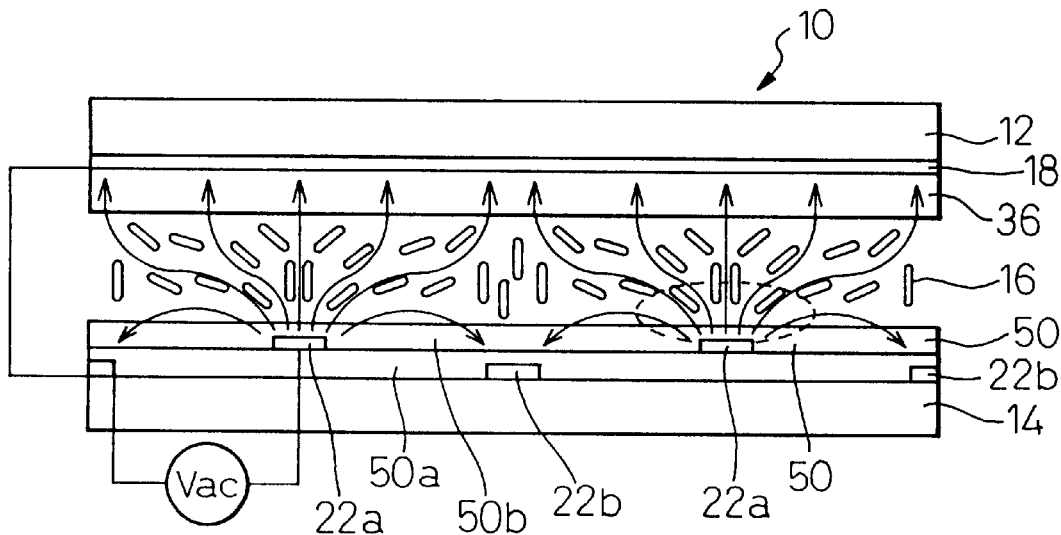
FIG. 72 is a sectional view showing a reference of the liquid crystal display apparatus of FIG. 73.
Figure 73:
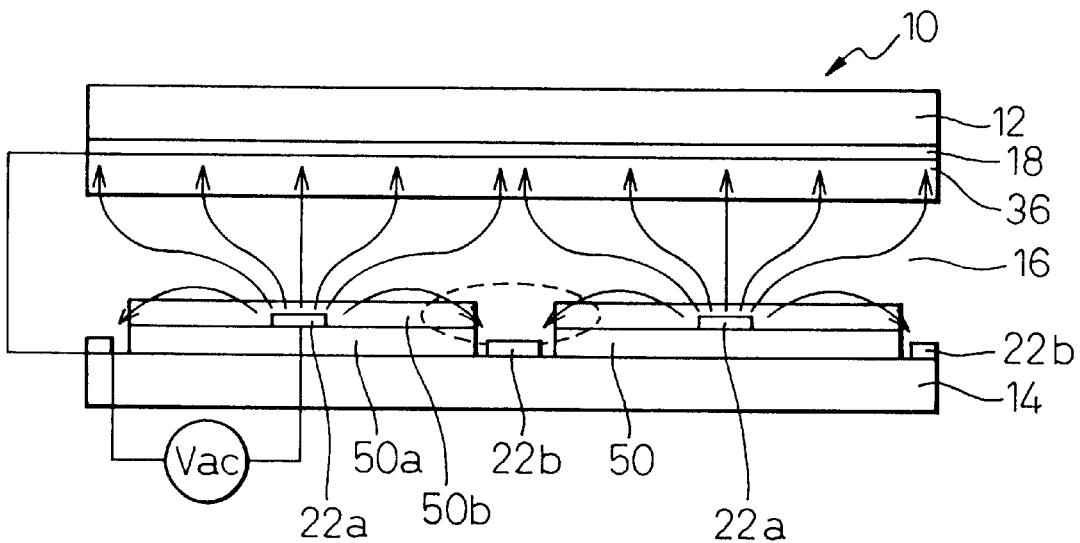
FIG. 73 is a sectional view showing the liquid crystal display apparatus according to a sixth embodiment of the invention.

FIG. 72 is a diagram showing a reference of the liquid crystal display apparatus of FIG. 73. FIG. 72 shows the liquid crystal display apparatus 10 similar to the embodiment of FIG. 32. In FIG. 72, however, the alignment layer and the polarizer are not shown. As explained with reference to FIG. 32, the insulating layer 50 can prevent the image sticking of the screen. In the presence of the insulating layer 50, however, the applied voltage is divided by the insulating layer 50 and a lower voltage is supplied on the liquid crystal, thereby posing the problem that a higher liquid crystal drive voltage is required.

FIG. 72 shows the alignment of the liquid crystal molecules upon application of a voltage thereto. An oblique electric field is formed between the first group of the stripe electrodes 22*a* and the wholly solid transparent electrode 18. A horizontal electric field for promoting the oblique electric field is formed between the first group of the stripe electrodes 22*a* and the second group of the stripe electrodes 22*b*.

FIG. 73 is a sectional view showing the liquid crystal display apparatus 10 according to a sixth embodiment of the invention. FIG. 73 also shows the liquid crystal display apparatus 10 including an insulating layer 50 like the liquid crystal display apparatus of FIGS. 32 and 72. This insulating layer 50 includes a first insulating layer 50*a* covering the second group of the stripe electrodes 22*b* supplied with a common voltage and a second insulating layer 50*b* covering the first group of the stripe electrodes 22*a* supplied with a data voltage.

In FIG. 73, the insulating layer 50 is partially removed after being formed. Specifically, the portion of the insulating layer 50 around the second group of the stripe electrodes 22*b* is removed by dry etching.

Figure 78:
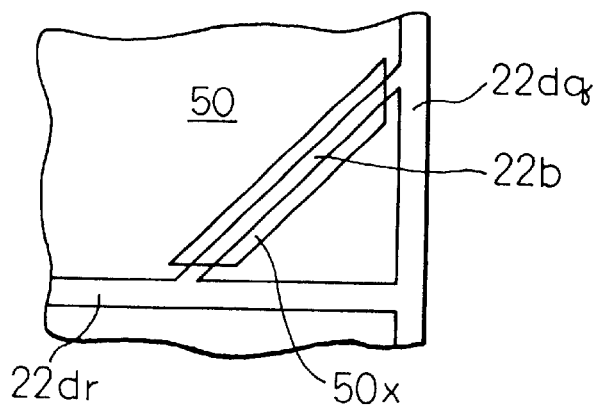
FIG. 78 is a plan view showing the vicinity of the second group of the stripe electrodes of FIG. 73.

FIG. 78 is a plan view showing the vicinity of the second stripe electrodes 22*b* of FIG. 73. The insulating layer 50 includes an opening 50*x* for exposing the second group of the stripe electrodes 22*b*. Thus, the horizontal electric field formed between the first group of the stripe electrodes 22*a* and the second group of the stripe electrodes 22*b* is interrupted to a lesser degree by the insulating layer 50 thereby to prevent the liquid crystal drive voltage from being reduced.

Figure 74:
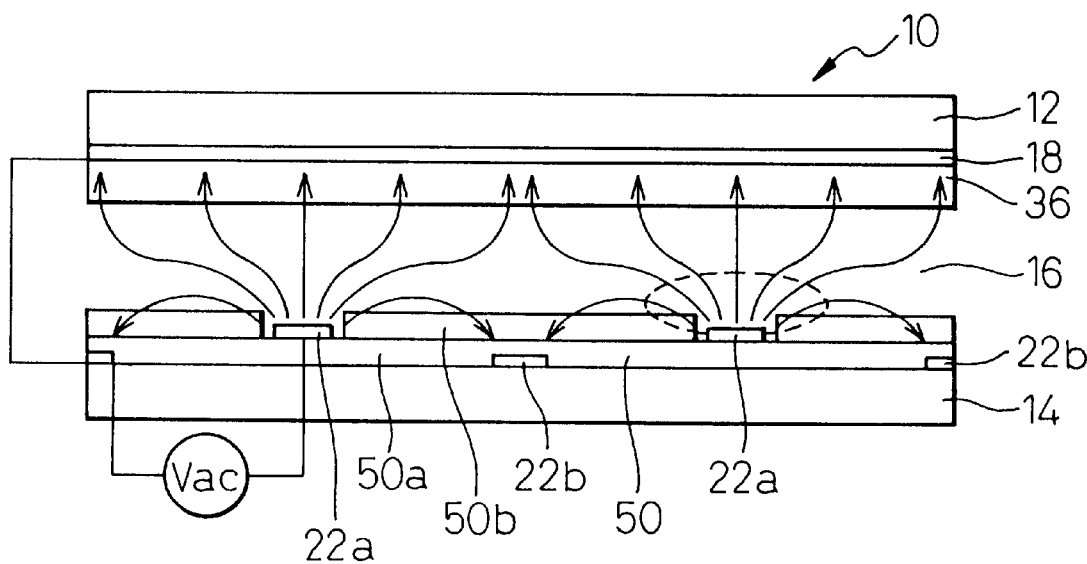
FIG. 74 is a sectional view showing a modification of the liquid crystal display apparatus of FIG. 73.

FIG. 74 is a diagram showing a modification of the liquid crystal display apparatus 10 of FIG. 73. In FIG. 74, the insulating layer 50 is removed partially after being formed. Specifically, the portion of the insulating layer 50 (second insulating layer 50*b*) on the peripheral portion of the first group of the stripe electrodes 22*a* is removed by dry etching. Thus, the oblique electric field formed between the first group of the stripe electrodes 22*a* and the wholly solid transparent electrode 18 is not interrupted by the insulating layer 50, thereby making it possible to prevent the liquid drive voltage from being reduced.

After forming the insulating layer 50, the portion of the insulating layer 50 on the peripheral portion of the first group of the stripe electrodes 22*a* and the portion of the insulating layer 50 on the periphery of the second group of the stripe electrodes 22*b* can be also effectively removed.

Figure 75:
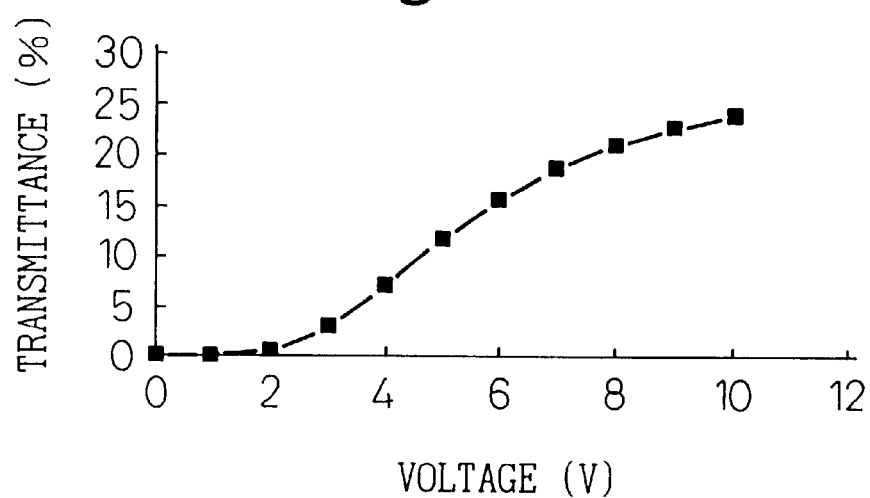
FIG. 75 is a diagram showing the light transmittance of the liquid crystal display apparatus of FIG. 72.
Figure 76:
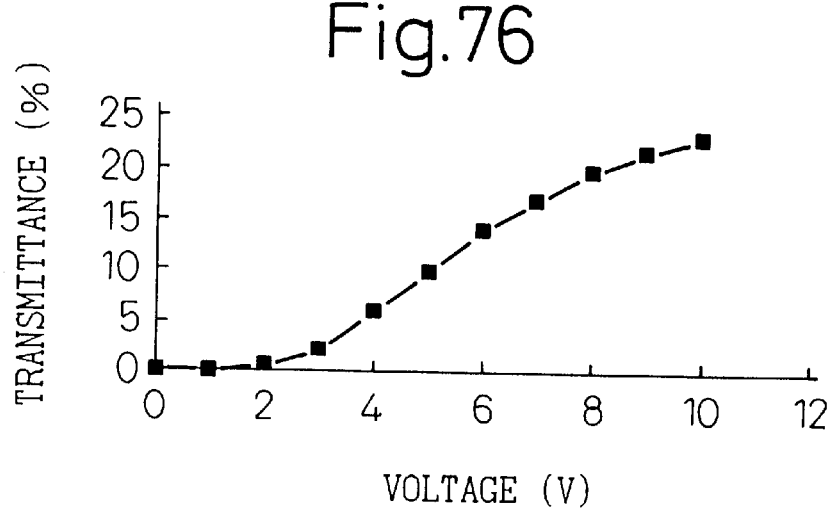
FIG. 76 is a diagram showing the light transmittance of the liquid crystal display apparatus of FIG. 73.
Figure 77:
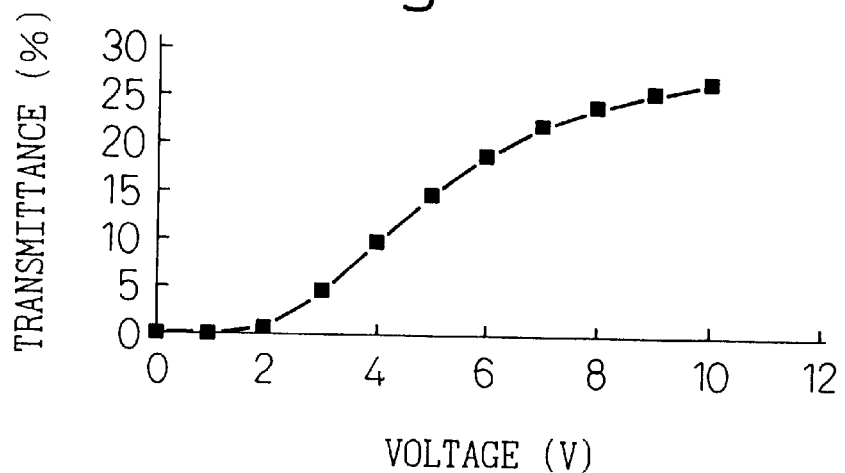
FIG. 77 is a diagram showing the light transmittance of the liquid crystal display apparatus of FIG. 74.

FIGS. 75 to 77 are diagrams showing the light transmittance of the liquid crystal display apparatus of FIGS. 72 to 74, respectively. In FIG. 75, for example, the light transmittance is about 15% for a voltage of 6 volts. In FIG. 76, the light transmittance is about 15% for a voltage of 6 volts, which substantially remains unchanged from the result of FIG. 75. In FIG. 77, the light transmittance is about 20% for a voltage of 6 volts, which is considerably different from the result of FIG. 74. Thus it is seen that the drive voltage can be reduced.

In the liquid crystal display apparatus shown in FIG. 72, an oblique electric field is formed from the first stripe electrodes 22*a* toward the wholly solid transparent electrode 18 of the opposite substrate 12. The electric field is substantially perpendicular to the wholly solid transparent electrode 18 is in the vicinity of the first group of the stripe electrodes 22*a*.

Figure 79:
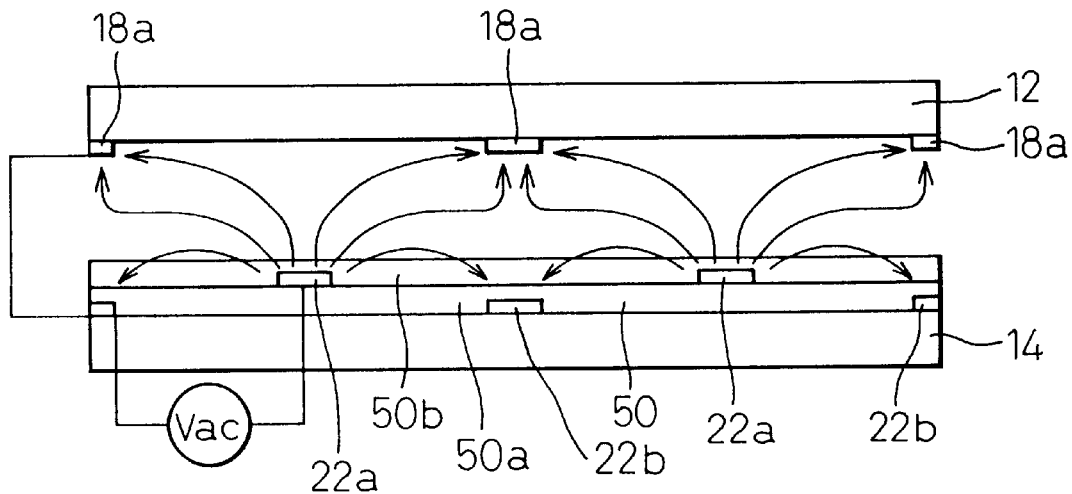
FIG. 79 is a sectional view showing a reference of the liquid crystal display apparatus of FIG. 80.

In view of this, as shown in FIG. 79, the wholly solid transparent electrode 18 is replaced by a third group of stripe electrodes 18*a* at a position of the substrate 12 in opposed relation to the second group of the stripe electrodes 22*b*. By so doing, an oblique electric field can be efficiently formed between the first group of the stripe electrodes 22*a* and the third group of the stripe electrodes 18*a*. In the configuration of FIG. 79, however, a displacement if caused between the substrates 12 and 14 causes a displacement between the electrodes, thereby leading to the problem of considerable irregularity of the relation between the voltage and transmittance.

Figure 80:
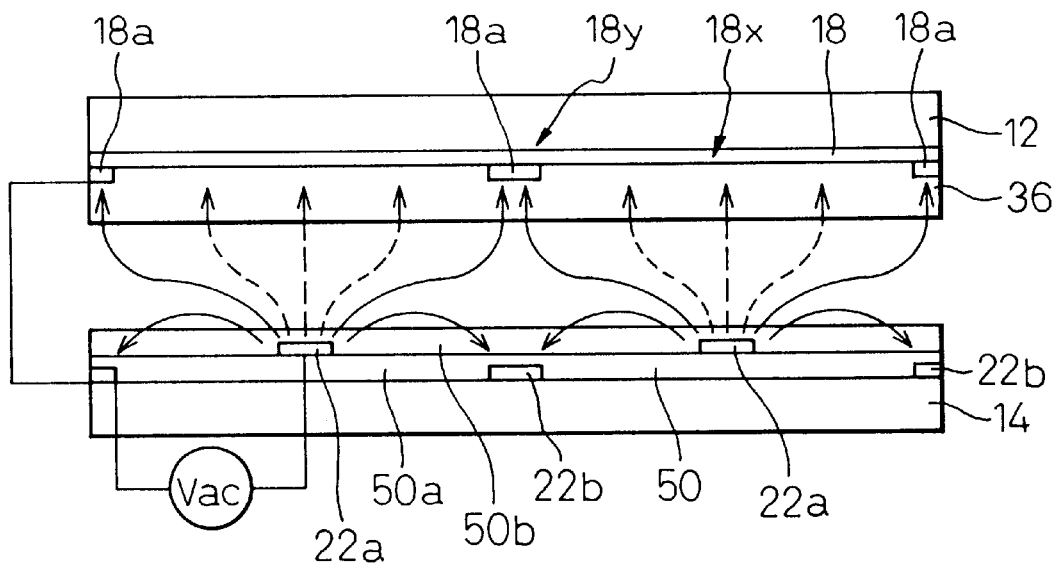
FIG. 80 is a sectional view showing the liquid crystal display apparatus according to a seventh embodiment of the invention.

FIG. 80 is a sectional view showing a liquid crystal display apparatus according to a seventh embodiment of the invention. In this embodiment, one substrate 14 includes the first group of the stripe electrodes 22*a* and the second group of the stripe electrodes 22*b*, while the other substrate 12 includes the wholly solid transparent electrode 18 and a third group of the stripe electrodes 18*a* in opposed relation to the second group of the stripe electrodes 22*b*. Specifically, only the portion of the wholly solid transparent electrode 18 constitutes a high-resistance electrode portion 18*x*, while the portion where the wholly solid transparent electrode 18 and the third group of the stripe electrodes 18*a* are overlapped with each other makes up an electrode portion 18*y* low in resistance. The wholly solid transparent electrode 18 is formed by sputtering the ITO to the thickness of 200 to 300 A, for example and heat treated not to be removed by the etching solution. Then, the third group of the stripe electrodes 18*a* is sputtered to a thickness of 2000 A, for example, and is etched using a mask.

Upon application of a voltage, the charge is accumulated first in the low-resistance electrode portion 18*y*, so that an electric field is formed between the low-resistance electrode portion 18*y* and the first group of the stripe electrodes 22*a*, and the liquid crystal behaves primarily in accordance with this electric field. The high-resistance electrode portion 18*x* is actually equal in potential to the low-resistance electrode portion 18*y*. With the lapse of time, therefore, the charge is also stored in the high-resistance electrode portion 18*x*. In other words, an electric field is formed to such an extent that the liquid crystal responds. Thus, the liquid crystal display apparatus of FIG. 79 can operate with a drive voltage as low as that for the liquid crystal display apparatus of FIG. 79. The liquid crystal display apparatus of FIG. 80 includes the wholly solid transparent electrode 18, and therefore a displacement, if any, between the substrates does not change the voltage-transmittance characteristic considerably.

Figure 81:
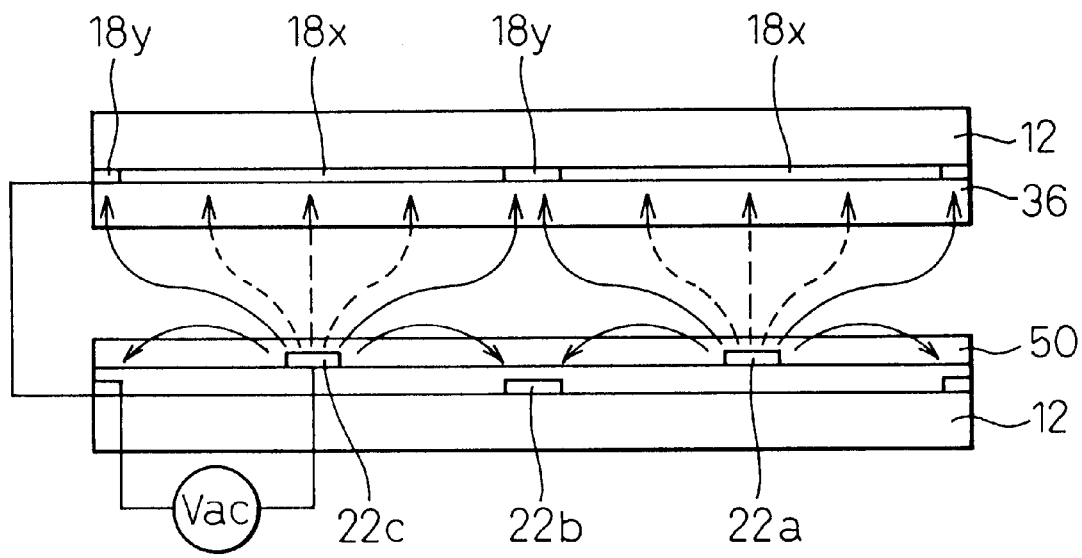
FIG. 81 is a diagram showing a modification of the liquid crystal display apparatus of FIG. 80.

FIGS. 81 to 84 are diagrams showing a modification of the liquid crystal display apparatus of FIG. 80. These examples use, as shown in FIG. 81, instead of the wholly solid transparent electrode, a striped structure or a mesh structure including a plurality of transparent striped lines having the same resistance thereby making up a high-resistance electrode portion 18*x* and a low-resistance electrode portion 18*y*. The low-resistance electrode portion 18*y* is represented by a thick line, and the low-resistance electrode portion 18*y* is represented by a thin line.

Figure 82:
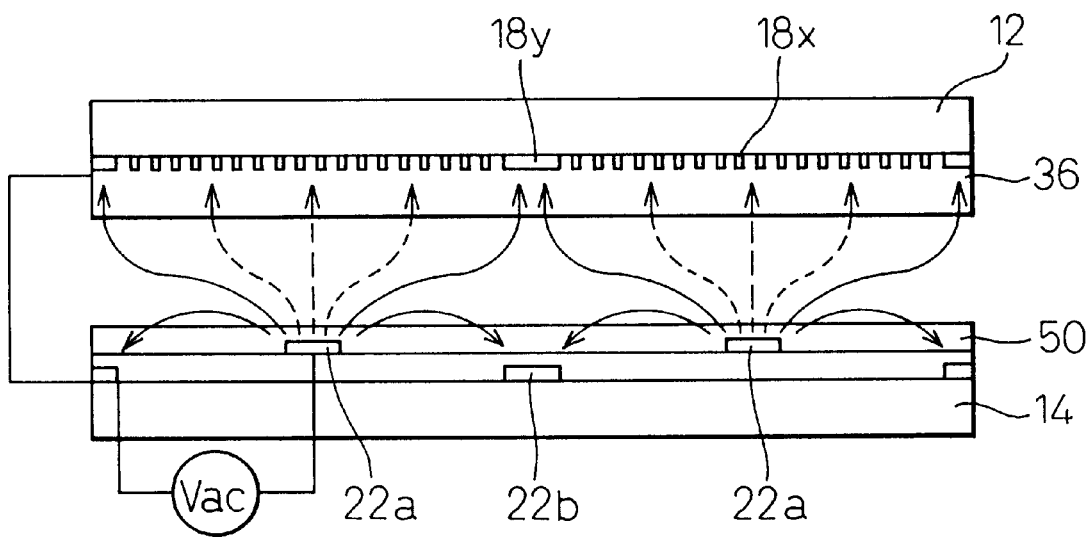
FIG. 82 is a diagram showing a modification of the liquid crystal display apparatus of FIG. 80.
Figure 83:
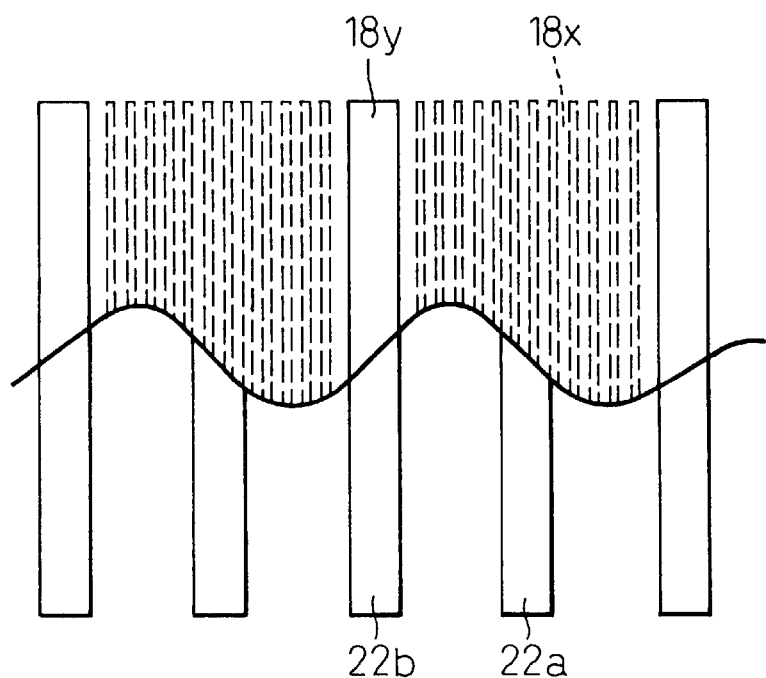
FIG. 83 is a diagram showing a modification of the liquid crystal display apparatus of FIG. 80.

FIGS. 82 and 83 show an example in which the high-resistance electrode portion 18*x* and the low-resistance electrode portion 18*y* are made up of a striped linear structure. The structure of a thin line is arranged to cover the first group of the stripe electrodes 22*a*, while the structure indicated by thick line is arranged in opposed relation to the second group of the stripe electrodes 22*b*. The thick line is preferably as thick as the second group of the stripe electrodes 22*b*. Specifically, the thick line is effectively set to not less than one half but not more than twice the thickness of the second group of the stripe electrodes 22*b*.

Figure 84:
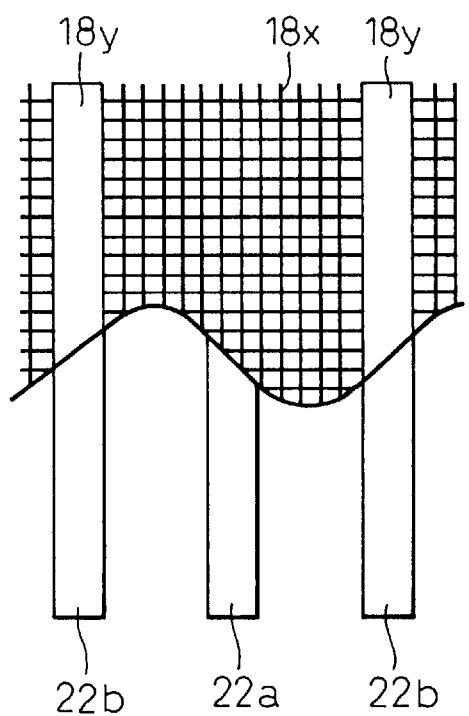
FIG. 84 is a diagram showing a modification of the liquid crystal display apparatus of FIG. 80.

FIG. 84 shows an example in which the high-resistance electrode portion 18*x* and the low-resistance electrode portion 18*y* are constituted by a mesh linear structure. In FIGS. 83 and 84, the part of the drawing above the corrugated line indicates a pattern on the opposed substrate, while the part of the drawing below the corrugated line indicates the pattern on the TFT substrate. The portion corresponding to the second group of the stripe electrodes 22*b* has a thick stripe electrode and is set to a low resistance. In the space therebetween, where thin stripe electrodes are provided, the resistance is so high that the charge is not stored immediately nor the electric field easily formed. The mesh linear structure shown in FIG. 84, on the other hand, permits an electric field to be applied more uniformly than the striped linear structure of FIG. 83. In the high-resistance electrode portion 18*x*, the width of the striped or meshed linear structure is not more than 3 μm, while in the low-resistance electrode portion 18*y*, the striped or meshed linear structure has a width of not less than 3 μm.

Figure 85:
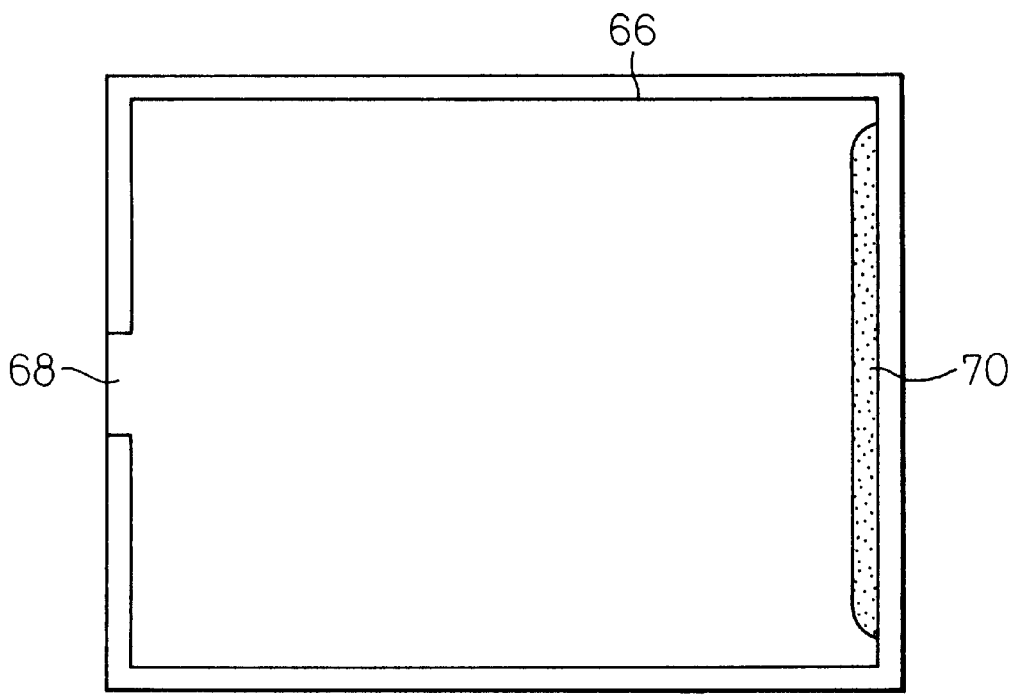
FIG. 85 is a schematic diagram showing the liquid crystal display apparatus for explaining the problems of the liquid crystal display apparatus of FIG. 86.
Figure 86:
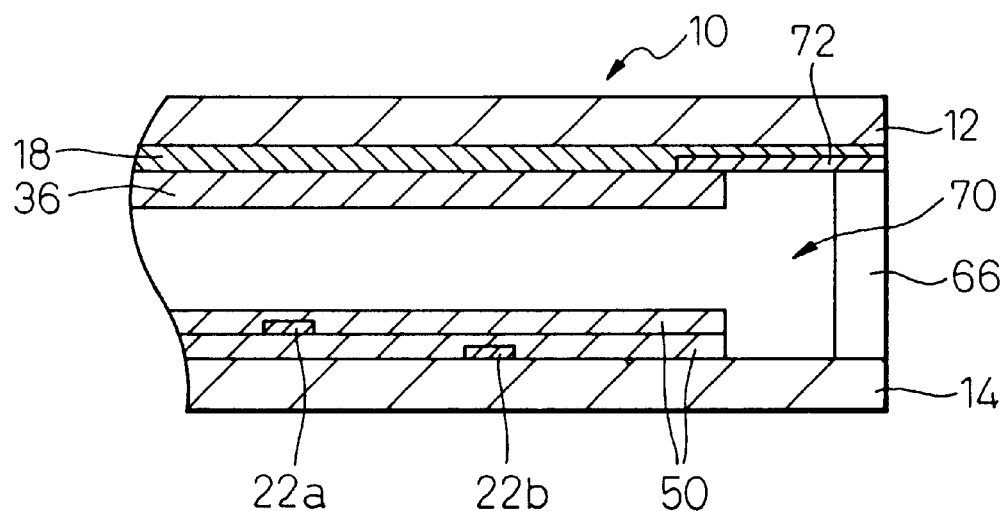
FIG. 86 is a sectional view showing the liquid crystal display apparatus according to an eighth embodiment of the invention.

FIG. 85 is a schematic diagram showing a liquid crystal display apparatus for explaining the problem points of the liquid crystal display apparatus of FIG. 86. The liquid crystal display apparatus includes first and second substrates 12, 14 (see FIG. 1, for example) attached to each other with a peripheral seal 66. The peripheral seal 66 has a liquid injection hole 68 at an end thereof, which is closed after injecting the liquid crystal. The liquid crystal is injected from the liquid crystal injection hole 68, and when it flows toward the end far from the liquid crystal injection hole 68, the impurities flow off from the alignment layer with the liquid crystal and are collected at the end far from the liquid crystal injection hole 68. As a result, the region 70 far from the liquid crystal injection hole 68 may form a display failure region due to a reduced voltage holding rate.

Figure 87:
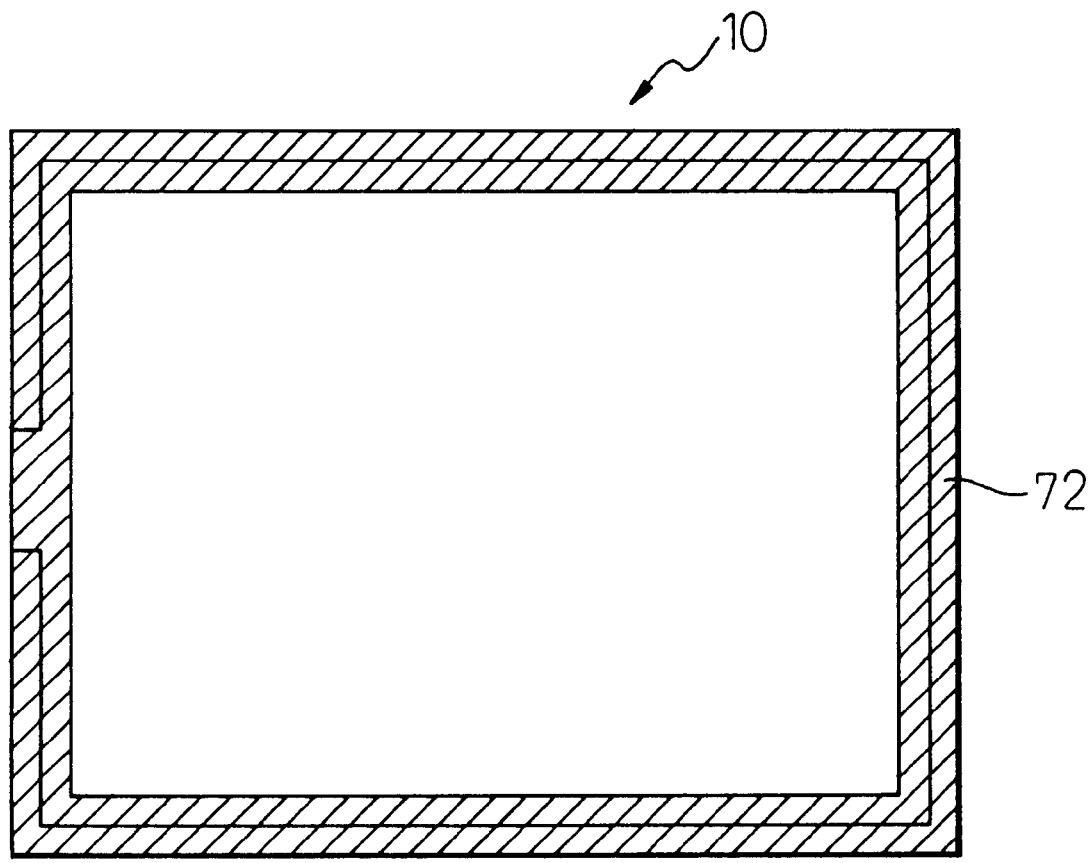
FIG. 87 is a plan view showing the liquid crystal display apparatus of FIG. 86.

FIGS. 86 and 87 are sectional views showing a liquid crystal display apparatus according to an eighth embodiment of the invention. One substrate 12 has a dielectric layer 36, and the other substrate 14 has an insulating layer 50. The dielectric layer 36 and the insulating layer 50 are removed in the region 70 far from the liquid crystal injection hole 68. Thus, the region 70 far from the liquid crystal injection hole 68 constitutes a region having a wide cell space of the liquid crystal cell. Further, a black matrix 72 covers the region 70 far from the liquid crystal injection hole 68, so that the particular region is set to a non-display region.

The dielectric layer 36 is made of the PC403 resin made by JSR and has a thickness of 3 μm to 5 μm. The insulating layer is made of SiN. Thus, the liquid crystal layer 16 has a thickness of 4 μm, while the size of the cell space of the region 70 far from the liquid crystal injection hole 68 is about 8 μm. As a result, the width of the region 70 far from the liquid crystal injection hole 68 can be reduced from 4 mm to 2 mm. Thus, the region 70 far from the liquid crystal injection hole 68 can be covered with the black matrix 72 without changing the area of the display region. The region 70 far from the liquid crystal injection hole 68 can be located adjacently to or in the vicinity of a side in opposed relation to the side having the liquid crystal injection hole 68.

As described above, according to this invention, a liquid crystal display apparatus having a superior viewing angle characteristic free of disclination can be produced.

Figure 88:
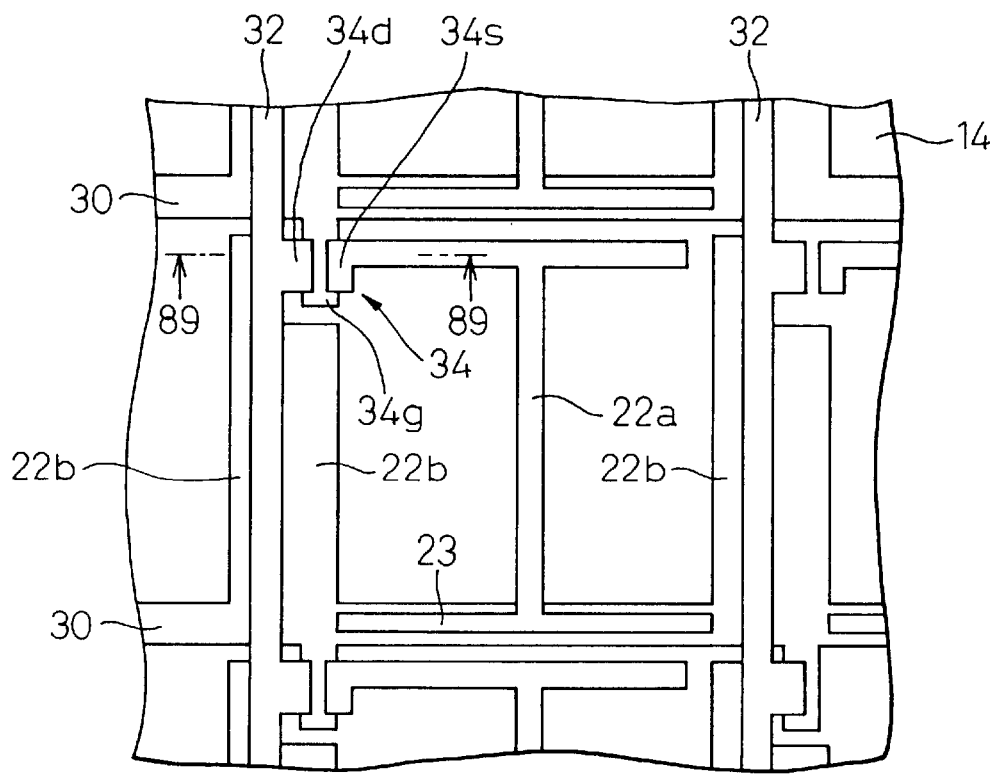
FIG. 88 is a plan view showing the liquid crystal display apparatus according to a ninth embodiment of the invention.

FIG. 88 is a plan view showing a liquid crystal display apparatus according to a ninth embodiment of the invention.

Figure 89:
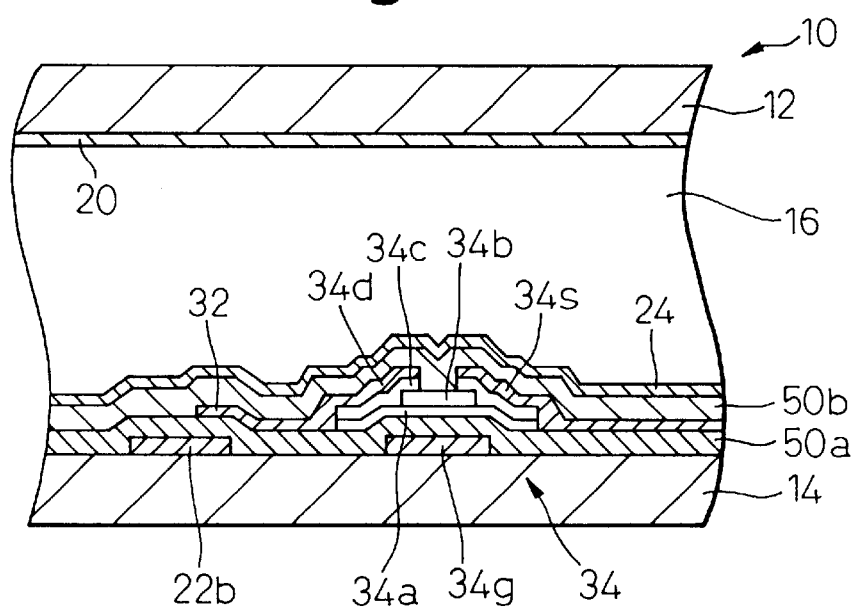
FIG. 89 is a sectional view taken in line 89—89 in FIG. 88.
Figure 90:
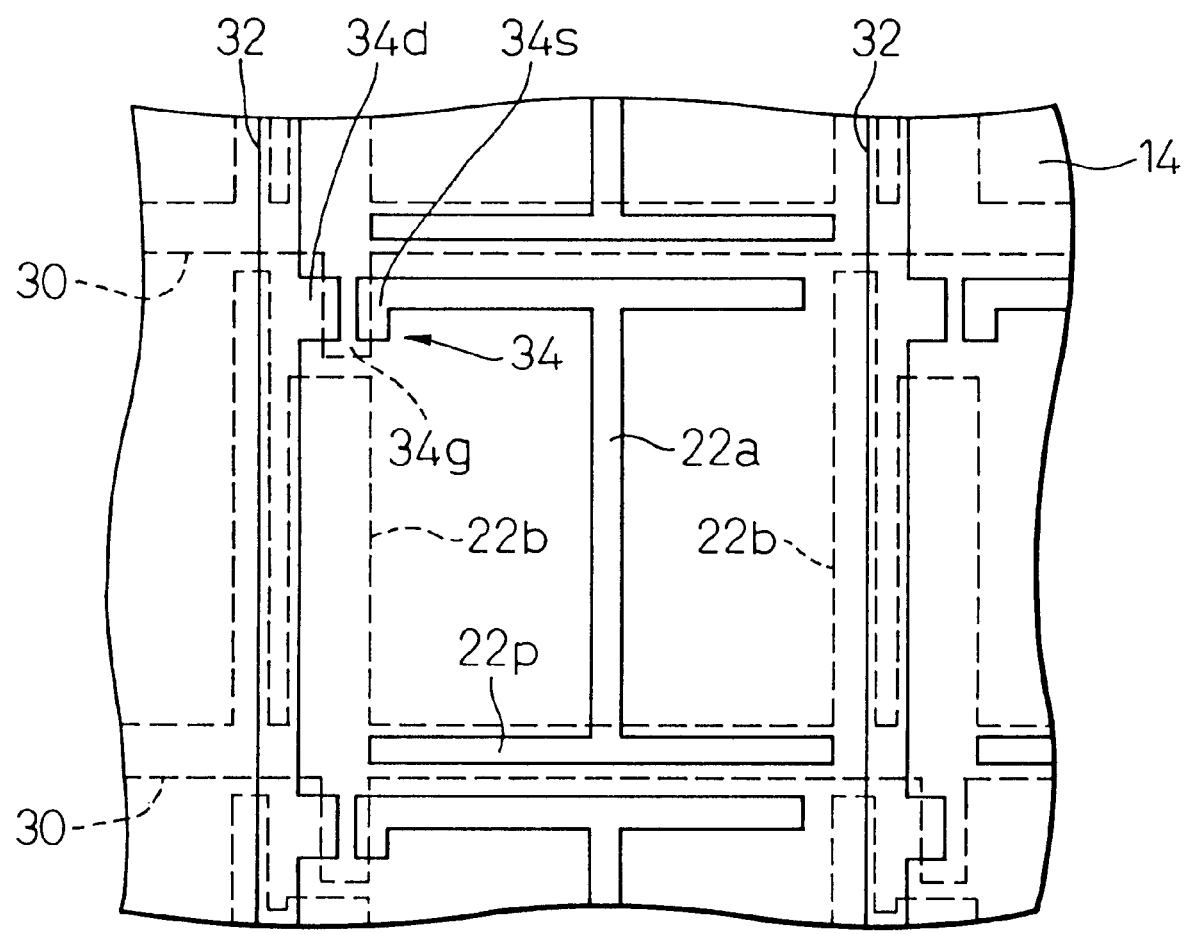
FIG. 90 is a diagram showing the conductive members in the upper and lower layers of the liquid crystal display apparatus of FIG. 88.

FIG. 89 is a sectional view taken along line 89—89 in FIG 88. FIG. 90 is a diagram showing conductive members in the upper and lower layers of the liquid crystal display apparatus.

The liquid crystal display apparatus comprises a pair of glass substrates 12, 14 arranged in opposed relation to each other, a liquid crystal arranged between the glass substrates 12, 14, and polarizers (not shown) arranged on the two sides of the glass substrates 12, 14. The glass substrate 14 is a TFT substrate having a plurality of gate bus lines 30 arranged in parallel to each other, a plurality of data bus lines 32 crossing the gate bus lines 30 at right angles thereto, TFTs 34, a first group of stripe electrode 22a, and a second group of stripe electrodes 22b. The TFT 34 includes a gate electrode 34g, a drain electrode 34d and a source electrode 34s. An auxiliary capacitance electrode 23 is arranged above the gate bus lines 30. The auxiliary capacitance electrode 23 makes up an auxiliary capacitance together with the corresponding gate bus line 30 thereunder A rectangular region defined by the two gate bus lines 30 and the two data bus lines 32 constitutes one pixel region. FIGS. 88 and 90 show one pixel region of the liquid crystal display apparatus. The glass substrate 14 includes 2400 (800×3 (RGB)) pixel regions in horizontal direction and 600 pixel regions in vertical direction. According to this embodiment, one pixel region includes therein one stripe electrode 22a arranged in vertical position at the center thereof, and two stripe electrodes 22b arranged on the horizontal sides thereof. The feature of this embodiment is applicable to the liquid crystal display apparatus not including the solid transparent electrode 18 as shown in FIG. 5 as well as to the liquid crystal display apparatus including the solid transparent electrode as shown in FIG. 1.

In FIG. 90, the solid lines indicate conductive members (electrodes, bus lines, etc.) in the upper layer and the dashed lines indicate conductive members (electrodes, bus lines, etc.) in the lower layer. As shown in FIG. 90, the gate bus lines 30, the gate electrode 34g of the TFT 34 and the second stripe electrodes 22b are formed in the lower layer. The gate electrode 34g is connected to the upper one of the two gate bus lines 30 defining the pixel region, and the second stripe electrodes 22b are connected to the lower gate bus line 30.

As shown in FIG. 89, the inter layer insulating film 50a of SiN is formed on the lower gate bus line 30, the gate electrode 34g of the TFT 34 and the second stripe electrode 22b of the lower layer. The upper conductive members arranged on the layer insulating film 50a include an amorphous silicon film 34a making up the TFT 34, a channel protection film 34b, an amorphous silicon film 34c with impurities introduced therein, a drain electrode 34d and a source electrode 34s.

The drain electrode 34d is connected to the data bus line 32 on the left side of the pixel region. The source electrode 34s is connected to the upper end portion of the first stripe electrode 22a through a portion (the first connection electrode 22c described above) extending in parallel to the gate bus lines 30. Specifically, according to this embodiment, the gate electrode 34g of the TFT 34 is connected electrically to the nth gate bus line 32, the drain electrode 34d is electrically connected to the mth data bus line 32, and the source electrode 34s is electrically connected to the first stripe electrode 22a. The second stripe electrodes 22b are arranged in spaced relation with the first stripe electrode 22a, and electrically connected to the (n+1)th gate bus line.

A protective film 50b of SiN is formed on the conductive members in the upper layer formed with the data bus line 32, the drain electrode 34d, the source electrode 34s, the first stripe electrode 22a and the subsidiary capacitance electrode 23. An alignment layer 24 is formed on the protective, film 50b. The surface of the alignment layer 20 is rubbed in the direction substantially perpendicular to the first stripe electrode 22a.

The glass substrate 12 is also formed with an alignment layer 20. This alignment layer 20 is also rubbed in the same direction as the alignment layer 24. A spherical or cylindrical spacer (not shown) is inserted between the glass substrates 12, 14 to secure a constant space therebetween. In the case of a color liquid crystal display apparatus, a color filter and a black matrix are formed on the glass substrate 12, though not shown in FIG. 89.

Figure 91A:
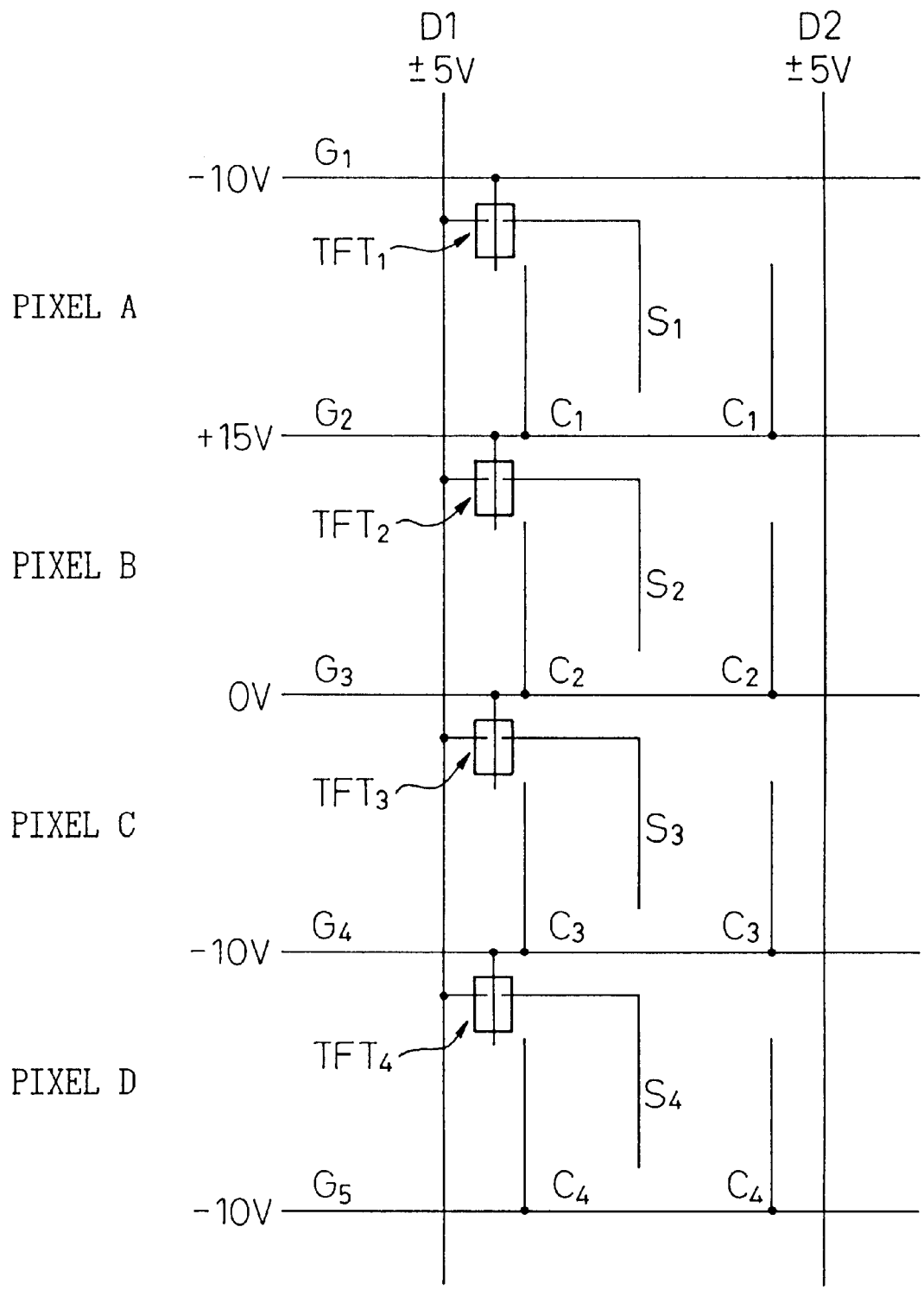
FIG. 91A is a diagram showing a method of driving the liquid crystal display apparatus of FIG. 88.
Figure 91B:
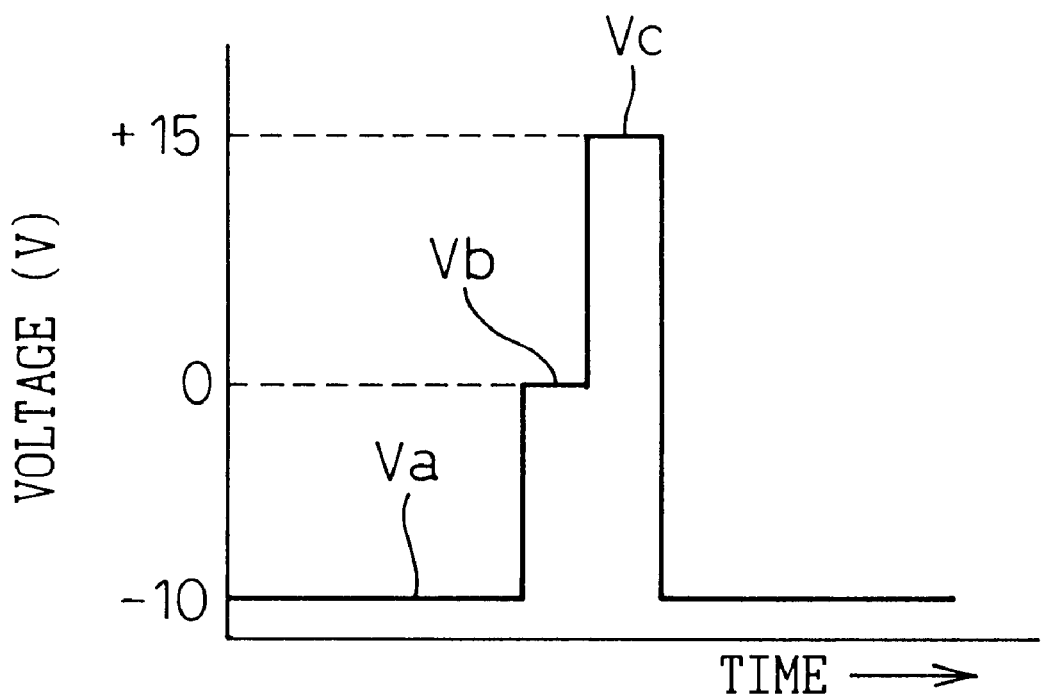
FIG. 91B is a diagram showing the voltage applied to the gate bus lines of the liquid crystal display apparatus of FIG. 88.

FIG. 91A is a diagram showing a method of driving the liquid crystal display apparatus of FIGS. 88 to 90. FIG. 91B is a diagram showing the manner in which a voltage is applied to the gate bus lines 30 of FIGS. 88 to 90. In FIG. 91B, the gate bus lines 30 are supplied, at appropriate timing, with a reference voltage Vb for determining the potential of the second stripe electrodes 22b at the time of writing display data, a first voltage Vc for turning on the TFT 34 and a second voltage Va for turning off the TFT 34.

FIG. 91A shows four pixels arranged in vertical direction. It is assumed that the pixel A is the one immediately after the data is written in, the pixel B is the one in which the data is being written, the pixel C is the one in which the next data is to be written, and the pixel D is the one in which the data is to be written after the pixel C. In FIGS. 88 to 90, the gate bus lines 30 are designated by $G_1$ to $G_5$, the data bus lines 32 by $D_1$, $D_2$, the TFTs 34 by $TFT_1$ to $TFT_4$, the first stripe electrodes 22a by $S_1$ to $S_4$, and the second stripe electrodes 22b by $C_1$ to $C_4$.

In this liquid crystal display apparatus, a plurality of the gate bus lines $G_1$, $G_2$, and so on, arranged in vertical direction are supplied with a scanning signal, sequentially from the top down, at a timing synchronous with the vertical sync signal. The pixel supplied with the scanning signal is supplied with the data signal through the data bus lines $D_1$, $D_2$ and so forth, thus writing a specific display data in a specific pixel.

For writing data in the pixel B, for example, a pulse signal voltage (scanning signal) of +15 V is applied to the gate bus line $G_2$ to turn on the $TFT_2$ for a predetermined length of time. On the other hand, the data bus line $D_1$ is supplied with a voltage of −5 V to +5 V as display data while the $TFT_2$ is on. In the process, the gate bus lines $G_1$, $G_4$, $G_5$ are supplied with a voltage of −10 V to turn off the $TFT_1$, $TFT_4$ of the pixels A and D. Also, the second stripe electrode $C_2$ of the pixel B is set to 0 V. In other words, the gate bus line $G_3$ is turned to 0 V.

When a voltage is applied to the gate bus lines $G_1$ to $G_5$ and the data bus line $D_1$ as shown in FIG. 91A, $TFT_2$ turns on so that the display data (the signal in the range of ±5 V) is written in the first stripe electrode $S_2$. At the same time, in the pixels A and D, both $TFT_1$ and $TFT_4$ are off since the gate bus lines $G_1$ and $G_4$ are both at −10 V Thus, the display data supplied to the data bus line $D_1$ is not written in the pixels A and D.

In the pixel C, on the other hand, the gate voltage of $TFT_3$ is 0 V, and therefore when the voltage of the display data applied to the data bus line $D_1$ is negative, $TFT_3$ turns on so that the display data is written undesirably in the first stripe electrode $S_3$. However, the display data is written in the pixel C during the next vertical sync period. Even in the case where the display data is erroneously written in the pixel C while the display data is written in the pixel B at the same time, therefore, the correct display data is written in the pixel C during the next vertical sync period. Thus, the effect of the erroneous write operation can be substantially ignored.

Upon completion of write operation of the display data in the pixel B, the gate bus line $G_2$ is supplied with a voltage of −10 V, the gate bus line $G_3$ is supplied with a voltage of +15 V and the gate bus line $G_4$ is supplied with a voltage of 0 V during the next vertical sync period. As a result, $TFT_2$ of the pixel B turns off and the first stripe electrode $S_2$ comes to assume what is called a floating state. At the same time, although the voltage of the second stripe electrode $C_2$ turns from 0 V to −10 V, an electric field of an intensity corresponding to the display data written in the first stripe electrode $S_2$ is generated between the first stripe electrode $S_2$ and the second stripe electrode $C_2$. This state is held since the first stripe electrode $S_2$ is floating. Thus, the liquid crystal molecules of the pixel B are aligned in the direction corresponding to the direction and intensity of the electric field thereby to determine the transmittance of the pixel B. The electric field intensity between the first stripe electrode $S_2$ and the second stripe electrode $C_2$ is held until the gate bus line $G_2$ comes to assume 0 V.

In this embodiment, the voltage difference between the first stripe electrodes 22a ($S_1$, $S_2$, and so on) and the second stripe electrodes 22b, 22b ($C_1$, $C_2$, and so on) is varied between the data write operation and the data holding period. Nevertheless, assuming that there are 600 gate bus lines, for example, the same voltage difference is held during the time corresponding to 598/600 of one frame period, and therefore the deterioration of the display quality due to the change in the voltage difference between the first stripe electrodes 22a ($S_1$, $S_2$, and so on) and the second stripe electrodes 22b, 22b ($C_1$, $C_2$, and so on) can be ignored substantially.

In the liquid crystal display apparatus according to this embodiment, the second stripe electrodes 22b are connected to the gate bus lines 30, and therefore common lines (such as designated by 40 in FIG. 20) required in the prior art is not required for keeping a constant potential of the second stripe electrodes 22b. Thus, the portion of the pixel region contributing to the display is correspondingly increased for a higher aperture ratio. In this way, a bright display of an image is made possible with a high contrast.

Also, according to this embodiment, the second stripe electrodes 22b are formed in partially overlapped relation with the data bus lines 32, thereby leading to the advantage that no light leaks from between the second stripe electrodes 22b and the data bus lines 32.

The first stripe electrodes 22a and the second stripe electrodes 22b are both formed desirably as conductive members of the upper layer. As an alternative, the second stripe electrodes 22b can be formed as a conductive member of the lower layer. In the case where the second stripe electrodes 22b are formed as a conductive member of the lower layer, the second stripe electrodes 22b are desirably formed in partially overlapped relation with the data bus lines 32. This makes it possible to avoid the light leakage from the gap between the second stripe electrodes 22b and the data bus lines 32.

Figure 92:
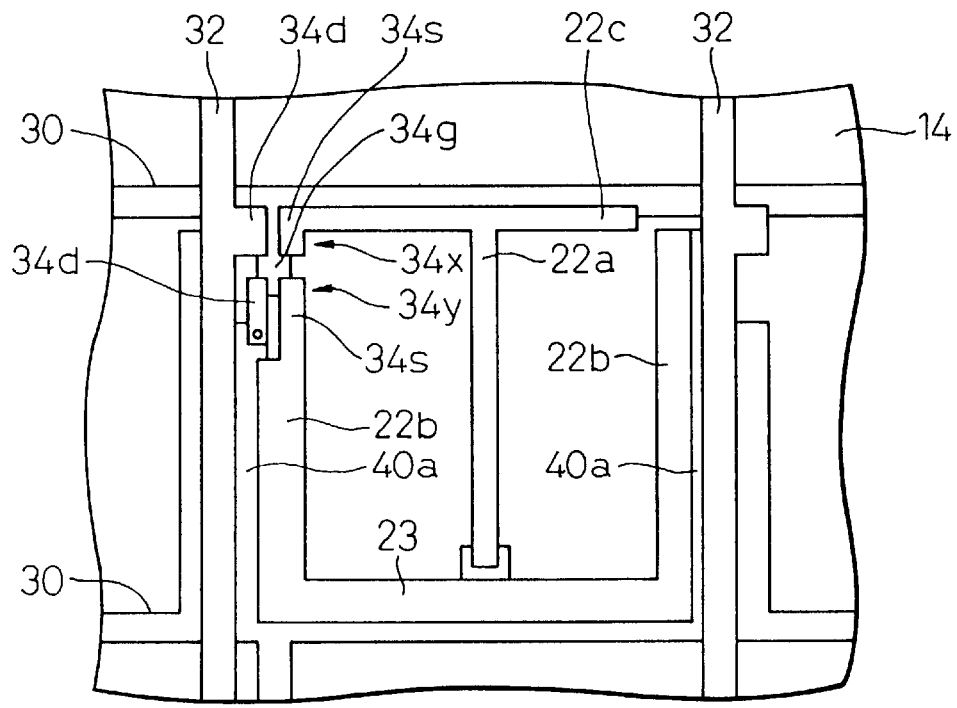
FIG. 92 is a plan view showing a modification of the liquid crystal display apparatus of FIG. 88.
Figure 93:
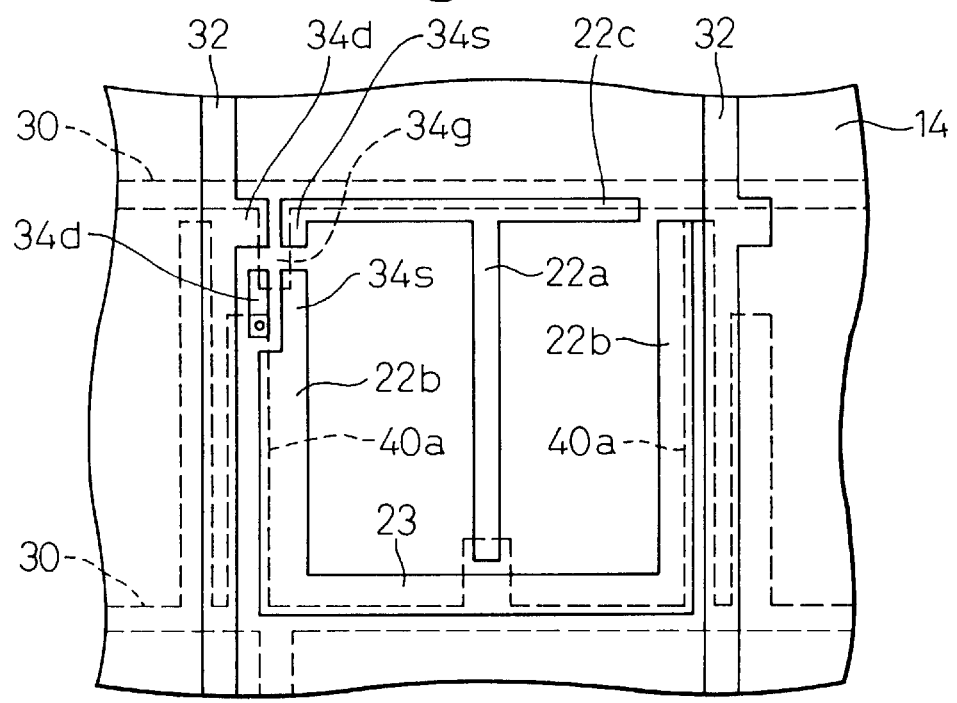
FIG. 93 is a diagram showing the conductive members in the upper and lower layers of the liquid crystal display apparatus of FIG. 92.

FIG. 92 is a plan view showing a modification of the liquid crystal display apparatus of FIG. 88. FIG. 93 is a diagram showing conductive members in the upper and lower layers of the liquid crystal display apparatus. In FIG. 93, the solid lines indicate the conductive members of the upper layer, and the dashed lines indicate the conductive members of the lower layer. This embodiment, though basically similar to the embodiment of FIGS. 88 to 90, is different in that each pixel region includes first and second TFTs 34x, 34y. The first and second TFTs 34x, 34y are arranged in proximity to each other at the upper left portion of each pixel region.

The first and second TFTs 34x, 34y each include a gate electrode 34g, a drain electrode 34d and a source electrode 34s. The gate electrode 34g extends long from the upper gate bus line 30 and is shared by the first and second TFTs 34x, 34y. The drain electrode 34d of the first TFT 34x is connected to the data bus lines 32, and the source electrode 34s of the first TFT 34x is connected to the first stripe electrode 22a.

The drain electrode 34d of the second TFT 34y is connected to the lower gate bus line 30 through common lines 40a, and the source electrode 34s of the second TFT 34y is connected to the second stripe electrodes 22b. The common lines 40a extend downward of the drain electrode 34d of the second TFT 34y in parallel to the drain bus line 32 from the lower gate bus line 30, and is connected to the drain electrode 34d by a through hole.

In this embodiment, the conductive members of the lower layer include the gate bus line 30, the gate electrode 34g shared by the first and second TFTs 34x, 34y, and the common lines 40a. The conductive members of the upper layer, on the other hand, include the data bus line 32, the drain electrode 34d and the source electrode 34s of the first and second TFTs 34x, 34y, the first stripe electrode 22a, the second stripe electrode 22b and the subsidiary capacitance electrode 23. The source electrode 34s of the first TFT 34x is partially overlapped with the upper gate bus line 30 of the pixel region, and the left common line 40a is partially overlapped with the left data bus line 32 and the second stripe electrode 22b. The right common line 40a, on the other hand, is partially overlapped with the right data bus line 32 and the second stripe electrode 22b, and the subsidiary capacitance electrode 23 is partially overlapped with the lower gate bus line 30.

Figure 94:
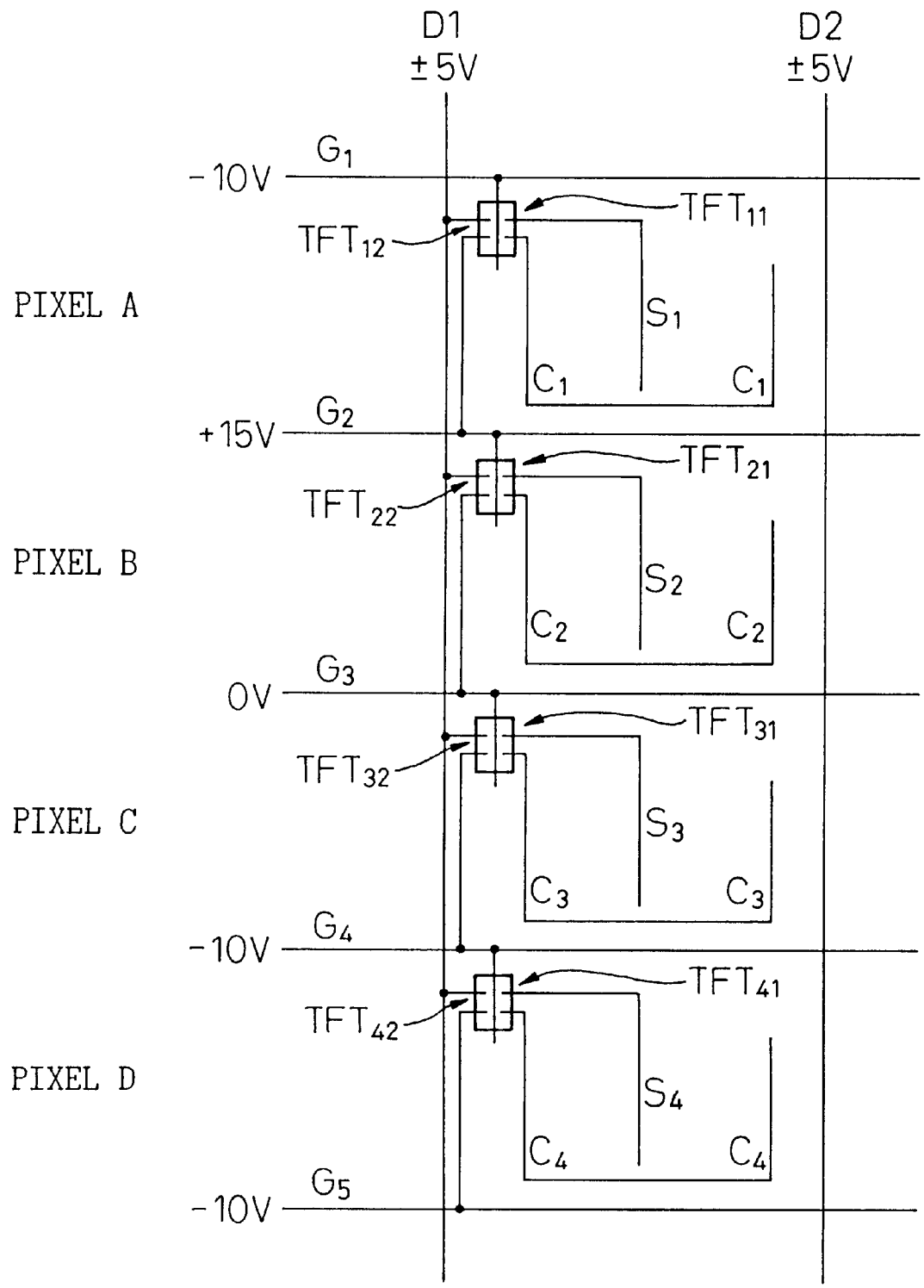
FIG. 94 is a diagram showing a method of driving the liquid crystal display apparatus of FIG. 82.

FIG. 94 is a diagram showing a method of driving the liquid crystal display apparatus of FIGS. 92 and 93. Four pixels are shown in vertical juxtaposition. The gate bus lines 30 are supplied with the voltage shown in FIG. 91B. Assume that the pixel A is the one immediately after the data is written in, the pixel B the one in which the data is being written, the pixel C the one in which the next data is written, and the pixel D is the one in which the data is written after the pixel C. In FIG. 94, the $TFT_{11}$, $TFT_{12}$, ..., $TFT_{41}$, $TFT_{42}$ represent the first and second TFTs 34x, 34y of the respective pixels.

For writing data in the pixel B, for example, a pulse signal (scanning signal) voltage of +15 V is applied to the gate bus line $G_2$ to turn on the $TFT_{21}$ and the $TFT_{22}$ for a predetermined length of time. On the other hand, the data bus line $D_1$ is supplied with a voltage in the range of −5 V to +5 V as display data while the $TFT_{21}$ and the $TFT_{22}$ are on. In the process, in order to turn off the $TFT_{11}$, the $TFT_{12}$, the $TFT_{41}$ and the $TFT_{42}$ of the pixels A and D, the gate bus lines $G_1$, $G_4$ are supplied with a voltage of −10 V. Also, in order to reduce the second stripe electrode $C_2$ of pixel B to 0 V, the voltage of the gate bus line $G_3$ is reduced to 0 V.

When the gate bus lines $G_1$ to $G_5$ and the data bus line $D_1$ are supplied with a voltage as shown in FIG. 94, the $TFT_{21}$ and the $TFT_{22}$ turn on and the first stripe electrode $S_2$ is supplied with display data (the signal in the range of ±5 V), while the second stripe electrode $C_2$ is supplied with 0 V. As a result, an electric field parallel to the substrate is generated between the first stripe electrode $S_2$ and the second stripe electrode $C_2$, so that the direction of alignment of the liquid crystal molecules of the pixel B changes and the transmittance of the pixel B changes in accordance with the field intensity between the first stripe electrode $S_2$ and the second stripe electrode $C_2$.

In the process, the $TFT_{11}$, the $TFT_{12}$, the $TFT_{41}$ and the $TFT_{42}$ of the pixels A and D are all off since the gate bus lines $G_1$ and $G_4$ are both at –10 V. Thus the display data supplied to the data bus line $D_1$ are not written in the pixels A and D.

In the pixel C, on the other hand, the gate voltage of the $TFT_{31}$ and the $TFT_{32}$ is 0 V. In the case where the voltage of the display data supplied to the data bus line $D_1$ is negative, therefore, the $TFT_3$ and the $TFT_{32}$ turn on, so that the display data is undesirably written in the first stripe electrode $S_3$. During the next vertical sync period, however, the display data is written in the pixel C. Even in the case where the display data is erroneously written in the pixel C at the same time that the display data is written in the pixel B, therefore, the correct display data is written in the pixel C during the next vertical sync period, and therefore the effect of the erroneous write operation can be substantially ignored.

Upon complete write operation of the display data into the pixel B, a voltage of –10 V is supplied to the gate bus line $G_2$, a voltage of +15 V is supplied to the gate bus line $G_3$ and the voltage of 0 V is supplied to the gate bus line $G_4$ during the next vertical sync period.

As a result, the $TFT_{21}$ and the $TFT_{22}$ of the pixel B turn off, so that the first stripe electrode $S_2$ and the second stripe electrode $C_2$ enter a floating state. Thus, the electrodes $S_2$ and $C_2$ hold the charge for the data write operation.

According to this embodiment, the second TFT 34y ($TFT_{12}$, $TFT_{22}$, and so forth) is turned on and the voltage of the second stripe electrode 22b is set to 0 V only at the time of data write operation, and upon complete write operation, the second TFT 34y is turned off so that the second stripe electrodes 22b are separated electrically from the gate bus lines 30. As a result, in addition to the effect similar to that of the preceding embodiment, the advantage is that the potential variation between the data write operation and the data holding time can be avoided.

Also, according to this embodiment, the source electrode 34s is partially overlapped with the upper gate bus line 30 of the pixel region, the left common line 40a is partially overlapped with the left data bus line 32 and the second stripe electrode 22b, the right common line 40a is partially overlapped with the right data bus line 32 and the second stripe electrode 32b, and the subsidiary capacitance electrode 23 is partially overlapped with the lower gate bus line 30. Therefore, the light leakage from the region in the vicinity of the data bus lines 32 and the gate bus lines 30 can be avoided more accurately.

Further, according to this embodiment, only the alignment layer is formed on the first stripe electrodes 22a and the second stripe electrodes 22b. Therefore, the electric field is easily exerted on the liquid crystal as compared with the preceding embodiment in which a protective film (insulating film) exists between the second stripe electrodes 22b and the alignment layer, thereby leading to the advantage of avoiding the display deterioration which otherwise might be caused by the charge accumulated in the boundary between the insulating film and the alignment layer on the electrode.

Figure 95:
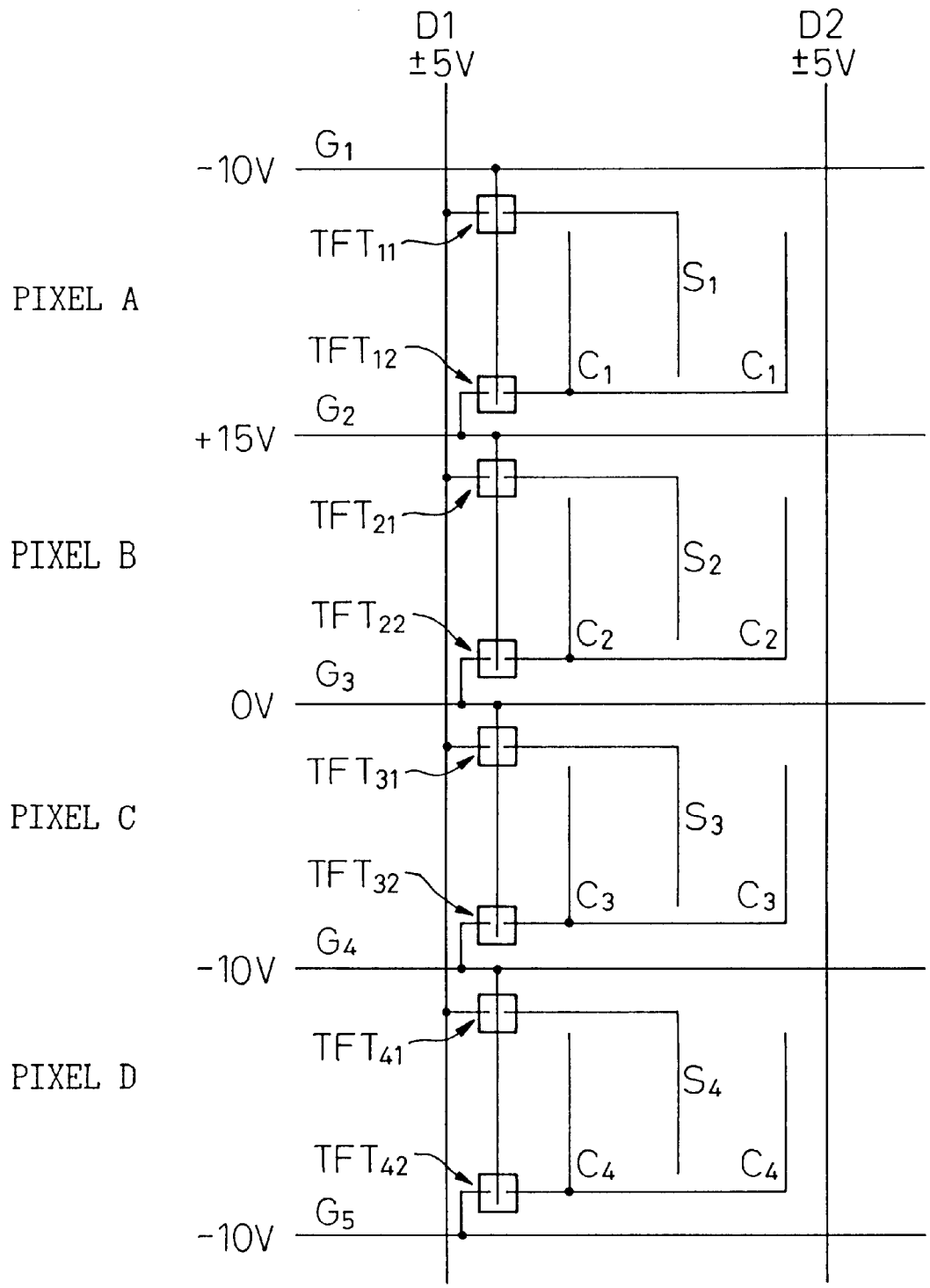
FIG. 95 is a diagram showing a modification of the method of driving the liquid crystal display apparatus.

FIG. 95 is a diagram showing a modification of the method of driving the liquid crystal display apparatus of FIG. 94. In this example, the TFTs ($TFT_{11}$, $TFT_{21}$, $TFT_{31}$, $TFT_{41}$) interposed between the data busline (D1) and the first stripe electrodes (S1, S2, and so forth) are arranged in the upper left portion, while the TFTs ($TFT_{12}$, $TFT_{22}$, $TFT_{32}$, $TFT_{42}$) interposed between the gate bus lines (G1, G2 and so forth) and the second stripe electrodes (C1, C2, and so forth) are arranged in the lower left portion of the pixel region. The operation of this liquid crystal display apparatus is the same as that of the preceding embodiment.

In the liquid crystal display apparatus having this configuration, a thin film transistor is connected between the second stripe electrode and the gate bus lines. Thus, the voltage change of the second stripe electrodes is avoided at the time of the data write operation and the data holding time. Also, in this liquid crystal display apparatus, the second stripe electrodes are normally formed in the same layer as the source electrode of the second thin film transistor, i.e. as a conductive member of the upper layer. In such a case, a common line for connecting the gate bus lines and the drain electrode of the second thin film transistor is required as a conductive member of the lower layer. By forming this common line in such a manner that the data bus lines and the second stripe electrodes are partially overlapped with each other, the light leakage from the gap between the data bus lines and the second stripe electrodes can be shielded.

By this driving method, the liquid crystal display apparatus can be driven with an improved aperture ratio without the common line.

Figure 96:
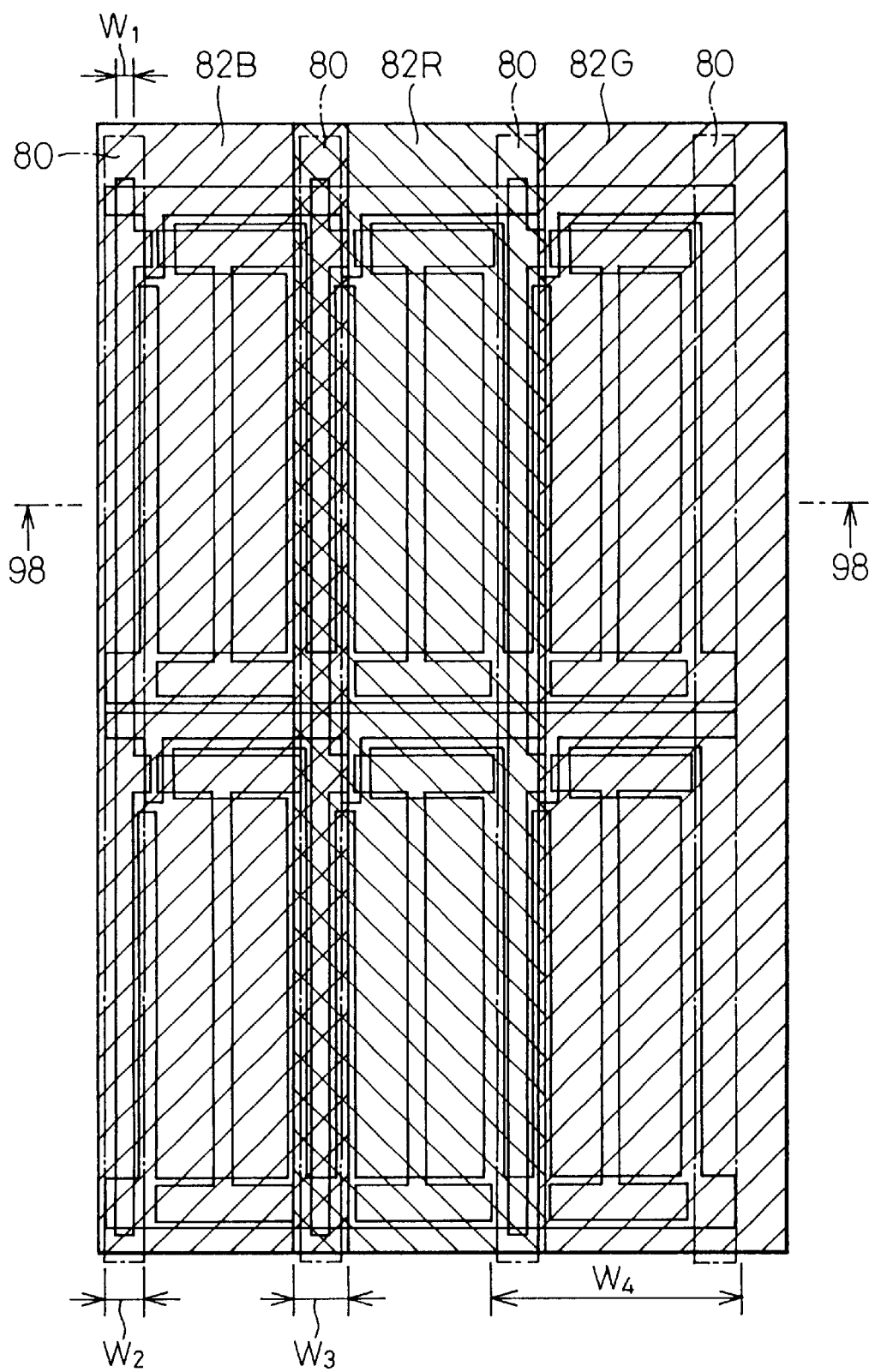
FIG. 96 is a plan showing the liquid crystal display apparatus according to still another embodiment of the invention.
Figure 97:
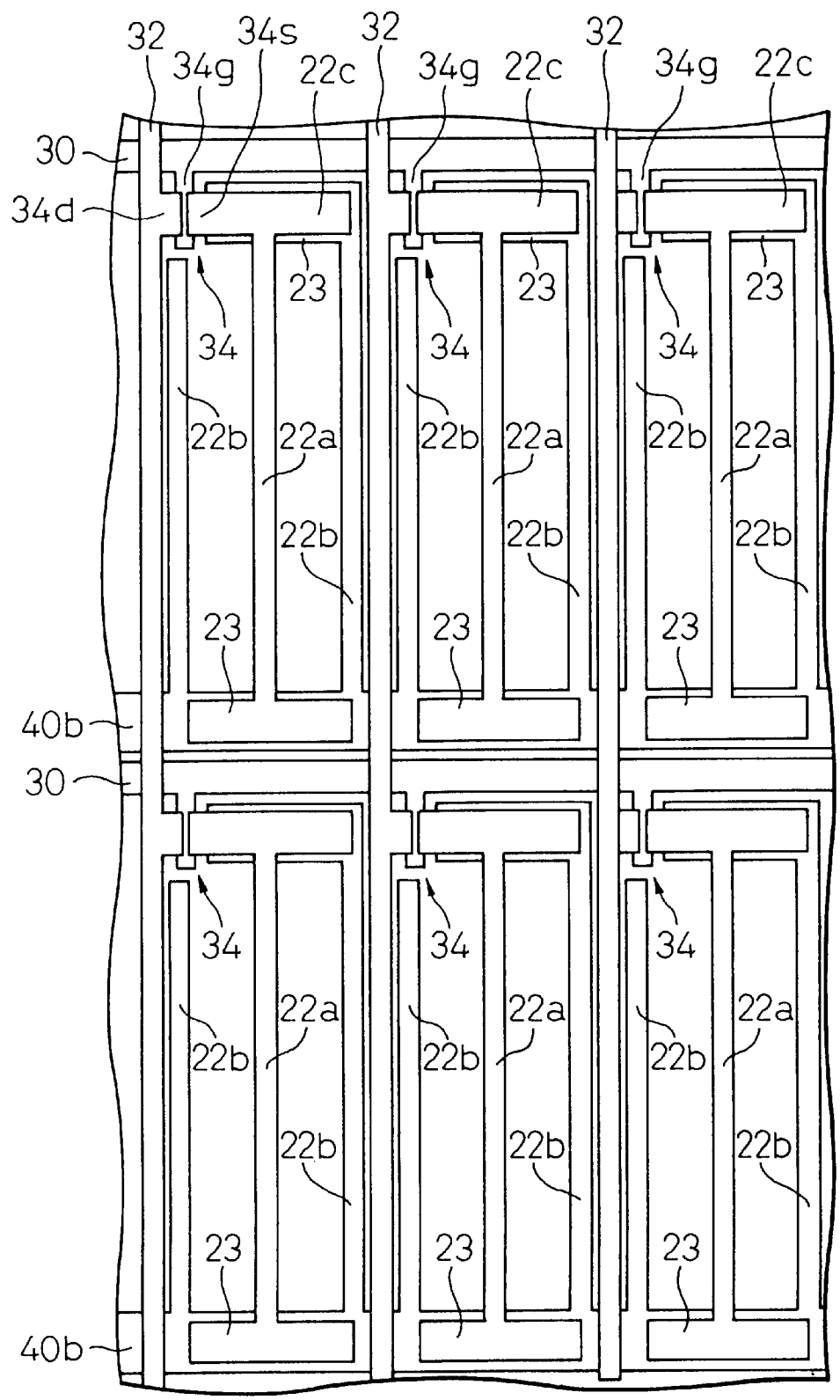
FIG. 97 is a diagram showing a pattern of the conductive layer of the lower glass substrate of FIG. 96.
Figure 98:
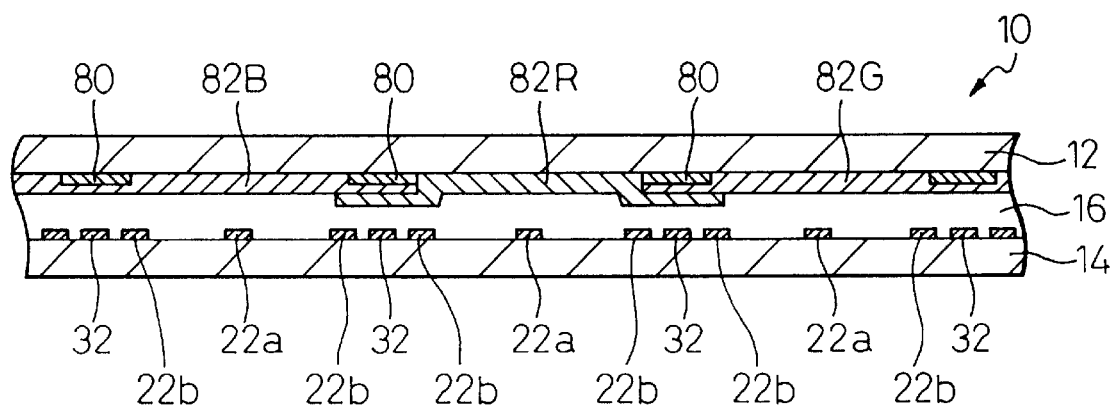
FIG. 98 is a sectional view taken in line 97—97 in FIG. 96.

FIG. 96 is a plan view showing a liquid crystal display apparatus according to another embodiment of the invention, FIG. 97 is a plan view showing a pattern of the conductive layer of the lower glass substrate of FIG. 96, and FIG. 98 is a sectional view taken in line 98—98 in FIG. 96. The liquid crystal display apparatus according to this embodiment comprises a pair of glass substrates 12, 14, a liquid crystal 16 arranged between the glass substrates 12, 14, and a polarizer (not shown).

The glass substrate 14 includes a plurality of gate bus lines 30 arranged in parallel to each other, common bus lines 40b arranged in parallel to the gate bus lines 30, and a plurality of data bus lines 32 crossing at right angles to the gate bus lines 30. A plurality of rectangular regions defined by the gate bus lines 30 and the data bus lines 32 constitute pixel regions. The pixel regions are arranged at pitches of 100 μm in horizontal direction and at pitches of 300 μm in vertical direction, for example.

Each pixel region includes a TFT 34, a first stripe electrode 22a, a second stripe electrode 22b and subsidiary capacitance electrodes 23 arranged at the upper and lower ends of the pixel regions. The gate bus lines 30, the common bus lines 40b, the gate electrode 34g of the TFT 34, the second stripe electrode 22b and the subsidiary capacitance electrodes 23 are formed in the lower conductive layer. The gate electrode 34g of the TFT 34 is connected to the gate bus lines 30, the second stripe electrodes 22b are all connected to the common bus lines 40b, and the subsidiary capacitance electrodes 23 are connected to the upper end of the second stripe electrodes 22b.

On the other hand, the data bus lines 30, the drain electrode 34d and the source electrode 34s of the TFT 34, the first stripe electrode 22a and the subsidiary capacitance electrodes 23 are all formed in the upper conductive layer. The drain electrode 34d is connected to the data bus lines 32, the source electrode 34s extends in horizontal direction and is connected to the first stripe electrode 22a, and the subsidiary capacitance electrodes 23 are connected to the lower end of the first stripe electrode 22a.

An interlayer insulating film (not shown) is formed between the conductive layer constituting the lower layer and the conductive layer making up the upper layer, and an alignment layer (not shown) is formed on the conductive layer making up the upper layer. The subsidiary capacitance electrode 23 with the source electrode 34s above them and the subsidiary capacitance electrode 23 with the common bus lines 40b above it each constitute an subsidiary capacitance.

Also, a black matrix 80 made of chromium oxide, or a like metal, or a metal compound low in reflectance, is formed on the inner side of the glass substrate 12 in parallel to the data bus lines 32. In this example, the width W1 of the data bus line 32 is 4 μm, and the width W2 of the black matrix 80 is set to 8 μm. Also, a blue color filter 82B, a red color filter 82R and a green color filter 82G are formed on the inner surface side of the glass substrate 12. In this example, the blue color filter 82B is formed in the pixel region in the column 3n (n: 1, 2, and so forth), the red color filter 82R is formed in the pixel region in the column 3n+1, and the green color filter 82G is formed in the pixel region in the column 3n+2, for example. The width W4 of the color filters 82R, 82G, 82B is 110 μm.

As shown in FIG. 98, the color filters 82B, 82R, 82G extend somewhat to the adjacent pixel under the black matrix 80. More specifically, the blue and green color filters 82B, 82G are overlapped with each other, the blue and red color filters 82B, 82R are overlapped with each other, or the green and red color filters 82G, 82R are overlapped with each other under the black matrix 80. The width W3 of each overlapped portion of the two color filters is 10 μm, which is set larger than the width W2 of the black matrix 51. The thickness of the color filters 82B, 82R, 82G is 0.1 to 2 μm. In this particular case, the thickness of the color filters 82B, 82R, 82G is assumed to be 1 μm.

Figure 99:
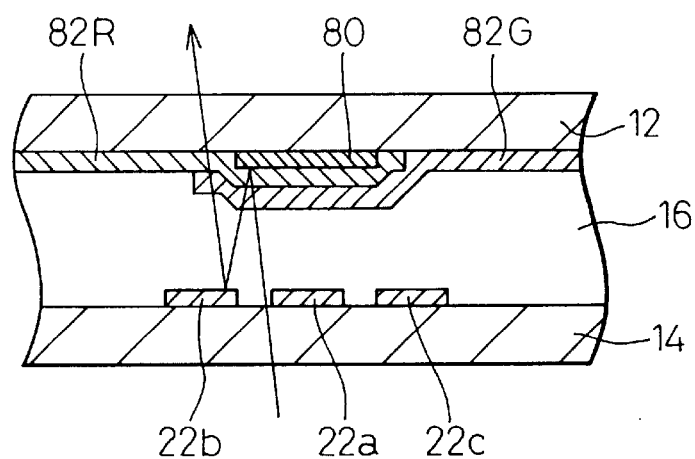
FIG. 99 is a diagram for explaining the operation of the liquid crystal display apparatus of FIG. 88.

With reference to FIG. 99, the effects of the embodiment will be explained. In the case of this liquid crystal display apparatus, the direction of alignment of the liquid crystal molecules is controlled by the electric field between the first stripe electrodes 22a and the second stripe electrodes 22b. The direction of alignment of the liquid crystal molecules existing between the second stripe electrodes 22b and the data bus line 32 on the left side thereof and between the second stripe electrodes 22b and the data bus line 32 on the right side thereof, however, cannot be controlled by the electric field between the first stripe electrodes 22a and the second stripe electrodes 22b. Therefore, the light entering the liquid crystal layer from the gap between them (about 2 μm wide) is liable to leak through the opposite side.

In this embodiment, two color filters of different colors (the color filters 82R, 82G in FIG. 99) are overlapped under the black matrix 80. If the light entering from the lower side of the glass substrate 14 leaks through the glass substrate 12, therefore, the particular leaking light follows the route indicated by the arrow in FIG. 99. Specifically, the light that has entered the liquid crystal layer from the gap between the second stripe electrode 22b and the data bus line 32 is transmitted through the overlapped portion of the color filters 82R, 82G, and reflected on the surface of the black matrix 80. The reflected light is reflected on the second stripe electrode 22b through the overlapped portion of the color filters 82R, 82G. This reflected light is emitted to the glass substrate 12 through the color filters 82R, 82G. In this case, the leaking light passes through the overlapped portion of the color filters 82R, 82G three times.

The cold cathode ray tube generally used as a backlight of the liquid crystal display apparatus has high peaks at wavelengths corresponding to red, green and blue, and the light transmitted through the red color filter 82R is liable to be absorbed into the green or blue color filter 82G, 82B. In a similar fashion, the light transmitted through the green color filter 82G is liable to be absorbed into the red or blue color filter 82R, 82B, while the light transmitted through the blue color filter 82B is liable to be absorbed into the red or green color filter 82R, 82G. Thus, in the liquid crystal display apparatus according to this embodiment, the intensity of the leaking light is extremely reduced and a reduction in display quality is avoided.

Figure 100:
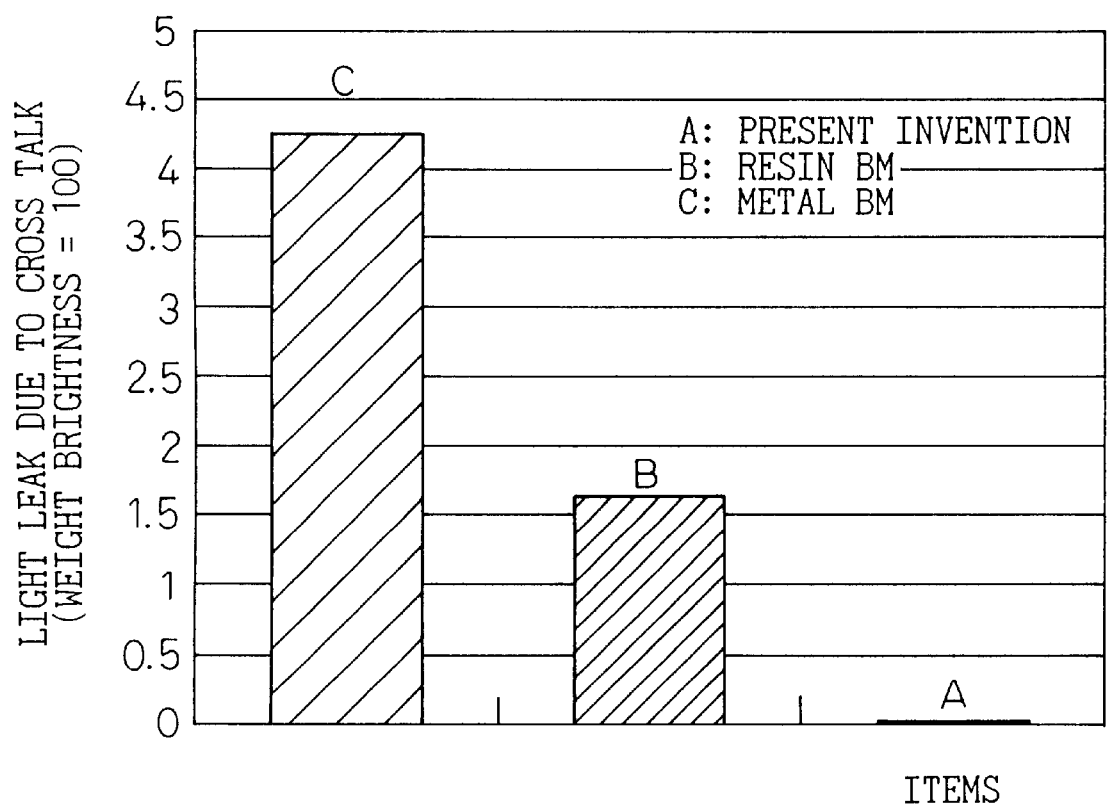
FIG. 100 is a diagram showing the result of measuring the light leakage amount due to the crosstalks in the liquid crystal display apparatus of FIG. 88, the conventional liquid crystal display apparatus with the black matrix formed of a metal film, and the conventional liquid crystal display apparatus with the black matrix formed of a resin film.

FIG. 100 is a diagram showing the result of measuring the light leakage amount due to crosstalk in the liquid crystal display apparatus A according to this embodiment, a conventional liquid crystal display apparatus C comprising the black matrix made of a metal film, and a conventional liquid crystal display apparatus B comprising a black matrix formed of resin. The brightness of the white display portion is assumed to be 100. As shown in FIG. 100, as compared with the brightness of about 4.3 for the metal black matrix and the brightness of about 1.6 for the resin black matrix, the brightness of the present embodiment A is a very low 0.1 or less. This clearly shows that the present embodiment is very effective in reducing crosstalk.

As described above, the feature of the present embodiment resides in the black matrix 80, of a metal or a metal compound for shielding between the pixel regions and the color filters 82R, 82G, 82B for determining the color of the light transmitted for each pixel region. Another feature is the fact that the color filters 82R, 82G, 82B extend from a pixel region to the adjacent pixel region over the black matrix 80, the black matrix 80 is covered with at least two color filters and the width W3 of the overlapped portion of the two color filters is larger than the width W2 of the black matrix.

In this configuration, the amount of light reflected onto the black matrix can be considerably reduced by overlapping at least two color filters on the black matrix. The overlapped portion of the color filters is used as a part of the black matrix, and therefore, the crosstalk stemming from the reflection on the black matrix can be prevented while avoiding an increase in the number of the manufacturing steps. The feature of this embodiment also lies in its applicability not only to the liquid crystal display apparatus having the first and second stripe electrodes 22a, 22b but also to the TN-type liquid crystal display apparatus having an subsidiary capacitance electrode made of a metal.

With a liquid crystal display apparatus with pixels having the color filters of the same color juxtaposed in vertical direction, the color filters are in stripes of RGB, and the overlapped portions of the color filters are parallel to the data bus lines. In the case of the liquid crystal display apparatus having the first and second stripe electrodes 22a, 22b, on the other hand, the crosstalk stemming from the reflection on the black matrix can be more positively prevented by extending the overlapped portion of the color filters over the second stripe electrode.

Figure 107:
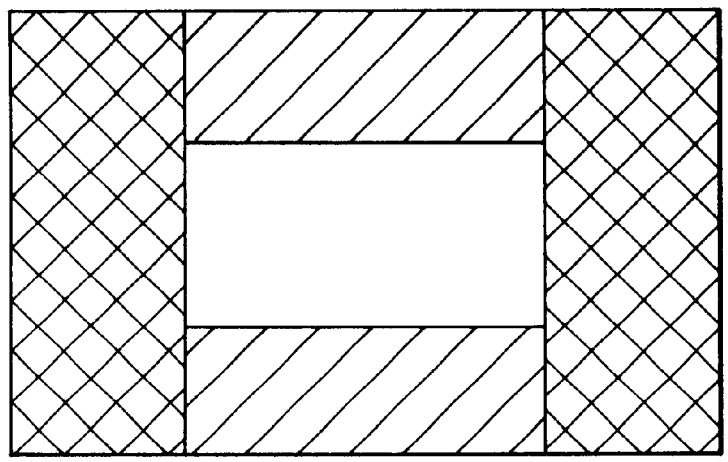
FIG. 107 is a schematic diagram for explaining the generation of crosstalks.
Figure 108:
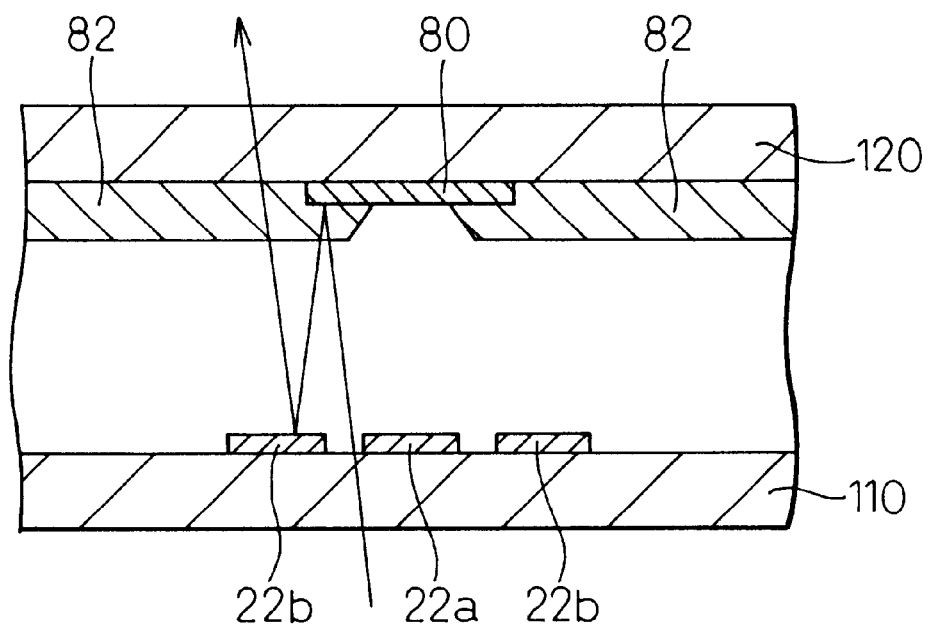
FIG. 108 is a sectional view of FIG. 107.

FIGS. 107 and 108 are diagrams for explaining the generation of crosstalk. In the case where a white rectangle is displayed on the black background, for example, a white band is generated at the upper and lower portions (portions hatched in the drawing) of the white rectangle as shown in FIG. 107. This phenomenon is conspicuous especially when the image is viewed in an oblique direction. As shown in FIG. 108, this phenomenon occurs due to the fact that the light transmitted through the gap between the second stripe electrode 22b and the data bus line 32 is transmitted through the liquid crystal display apparatus In the case where black is displayed over the whole screen, the voltage of the data bus lines 32 is substantially equal to the voltage of the second stripe electrodes 22b. The electric field is not applied to the liquid crystal between the data bus lines 32 and the second stripe electrodes 22b, and therefore no light leaks. In the case where a white rectangle is displayed on the black background, in contrast, a voltage is applied to the data bus lines and therefore an electric field is generated between the second stripe electrodes 22b and the data bus lines 32a in the regions above and below the portion where the white rectangle is displayed. Thus, the liquid crystal molecules are aligned along this electric field.

Thus, as shown in FIG. 108, the polarized light that has entered the liquid crystal layer from the lower side of the substrate 14 is reflected on the surface of the black matrix 80, and further reflected on the surface of the second stripe electrodes 22b, and passes through the color filter 82 and the glass substrate 12. This leaking light makes a whitish portion which should be displayed in black. This phenomenon is called crosstalk.

In order to prevent crosstalk, a resin mixed with a black pigment may be used to form the black matrix. The black matrix made of resin is low in light absorption rate, and therefore does not have a sufficient effect of preventing the light leakage, thereby posing the problem that the contrast becomes low as a whole. In another method, a resin black matrix is laid over the metal black matrix. This method, however, complicates the process due to an increased number of steps resulting in a higher manufacturing cost.

Figure 109:
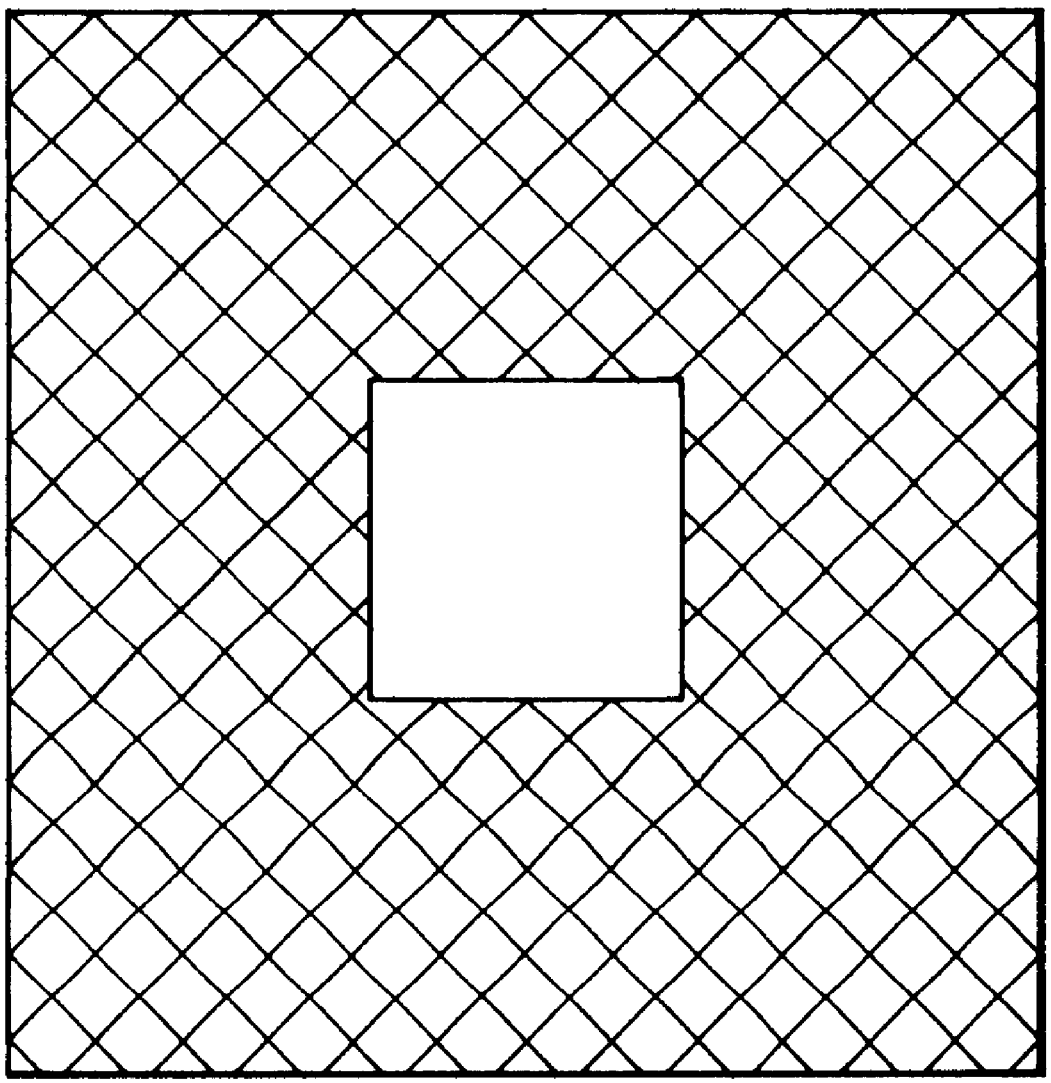
FIG. 109 is a plan view showing an example of a display pattern which conspicuously generates the image sticking of the screen.

The TN-type liquid crystal display apparatus is also accompanied by the phenomenon of image sticking. In this phenomenon, if it is supposed that after a white rectangle is displayed on the black background for a long time and the whole surface is switched to a halftone (gray) display, as shown in FIG. 109, for example, the portion displayed in black and the portion displayed in white are different in brightness.

Figure 101:
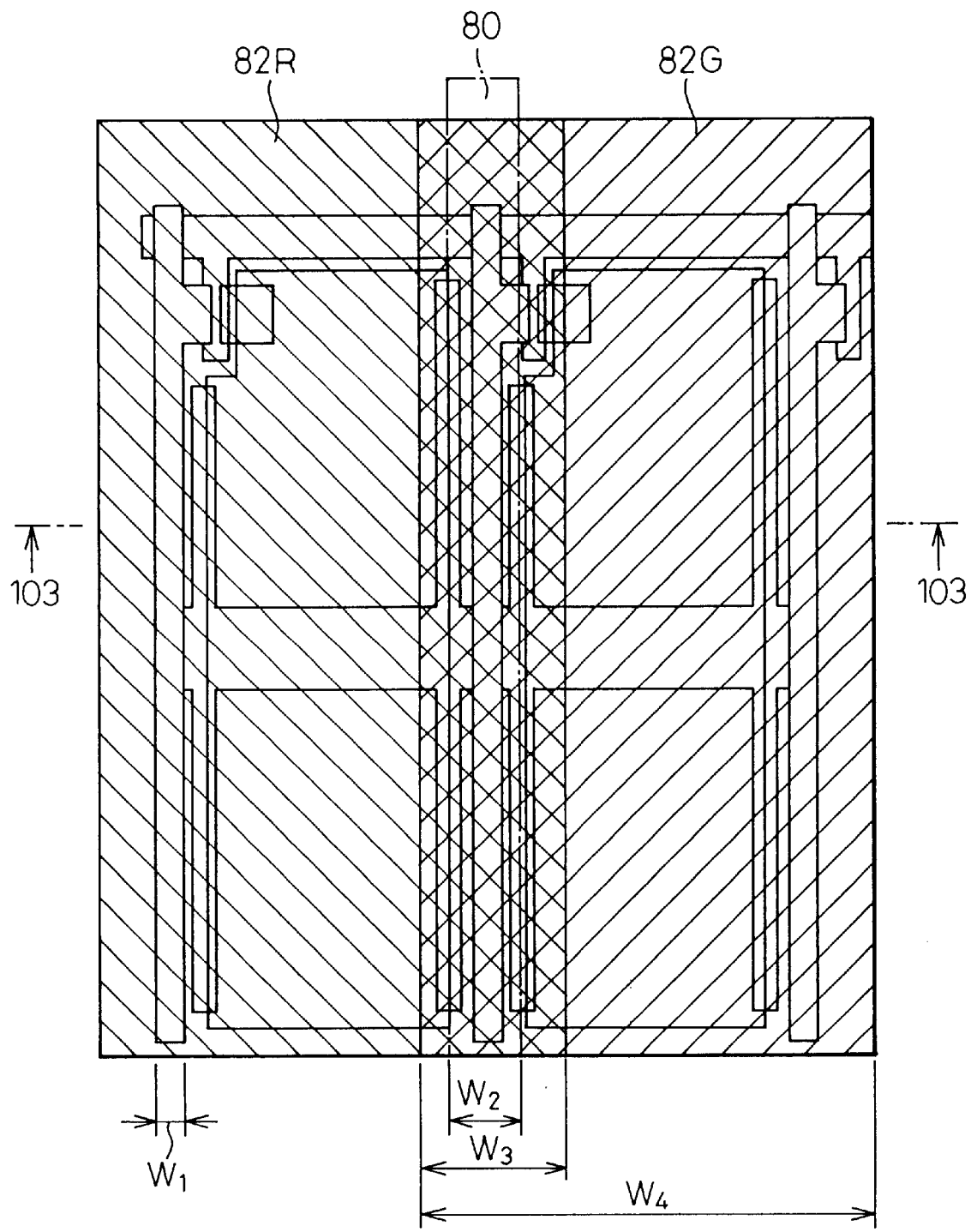
FIG. 101 is a plan view showing the liquid crystal display apparatus according to yet another embodiment of the invention.
Figure 102:
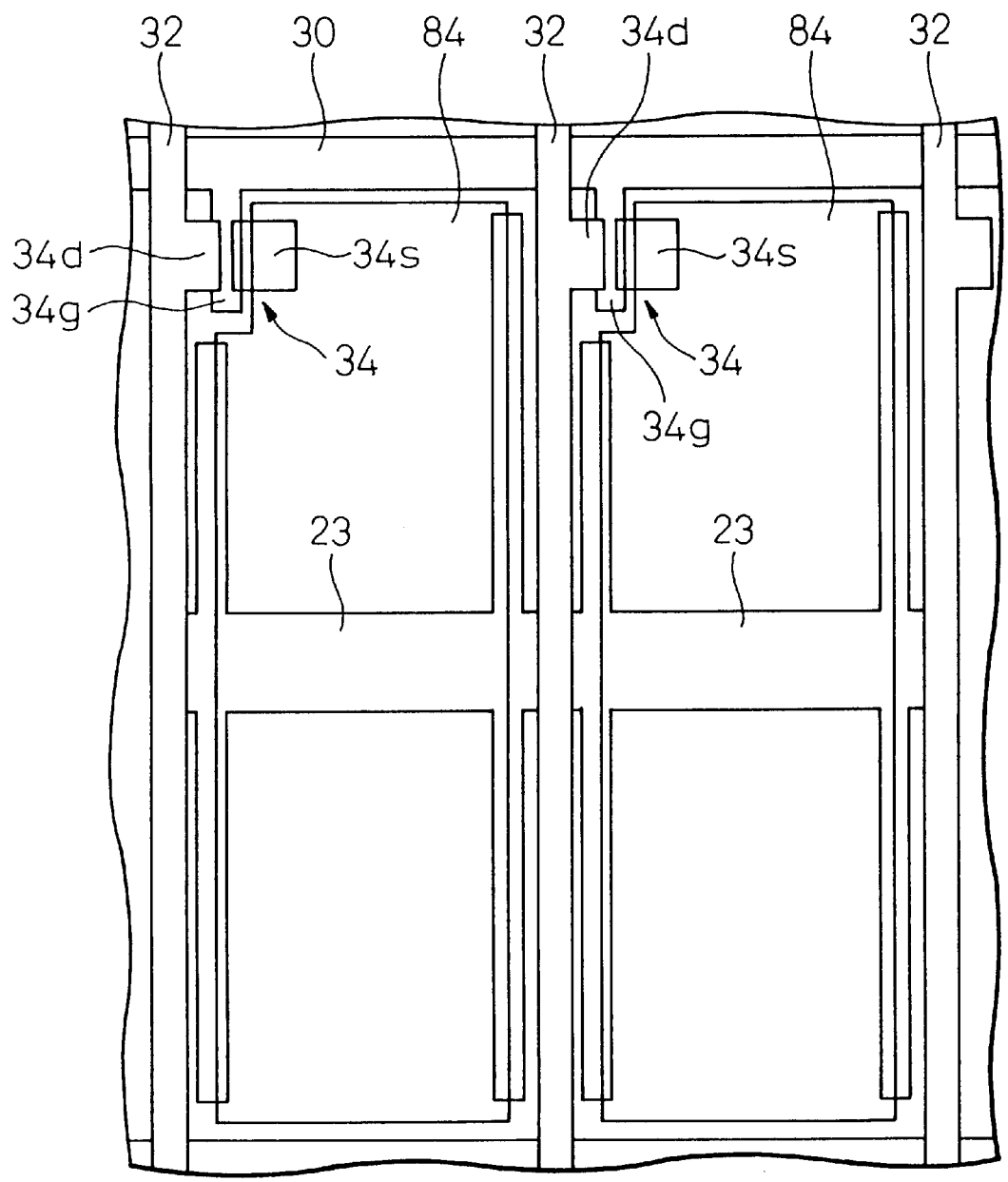
FIG. 102 is a diagram showing a pattern of the conductive layer of the lower glass substrate of FIG. 101.
Figure 103:
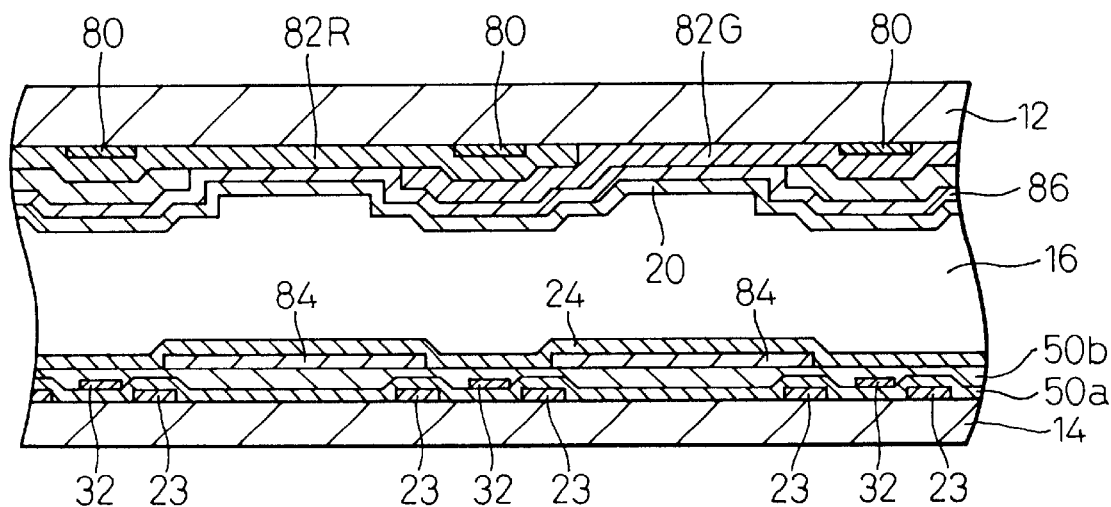
FIG. 103 is a sectional view taken along line 103—103 of FIG. 101.

Several embodiments of the invention are intended to reduce crosstalk and improve the image sticking phenomenon. FIG. 101 is a plan view showing a liquid crystal display apparatus according to another embodiment of the invention, FIG. 102 is a plan view showing a pattern of the conductive layer of the lower substrate of the liquid crystal display apparatus shown in FIG. 101, and FIG. 103 is a sectional view taken in line 103—103 in FIG. 101. The liquid crystal display apparatus has a liquid crystal 16 held between a pair of the substrates 12, 14. In FIG. 101, only one black matrix 80 is shown, but the black matrixes on the data bus lines on the two sides are not shown.

According to this embodiment, the glass substrate 14 is formed with the gate bus lines 30 and the data bus lines 32. A plurality of rectangular regions defined by the gate bus lines 30 and the data, bus lines 32 constitute pixel regions. The pixel regions are arranged at pitches of 100 μm in a horizontal direction and pitches of 300 μm in a vertical direction.

Each pixel region is formed with a TFT 34, an subsidiary capacitance electrode 23 and a pixel electrode 84. The gate bus lines 30, the gate electrode 34g of the TFT and the subsidiary capacitance electrode 23 are formed in the conductive layer constituting the lower layer. As shown in FIG. 103, a layer insulating film 50a is formed on the gate bus lines 30, the gate electrode 34g and the subsidiary capacitance electrodes 23. The conductive layer constituting the upper layer above the layer insulating film 50a is formed with the data bus lines 32 and the drain electrode 34d and the source electrode 34s of the TFT 34. A protective film 50b is formed on the data bus lines 32, the drain electrode 34d and the source electrode 34s. A pixel electrode 84 made of ITO (indium-tin oxide) is formed on the protective film 50b. An alignment layer 24 is formed on the pixel electrode 84.

The gate electrode 34g of the TFT 34 is connected to the gate bus lines 30, and the drain electrode 34d is connected to the data bus lines 32. Also, the source electrode 34s of the TFT 34 is electrically connected to the pixel electrode 84 through a contact hole (not shown).

The auxiliary capacitance electrode 23 has the shape of an "H" with the width of 34 μm in horizontal direction and 4 μm in vertical direction. The interval between the vertical portion of the auxiliary capacitance electrode 23 and the data bus lines 32 is 2 μm, for example.

On the other hand, the glass substrate 12 is formed with a black matrix 80. This black matrix 80 is formed with a larger width than the data bus lines 32 over the data bus lines 32. Also, the glass substrate 12 is formed with a red color filter 82R, a green color filter 82G and a blue color filter 82B. In this embodiment, the red color filter 82R is arranged in each pixel region in column 3n (n: 1, 2, and so forth), the green color filter 82G in each pixel region in column 3n+1, and the blue color filter 82B in each pixel region in column 3n+2. The color filters 82R, 82G, 82B extend to the adjacent pixel regions along the lower side of the black matrix 80. Specifically, two types of color filters having different colors are overlapped with each other on the lower side of the black matrix 80. Also, an opposite electrode 86 made of ITO is formed under the color filters 82R, 82G, 82B, and an alignment layer 20 is formed on the opposite electrode 86.

In this liquid crystal display apparatus, the direction of alignment of the liquid crystal molecules is controlled by the voltage applied between the pixel electrode 84 and the opposite electrode 86 thereby to control the transmittance of each pixel region. According to this embodiment, each data bus line 32 has the width W1 of 4 μm, the black matrix 80 has the width W2 of 8 μm, the color filters 82R, 82G, 82B have the width W4 of 130 μm, and the overlapped portion of the color filters has the width W3 of 15 μm. The overlapped portion of the color filters covers the region formed with the TFT 34 and the region between the vertical portion of the auxiliary capacitance electrode 23 and the data bus lines 32.

According to this embodiment, too, the overlapped portion of the color filters covers the region formed with the TFT 34 and the region between the auxiliary capacitance electrode 23 and the data bus line 32, as described above. As in the preceding embodiment, therefore, the light leakage is reduced and a superior display of high contrast is realized.

Figure 104:
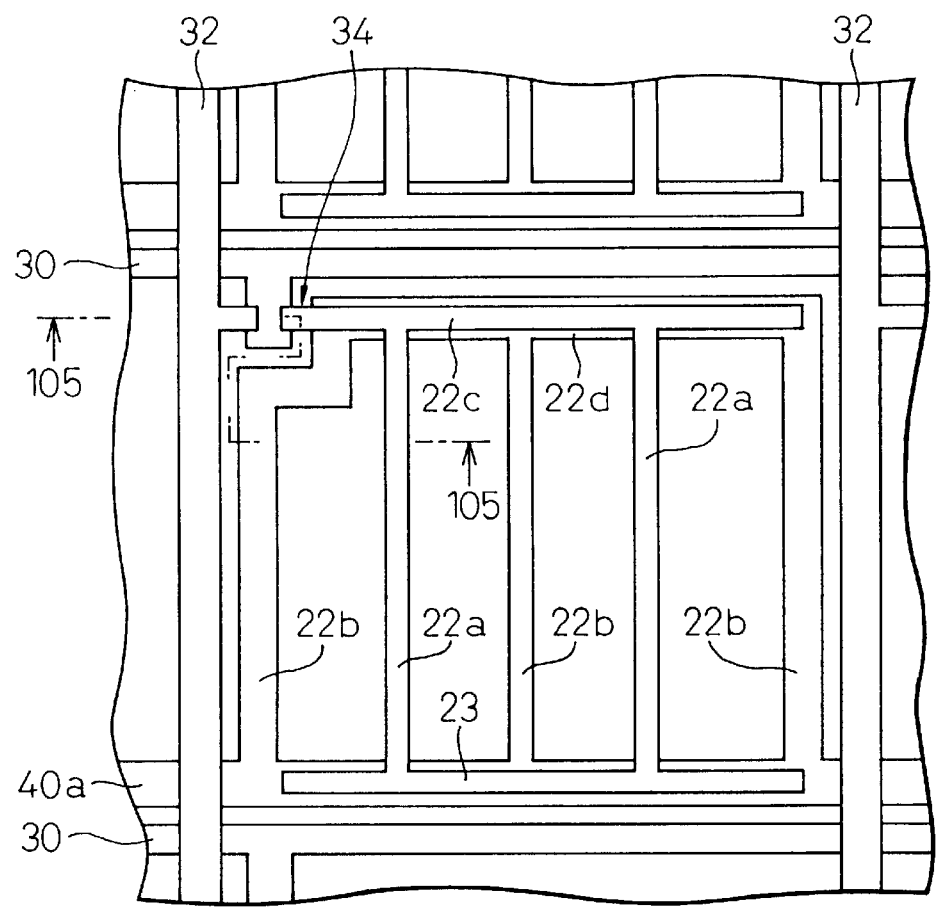
FIG. 104 is a plan view showing a liquid crystal display apparatus according to a further embodiment of the invention.
Figure 105:
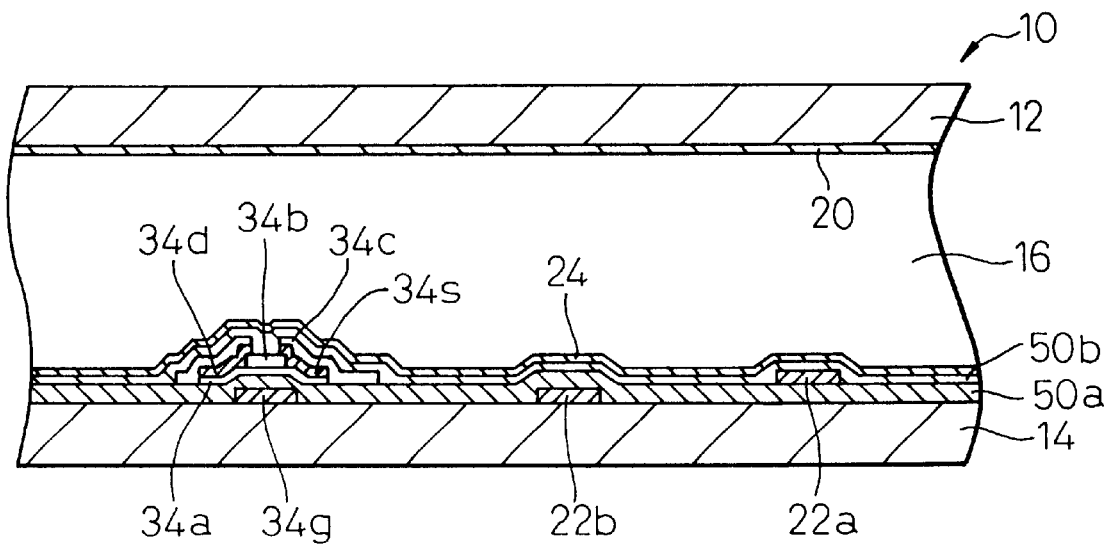
FIG. 105 is a sectional view taken along line 105—105 in FIG. 104.

FIG. 104 is a plan view showing a liquid crystal display apparatus according to still another embodiment of the invention, and FIG. 105 is a sectional view taken in line 105—105 in FIG. 104. The liquid crystal display apparatus comprises a pair of glass substrates 12, 14, a liquid crystal sealed between the pair of the glass substrates 12, 14, and a polarizer (not shown). The glass substrate 14 is formed with gate bus lines 30, data bus lines 32 and first and second stripe electrodes 22a, 22b. A plurality of rectangular regions defined by the gate bus lines 30 and the data bus lines 32 make up pixel regions, respectively.

Each pixel region is formed with a TFT 34, two first stripe electrodes 22a, three second stripe electrodes 22b, an auxiliary capacitance electrode 23 for electrically connecting the lower end of the two first stripe electrodes 22a, and an auxiliary capacitance electrode 23 for electrically connecting the upper end of the three second stripe electrodes 22b.

The gate bus lines 30, the common bus line 40a, the gate electrode 34g of the TFT 34 and the second stripe electrodes 22b are formed in the lower conductive layer. The gate electrode 34g is connected to the gate bus lines 30, and the second stripe electrodes 22b are connected to the common bus line 40a.

An inter layer insulating film 50a is formed, as shown in FIG. 105, on the gate bus lines 40, the common bus line 40a, the gate electrode 34g and the second stripe electrodes 22b. An amorphous silicon film 34a constituting a TFT 34, a channel protective film 34b, an amorphous silicon film 34c introduced with impurities, a drain electrode 34d and a source electrode 34s are formed on the layer insulating film 50a. The drain electrode 34g is connected to the data bus line 32 on the left side of the pixel region. The source electrode 34s, on the other hand, extends in parallel to the gate bus lines 30 and is connected to the two first stripe electrodes 22a.

A protective film (insulating layer) 50b of SiN is formed on the upper conductive layer formed with the data bus lines 30, the drain electrode 34g, the source electrode 34d, the first stripe electrodes 22a and the auxiliary capacitance electrode 23. An alignment layer 24 having a thickness of 500 A is formed on the protective film 50b. The surface of the alignment layer 24 is subjected to the rubbing treatment in the direction substantially perpendicular or in the direction substantially parallel to the first stripe electrode 22a (the direction at an angle of 75 degrees or 34 degrees, for example). According to this embodiment, the alignment layer 24 has a volume resistivity of about $10^{10}$ to $10^{11}$ Ωm. An alignment layer using the polyamic acid group is an example.

The glass substrate 12 is also formed with an alignment layer 20 to the thickness of 500 A. The surface of this alignment layer 20 is also subjected to the rubbing treatment in the same direction as the alignment layer 24. However, the alignment layer 20 is desirably formed of a material having a higher volume resistivity than the alignment layer 24. In this embodiment, the volume resistivity of the alignment layer 20 is about $10^{13}$ Ωcm. An alignment layer formed of soluble polyimide can be used. The polyimide having five member rings proposed by JSR is an example. Even with the alignment film of polyamic acid group, the voltage holding characteristic can be further improved by setting a high burning temperature. Further, a superior characteristic can be realized by use of an inorganic material such as a silane coupling agent (OA-003, etc.) of a silicon group made by Nissan Chemical as an alignment layer having a high voltage holding capacity.

Furthermore, this embodiment uses a liquid crystal having a volume resistivity near to that of the alignment layer 24. An example of the liquid crystal having a volume resistivity of about $10^{10}$ Ωcm is the one of CN (cyan) group.

In this embodiment configured as described above, the substrate 14 uses an alignment layer 24 of a low volume resistivity, and the liquid crystal 16 and the alignment layer 24 have almost the same volume resistivity. Therefore, the charge stagnation between the alignment layer 24 and the liquid crystal 16 can be prevented. In this way, the fact that the charge is not easily accumulated in the boundary of a layer having almost the same volume resistivity is generally known in the field of the electromagnetics.

The alignment layer 20 on the substrate 12 has a large volume resistivity and therefore a high voltage holding rate. As a result, the display data written between the first stripe electrodes 22a and the second stripe electrodes 22b is held for a long time thereby avoiding the deterioration of the display quality.

Now, the result of studying the presence or absence of the burning in the actual manufacture of the liquid crystal display apparatus according to this embodiment will be described in comparison with a reference.

The liquid crystal display apparatuses according to the embodiment and the reference having the structure shown in FIG. 105 are produced using the alignment layer and the liquid crystal having the volume resistivity shown in Table 1 below. An image of a white rectangle on the black background was displayed for 48 hours in these liquid crystal display apparatuses of the embodiment and the reference. After that, gray (16 displayed out of 64 gradations) was displayed over the whole screen. In the case where the image sticking occurs, the brightness of the portion displayed in white is higher than the brightness of the portion displayed in black. The difference between the brightness of the white display portion and the brightness of the black display portion is shown by percentage in Table 1 below.

TABLE 1

|  | Volume resistivity | | | Image sticking |
|---|---|---|---|---|
|  | Alignment layer 24 | Alignment layer 20 | Liquid crystal |  |
| Embodiment 1 | $10^{10}$ Ωcm | $10^{13}$ Ωcm | $10^{10}$ Ωcm | 3% |
| Embodiment 2 | $10^{12}$ Ωcm | $10^{13}$ Ωcm | $10^{13}$ Ωcm | 7% |
| Reference 1 | $10^{13}$ Ωcm | $10^{13}$ Ωcm | $10^{9}$ Ωcm | 20% |
| Reference 2 | $10^{14}$ Ωcm | $10^{13}$ Ωcm | $10^{13}$ Ωcm | 6% |

As seen from Table 1, the image sticking is low in the first and second embodiments. Especially when the same liquid crystal as the alignment layer 88 is used, the volume resistivity was very low at 3%. In the first reference 1 having the same basic configuration as the conventional liquid crystal display apparatus, on the other hand, the image sticking was high at 12%.

Generally, in the TN-type liquid crystal display apparatus, an alignment layer of high volume resistivity is used. This is in order to improve the voltage holding rate. Even with a high voltage holding ratio, however, the display quality would be considerably reduced if the image sticking is caused by charge stagnation in the boundary between the alignment layer and the liquid crystal. In view of this, according to this embodiment, as described above, the volume resistivity of the alignment layer 24 on the glass substrate 414 formed with the first stripe electrodes 22a and the second stripe electrodes 22b is reduced. In this case, the alignment layer 20 on the glass substrate 12 is high in volume resistivity, and therefore the deterioration of the display quality due to the reduction in the voltage holding rate is avoided. Now, the result of studying the voltage holding ratio will be explained.

Figure 106:
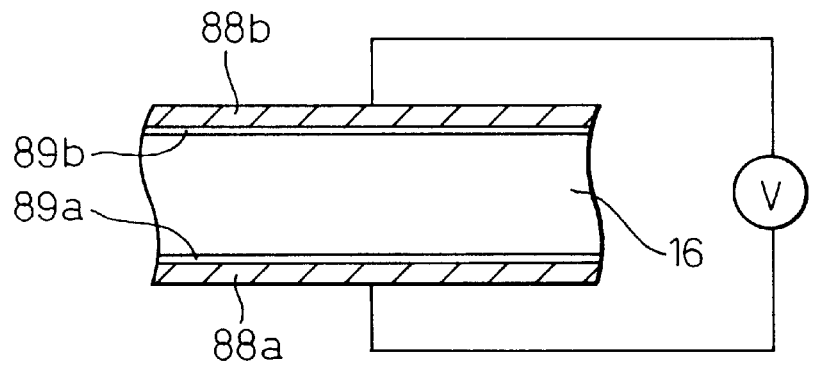
FIG. 106 is a schematic diagram showing a device for measuring the voltage holding ratio of the alignment layer.

As shown in FIG. 106, two glass substrates formed with the driving electrodes 88a, 88b are prepared, and alignment layers 89a, 89b are coated on the electrodes 88a, 88b, respectively. The two glass substrates are arranged in parallel to each other in such a manner that the electrodes 88a and 88b are in opposed relation, and the liquid crystal 16 was sealed between the glass substrates. The alignment layers 89a, 89b have the volume resistivity shown in the table below.

A voltage is applied between the electrodes 88a and 88b and the voltage holding ratio was measured. A voltage one frame time (16 ms) after application of 5 V between the electrodes 88a, 88b was measured as the voltage holding rate and was shown in percentage.

TABLE 2

| Volume resistivity | | | |
|---|---|---|---|
| Alignment layer 89a | Alignment layer 89b | Liquid crystal | Voltage holding rate |
| $10^{13}$ Ωcm | $10^{13}$ Ωcm | $10^{10}$ Ωcm | 98.50% |
| $10^{10}$ Ωcm | $10^{10}$ Ωcm | $10^{10}$ Ωcm | 70% |

As a result, as shown in Table 2, the voltage holding rate was about 70% in the case where the alignment layers 89a, 89b having a volume resistivity of $10^{10}$ Ωcm were used. This compares with the voltage holding rate of about 98.5% for the alignment layer having the volume resistivity of $10^{13}$ Ωcm as generally used in the conventional liquid crystal display apparatus. According to this invention, the alignment layer of low voltage holding rate is used on the substrate (glass substrate 14) formed with the first stripe electrode and the second stripe electrode, while the alignment layer of high voltage holding rate is used on the opposite substrate (glass substrate 12) thereby to avoid the image sticking of the liquid crystal display apparatus.

As described above, the configuration in which the second stripe electrode is connected to the gate bus line improves the aperture ratio and makes possible the display of a bright image of high contrast.

The gate bus lines are supplied with a reference voltage for determining the potential of the second stripe electrodes for writing the display data, the first voltage for turning on the thin film transistor and the second voltage for turning off the thin film transistor at an appropriate timing, whereby the liquid crystal display apparatus with the second stripe electrodes connected to the gate bus lines can be driven.

Further, at least two color filters are formed in overlapped relation with each other on the black matrix composed of a metal or a metal compound, and the width of the overlapped portion of the color filters is set larger than the width of the black matrix. Therefore, the light leakage is prevented and the deterioration of the display quality which otherwise might be caused by crosstalk can be avoided.

The first alignment layer formed on the first substrate and the second alignment layer formed on the second substrate have different electrical characteristics, and therefore the image sticking stemming from the charge accumulation on the alignment layer is avoided while at the same time making possible a superior voltage holding rate and an image display of high quality.

Figure 111:
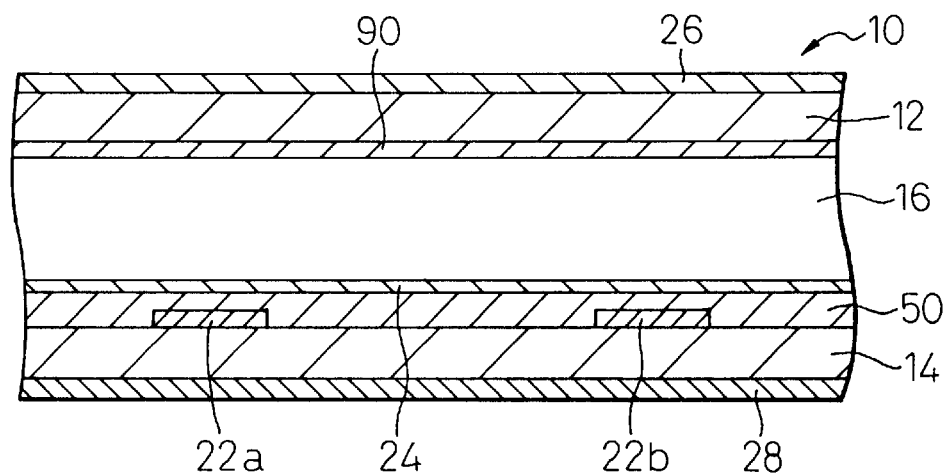
Figure 112:
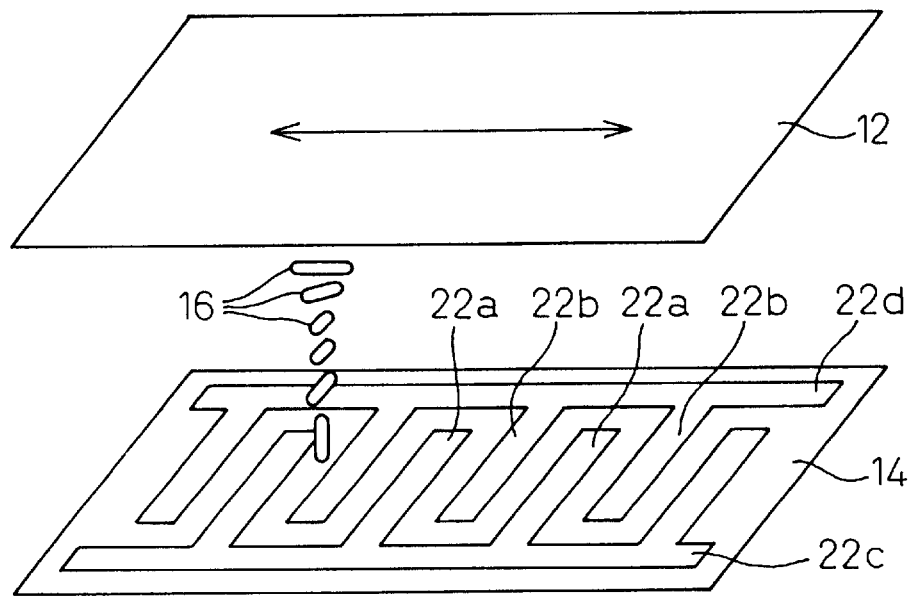
Figure 113:
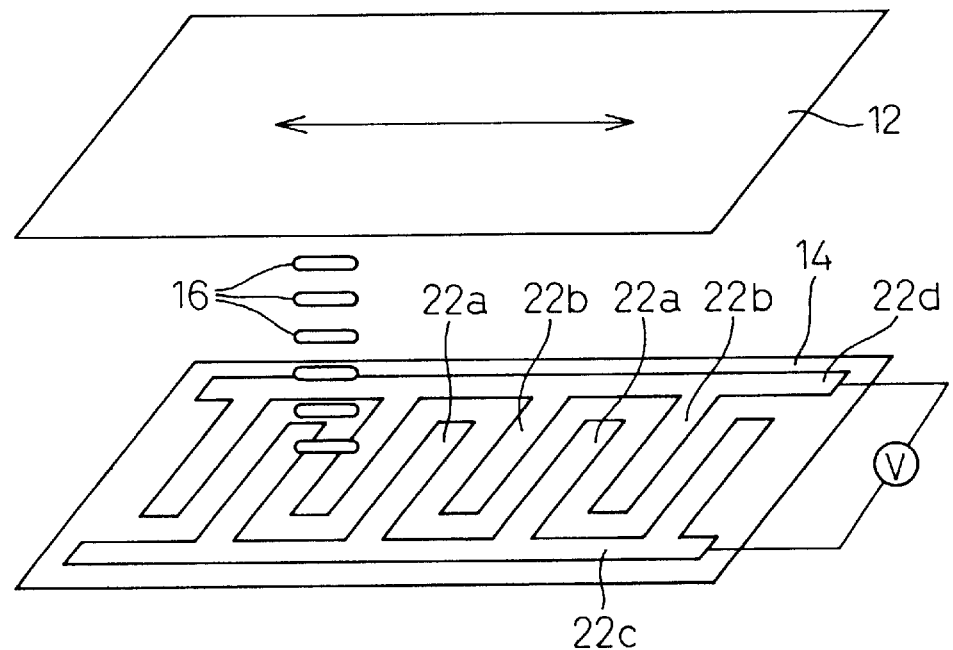

FIG. 110 is a plan view showing a liquid crystal display apparatus according to still another embodiment of the invention, and FIG. 111 is a sectional view taken in line 111—111 in FIG. 110. FIG. 112 is a diagram showing the liquid crystal display apparatus of FIGS. 110 and 111 supplied with no voltage, and FIG. 113 a diagram showing the liquid crystal display apparatus of FIGS. 110 and 111 supplied with a voltage. FIGS. 111 and 113 represent one pixel of the liquid crystal display apparatus. In the case of the color liquid crystal display apparatus, on the other hand, the color filters and the black matrix are formed on one substrate, though not shown.

In FIGS. 110 and 111, the liquid crystal display apparatus comprises a liquid crystal 16 having a dielectric anisotropy arranged between a pair of glass substrates 12, 14. This liquid crystal 16 has added thereto a chiral agent for determining the direction of twist of the liquid crystal molecules.

The glass substrate 14 includes first and second stripe electrodes 22a, 22b. These electrodes 22a, 22b are arranged in parallel to each other. The electrodes 22a, 22b are formed of chromium (Cr), aluminum (Al) or the like metal. The first and second stripe electrodes 22a, 22b are covered by an insulating film 50 composed of silicon oxide or silicon nitride.

A vertical alignment layer 24 is formed on the insulating film 50. The vertical alignment layer 24 is composed of polyimide or polyamic acid having an alkyl base as a side chain, for example.

The first stripe electrodes 22a are supplied with data through a TFT 34 from the data bus lines 32. The gate of the TFT 34 is supplied with the scanning signal through the gate bus lines 30. The second stripe electrodes 22b are connected to the common bus line 40.

The glass substrate 12 is formed with a horizontal alignment layer 90. The horizontal alignment layer 90 is formed of a linear soluble polyimide, the surface of which is subjected to a rubbing treatment in the direction substantially perpendicular to the first and second stripe electrodes 22a, 22b.

Also, a polarizer 28 is arranged outside of the substrate 14, and a polarizer 26 is arranged outside of the substrate 12. These two polarizers 26, 28 are arranged with the polarization axis thereof vertical (crossed Nicol) or parallel (parallel Nicol). In this case, the polarization axis of the polarizer 26 is assumed to be in the direction perpendicular to the first and second stripe electrodes 22a, 22b (the direction indicated by arrow in FIG. 112), and the polarization axis of the polarizer 28 is assumed to be in the direction parallel to the first and second stripe electrodes 22a, 22b.

With the liquid crystal display apparatus having this configuration, as long as no voltage is applied between the first and second stripe electrodes 22a, 22b, as shown in FIG. 112, the liquid crystal molecules 16 are aligned in the direction perpendicular to the alignment layer 24 on the substrate 14, and aligned along the rubbing direction of the alignment layer 90 on the substrate 14, so that the liquid crystal molecules 16 are gradually tilted from the vertical direction toward the horizontal, viewing from the substrate 14 to the substrate 12, while at the same time being twisted gradually in the direction determined by the chiral agent. The polarized light entering the liquid crystal layer from the lower side of the glass substrate 14 through the polarizer 28 proceeds through the liquid crystal layer while the polarization axis thereof is gradually twisted in the twist direction of the liquid crystal molecules 16 and transmitted through the polarizer 90. Specifically, in this liquid crystal display apparatus, the bright display is realized with no voltage applied between the electrodes 22a, 22b.

Upon application of a voltage between the electrodes 22a, 22b, on the other hand, as shown in FIG. 113, the liquid crystal molecules 16 are aligned in the direction along the electric field, i.e. in the direction perpendicular to the electrodes 22a, 22b. In such a case, the polarized light that has entered the liquid crystal layer from the lower side of the substrate 14 through the polarizer 28 has the polarization axis thereof not changed by the liquid crystal layer and therefore is shielded by the polarizer 26. In other words, the dark display is realized with a voltage applied to the electrodes 22a, 22b.

In this embodiment, the electric field generated by the voltage applied between the electrodes 22a, 22b functions to cancel the twist of the liquid crystal. In the process, the direction of alignment of the liquid crystal molecules in the vicinity of the horizontal alignment layer 90 anchored by the horizontal alignment layer 90 coincides with the direction of the electric field, and therefore the alignment of the liquid crystal molecules is not disturbed by the anchoring. Thus, it is possible to align the liquid crystal molecules 16 along the direction of the electric field even with a low applied voltage, thereby reducing the drive voltage. Also, since the liquid crystal molecules 16 between the electrodes 22a, 22b are aligned in one direction, no disclination occurs and a bright image can be displayed.

Preferable Range of d/p

Now, an explanation will be given of the result of studying the preferable range of the ratio d/p between the cell thickness d and the chiral pitch (natural twist pitch) p of the liquid crystal display apparatus according to this invention.

Figure 114:
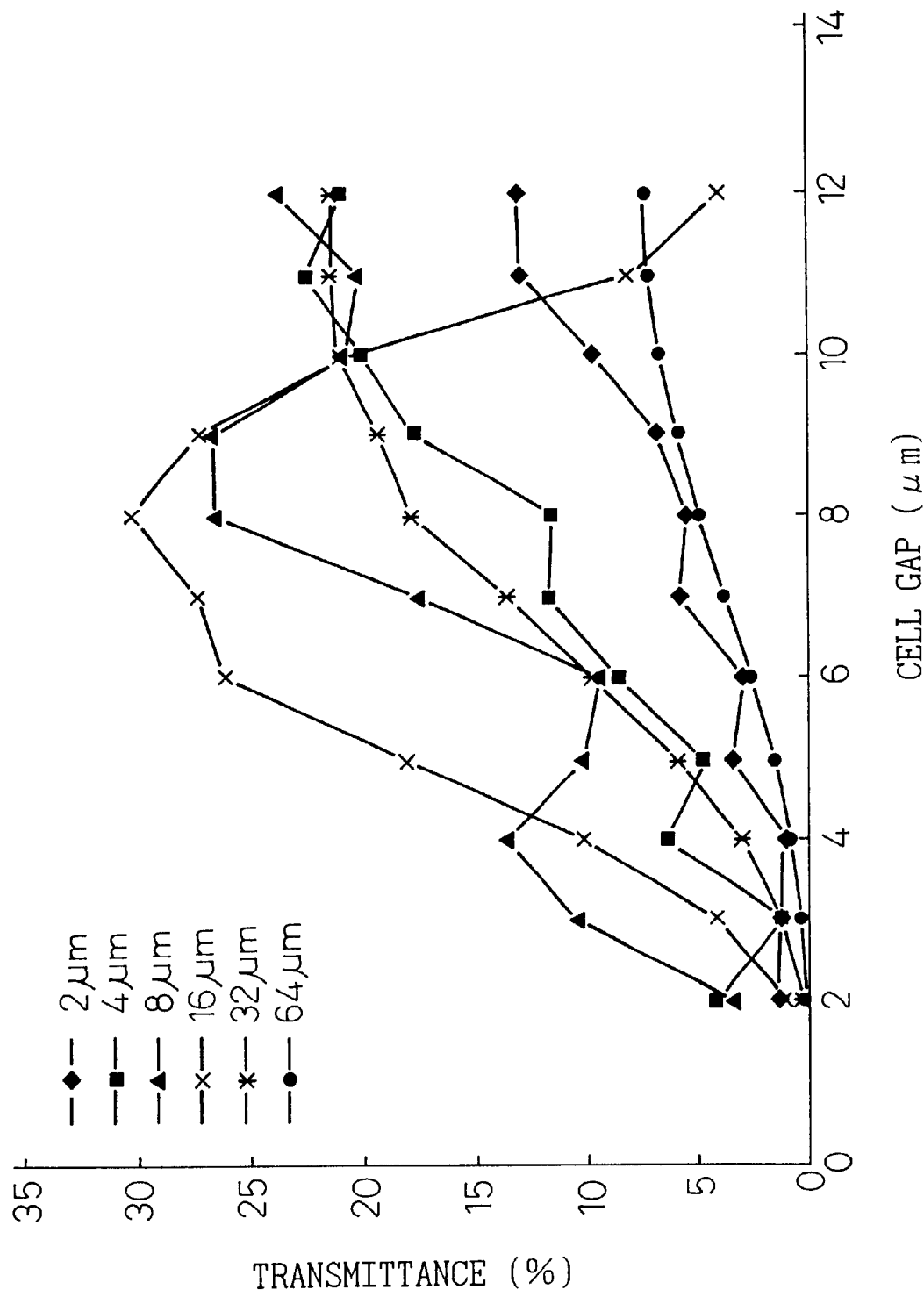
Figure 115A:
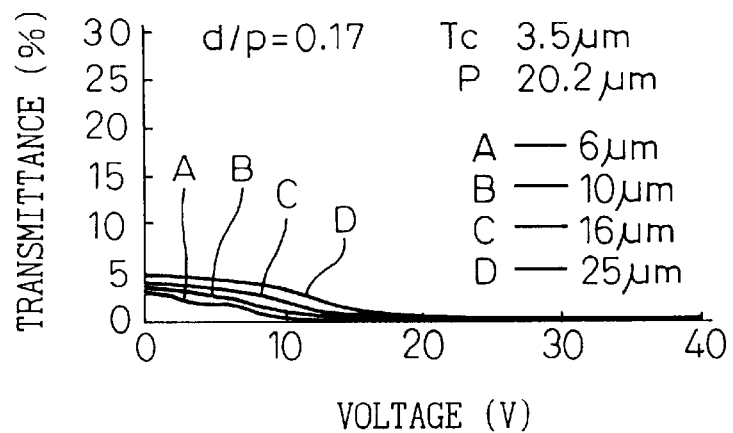
Figure 115B:
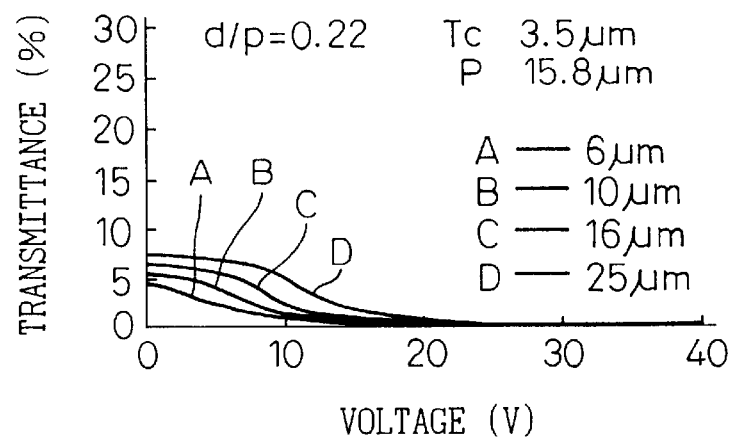
Figure 115C:
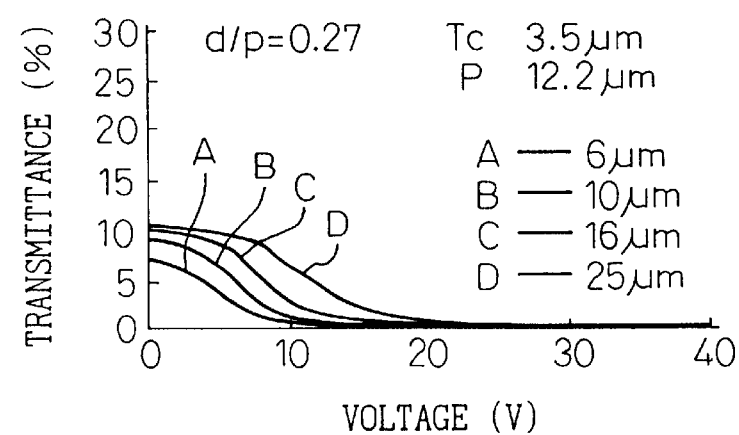
Figure 116A:
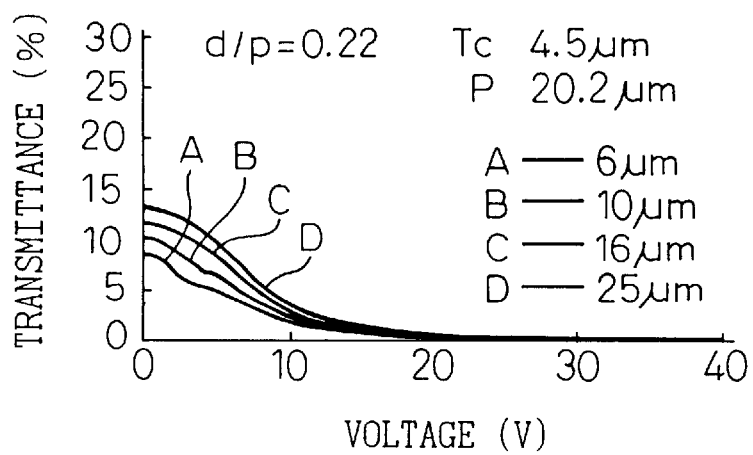
Figure 116B:
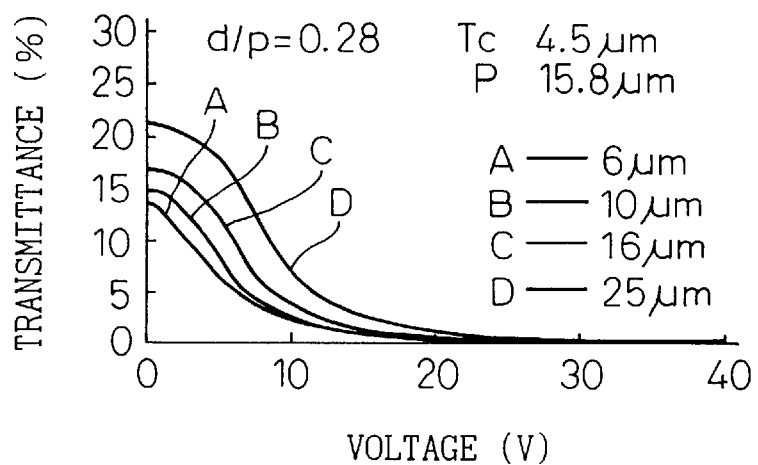
Figure 116C:
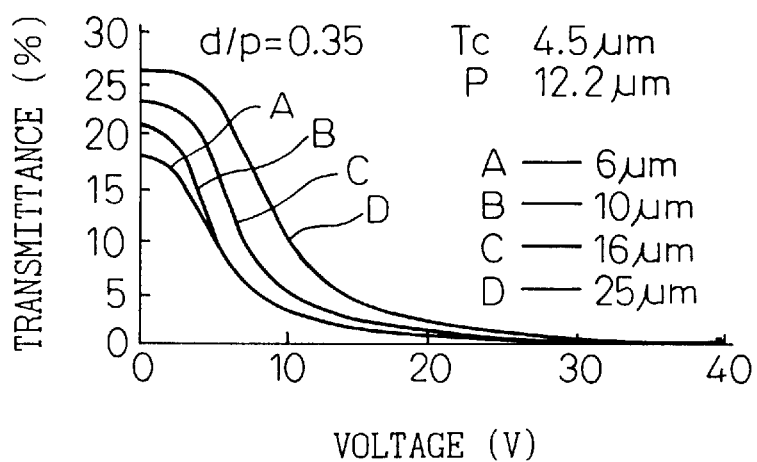
Figure 117A:
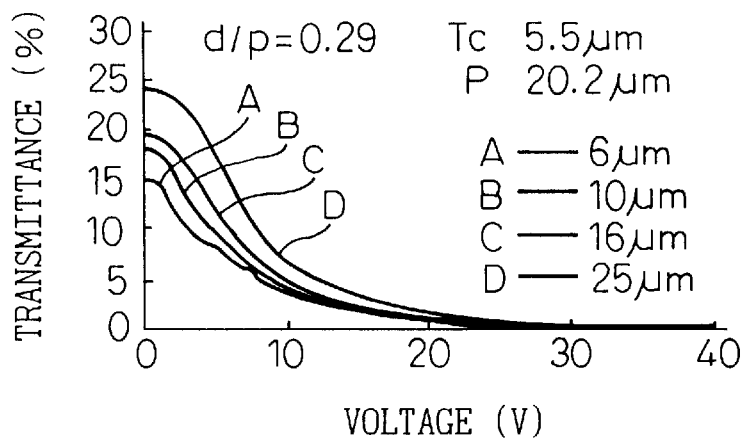
Figure 117B:
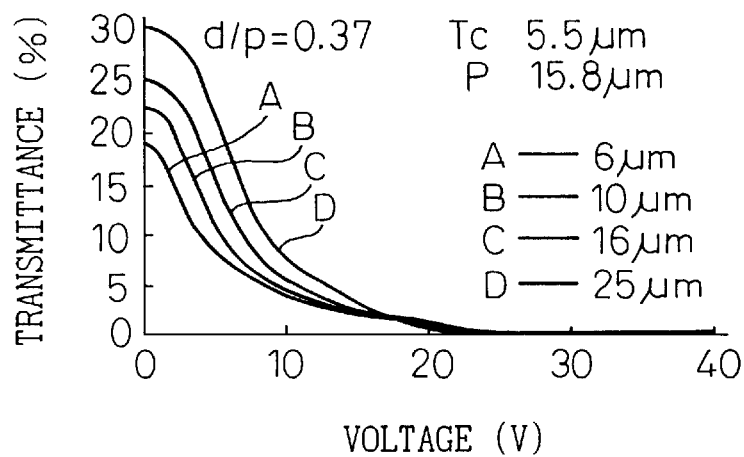
Figure 117C:
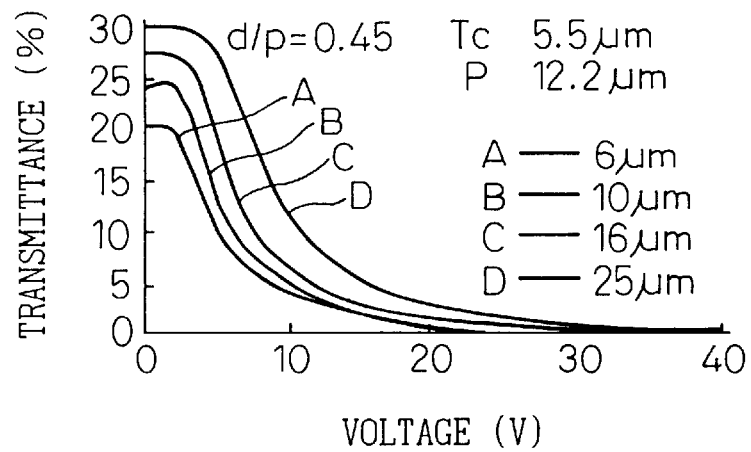

FIG. 114 is a diagram showing the result of calculating the relation between the chiral pitch and the front brightness of the liquid crystal in a graph having the abscissa representing the cell gap (thickness of the liquid crystal layer), and the ordinate representing the transmittance. The birefringence $\Delta n$ of the liquid crystal is assumed to be 0.1.

As seen from FIG. 114, when the chiral pitch is 2 $\mu$m or 64 $\mu$m, the transmittance fails to increase considerably with the change in cell gap. With the chiral pitch between 4 $\mu$m and 32 $\mu$m and the cell gap between 4 $\mu$m and 12 $\mu$m, the transmittance is comparatively high. Especially when the chiral pitch is 16 $\mu$m and the cell gap 8 $\mu$m, the transmittance is highest.

Based on this, according to the invention, a preferable range of the ratio d/p between the cell gap d and the chiral pitch p is set to 0.1.25 (4/32) to 3 (12/4).

More Preferable Range of d/p and Preferable Range of $\Delta n$d

The liquid crystal display apparatus having the structure shown in FIG. 110 was actually fabricated and the relation between d/p and transmittance and the relation between $\Delta n$d and transmittance were studied.

Assume that the width of the electrodes 22a, 22b is 4 $\mu$m, and the interval between the electrodes 22a and 22b is 6 $\mu$m, 10 $\mu$m, 16 $\mu$m or 25 $\mu$m. Also, the vertical alignment layer 24 is made of soluble polyimide having an alkyl base as a side chain and formed to the thickness of 500 A. Specifically, the glass substrate 14 was rotated at the speed of 1500 rpm using the spinner and the soluble polyimide was precipitated on the glass substrate 14 thereby to coat polyimide on the glass substrate 14. After coating polyimide, the glass substrate 14 was placed on a plate 90 degree in temperature, heated for one minute and dried preliminarily. After that, the glass substrate 14 was heated for one hour in an oven of 180 degrees thereby to cure the polyimide film. The vertical alignment layer 24 was not subjected to a rubbing or the like process.

The horizontal alignment layer 90, on the other hand, was formed to a thickness of 500 A on the glass substrate 12 by a method similar to the vertical alignment layer 24 using a linear soluble polyimide. The horizontal alignment layer 90, however, was subjected to the process of rubbing the surface thereof in one direction with rayon velvet cloth, after curing.

The liquid crystal 16 of fluoride having a positive dielectric anisotropy was sealed between the glass substrates 12, 14. The double refractive index $\Delta n$ of this liquid crystal 16 is 0.1227. Cholesterilnonanoate (made by Merck) was used as a chiral agent.

The liquid crystal with the cell thickness of 3.5. $\mu$m ($\Delta n$d=0.429), 4.5 $\mu$m ($\Delta n$d=0.552) or 5.5 $\mu$m ($\Delta n$d 0.675), and the chiral pitch p of 12.2 $\mu$m, 15.8 $\mu$m or 20.2 $\mu$m was used, and the value d/p was set to 0.17 to 0.45. Thus the voltage (V) vs. light transmittance (T) characteristic was studied. The result is shown in FIGS. 115A to 117C. Curves A to D correspond to the cases where the distances between the electrodes are 6 $\mu$m, 10 $\mu$m, 16 $\mu$m and 25 $\mu$m.

As seen from FIGS. 115A to 117C, the transmittance is low for $\Delta n$d of 0.429 (FIGS. 115A to 115C) and not satisfactory. For $\Delta n$d of 0.5 or more (FIGS. 116A to 116C) and FIGS. 117A to 117C, on the other hand, the transmittance is high. Especially for $\Delta n$d of 0.675 (FIGS. 117A to 117C), the transmittance is so high that a bright image could be obtained.

This experiment shows that the value d/p is preferably not less than 0.2 or more preferably in the range of 0.35±0.1. Also, the preferable range of $\Delta n$d is 0.7±0.2. By setting the value d/p and the value $\Delta n$d in this way, a high transmittance is obtained with no voltage applied, and the black display is possible with a voltage of about 5 V, thereby producing an image high in contrast and superior in display quality.

Figure 118:
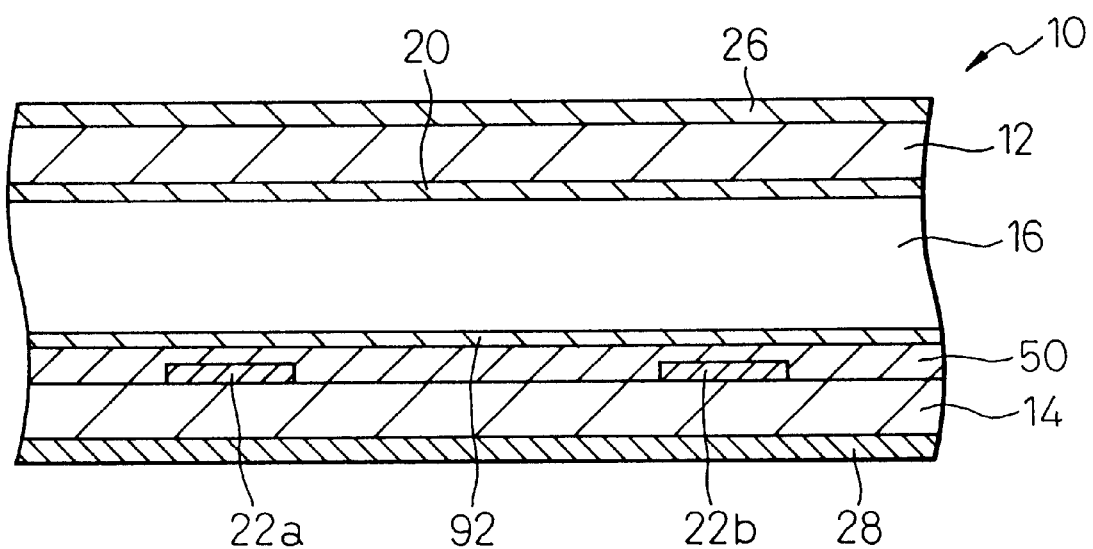
Figure 119:
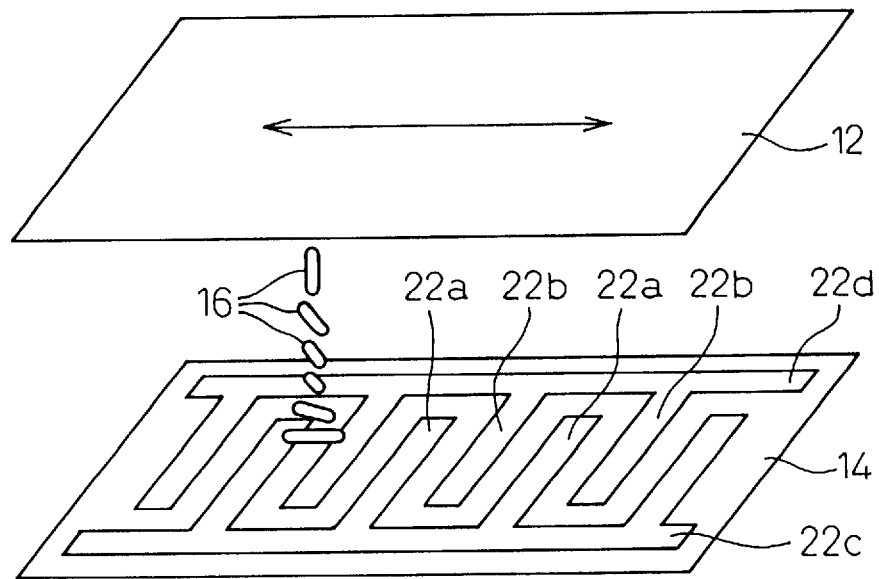
Figure 120:
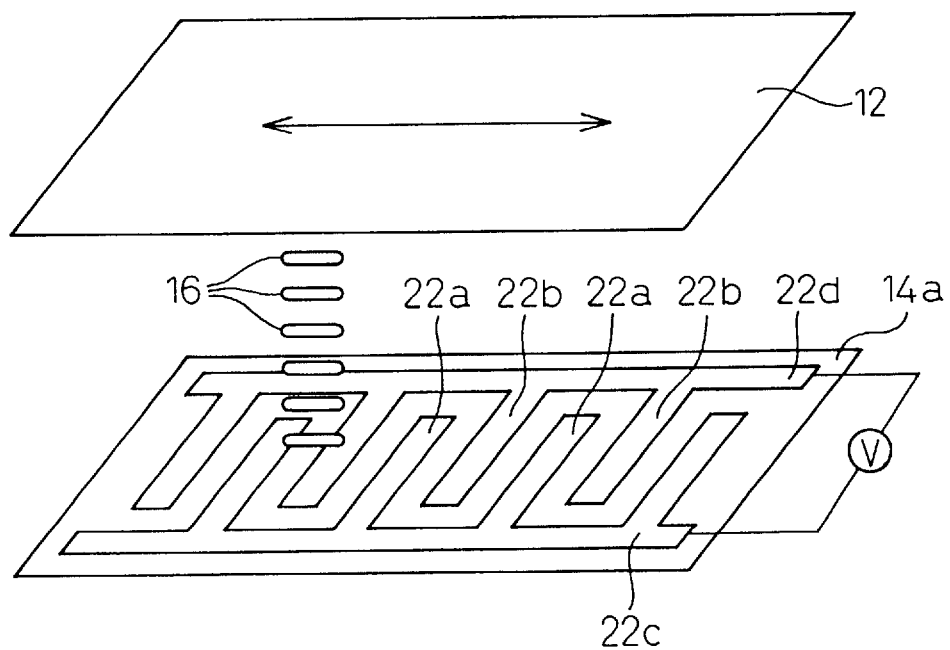

FIG. 118 is a sectional view showing a modification of the liquid crystal display apparatus of FIG. 110, FIG. 119 shows the liquid crystal display apparatus of FIG. 118 with no voltage applied thereto, and FIG. 120 shows the liquid crystal display apparatus with a voltage applied thereto. In FIG. 118, the same component parts as the corresponding ones in FIG. 110 are designated by the same reference numerals, respectively, and will not be described in detail.

In this example, a horizontal alignment layer 92 is formed on the substrate 14, and a vertical alignment layer 20 is formed on the substrate 12. The surface of the horizontal alignment layer 92 is subjected to the rubbing treatment in the direction substantially perpendicular to the electrodes 22a, 22b.

In the liquid crystal display apparatus having this configuration, the liquid crystal molecules 16 in the vicinity of the horizontal alignment layer 92 on the substrate 14, when not supplied with a voltage between the electrodes 22a, 22b, are aligned in the direction substantially perpendicular to the electrodes 22a, 22b (in the rubbing direction), as shown in FIG. 119. The liquid crystal molecules 16 in the vicinity of the vertical alignment layer 20 on the substrate 12, on the other hand, are aligned in the direction perpendicular to the alignment layer 20. The liquid crystal molecules 16 between the substrates 12, 14 are gradually twisted in the direction determined by the chiral agent as they proceed from the substrate 14 toward the substrate 12, while at the same time gradually rising in the vertical direction from the horizontal direction. In the process, the light that has entered the liquid crystal layer from the lower side of the substrate 14 through the polarizer 29 has the polarization axis thereof gradually twisted as it passes through the liquid crystal layer and is transmitted through the polarizer 26. In other words, the bright display is realized unless a voltage is applied between the electrodes 22a and 22b.

Upon application of a voltage between the electrodes 22a and 22b, as shown in FIG. 120, the liquid crystal molecules 16 are aligned in the direction of the electric field. In the process, the light that has entered the liquid crystal layer from the lower side of the substrate 14 has the direction of the polarization axis thereof remaining unchanged, and therefore cannot be transmitted through the polarizer 26. In this way, the dark display is realized when a voltage is applied to the electrodes 22a, 22b.

In this embodiment, even in the case where the state in which no voltage is applied between the electrodes 22a, 22b is changed to the state in which a voltage is applied therebetween, the direction of alignment of the liquid crystal molecules in the vicinity of the horizontal alignment layer 92 remains substantially unchanged. The liquid crystal molecules in the vicinity of the horizontal alignment layer 92 are strongly anchored by the alignment layer 92. In this embodiment, however, the direction of anchoring, is substantially the same as the direction of alignment of the liquid crystal molecules with a voltage applied thereto. As a result, according to this embodiment, the liquid crystal molecules can be aligned in the direction of the electric field with a low voltage. In other words, the liquid crystal display apparatus according to this embodiment has the advantage that the drive voltage can be further reduced as compared with the embodiment of FIG. 110.

Figure 121:
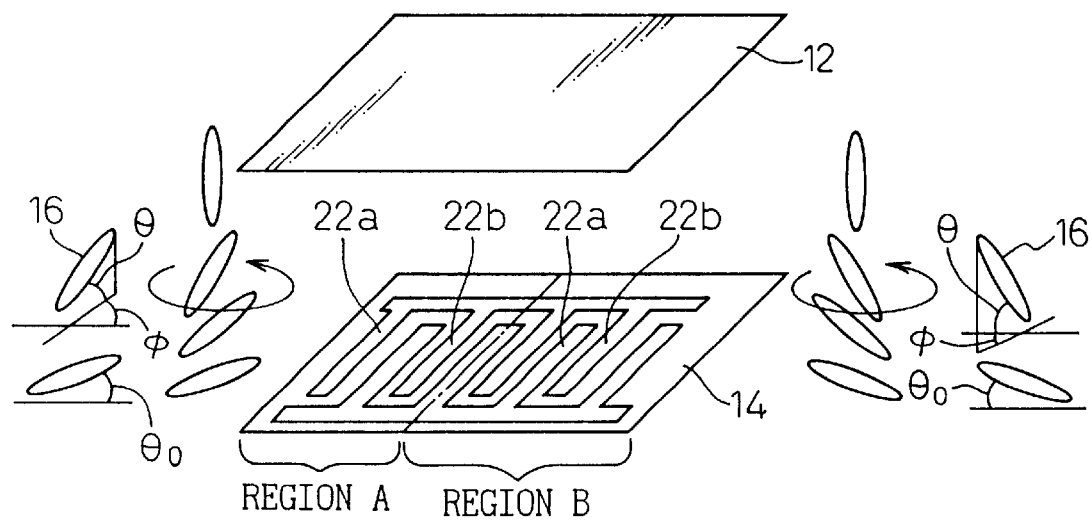

FIG. 121 is a diagram showing a modification of the liquid crystal display apparatus of FIG. 110. In FIG. 112, the same component parts as the corresponding ones in FIG. 110 are designated by the same reference numerals, respectively, and will not be described in detail.

In this embodiment, each pixel region is divided into two regions A and B, each having a horizontal alignment layer rubbed in opposite directions. After forming a horizontal alignment layer 92 on the glass substrate 14, for example, the portion of the horizontal alignment layer 92 in the region B is covered with a resist film and the portion of the horizontal alignment layer in the region A is rubbed in one direction, followed by covering with a resist film and rubbing the horizontal alignment layer in the region B in the opposite direction to the first rubbing session.

In this way, since the regions A and B are rubbed in different directions, the liquid crystal molecules 16 are pretilted in opposite directions in the regions A and B, as shown in FIG. 121, thereby realizing what is called the alignment segmentation. By providing a plurality of region shaving different directions of alignment in one pixel in this way, the viewing angle characteristic of the liquid crystal display apparatus is improved. By the way, the pretilt angle θ is preferably 2° to 50°.

FIGS. 122 and 123 are diagrams showing a modification of the liquid crystal display apparatus of FIG. 110. In FIGS. 122 and 123, the same component parts as the corresponding parts in FIG. 110 are designated by the same reference numerals respectively, and will not be described in detail. FIG. 122 shows the state in which no voltage is applied between the electrodes, and FIG. 123 the state in which a voltage is applied between the electrodes.

In this embodiment, a liquid crystal having a negative dielectric anisotropy is used as a liquid crystal 16 sealed between the substrates 12 and 14. The chiral agent is added also to this liquid crystal to determine the direction of twisting of the liquid crystal. The other parts of the configuration are basically the same as those of the liquid crystal display apparatus of the embodiment shown in FIG. 119. In other words, the horizontal alignment layer is formed on the substrate 14, and the vertical alignment layer is formed on the substrate 12.

With no voltage applied between the electrodes 22a and 22b, as shown in FIG. 122, the liquid crystal molecules 16 are twisted in the direction (indicated by φ in the drawing) determined by the chiral agent while proceeding from the substrate 14 toward the substrate 12 and thus are arranged with the angle thereof gradually changing from horizontal to vertical position on the substrate 14. In the case where the polarization axes of the polarizers are orthogonal to each other, the polarized light that has entered the liquid crystal layer through one of the polarizers from the lower side of the substrate 14 has the polarization axis thereof twisted in the direction of twisting of the liquid crystal molecules and is transmitted through the other polarizer. In other words, the bright display is realized with no voltage applied.

In the case where a voltage is applied between the electrodes 22a and 22b, on the other hand, as shown in FIG. 123, the liquid crystal molecules 16 change in angle from the horizontal position to the vertical position as they proceed from the substrate 14 toward the substrate 12. Nevertheless, the twisting of the liquid crystal molecules is canceled so that each liquid crystal molecule 16 is aligned in the direction perpendicular to the electric field. In the process, the polarized light that has entered the liquid crystal layer from the lower side of the substrate 14 through one of the polarizers has the polarization axis thereof not changed in the liquid crystal layer and is shielded by the other polarizer. In other words, the dark display is realized with a voltage applied.

In this embodiment, as in the embodiment shown in FIG. 110, the driving power can be reduced and a bright image can be displayed free of disclination.

In short, a horizontal alignment layer is formed on one of the pair of the substrates, a vertical alignment layer is formed on the other substrate, and a liquid crystal with a chiral agent added thereto is sealed between the substrates. In the case of a liquid crystal having a positive dielectric anisotropy, the liquid crystal molecules are aligned in the direction in which the horizontal alignment layer is processed on one of the substrates, and aligned in the direction perpendicular to the substrate on the other substrate. The liquid crystal molecules between the substrates, on the other hand, are twisted in the direction determined by the chiral agent as they proceed from one substrate to the other, while gradually rising from the horizontal position. Under this condition, the polarized light that has entered the liquid crystal layer passes through the liquid crystal layer while the polarization axis is being gradually twisted in the direction of the twisting of the liquid crystal molecules.

In the case where a voltage is applied between the first and second electrodes with an electric field generated in the direction parallel to the substrate, on the other hand, the liquid crystal molecules are arranged along the electric field. Under this condition, the polarized light that has entered the liquid crystal layer passes through the liquid crystal layer without changing the direction of the polarization axis. In this case, assuming that the direction in which the horizontal alignment layer is processed for alignment is substantially the same as that of the electric field, the direction of alignment of the liquid crystal molecules in the vicinity of the horizontal alignment layer remains unchanged regardless of whether a voltage is applied or not. Specifically, the anchoring of the horizontal alignment layer and the liquid crystal molecules does not disturb the alignment of the liquid crystal molecules in the direction of the electric field. As a result, the liquid crystal molecules can be aligned along the direction of the electric field with a comparatively low voltage, thereby reducing the driving voltage of the liquid crystal display apparatus. Also, the electric field generated between the first and second electrodes functions to cancel the twist of the liquid crystal molecules, and the generation of the disclination is avoided, thereby making possible a bright display.

The ratio d/p between the thickness d of the liquid crystal layer and the natural twist pitch p of the liquid crystal is preferably in the range of 0.125 to 3. In the case where the ratio d/p is less than 0.125, the transmittance is reduced and no bright image can be produced. In the case where the ratio d/p exceeds 3, on the other hand, the alignment may be disturbed or the reflection may occur in the liquid crystal, and no superior image can be produced. A preferable range of d/p is 0.2 to 3, and a more preferable range is 0.35±0.1.

The product Δnd of the double refractive index Δn of the liquid crystal and the thickness d of the liquid crystal layer is preferably within the range of 0.7±0.2. For the value Δnd deviating from this range, the transmittance is reduced and no bright image can be produced.

Japanese Unexamined Patent Publications No. 4-305624, No. 52-45897 and No. 52-45895 disclose a liquid crystal display apparatus in which the liquid crystal molecules are aligned in vertical direction on one substrate and in horizontal direction on the other substrate. The configuration and operation of these conventional configurations in which an electrode is formed on both the first and second substrates are different from those of the present invention in that the driving voltage is reduced by keeping substantially the same direction of alignment of the liquid crystal molecules in the vicinity of the horizontal alignment layer regardless of whether a voltage is applied or not.

As described above, according to these embodiments, there is provided a liquid crystal display apparatus having first and second electrodes on one substrate, in which a first alignment layer or a second alignment layer is formed as a horizontal alignment layer on one of the substrates, and the other alignment layer is used as a vertical alignment layer, so that the alignment of the liquid crystal molecules is not disturbed by the anchoring thereof by the alignment layers and the generation of disclination is avoided, thereby producing a bright image with a low driving voltage.

FIG. 124 is a plan view showing a liquid crystal display apparatus according to yet another embodiment of the invention, and FIG. 126 is a diagram showing an equivalent circuit of the liquid crystal display apparatus of FIG. 124. FIG. 126 is a sectional view of the liquid crystal display apparatus shown in FIG. 124. The liquid crystal display apparatus comprises a translucent glass substrate 12, a glass substrate 14 arranged in opposed relation to the glass substrate 12, and a liquid crystal 16 inserted between the glass substrates 12, 14. The glass substrate 12 has a vertical alignment layer 20. The glass substrate 14 includes a reflection layer 94, first and second parallel stripe electrodes 22a, 22b and a vertical alignment layer 24.

In FIG. 126, the first stripe electrode 22a and the second stripe electrode 22b are arranged alternately with each other, and by applying a voltage between these electrodes, horizontal electric fields E1 to E3 are generated. In this case, one pixel is represented by the portion between one first stripe electrode 22a and the second stripe electrodes 22b on the right and left sides thereof, i.e. the portion indicated by the one-dot chain line 52. The boundary between adjacent pixel regions is located at the center of the second stripe electrode 22b. The intervals of the alternately-arranged first stripe electrodes 22a and the second stripe electrodes 22b are equal. Thus, in the case where a voltage is applied to the adjacent first stripe electrodes 22a at the same time, the direction of alignment of the liquid crystal changes over the whole pixel region including the boundary between the adjacent pixel regions so that the liquid crystal in the boundary portion of the adjacent pixel regions is always driven, thereby realizing a high contrast.

The reflection layer 94 is arranged under the first stripe electrode 22a and the second stripe electrodes 22b on the glass substrate 14. The light that has entered the liquid crystal layer from the upper surface of the page in FIG. 124 is reflected on the reflection layer 94. The data bus lines 32 and the TFT 34, on the other hand, are arranged under the second stripe electrodes 22b. This is in order to prevent the incident light from being applied to the thin film transistor by shielding it with the second stripe electrodes 22b and thereby to reduce the optical leakage current of the TFT 34.

The data voltage applied to the data bus lines 32 is applied from the source electrode of the TFT 34 through the contact hole 96 to the first stripe electrode 22a, and generates horizontal electric fields E1 to E3. The p-type liquid crystal molecules that have thus far been aligned in vertical direction with no voltage applied thereto are aligned in horizontal direction by the electric fields E1 to E3. Therefore, the direction of polarization of the light passed through the liquid crystal layer and reflected on the reflection layer 94 is rotated by 90 degrees. Thus, the reflected light can be switched by supplying the liquid crystal layer with the light linearly polarized through the polarizer.

In FIG. 125, the first stripe electrode 22a and the second stripe electrodes 22b with a liquid crystal therebetween are represented equivalently by capacitors C1 to C4.

FIG. 126 shows the state in which no voltage is applied between the first stripe electrode 22a and the second stripe electrodes 22b. A reflection layer 94 is arranged on the glass substrate 14, and the first stripe electrode 22a and the second stripe electrodes 22b are formed through an insulating layer 50c on the reflection layer 94. Also, a vertical alignment layer 24 is arranged on the first stripe electrode 22a, the second stripe electrodes 22b and the insulating layer 50c. In FIG. 126, the data bus lines 32 are not shown.

On the other hand, a polarizer 26 is arranged on the outside (display side) of the glass substrate 12, and a vertical alignment layer 20 is arranged on the inside of the glass substrate 12. A p-type liquid crystal 16 is inserted between the glass substrates 12, 14. The vertical alignment layers 20, 24 align the liquid crystal 34 in the direction perpendicular to the glass substrates 12, 14 with no voltage applied between the first stripe electrode 22a and the second stripe electrodes 22b.

In the case where no voltage is applied between the first stripe electrode 22a and the second stripe electrodes 22b, the direction of alignment of the liquid crystal remains vertical and the polarized state of the incident light 111 remains unchanged. As a result, the light 111 that has passed through the polarizer 26 is reflected on the reflection layer 94 and transmitted again through the polarizer 26. In other words, the display on the liquid crystal panel is white when no voltage is applied thereto.

FIG. 127 is a diagram for explaining the operation of the liquid crystal display apparatus with a voltage applied thereto. Upon application of a voltage between the first stripe electrode 22a and the second stripe electrodes 22b, the p-type liquid crystal 16 is tilted in horizontal direction. In this case, the liquid crystal 16 tilted in horizontal direction functions as a λ/4 plate for rotating the direction of polarization of the incident light by 90 degrees, where λ is the wavelength of the incident light. Thus, the light 111 that has been transmitted through the polarizer 26 and reflected on the reflection layer 94 cannot be transmitted through the polarizer 26 as the polarization plane thereof is rotated by 90 degrees. In this way, the liquid crystal display apparatus displays black when a voltage is applied thereto.

As described above, in the liquid crystal display apparatus according to this invention, what is required of the first strip electrode 22a and the second stripe electrodes 22b is only to generate an electric field in horizontal direction, and therefore there is no need of providing an opposite electrode on the glass substrate 12 facing the glass substrate 14 through the liquid crystal layer. The glass substrate, 14, therefore, is formed only with the first stripe electrode 22a, the second stripe electrodes 22b, the data bus lines 32, the gate bus lines 30, the TFT 34, etc. The manufacturing process of the liquid crystal display apparatus thus is simplified.

FIG. 128 is a plan view showing a modification of the liquid crystal display apparatus of FIG. 124, and shows a configuration for the case in which each pixel region is driven with two first stripe electrodes 22a. The data voltage applied to the data bus lines 32 is passed through the TFT 34 having the gate bus lines 30 thereof supplied with a gate voltage, and sequentially applied to the first stripe electrodes 22a.

The second stripe electrodes 22b are supplied with a predetermined voltage, and an electric field is generated between the first stripe electrodes 22a and the second stripe electrodes 22b due to the voltage difference therebetween. This electric field controls the direction of alignment of the liquid crystal 16. According to this embodiment, the liquid crystal 16 in one pixel region corresponding to one reflection layer 94 is driven by three second stripe electrodes 22b and two first stripe electrodes 22a arranged therebetween. Therefore, the applied voltage for applying a predetermined electric field to the liquid crystal 16 can be reduced, thereby saving the power consumption.

The reflection layer 94 is formed of a metal or an insulating material under the first stripe electrodes 22a and the second stripe electrodes 22b. According to this embodiment, the reflection layer 94 is segmented by the boundary portion of the pixel in order to facilitate the formation of the data bus lines 32. Specifically, the data bus lines can be formed in the boundary region of the pixel where the reflection layer 84 is segmented. In the case where the reflection layer 94 is made of a metal, an aluminum film or the like metal high in reflectance is desirable. In the case of an insulating material, an acrylic resin with pigment distributed therein is used. In the case of an insulating material, on the other hand, the pigment colored in red, green and blue can be used to provide the reflection layer 94 as a replacement color filter, thereby simplifying the structure of the color liquid crystal display panel.

FIG. 129 is a sectional view taken in line 129—129 in FIG. 128. The reflection layer 94 is electrically insulated from the first stripe electrodes 22a and the second stripe electrodes 22b through the insulating layer 50c made of HRC-001 of Japan Synthetic Rubber, for example, having a thickness of 1 to 10 $\mu$m. As a result, an aluminum film or the like high in reflectance can be used for the reflection layer 94. In the case where the reflection layer 94 is formed of a conductive material such as an aluminum film, the data bus lines 32 are surrounded by the reflection layer 94 and the second stripe electrodes 22b, so that the leakage electric field from the data bus lines 32 can be shielded by the conductive material. As a result the liquid crystal 16 is never driven by the leakage electric field from the data bus lines 32, thereby improving the display contrast.

The vertical alignment layers 20, 24 are for aligning the liquid crystal 16 in the direction perpendicular to the glass substrates 12, 14 in the absence of a voltage applied thereto. RN-783 of Nissan Chemical is an example material.

The TFTs 34 and the data bus lines 32 are formed under the second stripe electrodes 22b. Thus, the TFT 34 is shielded by the opaque second stripe electrodes 22b thereby to reduce the optical leakage current of the TFT 34. Also, the data bus lines and the TFT 34 which do not contribute to the display are formed under the second stripe electrodes 22b, so that substantially the whole surface of the panel can be covered with the reflection layer 94 and the second stripe electrodes 22b, thus making it possible to increase the reflection area of the liquid crystal display panel as a whole. Specifically, the first stripe electrodes 22a and the second stripe electrodes 22b are a metal conductor such as aluminum and function as a reflector. Thus, they improve the reflectance of the liquid crystal display panel in cooperation with the original reflection layer 94. At the same time, in view of the fact that the second stripe electrodes 22b are arranged above the boundary of the adjacent reflection layer 94 and the light is reflected also on the boundary portion of the reflection layer 94, the reflection area of the panel can be increased.

As described above, upon application of a voltage between the first stripe electrodes 22a and the second stripe electrodes 22b, the p-type liquid crystal 16 is tilted in the same direction as the electric field, i.e. in the direction perpendicular to the first stripe electrodes 22a and the second stripe electrodes 22b in parallel to the glass substrates 12, 14. In this case, the polarizer 26 is arranged in a position with the transmission axis or the absorption axis thereof parallel to the glass substrates 12, 14 and at an angle of ±45 degrees from the direction perpendicular to the first stripe electrodes 22a and the second stripe electrodes 22b. As a result, the direction of polarization of the light passing through the liquid crystal 16 supplied with a voltage rotates by 90 degrees.

Also, the retardation $\Delta$nd which is the product of the refractive index anisotropy $\Delta$n of the liquid crystal 16 and the cell gap d is adjusted to be equal to $n\lambda/4$ (n: natural odd number, $\lambda$: light wavelength when a voltage is applied. In this case, the refractive index anisotropy $\Delta$n of the liquid crystal 16 varies with the applied voltage.

Specifically, as a voltage is applied between the first stripe electrodes 22a and the second stripe electrodes 22b, the liquid crystal 16 is tilted in the direction of the electric field and the refractive index anisotropy $\Delta$n of the liquid crystal 16 increases. Thus, the value of the retardation $\Delta$nd also gradually increases from zero.

If it is assumed, for example, that the wavelength $\lambda$ of the light switched is 550 nm associated with maximum luminous efficacy, $\lambda/4$ is about 140 nm. The value of the retardation $\Delta$nd of the liquid crystal 16 is 140 nm at a predetermined applied voltage, and the liquid crystal 16 functions as a $\lambda/4$ plate for rotating the direction of light polarization by 90 degrees.

In the case where there retardation $\Delta$nd of the liquid crystal 16 is not equal to $n\lambda/4$, on the other hand, the error is corrected by inserting a phase filter having the retardation $\Delta$nd equal to the difference between the glass substrate 12 and the polarizer 26. Also, in the case where the black and white of the liquid crystal 16 are reversed, a phase filter is inserted so that the retardation $\Delta$nd of the liquid crystal 16 becomes zero at a predetermined voltage FIG. 130 is a plan view showing the liquid crystal display apparatus of FIG. 128. The difference between this embodiment and the embodiment of FIG. 124 lies in that a segmented reflection layer 94 is arranged in a position corresponding to each pixel region so that each pixel region is driven by three second stripe electrodes 22b and two first stripe electrodes 22a. Thus, the liquid crystal 16 can be driven efficiently with a lower driving voltage, and the driving voltage associated with the retarded $\Delta$nd of the liquid crystal 16 equal to nλ/4 is reduced, thereby making it possible to reduce the power consumption of the liquid crystal display panel.

Also, the first stripe electrodes 22a and the second stripe electrodes 22b are arranged equidistantly over the adjacent pixel regions, and the boundary of the adjacent pixel regions is located at the center of the second stripe electrode 22b. As a result, in the case where a voltage is applied at the same time to the first stripe electrodes 22a of adjacent pixel regions, the second stripe electrode 22b is shared by the pixel regions on the two sides thereof, and the direction of alignment of the liquid crystal changes over the whole pixel region including the boundary of the adjacent pixel regions, thereby realizing a high contrast.

FIG. 131 is a diagram showing an equivalent circuit of the liquid crystal display apparatus shown in FIG. 130. Equivalent capacitors C11 to C18 with the liquid crystal 16 as a dielectric material are inserted between the first stripe electrodes 22a and the second stripe electrodes 22b.

FIGS. 132A to 133C are sectional views taken along line 132—132 of FIG. 130 for explaining the manufacturing process of the liquid crystal display apparatus of FIG. 130. According to this embodiment, the reflection layer 94, the TFT 34, the data bus lines 32, the first stripe electrodes 22a and the second stripe electrodes 22b, etc. can be all formed on one glass substrate 14, and therefore the manufacturing process of the liquid crystal display apparatus can be simplified.

As shown in FIG. 132A, the reflection layer 94 and the gate bus lines 30 are formed by forming and patterning an aluminum film about 3000 Å thick on the glass substrate 14. Then, as shown in FIG. 132B, a gate insulating layer 99 such as of silicon nitride (SiN), an amorphous silicon (a-Si) 100 constituting the channel of the thin film transistor, and a silicon nitride (SiN) 101 making up an etching protective film of the thin film transistor are formed in layers.

As the next step, as shown in FIG. 132C, the etching protective film 101a is generated by patterning the silicon nitride (SiN) 101. The etching protective film 101a is for protecting the amorphous silicon 100, providing a channel, when etching the source electrode and the drain electrode of the thin film transistor.

Then, as shown in FIG. 132D, an ohmic contact layer (n+a-Si) 102 with ions implanted into the amorphous silicon and a metal layer (Ti/Al/Ti) 103 constituting the source electrode and the drain electrode are formed in layers. The ohmic contact layer 102 is for improving the ohmic contact between the metal layer 103 and the amorphous silicon 100. The metal layer (Ti/Al/Ti) 103 is a multilayer including a titanium film about 500 Å thick and an aluminum film (lower layer) as thick as about 1500 Å.

Then, as shown in FIG. 132E, the metal layer 103, the ohmic contact 102 and the amorphous silicon 100 are patterned thereby to generate the data bus lines 32, the drain electrode 103a and then the TFT 34.

As the next step, as shown in FIG. 133A, an insulating film 104 (HRC-001 of Japan Synthetic Rubber, etc., for example) is formed to produce a through hole constituting a contact hole 96. As shown in FIGS. 129 and 130, the contact hole 96 connects the source electrode of the TFT 34 to the first stripe electrodes 22a. Then, as shown in FIG. 133B, an aluminum metal layer (Al) 105 constituting the first stripe electrodes and the second stripe electrodes is formed. Then, as shown in FIG. 133C, the metal layer (Al) 105 is patterned thereby to generate the first stripe electrodes 22a and the second stripe electrodes 22b at the same time.

As described above, according to this embodiment, one glass substrate 14 can be formed with all of the reflection layer 94, the TFT 34, the data bus lines 32, the first stripe electrodes 22a, the second stripe electrodes 22b, etc. Therefore, the manufacturing process of the liquid crystal display panel can be simplified.

Figure 134A:
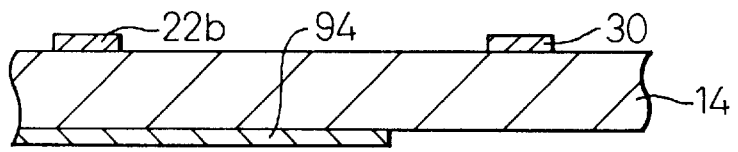
Figure 134B:
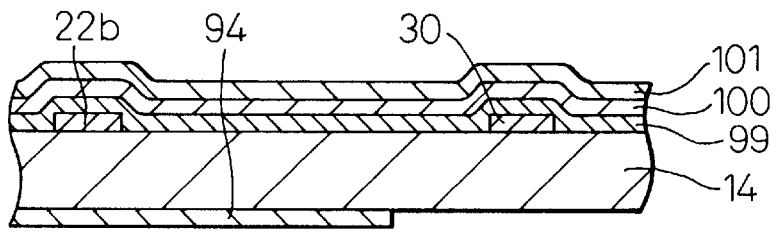
Figure 134C:
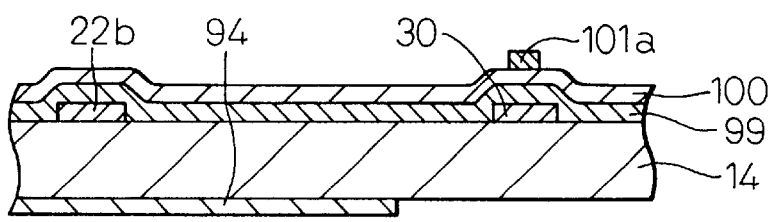
Figure 134D:
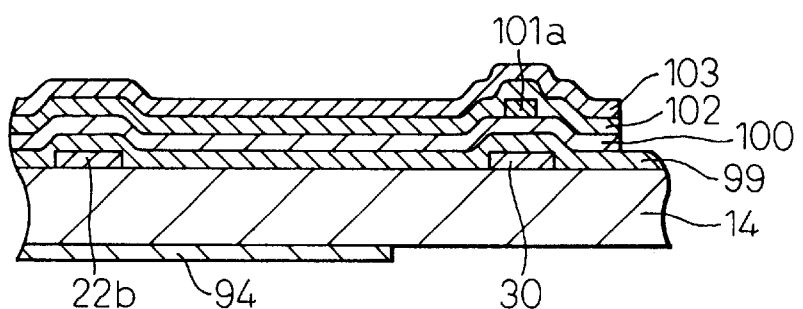
Figure 134E:
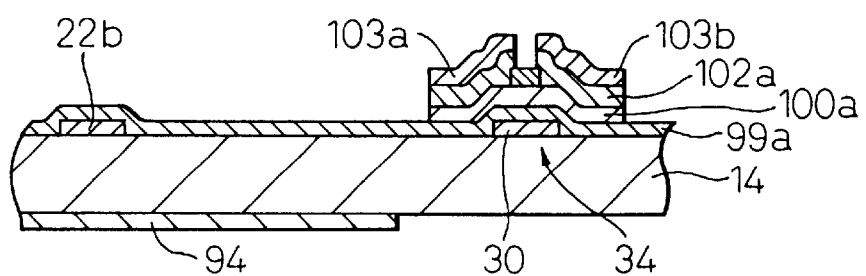

FIGS. 134A to 134E are diagrams showing an example in which the reflection layer 94 is formed independently of the back surface of the glass substrate 14, the gate bus lines 30 of the thin film transistor, etc. In this case, as shown in FIG. 134A, the reflection layer 94 is formed on the back surface (lower side in the drawing) of the glass substrate 14, so that the second stripe electrodes 22b and the gate bus lines 30 can be formed at the same time on the front side (upper side in the drawing) of the glass substrate 14. Also, as shown in FIG. 134E, the first stripe electrodes 22a and the data bus lines 32 can be formed at the same time. Therefore, the process for generating the insulating layer 104, the first stripe electrodes 22a and the second stripe electrodes 22b shown in FIGS. 132A to 133C can be eliminated. As a result, the manufacturing process for the liquid crystal display panel can be further simplified. By the way, FIGS. 134B to 134D show a process similar to FIGS. 132B to 132.

FIG. 135 is a sectional view showing a modification of a liquid crystal display apparatus according to this invention. In this embodiment, the second stripe electrodes 22b of the embodiment shown in FIG. 129 are formed on the back side of the glass substrate 12. The second stripe electrodes 22b are formed on the display side of the reflection layer 94 and therefore use a transparent electrode of indium tin, oxide (ITO) about 1000 Å thick.

In FIG. 135, the electric field between the first stripe electrodes 22a and the second stripe electrodes 22b assumes a direction substantially parallel (more strictly, an oblique direction somewhat parallel) to the glass substrates 12, 14, and so the direction of alignment is also substantially parallel upon application of a voltage to the liquid crystal 16. In this embodiment, too, the second stripe electrodes 22b are formed in the boundary between and shared by adjacent pixel regions. Therefore, the liquid crystal 16 in the boundary portion of the pixel regions can be efficiently aligned for an improved contrast.

FIG. 136 is a sectional view showing a modification of the liquid crystal display apparatus according to this invention. This configuration uses a guest-host liquid crystal 16 (LA-121 made by Mitsubishi Chemical, for example) with a dichroic pigment attached thereto as a liquid crystal. In this embodiment, though configured similarly to the embodiment shown in FIG. 129, a polarizer is not formed on the glass substrate 12. Specifically, the polarizer is not needed because the function of a λ/4 plate is provided by the insulating layer 50.

The insulating layer 50c is generated by polymerizing a liquid crystal prepolymer. This liquid crystalline prepolymer can be aligned and can function as a λ/4 plate having an optical anisotropy. The liquid crystal display panel according to this embodiment, therefore, can realize a high contrast without any polarizer.

Upon application of a voltage between the first stripe electrodes 22a and the second stripe electrodes 22b, the guest-host liquid crystal 16 is aligned in horizontal direction and absorbs the incident light polarized in a predetermined direction. The incident light is reflected on the reflection layer 94 and constitutes a reflected light. The direction of polarization of the reflected light is rotated by 90 degrees as it passes through the insulating layer 50c functioning as a λ/4 plate and is reabsorbed into the guest-host liquid crystal 16. As a result, the guest-host liquid crystal 16 can efficiently absorb the light and thus improves the contrast of the liquid crystal display panel.

According to this embodiment, the first stripe electrodes 22a and the second stripe electrodes 22b are not in an opposed relation to each other. Thus, the area of the capacitor formed between the electrodes is reduced and so is the electrostatic capacitance between the electrodes. As a result, the ratio of this electrostatic capacitance to the electrostatic capacitance between the auxiliary electrodes is reduced, thereby reducing the effect of the charge leakage of the pixel region. Although the charge leakage of the guest-host liquid crystal 16 increases in this way, an azo pigment with superior optical characteristics, such as a good dichroic ratio, can be added.

The optical characteristics of the guest-host liquid crystal 16 is expressed by the dichroic ratio between the light absorbance with the dichroic pigment arranged in vertical direction and the light absorbance with the dichroic pigment arranged in horizontal direction. The guest-host liquid crystal 16 having dissolved therein a dichroic pigment with a high dichroic ratio can realize a high reflectance. Dichroic materials are roughly classified into the azo group and anthraquinone group. The azo group, though having high dichroic ratios, increases the charge leakage, while the anthraquinone group, though having low dichroic ratios, decreases the charge leakage.

According to this embodiment, it has become possible to employ a azo group pigment with a high dichroic ratio, even with a large charge leakage of the guest-host crystal liquid, as long as the effect of the charge leakage is reduced. Thus, a reflectance about 20% higher than the prior art can be realized.

It has also been confirmed by experiments that the guest-host liquid crystal 16 with an azo group pigment added thereto can restore the reduced voltage holding rate by long-term annealing. In the case where the voltage holding rate is decreased, therefore, the repeated annealing process can realize a liquid crystal display panel resistant to long-term operation. In the embodiment shown in FIG. 136, the second stripe electrodes 22b can use the guest-host liquid crystal with an azo group pigment having a superior optical characteristic added thereto, even with a large charge leakage, as long as a substantially parallel electric field is generated between the second stripe electrodes 22b and the first stripe electrodes 22a.

FIG. 137 is a sectional view showing a modification of the liquid crystal display apparatus according to this invention. This embodiment, though configured substantially the same way as the embodiment shown in FIG. 129, is different in that the nematic liquid crystal or the guest-host liquid crystal 16 is aligned in horizontal direction by the horizontal alignment layers 90, 92 when no voltage is applied thereto. The horizontal alignment layers 90, 92 are AL-1054 of JSR, for example.

In the case where the nematic liquid crystal 16 is used in this embodiment, either n-type or p-type will do. In the case of n type, MJ-95785 of Merck is used, while in the case of p type, ZLI-4792 of Merck is employed.

In this case, the horizontal alignment layers 90, 92 are rubbed in the direction at an angle of about 45 degrees to the direction of the first stripe electrodes 22a and the second stripe electrodes 22b. As a result, the liquid crystal molecules are aligned in horizontal direction in the same direction as the rubbing with no voltage applied thereto. When a voltage is applied between the first stripe electrodes 22a and the second stripe electrodes 22b, on the other hand, the liquid crystal molecules are rotated by about 45 degrees within a plane parallel to the glass substrates 12, 14, and thus come to assume the position parallel or perpendicular to the direction of the electrodes of the first stripe electrodes 22a and the second stripe electrodes 22b. This state is similar to the corresponding state in the first embodiment, in which the direction of light polarization is rotated by about 90 degrees. Thus, the light can be switched by arranging the absorption axis or the transmission axis of the polarizer 110 in a position parallel or perpendicular to the direction of alignment of the liquid crystal with no voltage applied.

In the case where the guest-host liquid crystal 16 is used in this embodiment, on the other hand, the horizontal alignment layers 90, 92 are rubbed in the direction parallel or perpendicular to the direction of the first stripe electrodes 22a and the second stripe electrodes 22b. When a voltage is applied between the first stripe electrodes 22a and the second stripe electrodes 22b, the liquid crystal molecules are rotated by about 90 degrees in a plane parallel to the glass substrates 12, 14 and assume a position substantially parallel or substantially perpendicular to the direction of the electrodes. In this way, by arranging the absorption axis or the transmission axis of the polarizer 26 in the direction parallel or perpendicular to the direction of alignment of the liquid crystal with no voltage applied, the light can be switched.

FIG. 138 is a sectional view showing a modification of a liquid crystal display apparatus according to this invention and shows a configuration in which the reflection layer 94 is formed on the second stripe electrodes 22b, the first stripe electrodes 22a and the glass substrate 14. The reflection layer 94 is made of a photo-curable acrylic resin, for example, with fine white powder of magnesium oxide or fine powder of aluminum metal or the like dispersed therein. In this case, the reflection layer 94 is made of an insulating material, and therefore unlike a metal reflection layer, the insulation from the first stripe electrodes 22a, etc. is not required, thereby simplifying the manufacturing process. This configuration is applicable to the embodiment shown in FIG. 129 or the embodiment shown in FIG. 137.

FIG. 139 is a sectional view showing a modification of a liquid crystal display apparatus, according to this invention, and shows a configuration in which the reflection layer 94 is formed between and in the same layer as the second stripe electrodes 22b and the first stripe electrodes 22a. In this case, if the second stripe electrodes 22b and the first stripe electrodes 22a are formed of a metal, these electrodes also function as a reflector and, in cooperation with the reflection layer 94 formed therebetween, can improve the reflectance of the liquid crystal display panel. This configuration is applicable to the embodiment shown in FIG. 129 or the embodiment shown in FIG. 137, for example.

FIG. 140 is a sectional view showing a modification of the liquid crystal display apparatus according to this invention, and shows a configuration in which the second stripe electrodes 22b and the first stripe electrodes 22a are formed on the lower surface of the glass substrate 12, and the reflection layer 94 is formed on the inner surface of the glass substrate 14. The second stripe electrodes 22b and the first stripe electrodes 22a are ITO transparent electrodes having a thickness of about 1000 A, for example. In this case, too, a horizontal electric field, is generated by applying a voltage between the second stripe electrodes 22b and the first stripe electrodes 22a, and therefore the contrast of the liquid crystal display panel can be improved with a simple structure. By the way, this configuration is applicable to the embodiment shown in FIG. 135 in which the first stripe electrodes 22a are formed on the lower surface of the glass substrate 12.

FIGS. 141 and 142 are a sectional view and a plan view, respectively, of a modification of the liquid crystal display apparatus according to this invention, of which FIG. 141 is a sectional view taken in line 141—141 in FIG. 142. In this embodiment, the first stripe electrodes and the second stripe electrodes are formed on the inner surface of the glass substrate 12, and further similar first stripe electrodes and second stripe electrodes (third stripe electrodes and fourth stripe electrodes) are formed on the inner surface of the glass substrate 14 in a position at right angles to the first stripe electrodes and the second stripe electrodes of the glass substrate 12. Specifically, the first stripe electrode 122a and the second stripe electrode 122b are arranged alternately at predetermined intervals in the direction parallel to the page of FIG. 141 on the inner surface of the glass substrate 12. Also, the first (third) stripe electrode 22a and the second (fourth) stripe electrode 22b are arranged alternately at predetermined intervals in the direction perpendicular to the page of FIG. 141 on the inner surface of the glass substrate 12 through the reflection, layer 94 and the insulating layer 50c. The first stripe electrodes 122a and the second stripe electrodes 122b are orthogonal to the first (third) stripe electrodes 22a and the second (fourth) stripe electrodes 22b, respectively.

According to this embodiment, the liquid crystal molecules aligned in vertical direction with no voltage applied thereto by the vertical alignment layers 20, 24 can be twisted by the electric field generated by the two sets of the stripe electrodes 22a, 22b and 122a, 122b arranged at right angles to each other. As a result, in the case where the guest-host liquid crystal is used, the light absorbance of the guest-host crystal can be improved for an improved display contrast.

FIG. 143 is a sectional view showing a modification of the liquid crystal display apparatus according to this invention, and shows an example configuration substantially similar to the configuration of the embodiment of. FIG. 129, in which the red color filter 82R, the green color filter 82G and the blue color filter 82B are inserted between the glass substrate 12 and the vertical alignment layer 10. According to this embodiment, by applying a voltage between the first stripe electrode 22a and the second stripe electrode 22b, the liquid crystal molecules vertically aligned with no voltage applied thereto can be driven in horizontal direction and thus a color display with a high contrast can be realized with a simple structure.

FIGS. 144 and 145 are a sectional view and a plan view, respectively, of a modification of the liquid crystal display apparatus according to this invention. This configuration is substantially similar to the configuration of the embodiment shown in FIG. 129, in which the second stripe electrodes 22b and the reflection layer 94 are connected by contact holes 97. With the reflection layer 94 formed of a conductive material such as aluminum, the reflection layer 94 and the second stripe electrodes 22b are connected by the contact holes 97. In this case, the contact holes 976 are formed at the time of selective radiation with ultraviolet light like the contact holes 96.

In the case where the reflection layer 94 and the second stripe electrodes 22b are connected to each other with the contact holes 97, the first stripe electrodes 22a form a large auxiliary capacitance with the second stripe electrodes 22b through the insulating layer 401. This auxiliary capacitance improves the holding rate of the data voltage applied to the first stripe electrodes 22a and can display an image with small fluctuations. This auxiliary capacitance can be provided also in the embodiment shown in FIG. 136, and therefore a pigment of azo group high in dichroic ratio, though with large charge leakage, can be added to the guest-host liquid crystal 16 as described above.

It will be understood from the foregoing description that according to this invention, the liquid crystal existing between pixels can be driven so that both the reflectance and the contrast of the liquid crystal display panel can be improved. Also, both the first stripe electrodes and the second stripe electrodes are formed on one substrate, and therefore the electrostatic capacitance of the pixel region is reduced, thereby making it possible to employ a liquid crystal material having a superior optical characteristic such as transmittance. Further, parallel tabular electrodes in opposed relation are not used, and therefore the manufacturing process is simplified and a low-cost liquid crystal display panel is provided. Also, according to this invention, a reflection-type liquid crystal display apparatus small in power consumption and high in light utilization rate can be produced.

Especially, provision of a common first stripe electrode in the boundary between two adjacent pixels can change the direction of alignment of the liquid crystal over the whole pixel region including the boundary between the adjacent pixel regions in the case where the two adjacent pixels are driven at the same time. Thus, the liquid crystal in the boundary portion of the adjacent pixel regions is always driven, thereby realizing a high contrast.

Also, an insulating layer is formed between a conductive reflection layer and the second stripe electrodes, so that the reflection layer and the second stripe electrodes are connected by contact holes. The reflection layer is arranged at least on the portion of the first stripe electrode nearer to the liquid crystal.

FIGS. 146 and 147 are views showing a liquid crystal display apparatus similar to that of FIG. 6 and, and illustrate the alignment of the liquid crystal molecules in more detail. FIGS. 148A and 148B show a part of the liquid crystal display apparatus of FIGS. 146 and 147 near the surface of the dielectric layer 36.

In the liquid crystal display apparatus shown in FIGS. 146 to 148B, a color filter substrate 12 has a transparent electrode 18 to cover substantially the whole surface of a dielectric layer 36, and a TFT substrate 14 has first and second stripe electrodes 22a, 22b. The first stripe electrodes 22a are connected to a TFT 34, and supplied with a data voltage. The second stripe electrodes 22b are connected to a common bus line 40, and supplied with a common voltage. The surface of dielectric layer 36 is substantially flat and substantially parallel to the surface of the substrate. Also, a liquid crystal layer has a positive dielectric anisotropy, and vertical alignment layers 20, 24 and polarizers 26, 28 are provided. The polarizers 26, 28 are adhered to the outsides of the substrates 12, 14 so that transmission axes thereof are perpendicular to each other. An insulating layer is designated by a reference numeral 50 as a whole.

The liquid crystal molecules are aligned perpendicular to the substrates 12, 24 and a light is not allowed to pass through the liquid crystal panel, when no voltage is applied (FIGS. 146 and 148A). The liquid crystal molecules are aligned along the oblique electric field $F_0$ generated between the first stripe electrodes 22a and the transparent electrode 18 and aligned obliquely to the substrates 12, 14, and a light is allowed to pass through the liquid crystal panel by the double refraction effect of the liquid crystal 16, when a voltage is applied (FIGS. 147 and 148B). That is, if the surface of the dielectric layer 36 is flat, all the liquid crystal molecules are aligned perpendicular to the surface of the dielectric layer 36 when no voltage is applied, as shown in FIG. 148A When a voltage is applied, the liquid crystal molecules are aligned along the oblique electric field $F_0$ and aligned obliquely to the surfaces of the substrates 12, 14. When the liquid crystal molecules are aligned along the oblique electric field $F_0$ and obliquely to the surfaces of the substrates 12, 14, a time is needed to change from the state of FIG. 148A to the state of FIG. 148B because of an alignment regulating force of the alignment layer 20. Therefore, the response in driving the liquid crystal is low, and it is required to increase in the driving voltage.

FIGS. 149A to 151 show a further embodiment of the present invention which is aimed to solve the problem explained with reference to FIGS. 146 to 148B. In FIGS. 149A to 151, the surface of the dielectric layer 36 is formed in a curved shape. The alignment layer 20 is also formed in a curved shape, identically to the dielectric layer 36. The curved shape of the surface of the dielectric layer 36 is such that a normal vector at a point on the surface of the dielectric layer 36 is closer to a line which is parallel to an electric line of force penetrating that point than that when the dielectric layer 36 has a surface formed in a planar shape. That is, the surface of the dielectric layer 36 is inclined in such a direction that a normal vector on the surface of the dielectric layer 36 approaches parallel to an electric line of force $F_0$. FIG. 149A shows the alignment of the liquid crystal molecules when no voltage is applied. The liquid crystal molecules are aligned perpendicular to the surface of the substrates 12, 14, and aligned obliquely to the surface of the dielectric layer 36 when no voltage is applied. In this way, by obliquely putting the liquid crystal molecules near the surface of the dielectric layer 36 in advance, the liquid crystal molecules are easily tilted when voltage is applied, as shown in FIG. 149B. Therefore, the voltage for driving the liquid crystal can be reduced, and a response speed of the liquid crystal molecules can be increased.

In other word, the amount of position change of the liquid crystal molecules and the influence of the alignment regulating force of the alignment layer 20, when the liquid crystal molecules are tilted from the state of FIG. 149A to the state of FIG. 149B, are smaller than those when the liquid crystal molecules are tilted from the state of FIG. 148A to the state of FIG. 148B. Therefore, the voltage for driving the liquid crystal can be reduced, and a response speed of the liquid crystal molecules can be increased.

Next, in FIG. 150, if a portion of the surface of the dielectric layer 36 (for example, 36x) corresponding to the gap between the first and second stripe electrodes 22a and 22b is inclined, the liquid crystal molecules are slightly inclined with respect to the surface of the substrate when no voltage is applied, so a problem is posed that a light leaks and the contrast is reduced.

Therefore, as shown in FIG. 152, the liquid crystal display apparatus is designed such that only a portion 36a, 36b of the surface of the dielectric layer 36, corresponding to the first and second stripe electrodes 22a and 22b, is curved and a portion 36x of the surface of the dielectric layer 36 corresponding to the gap between the first and second stripe electrodes 22a and 22b is parallel to the surface of the substrate. By doing so, the liquid crystal molecules, which are positioned at a portion 36x of the surface of the dielectric layer 36 corresponding to the gap between the first and second stripe electrodes 22a and 22b and which affect the display, are aligned perpendicular when no voltage is applied, so no light leak takes place.

In addition, a portion 36b of the surface of the dielectric layer 36 corresponding to the second stripe electrodes 22b receiving the common voltage is protruded as a projection, and a portion 36a of the surface of the dielectric layer 36 corresponding to the first stripe electrodes 22a receiving the data voltage is depressed as a recess. Therefore, a portion 36a of the dielectric layer 36 opposed to the first stripe electrodes 22a is thinnest, and a portion 36b of the dielectric layer 36 opposed to the second stripe electrodes 22b is thickest. Slopes are formed on either side of the protruded portion 36b and the recessed portion 36a. Preferably, the width of the protruded portion 36b including the slope portions is equal to or smaller than the width of the second stripe electrode 22b, and the width of the recessed portion 36a including the slope portions is equal to or smaller than the width of the first stripe electrode 22a. Therefore, in this case, the region along which the surface of the dielectric layer 36 is curved is only a portion on the first and second stripe electrode 22a, 22b.

In the case of the active matrix drive, a selective pulse voltage is applied on the gate bus line 30, and minus several volts is normally applied when the pulse voltage is not applied. Therefore, a large electric field is generated between the gate bus line 30 and the first and second stripe electrode 22a, 22b (the first and second connection electrodes 22c, 22d; FIG. 50). A problem is thus posed in that an aperture ratio is reduced since the distance between the gate bus line 30 and the first and second stripe electrode 22a, 22b is increased or a shield electrode is sometimes necessary.

FIG. 153 is a view for explaining a problem in the alignment of the liquid crystal occurring due to an electric field between the gate bus line 30 and the second stripe electrode 22b. In FIG. 153, the alignment of the liquid crystal is disordered in the regions RA and RB.

FIG. 154 is a view showing an example in which a problem in the alignment of the liquid crystal shown in FIG. 153 is prevented by curving the surface of the dielectric layer 36. The surface of the dielectric layer 36 is arranged so as to balance the electric field between the gate bus line 30 and the second stripe electrode 22b with the alignment regulating force by the alignment layer 20 on the dielectric layer 36, to cause the liquid crystal molecules positioned near the dielectric layer 36 (at a region RC) to be aligned perpendicular to the substrate. In this case, the surface of the dielectric layer 36 is curved in the region RC so that there is a relation of $L_1 > L_2$, where the thickness of a portion of the dielectric layer 36 corresponding to the gate bus line 30 is $L_1$, and the thickness of a portion of the dielectric layer 36 corresponding to the second stripe electrode 22b is $L_2$.

It is advisable that the electric field between the voltage of the gate bus line 30 and the common voltage is balanced with the alignment regulating force, since the second stripe electrode 22b is supplied with the substantially constant common voltage. Regarding the first stripe electrode 22a, an AC voltage is supplied to the first stripe electrode 22a and the intermediate voltage thereof is identical to the common voltage, so the electric field is balanced with the alignment regulating force, supposing that a voltage substantially identical to the common voltage is applied to the first stripe electrode 22a. As a result, it is possible to reduce the distance between the gate bus line 30 and the stripe electrode, and to reduce the width of the shielding electrode, to thereby increase the aperture ratio.

FIG. 155 is a view for explaining that a function as a lens is added to the dielectric layer 36, by curving the surface of the dielectric layer 36. The dielectric layer 36 of FIG. 155 is curved like a concave lens. Therefore, the dielectric layer 36 has a function of a concave lens, and light which is directed to the second stripe electrode 22b is condensed to a gap portion between the first and second stripe electrodes 22a and 22b to thereby enhance a substantial aperture ratio.

A 15 type XGA liquid crystal display apparatus according to the example of FIG. 152 is produced in the following manner. The dielectric layer 36 is formed on one substrate 12, the portion 36a of the dielectric layer 36 corresponding to the first stripe electrode 22a. is treated in a recess shape by a photolithographic process and cured, a resin layer is further applied on the dielectric layer 36, and the portion 36b of the dielectric layer 36 corresponding to the second stripe electrode 22b is treated in a protruding shape by a photo-lithographic process and cured. The resin used is NN700 (JSR). The corners of the protruding portion 36b and the recessed portion 36a are rounded to become slopes, by heating. The vertical alignment layer 20 (JALS204 by JSR) is then applied. The two substrates are joined after the other substrate 14 is formed, and the liquid crystal (ZLI4535 by Merc Japan) is inserted. In addition, a comparative liquid crystal display apparatus having a dielectric layer 36 the surface of which is flat is produced in a similar manner. The comparison of the liquid crystal display apparatus according to this embodiment with the comparative liquid crystal display apparatus shows that the contrast is not reduced, the white brightness is increased by 15% at the same drive voltage, and the response speed is improved by 10 percent.

FIGS. 156 to 158 show a further embodiment of the present invention.

FIG. 156 shows an active matrix similar to that of FIG. 50. The liquid crystal display apparatus having this active matrix has first and second stripe electrodes 22a, 22b, and insulating layers 50a, 50b covering the first and second stripe electrodes 22a, 22b, in a manner as shown in FIG. 73.

FIG. 157 shows the substrate 14 having the first and second stripe electrodes 22a, 22b of FIG. 156, and insulating layers 50a, 50b covering the first and second stripe electrodes 22a, 22b.

The insulating layers 50a, 50b have openings 50h above the second stripe electrodes 22b, and the side walls of the openings 50h are tapered from above. That is, the openings 50h are formed to spread from the side of the TFT substrate 14 to the side of the color filter substrate 12. The contour of the openings 50h is also shown in FIG. 156. In addition, the color filter substrate 12 has the solid transparent electrode 18 shown in FIG. 1.

In FIG. 157, the oblique electric field $F_0$ is formed from the first stripe electrodes 22a to the transparent electrode 18 when the voltage is applied, and the liquid crystal molecules are aligned parallel to the oblique electric field $F_0$ is, as described above. The horizontal electric field formed between the first and second stripe electrodes 22a, 22b functions to aid in the alignment of the liquid crystal derived by the oblique electric field $F_0$. The electric field formed near the second stripe electrodes 22b does not necessarily coincide with the intended oblique electric field $F_0$, and the liquid crystal molecules are apt to align differently from those aligned along the oblique electric field $F_0$. However, the liquid crystal molecules positioned adjacent to the tapering wall 50i of the opening 50h are aligned perpendicular to the tapering wall 50i, with the result that the alignment of these liquid crystal molecules coincides with that of the liquid crystal molecules aligned along the oblique electric field $F_0$. Therefore, the alignment of the liquid crystal is improved.

FIG. 158 shows a modification of the openings 50h of the insulating layers 50a, 50b. The openings 50h are formed in the insulating layers 50a, 50b above the second stripe electrodes 22b, and the openings 50j are formed in the insulating layers 50a, 50b above the first stripe electrodes 22a. The ends of the openings 50h, 50j are narrower than the first and second stripe electrodes 22a, 22b, so that the ends of the openings 50h, 50j are hidden by the first and second stripe electrodes 22a, 22b, respectively. The liquid crystal molecules positioned adjacent to the tapering wall 50i of the opening 50h when no voltage is applied, as described with reference to FIG. 157, so the alignment of the liquid crystal is disordered at those portions and a light leak may be caused. By arranging the openings 50h, 50j above the first and second stripe electrodes 22a, 22b, respectively, as shown in FIG. 158, the disordered alignment portion of the liquid crystal can be shaded by the stripe electrodes 22a, 22b, to thereby improve the contrast.

FIGS. 159 to 163 show a further embodiment of the present invention. In this embodiment, the color filter substrate 12 has the dielectric layer 36 between the transparent electrode 18 and the alignment layer 20.

In FIG. 159, the transparent electrode 18 is formed on the surface of the substrate 12, the color filter layer (containing R, G, and B components) 38 is formed on the transparent electrode 18, the transparent resin layer 36x is formed on the color filter layer 38, and the alignment layer 20 is formed on the transparent resin layer 36x. The dielectric layer 36 comprises the color filter layer 38 and the transparent resin layer 36x.

In FIG. 160, the color filter layer 38 is formed on the surface of the substrate 12, the transparent electrode 18 is formed on the color filter layer (containing R, G, and B components) 38, the transparent resin layer 36x is formed on the transparent electrode 18, and the alignment layer 20 is formed on the transparent resin layer 36x. The dielectric layer 36 comprises the transparent resin layer 36x.

In FIG. 161, the transparent electrode 18 is formed on the surface of the substrate 12, the color filter layer 38 is formed on the transparent electrode 18, and the alignment layer 20 is formed on the color filter layer 38. The dielectric layer 36 comprises the color filter layer 38. In addition, the black matrix is approximately formed on the substrate 12.

In the fabrication of the dielectric layer 36, a sufficient brightness, needed for a display, is not obtained if the ratio (d/∈) of the thickness d to the relative dielectric constant ∈ of the dielectric layer 36 is not appropriate. In addition, in the case of the arrangement of FIG. 160 in which the dielectric layer 36 comprises the transparent resin layer 36x, image sticking of the screen may occur when the liquid crystal panel is used to make an image after the liquid crystal panel is fabricated.

In the case of the arrangement of FIG. 161 in which the dielectric layer 36 comprises the color filter layer 38, image sticking of the screen may not occur, but there is a problem that voltage holding capacity may be decreased by the pollution of the liquid, crystal layer 16 caused by the color filter layer 38, since only the thin alignment layer 20 exists between the liquid crystal layer 16 and the color filter layer 38.

The relative dielectric constant ∈ of the color filter layer 38 is higher than that of the transparent resin. For example, the relative dielectric constant ∈ of the transparent resin is approximately 3 to 3.3, but the relative dielectric constant ∈ of the color filter layer 38 is 3.5 to 4. The voltage applied from the transparent electrode 18 to the liquid crystal is influenced by the dielectric layer 36, since the transparent electrode 18 is arranged underneath the dielectric layer 36. When the relative dielectric constant ∈ of the dielectric layer 36 changes, it is necessary to correspondingly change the thickness of the dielectric layer 36, to maintain the voltage applied to the liquid crystal layer constant. For example, if the relative dielectric constant is a higher value, it is necessary to correspondingly increase the thickness of the dielectric layer 36. In particular, in the case where the dielectric layer 1 has the thickness d1 and the relative dielectric constant ∈1 and the dielectric layer 2 has the thickness d2 and the relative dielectric constant ∈2, in order to maintain the voltage applied to the liquid crystal layer constant, it is advisable to satisfy a relation of (d1/∈1)=(d2/∈2).

As a result of study actually using many resins, it has been found that the display brightness is related to the relative dielectric constant and the thickness of the dielectric layer.

FIG. 162 shows a relation of the ratio (d/∈, unit is f/μm) of the thickness to the relative dielectric constant and the transmittance when the voltage of 10 V is applied, where ∈ (unit is f) is the relative dielectric constant and d (unit is μm) is the thickness of the dielectric layer 36. The ratio (d/∈) is shown in X-axis and the transmittance is shown in Y-axis.

Brightness (transmittance) has a peak when the value of d/∈ is approximately 0.7 f/μm. When the value of d/∈ exceeds 0.7 f/μm, the brightness is slightly decreased. When the value of d/∈ is lower than 0.7 f/μm, the brightness is decreased with the decrease of the value of d/∈. From the result of FIG. 162, d/∈ is preferably equal to or higher than 0.5 f/μm. In the range wherein d/∈ is higher than 0.7 f/μm, the transmittance of the dielectric layer 36 itself, and the brightness is decreased. Therefore, it is also important that d/∈ is not so high, and d/∈ is preferably lower than 0.9 f/μn.

Burning of the dielectric layer 36 is related to the resistivity. There is a tendency that the lower the resistivity of the dielectric layer 36 is, the lower the degree of image sticking of the screen is. As the thickness of the dielectric layer 36 increases, the resistivity becomes higher and the degree of image sticking of the screen becomes greater.

In the configuration of the dielectric layer 36 comprising the transparent resin layer 36x, it is necessary for the dielectric layer 36 to have a certain thickness to meet the brightness requirement, with the result that the resistivity becomes higher and image sticking of the screen may easily occur. Inversely, in the configuration of the dielectric layer 36 comprising the color filter 38, it cannot be said that a sufficient brightness can be obtained when the color filter 38 has a conventionally typical thickness. However, the resistivity is not so high, and image sticking of the screen does not occur.

Therefore, in the configuration of the dielectric layer 36 comprising the color filter 38 and the transparent resin layer 36x, as shown in FIG. 159, it is possible to solve the above described problems simultaneously. In this case, the transparent resin layer 36x is preferably thinner than the color filter 38. The thickness of the dielectric layer 36 in this case is thicker than the thickness of the dielectric layer 36 comprising the single layer of the color filter 38, and becomes a thickness by which a sufficient brightness can be ensured. In addition, the resistivity of the dielectric layer 36 in this case is smaller than the resistivity of the dielectric layer 36 comprising the single layer of the transparent resin layer 36x, and image sticking of the screen may not occur. In addition, the liquid crystal layer 16 is not polluted by the color filter layer 38 since the transparent resin layer 36x which is denser than the color filter 38 is arranged outside the color. filter 38, and a problem of the reduction of the voltage holding capacity is solved.

In the configuration of the dielectric layer 36 comprising the color filter 38 and the transparent resin layer 36x, the relation of 0.5<(d1/∈1)+(d2/∈2) is preferably satisfied, similar to the single layer dielectric layer 36. More preferably, the relation of 0.5<(d1/∈)+(d2/∈2)<0.9 is satisfied.

FIG. 163 is a diagram showing a relation between the thickness of the transparent resin layer 36x of the dielectric layer 36 and image sticking of the screen when the thickness of the color filter 38 is 2 μm. Image sticking of the screen is represented by the sum. ($S_T$) of squares of differences between the brightness before the voltage is applied and the brightness after the voltage of 3 Volt is applied. It will be seen that the degree of image sticking of the screen becomes greater, as the thickness of the transparent resin layer 36x is greater. This is supposed that the ratio of the transparent resin layer 36x within the dielectric layer 36 becomes greater, and the effect of the low resistance color filter 38 located underneath the transparent resin layer 36x becomes low, so charges may be easily collected. That is, the effect of preventing image sticking of the screen is not so much if the ratio of the low resistance color filter 38 within the transparent resin layer 36x and the color filter 38 which are used as the dielectric layer 36 is not so great. The thickness of the transparent resin layer 36x formed on the color filter 38 is preferably as thin as possible.

The Table 3 below shows image sticking of the screen and the voltage holding ratio (VHR) in the embodiments of FIGS. 159 to 161.

TABLE 3

|  | $S_T$ | VHR |
| --- | --- | --- |
| Embodiment of FIG. 159 | 1.0 E-05 | 92.5% |
| Embodiment of FIG. 160 | 7.2 E-05 | 95.0% |
| Embodiment of FIG. 161 | 1.3 E-05 | 77.2% |

In the fabrication of the color filter substrate, a thin Cr layer is formed on the glass plate 12 to form the black matrix (not shown). The color filter layer was formed on the black matrix in the conventional color filter substrate, but in this step in the present invention, the transparent electrode 18 of ITO or the like is formed by the sputtering method. The RGB components of the color filter layer 38 are respectively formed on the transparent electrode 18 by the photolithographic process. The relative dielectric constant of the color filter layer 3 is approximately 4. The transparent resin layer 36x is then formed on the color filter layer 38. In this case, the transparent resin layer 36x is preferably made of a resin which can be patterned, since through holes are provided in the transparent resin layer 36x to connect transfer electrodes in the TFT substrate to the transparent electrode 18 in the color filter substrate. Here, a positive resist type transparent resin having the relative dielectric constant ∈ of 3.3 and the thickness of approximately 0.2 μm is formed on the color filter layer 38 having the RGB components. After the transparent resin layer is applied, an ultraviolet ray is irradiated onto portions where through holes are to be formed, and development is carried out using a development solution (for example, TMAH solution).

The transparent resin may be a usually used transparent resist (for example, Shibray S1808 or the like) which is decolored by a photobleaching process. The vertical alignment layer is then, applied to the transparent resin layer.

The active matrix including gate bus lines, data bus lines, and TFTs, the first and second stripe electrodes 22a, 22b, and the vertical alignment layer are formed in the TFT substrate.

In the liquid crystal panel thus fabricated, the value of d/∈ as the total of the color filter layer 38 and the transparent resin layer 36x is approximately 0.6, which is close to a value providing the peak in FIG. 162, so the brightness is increased. Also, in this condition, image sticking of the screen does not occur and higher voltage holding ratio is ensured.

FIG. 164 shows a further embodiment of the present invention. In this embodiment, the color filter substrate 12 has a dielectric layer 36y between the transparent electrode 18 and the alignment layer 20. The dielectric layer 36y has an optical anisotropy. That is, in FIG. 25, the phase film 42 is arranged separately from the dielectric layer 36 (not shown in FIG. 25), but in FIG. 159, the dielectric layer 36y has the function of the dielectric layer 36 and the function of the phase film 42 in combination. Therefore, the above description regarding the phase film 42 is also applicable to the dielectric layer 36y. The equations (1) to (5) and FIGS. 28 to 31 are also applicable to the dielectric layer 36y. Therefore, a repeated explanation is omitted here.

The dielectric layer 36y can be made of a polymer liquid crystal having photopolymerization groups or a discotic liquid crystal. FIG. 165 shows an example of a discotic liquid crystal usable as the dielectric layer 36y. For example, in the formation of the dielectric layer 36y, the transparent electrode 18 is formed on the glass substrate 12, and an alignment layer to cause the dielectric layer 36y to be aligned (for example, AL3045 of JSR) is formed on the transparent electrode 18. The discotic liquid crystal mixed with a solvent is applied onto the alignment layer and, and after volatile components are vaporized on a hot plate, it is cured by irradiation of ultraviolet light to form the dielectric layer 36. The dielectric layer 36 can be cured by heating. The vertical alignment layer 20 is then formed on the dielectric layer 36. In this embodiment, it is possible to easily fabricate a liquid crystal display apparatus having a superior visual characteristics.

Also, it is possible to reduce the driving voltage and to improve the response speed of the liquid crystal.

What is claimed is:

1. A liquid crystal display apparatus comprising:
   a pair of substrates;
   a liquid crystal arranged between said pair of the substrates;
   a plurality of stripe electrodes per pixel formed in one of said substrates; and
   a transparent electrode formed inside the other substrate in such a manner as to cover substantially the whole surface of said other substrate,
   wherein said stripe electrodes comprise first and second groups of stripe electrodes parallel to each other, the first group of stripe electrodes are supplied with a first voltage and the second group of stripe electrodes are supplied with a second voltage different from the first voltage.

2. A liquid crystal display apparatus according to claim 1, wherein all of the plurality of stripe electrodes are supplied with the same voltage.

3. A liquid crystal display apparatus according to claim 1, wherein the first group of stripe electrodes are supplied with a data voltage and the second group of stripe electrodes are supplied with a different voltage.

4. A liquid crystal display apparatus according to claim 1, wherein said liquid crystal has a positive dielectric anisotropy and the initial alignment thereof when no voltage applied thereto is a vertical alignment.

5. A liquid crystal display apparatus according to claim 1, further comprising a dielectric layer between the transparent electrode and the liquid crystal layer.

6. A liquid crystal display apparatus according to claim 5, wherein the dielectric layer is formed in contact with the transparent electrode and an alignment layer is formed on said dielectric layer for causing the liquid crystal to be aligned.

7. A liquid crystal display apparatus according to claim 5, wherein said dielectric layer is formed of a color filter layer.

8. A liquid crystal display apparatus according to claim 5, wherein said dielectric layer is adapted for alignment.

9. A liquid crystal display apparatus according to claim 1, wherein the initial alignment of the liquid crystal is a vertical alignment and a liquid crystal panel including said pair of the substrates is arranged between crossed Nicol polarizers.

10. A liquid crystal display apparatus according to claim 9, wherein said stripe electrodes include first and second groups of stripe electrodes, the first group of stripe electrodes have parallel linear portions, the second group of stripe electrodes have parallel linear portions, and the linear portions of the first group of stripe electrodes are parallel to the linear portions of the second group of stripe electrodes.

11. A liquid crystal display apparatus according to claim 1, further comprising a pair of polarizers having axes at right angles to each other and arranged on either side of a liquid crystal panel including said pair of substrates, and at least one phase layer is arranged between at least one of the polarizers and the liquid crystal panel.

12. A liquid crystal display apparatus according to claim 11, wherein the initial alignment of the liquid crystal of the liquid crystal panel is a vertical alignment, and the relation holds that $$n_x \geq n_z, n_y \geq n_z \text{ (not } n_x = n_y = n_z) \tag{1}$$

where $n_x$, $n_y$, $n_z$ are main refractive indexes of the phase layer, in which $n_x$, $n_y$ are taken in a plane of the phase layer, $n_z$ is taken normal to the phase layer, $n_x$ is taken perpendicular to an absorption axis of the adjacent polarizer, and $n_y$ is taken parallel to the absorption axis of the adjacent polarizer.

13. A liquid crystal display apparatus according to claim 11, wherein N phase layers are provided in which the initial alignment of the liquid crystal of the liquid crystal panel is a vertical alignment, and the relation holds that $$n_x \geq n_z, n_y \geq n_z \text{ (not } n_x = n_y = n_z) \tag{1}$$

where $n_x$, $n_y$, $n_z$ are main refractive indexes of the phase layers, in which $n_x$, $n_y$ are taken in a plane of the phase layer, $n_z$ is taken normal to the phase layer, $n_x$ is taken perpendicular to an absorption axis of the adjacent polarizer, and $n_y$ is taken parallel to the absorption axis of the adjacent polarizer, and wherein the following phases are satisfied at the same time $$-130 \text{ nm} \leq R_1 \leq 230 \text{ nm} \tag{2}$$

$$-130 \text{ nm} \leq R_N \leq 230 \text{ nm}$$

$$R_{t1}R_{t2} + \ldots R_{tN} \leq 1.6 \times R_{LC} \tag{3}$$

where d is the thickness of the phase layers, $\Delta nd_{LC}$ of the liquid crystal panel is $R_{LC}$, $R=(n_x-n_y)d$, $R_t=((n_x+n_y)/2-n_z)d$, R of the N phase layers is $R_1, R_2, \ldots R_N$, and $R_t$ is $R_{t1} R_{t2} \ldots R_{tN}$.

14. A liquid crystal display apparatus according to claim 11, wherein N phase layers are provided in which the initial alignment of the liquid crystal of the liquid crystal panel is a vertical alignment, and the relation holds that $$n_x \geq n_z, \; n_y \geq n_z \text{ (not } n_x = n_y = n_z) \quad (1)$$

where $n_x$, $n_y$, $n_z$ are main refractive indexes of the phase layers, in which $n_x$, $n_y$ are taken in a plane of the phase layers, $n_z$ is taken normal to the phase layers, $n_x$ is taken perpendicular to an absorption axis of the adjacent polarizer, and $n_y$ is taken parallel to the absorption axis of the adjacent polarizer, and wherein the following phases are satisfied at the same time $$-50 \text{ nm} \leq R_1 \leq 150 \text{ mm} \quad (4)$$

$$-50 \text{ nm} \leq R_N \leq 150 \text{ nm}$$

$$R_{t1} + R_{t2} + \ldots R_{tN} \leq 1.3 \times R_{LC} \quad (5)$$

where d is the thickness of the phase layers, $\Delta nd_{LC}$ of the liquid crystal panel is $R_{LC}$, $R=(n_x-n_y)d$, $R_t=((n_x+n_y)/2-n_z)d$, R of the N phase layers is $R_1, R_2, \ldots R_N$, and $R_t$ is $R_{t1}$ $R_{t2}$ … $R_{tN}$.

15. The liquid crystal display apparatus of claim 1 comprising:
an alignment layer formed in the other substrate; and
a plurality of pixels, each pixel having a peripheral portion, a first connection electrode arranged at the peripheral portion of said pixel for connecting the first group of stripe electrodes together, and a second connection electrode arranged at the peripheral portion of the pixel for connecting the second group of stripe electrodes together, the first connection electrode at least partially overlapping the second connection electrode through an insulating layer.

16. The liquid crystal display apparatus according to claim 1, comprising:
an alignment layer formed in the other substrate;
each of the stripe electrodes of the first and second groups located in one region having a shape aligned in one direction, each of the stripe electrodes of the first and second groups located in another region having the same shape as the stripe electrodes of said first and second groups located in said one region but aligned in the direction opposite to said one direction.

17. The liquid crystal display apparatus according to claim 16, wherein the first group of stripe electrodes includes a first subgroup of parallel linear portions and a second subgroup of parallel linear portions arranged at an angle to the first subgroup of linear portions, and the second group of stripe electrodes includes a third subgroup of parallel linear portions and a fourth subgroup of parallel linear portions arranged at an angle to the third subgroup of the linear portions, the first and second subgroups of linear portions and the third and fourth subgroups of linear portions being arranged at an angle of 2 to 88 degrees to the data bus lines.

18. The liquid crystal display apparatus according to claim 17, wherein the angles are 45 degrees.

19. The liquid crystal display apparatus according to claim 1, further comprising gate bus lines, data bus lines and TFTs, the first group of the stripe electrodes being connected to the TFTs, wherein one of the stripe electrodes of the first group is connected to a portion of a first connection electrode parallel to the data bus lines, said portion of said first connection electrode extends in one direction from the joint between said one stripe electrode and said portion of said first connection electrode, and a driving correction electrode portion extends in parallel to said data bus lines in the direction opposite to said portion of the connection electrode and ends at a position overlapping the nearest one of the stripe electrodes of the second group.

20. The liquid crystal display apparatus according to claim 1, comprising:
a plurality of TFTs and an alignment layer formed in one of said substrates;
an alignment layer formed in the other substrate;
a plurality of pixels, each pixel having a peripheral portion, a first connection electrode arranged at the peripheral portion of said pixel for connecting the first group of stripe electrodes together, and a second connection electrode arranged at the peripheral portion of said pixel for connecting the second group of stripe electrodes together, said first connection electrode being connected to the TFTs, said second connection electrode being connected to a second connection electrode of an adjacent pixel by a plurality of common bus lines.

21. The liquid crystal display apparatus according to claim 20, wherein the stripe electrode extend at an angle of 45 degrees to the bus lines.

22. A liquid crystal display apparatus comprising:
a pair of substrates;
a liquid crystal arranged between said pair of the substrates;
a plurality of stripe electrodes and an alignment layer formed in one of said substrates;
an alignment layer formed in the other substrate;
said stripe electrodes including first and second groups of stripe electrodes parallel to each other, the first group of stripe electrodes being supplied with a first voltage, and the second group of stripe electrodes being supplied with a second voltage different from the first voltage; and
each of the stripe electrodes of the first and second groups located in one region having a shape aligned in one direction, each of the stripe electrodes of the first and second groups located in another region having the same shape as the stripe electrodes of said first and second groups located in said one region but aligned in the direction perpendicular to said one direction,
wherein the first group of stripe electrodes include a first subgroup of parallel linear portions and a second subgroup of parallel linear portions arranged at an angle to the first subgroup of linear portions, and the second group of stripe electrodes include a third subgroup of parallel linear portions and a fourth subgroup of parallel linear portions arranged at an angle to the third subgroup of the linear portions, the first and second subgroups of linear portions and the third and fourth subgroups of linear portions being arranged at an angle of 2 to 88 degrees to the data bus lines.

23. A liquid crystal display apparatus according to claim 22, wherein said one region and said another region are arranged alternately.

24. A liquid crystal display apparatus comprising:
a pair of substrates;
a liquid crystal arranged between said pair of substrates;
a plurality of stripe electrodes and an alignment layer formed in one of said substrates;

an alignment layer formed in the other substrate;

gate bus lines, data bus lines and TFTs arranged in said one substrate;

said stripe electrodes including first and second groups of stripe electrodes parallel to each other, the first group of stripe electrodes being supplied with a first voltage, and the second group of stripe electrodes being supplied with a second voltage different from the first voltage;

a plurality of pixels, each pixel having a peripheral portion, a first connection electrode arranged at the peripheral portion of the pixel for connecting the first group of stripe electrodes together, and a second connection electrode arranged at the peripheral portion of the pixel for connecting the second group of stripe electrodes together, the first connection electrode at least partially overlapping the second connection electrode through an insulating layer; and a driving correction electrode portion crossing one stripe electrode of said first or second groups at a right or acute angle thereto, said driving correction electrode portion being connected to one stripe electrode of the group different from the group including said first one stripe electrode and arranged in the same layer as said first or second connection electrode for said one stripe electrode of said different group;

wherein the first group of stripe electrodes includes a first subgroup of parallel linear portions and a second subgroup of parallel linear portions arranged at an angle to the first subgroup of the linear portions, and the second group of the stripe electrodes includes a third subgroup of parallel linear portions and a fourth subgroup of parallel linear portions arranged at an angle to the third subgroup of the linear portions, the first and second subgroups of linear portions and the third and fourth subgroups of linear portions being arranged at an angle of 2 to 88 degrees to the data bus lines;

wherein said one substrate further comprises gate bus lines, data bus lines and TFTs, the first group of the stripe electrodes being connected to the TFTs; and wherein in one pixel, said first connection electrode includes a plurality of connection electrode portions connecting the first and second subgroups of linear portions together, and discontinuously extending in parallel to the data bus lines at the peripheral portion of the pixel for connecting the ends of at least two linear portions of said first and second subgroups to each other, and said second connection electrode interconnects said third and fourth subgroups of the linear portions together.

25. A liquid crystal display apparatus comprising:

a pair of substrates;

a liquid crystal arranged between said pair of substrates;

a plurality of stripe electrodes and an alignment layer formed in one of said substrates;

an alignment layer formed in the other substrate;

gate bus lines, data bus lines and TFTs arranged in said one substrate;

said stripe electrodes including first and second groups of stripe electrodes parallel to each other, the first group of stripe electrodes being supplied with a first voltage, and the second group of stripe electrodes being supplied with a second voltage different from the first voltage;

a plurality of pixels, each pixel having a peripheral portion, a first connection electrode arranged at the peripheral portion of the pixel for connecting the first group of stripe electrodes together, and a second connection electrode arranged at the peripheral portion of the pixel for connecting the second group of stripe electrodes together, the first connection electrode at least partially overlapping the second connection electrode through an insulating layer; and a driving correction electrode portion crossing one stripe electrode of said first or second groups at a right or acute angle thereto, said driving correction electrode portion being connected to one stripe electrode of the group different from the group including said first one stripe electrode and arranged in the same layer as said first or second connection electrode for said one stripe electrode of said different group;

wherein the first group of the stripe electrodes is connected to the TFTs, wherein one of the stripe electrodes of the first group is connected to a portion of the first connection electrode parallel to the data bus lines, said portion of said first connection electrode extends in one direction from the joint between said one stripe electrode and said portion of said first connection electrode, and said driving correction electrode portion extends in parallel to said data bus lines in the direction opposite to said portion of the connection electrode and ends at a position overlapping the nearest one of the stripe electrodes of the second group.

26. A liquid crystal display apparatus according to any one of claim 24 or 25, wherein one of the stripe electrodes of the second group is connected to a portion of the second connection electrode parallel to the gate bus lines, and said driving correction electrode portion is connected to the inner side of said portion of said second connection electrode.

27. A liquid crystal display apparatus according to any one of claim 24 or 25, wherein said driving correction electrode portion is formed in such a manner that said first connection electrode is depressed so that said second connection electrode protrudes from said first connection electrode.

28. A liquid crystal display apparatus according to any one of claim 24 or 25, wherein said driving correction electrode portion is in the same layer as an overlapping portion of the first and second connection electrodes, and said driving correction electrode portion protrudes inward from another overlapping portion of said first and second connection electrodes.

29. A liquid crystal display apparatus comprising:

a pair of substrates;

a liquid crystal arranged between said pair of substrates;

a plurality of stripe electrodes and an alignment layer formed in one of said substrates;

a transparent electrode covering substantially the whole surface of the other substrate and an alignment layer formed in the other substrate;

said stripe electrodes including first and second groups of stripe electrodes parallel to each other, the first group of stripe electrodes being supplied with a first voltage and the second group of stripe electrodes being supplied with a second voltage different from the first voltage; and said transparent electrode having a region of high resistance and a region of low resistance.

* * * * *

UNITED STATES PATENT AND TRADEMARK OFFICE
CERTIFICATE OF CORRECTION

PATENT NO.    : 6,642,984 B1
DATED         : November 4, 2003
INVENTOR(S)   : Hidefumi Yoshida et al.

It is certified that error appears in the above-identified patent and that said Letters Patent is hereby corrected as shown below:

Column 68,
Line 60, between "-130 nm < R1 < 230 nm" and "-130 nm < RN < 230 nm", insert
-- . . . . . . . . . . . . --.

Column 69,
Line 18, between "-50 nm < RI < 150 nm" and "50 nm < RN < 150 nm", insert
-- . . . . . . . . . . . . --.

Signed and Sealed this

Twenty-second Day of June, 2004

JON W. DUDAS
*Acting Director of the United States Patent and Trademark Office*